(12) United States Patent
Matsumura et al.

(10) Patent No.: US 8,014,079 B2
(45) Date of Patent: Sep. 6, 2011

(54) ZOOM LENS SYSTEM, IMAGING DEVICE AND CAMERA

(75) Inventors: Yoshio Matsumura, Osaka (JP); Nobuyuki Adachi, Tokyo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/829,529

(22) Filed: Jul. 2, 2010

(65) Prior Publication Data

US 2011/0002049 A1    Jan. 6, 2011

(30) Foreign Application Priority Data

Jul. 3, 2009 (JP) ................................. 2009-158776
Jul. 3, 2009 (JP) ................................. 2009-158777
Jul. 3, 2009 (JP) ................................. 2009-158778
Jul. 3, 2009 (JP) ................................. 2009-158779

(51) Int. Cl.
*G02B 15/14* (2006.01)

(52) U.S. Cl. ........ 359/687; 359/683; 359/684; 359/685; 359/715; 359/740; 359/774

(58) Field of Classification Search .................. 359/687, 359/683–685, 715, 740, 774
See application file for complete search history.

(56) References Cited

U.S. PATENT DOCUMENTS

| 2005/0190457 A1 | 9/2005 | Ohashi |
| 2006/0193062 A1 | 8/2006 | Ohashi |
| 2007/0201146 A1 | 8/2007 | Saruwatari |
| 2008/0106798 A1* | 5/2008 | Sato ............................... 359/687 |
| 2008/0180808 A1* | 7/2008 | Hankawa et al. ............. 359/687 |
| 2008/0204892 A1 | 8/2008 | Satori et al. |
| 2008/0231969 A1 | 9/2008 | Satori |
| 2009/0073574 A1* | 3/2009 | Yoshitsugu .................... 359/687 |
| 2009/0080088 A1* | 3/2009 | Ohashi ........................... 359/687 |
| 2009/0091841 A1* | 4/2009 | Ohashi ........................... 359/684 |
| 2009/0109546 A1* | 4/2009 | Watanabe et al. ............. 359/687 |
| 2009/0296230 A1* | 12/2009 | Sakai ............................. 359/684 |
| 2010/0007967 A1* | 1/2010 | Ohashi ........................... 359/684 |
| 2011/0002049 A1* | 1/2011 | Matsumura et al. .......... 359/687 |

FOREIGN PATENT DOCUMENTS

| JP | 2005-326743 A | 11/2005 |
| JP | 2006-078979 A | 3/2006 |
| JP | 2006-235062 A | 9/2006 |
| JP | 2007-212537 A | 8/2007 |
| JP | 2007-226142 A | 9/2007 |
| JP | 2008-203453 A | 9/2008 |
| JP | 2008-209773 A | 9/2008 |
| JP | 2008-225328 A | 9/2008 |

* cited by examiner

*Primary Examiner* — Evelyn A. Lester
(74) *Attorney, Agent, or Firm* — Pearne & Gordon LLP

(57) ABSTRACT

A zoom lens system, in order from an object side to an image side, comprising a first lens unit of positive power, a second lens unit of negative power, a third lens unit of positive power, and a fourth lens unit of positive power, wherein in zooming, the first to the fourth lens units are moved along the optical axis such that the air spaces between the individual lens units should vary, so that magnification change is achieved, and wherein the conditions: $-0.60 < M_2/f_{G2} < -0.07$, $\omega_W \geq 30$, and $f_T/f_W \geq 4.5$ ($M_2$ is an amount of axial movement of the second lens unit in zooming, $f_{G2}$ is a composite focal length of the second lens unit, $\omega_W$ is a half view angle at a wide-angle limit, and $f_T$ and $f_W$ are focal lengths of the entire system at a telephoto limit and at a wide-angle limit, respectively) are satisfied, an imaging device and a camera are provided.

20 Claims, 82 Drawing Sheets

ZOOM LENS SYSTEM, IMAGING DEVICE AND CAMERA

CROSS-REFERENCE TO RELATED APPLICATION

This application is based on application Nos. 2009-158776, 2009-158777, 2009-158778 and 2009-158779 filed in Japan on Jul. 3, 2009, the contents of which are hereby incorporated by reference.

BACKGROUND OF THE INVENTION

1. Field of the Invention

The present invention relates to a zoom lens system, an imaging device and a camera. In particular, the present invention relates to: a high-performance zoom lens system that has a remarkably reduced overall length of lens system (the optical axial distance measured from the object side surface of the most object side lens element to the image surface) and hence a reduced size and still has good balance between a wide view angle at a wide-angle limit and a high zooming ratio; an imaging device employing this zoom lens system; and a thin and compact camera employing this imaging device.

2. Description of the Background Art

Remarkably strong requirements of size reduction and performance improvement are present in digital still cameras and digital video cameras (simply referred to as digital cameras, hereinafter) provided with an image sensor for performing photoelectric conversion. In particular, from a convenience point of view, digital cameras are strongly requested that employ a zoom lens system having a high zooming ratio and still covering a wide focal-length range from a wide angle condition to a highly telephoto condition. On the other hand, in recent years, zoom lens systems are also desired that have a wide angle range where the photographing field is large.

As zoom lens systems having a high zooming ratio and zoom lens systems having a wide angle range as described above, in the conventional art, various kinds of zoom lens systems have been proposed that has a four-unit construction of positive, negative, positive and positive in which in order from the object side to the image side, provided are a first lens unit having positive optical power, a second lens unit having negative optical power, a third lens unit having positive optical power, and a fourth lens unit having positive optical power.

Japanese Laid-Open Patent Publication No. 2005-326743 discloses a zoom lens having a four-unit construction of positive, negative, positive and positive and having an aperture diaphragm located between the second lens unit and the third lens unit, in which in magnification change from a wide-angle limit to a telephoto limit, the interval between the first lens unit and the second lens unit increases while the interval between the second lens unit and the third lens unit decreases, in which the ratio between the focal length of the entire system and the maximum image height is set forth at a wide-angle limit, and in which the second lens unit is composed of three lenses, in order from the object side to the image side, consisting of a negative lens with the larger curvature surface facing the image side, a positive lens with the larger curvature convex surface facing the image side, and a negative lens with the larger curvature concave surface facing the object side.

Japanese Laid-Open Patent Publication No. 2006-078979 discloses a zoom lens having a four-unit construction of positive, negative, positive and positive, in which in magnification change from a wide-angle limit to a telephoto limit, the interval between the first lens unit and the second lens unit increases while the interval between the second lens unit and the third lens unit decreases, in which the ratio between the focal length of the entire system and the maximum image height is set forth at a wide-angle limit, and in which the second lens unit is composed of three lenses, in order from the object side, consisting of a negative lens with the larger curvature surface facing the image side, a positive lens with the larger curvature surface facing the image side, and a negative lens with the larger curvature surface facing the object side, with an air space between the individual lenses.

Japanese Laid-Open Patent Publication No. 2006-235062 discloses a zoom lens having a four-unit construction of positive, negative, positive and positive, in which in magnification change from a wide-angle limit to a telephoto limit, the first lens unit and the third lens unit move to the object side while the aperture diaphragm moves independently of the adjacent lens units, and in which the ratio between the total amount of movement of the first lens unit at the time of magnification change from a wide-angle limit to a telephoto limit and the focal length of the entire system at a telephoto limit is set forth.

Japanese Laid-Open Patent Publication No. 2008-209773 discloses a zoom lens having a four-unit construction of positive, negative, positive and positive and having an illuminance diaphragm located between the second lens unit and the third lens unit, in which in magnification change from a wide-angle limit to a telephoto limit, the first lens unit moves such as to be located on more object side at a telephoto limit than at a wide-angle limit, the second lens unit moves such as to be located on more image side at a telephoto limit than at a wide-angle limit, the illuminance diaphragm moves such as to be located on more object side at a telephoto limit than at a wide-angle limit, and the third lens unit moves such as to be located on more object side at a telephoto limit than at a wide-angle limit, and in which the ratio between the focal lengths of the entire zoom lens system at a wide-angle limit and at a telephoto limit is set forth.

Japanese Laid-Open Patent Publication No. 2008-225328 discloses a zoom lens having a four-unit construction of positive, negative, positive and positive and having an illuminance diaphragm located between the second lens unit and the third lens unit, in which in magnification change from a wide-angle limit to a telephoto limit, the first lens unit, the second lens unit, and the third lens unit move such that the interval between the first lens unit and the second lens unit increases while the interval between the second lens unit and the third lens unit decreases, and the illuminance diaphragm moves such that the distance from the second lens unit decreases, in which the second lens unit, in order from the object side, composed of three lenses consisting of a first negative lens, a positive lens, and a second negative lens, and in which the ratio between the focal length of the second lens unit and the focal length of the entire zoom lens system at a telephoto limit and the ratio between the focal length of the second negative lens and the focal length of the entire zoom lens system at a telephoto limit are set forth.

In the zoom lenses disclosed in the patent documents, size reduction is achieved to an extent applicable to thin and compact digital cameras. Nevertheless, in some cases, although a somewhat wide view angle is obtained at a wide-angle limit, the achieved zooming ratio is as low as 4 or the like. In alternative cases, in contrast, although a satisfactory zooming ratio of 6 or the like is obtained, the achieved view angle at a wide-angle limit is unsatisfactory. As such, from the perspective of the balance between the view angle at a wide-angle limit and the zooming ratio, these zoom lenses do not satisfy the requirement for digital cameras in recent years.

SUMMARY OF THE INVENTION

An object of the present invention is to provide: a high-performance zoom lens system that has a remarkably reduced overall length of lens system and hence a reduced size and still has good balance between a wide view angle at a wide-angle limit and a high zooming ratio; an imaging device employing this zoom lens system; and a thin and compact camera employing this imaging device.

(I) The novel concepts disclosed herein were achieved in order to solve the foregoing problems in the conventional art, and herein is disclosed:

a zoom lens system, in order from an object side to an image side, comprising a first lens unit having positive optical power, a second lens unit having negative optical power, a third lens unit having positive optical power, and a fourth lens unit having positive optical power, wherein in zooming from a wide-angle limit to a telephoto limit at the time of image taking, the first lens unit, the second lens unit, the third lens unit and the fourth lens unit are moved individually along an optical axis such that air spaces between the individual lens units should vary, so that variable magnification is achieved, and wherein the following conditions (1-1), (a) and (b) are satisfied:

$$-0.60 < M_2/f_{G2} < -0.07 \quad (1\text{-}1)$$

$$\omega_W \geq 30 \quad (a)$$

$$f_T/f_W \geq 4.5 \quad (b)$$

where, $M_2$ is an amount of axial movement of the second lens unit in zooming from a wide-angle limit to a telephoto limit (the wide-angle limit is adopted as a reference position, and movement from the image side to the object side is defined as positive), $f_{G2}$ is a composite focal length of the second lens unit, $\omega_W$ is a half view angle (°) at a wide-angle limit, $f_T$ is a focal length of the entire system at a telephoto limit, and $f_W$ is a focal length of the entire system at a wide-angle limit.

The novel concepts disclosed herein were achieved in order to solve the foregoing problems in the conventional art, and herein is disclosed:

an imaging device capable of outputting an optical image of an object as an electric image signal, comprising:

a zoom lens system that forms the optical image of the object; and an image sensor that converts the optical image formed by the zoom lens system into the electric image signal, wherein in the zoom lens system, the zoom lens system, in order from an object side to an image side, comprises a first lens unit having positive optical power, a second lens unit having negative optical power, a third lens unit having positive optical power, and a fourth lens unit having positive optical power, wherein in zooming from a wide-angle limit to a telephoto limit at the time of image taking, the first lens unit, the second lens unit, the third lens unit and the fourth lens unit are moved individually along an optical axis such that air spaces between the individual lens units should vary, so that variable magnification is achieved, and wherein the following conditions (1-1), (a) and (b) are satisfied:

$$-0.60 < M_2/f_{G2} < -0.07 \quad (1\text{-}1)$$

$$\omega_W \geq 30 \quad (a)$$

$$f_T/f_W \geq 4.5 \quad (b)$$

where, $M_2$ is an amount of axial movement of the second lens unit in zooming from a wide-angle limit to a telephoto limit (the wide-angle limit is adopted as a reference position, and movement from the image side to the object side is defined as positive), $f_{G2}$ is a composite focal length of the second lens unit, $\omega_W$ is a half view angle (°) at a wide-angle limit, $f_T$ is a focal length of the entire system at a telephoto limit, and $f_W$ is a focal length of the entire system at a wide-angle limit.

The novel concepts disclosed herein were achieved in order to solve the foregoing problems in the conventional art, and herein is disclosed:

a camera for converting an optical image of an object into an electric image signal and then performing at least one of displaying and storing of the converted image signal, comprising an imaging device including a zoom lens system that forms the optical image of the object and an image sensor that converts the optical image formed by the zoom lens system into the electric image signal, wherein in the zoom lens system, the zoom lens system, in order from an object side to an image side, comprises a first lens unit having positive optical power, a second lens unit having negative optical power, a third lens unit having positive optical power, and a fourth lens unit having positive optical power, wherein in zooming from a wide-angle limit to a telephoto limit at the time of image taking, the first lens unit, the second lens unit, the third lens unit and the fourth lens unit are moved individually along an optical axis such that air spaces between the individual lens units should vary, so that variable magnification is achieved, and wherein the following conditions (1-1), (a) and (b) are satisfied:

$$-0.60 < M_2/f_{G2} < -0.07 \quad (1\text{-}1)$$

$$\omega_W \geq 30 \quad (a)$$

$$f_T/f_W \geq 4.5 \quad (b)$$

where, $M_2$ is an amount of axial movement of the second lens unit in zooming from a wide-angle limit to a telephoto limit (the wide-angle limit is adopted as a reference position, and movement from the image side to the object side is defined as positive), $f_{G2}$ is a composite focal length of the second lens unit, $\omega_W$ is a half view angle (°) at a wide-angle limit, $f_T$ is a focal length of the entire system at a telephoto limit, and $f_W$ is a focal length of the entire system at a wide-angle limit.

(II) The novel concepts disclosed herein were achieved in order to solve the foregoing problems in the conventional art, and herein is disclosed:

a zoom lens system, in order from an object side to an image side, comprising a first lens unit having positive optical power, a second lens unit having negative optical power, a third lens unit having positive optical power, and a fourth lens unit having positive optical power, wherein in zooming from a wide-angle limit to a telephoto limit at the time of image taking, the first lens unit, the second lens unit, the third lens unit and the fourth lens unit are moved individually along an optical axis such that air spaces between the individual lens units should vary, so that variable magnification is achieved, wherein at least one of the lens elements constituting the second lens unit satisfies the following condition (1-2), and wherein the following conditions (a) and (b) are satisfied:

$$11.8 < f_W/t_{LG2} < 500.0 \tag{1-2}$$

$$\omega_W \geq 30 \tag{a}$$

$$f_T/f_W \geq 4.5 \tag{b}$$

where, $t_{LG2}$ is a center thickness of the lens elements constituting the second lens unit, $\omega_W$ is a half view angle (°) at a wide-angle limit, $f_T$ is a focal length of the entire system at a telephoto limit, and $f_W$ is a focal length of the entire system at a wide-angle limit.

The novel concepts disclosed herein were achieved in order to solve the foregoing problems in the conventional art, and herein is disclosed:

an imaging device capable of outputting an optical image of an object as an electric image signal, comprising:

a zoom lens system that forms the optical image of the object; and an image sensor that converts the optical image formed by the zoom lens system into the electric image signal, wherein in the zoom lens system, the zoom lens system, in order from an object side to an image side, comprises a first lens unit having positive optical power, a second lens unit having negative optical power, a third lens unit having positive optical power, and a fourth lens unit having positive optical power, wherein in zooming from a wide-angle limit to a telephoto limit at the time of image taking, the first lens unit, the second lens unit, the third lens unit and the fourth lens unit are moved individually along an optical axis such that air spaces between the individual lens units should vary, so that variable magnification is achieved, wherein at least one of the lens elements constituting the second lens unit satisfies the following condition (1-2), and wherein the following conditions (a) and (b) are satisfied:

$$11.8 < f_W/t_{LG2} < 500.0 \tag{1-2}$$

$$\omega_W \geq 30 \tag{a}$$

$$f_T/f_W \geq 4.5 \tag{b}$$

where, $t_{LG2}$ is a center thickness of the lens elements constituting the second lens unit, $\omega_W$ is a half view angle (°) at a wide-angle limit, $f_T$ is a focal length of the entire system at a telephoto limit, and $f_W$ is a focal length of the entire system at a wide-angle limit.

The novel concepts disclosed herein were achieved in order to solve the foregoing problems in the conventional art, and herein is disclosed:

a camera for converting an optical image of an object into an electric image signal and then performing at least one of displaying and storing of the converted image signal, comprising an imaging device including a zoom lens system that forms the optical image of the object and an image sensor that converts the optical image formed by the zoom lens system into the electric image signal, wherein in the zoom lens system, the zoom lens system, in order from an object side to an image side, comprises a first lens unit having positive optical power, a second lens unit having negative optical power, a third lens unit having positive optical power, and a fourth lens unit having positive optical power, wherein in zooming from a wide-angle limit to a telephoto limit at the time of image taking, the first lens unit, the second lens unit, the third lens unit and the fourth lens unit are moved individually along an optical axis such that air spaces between the individual lens units should vary, so that variable magnification is achieved, wherein at least one of the lens elements constituting the second lens unit satisfies the following condition (1-2), and wherein the following conditions (a) and (b) are satisfied:

$$11.8 < f_W/t_{LG2} < 500.0 \tag{1-2}$$

$$\omega_W \geq 30 \tag{a}$$

$$f_T/f_W \geq 4.5 \tag{b}$$

where, $t_{LG2}$ is a center thickness of the lens elements constituting the second lens unit, $\omega_W$ is a half view angle (°) at a wide-angle limit, $f_T$ is a focal length of the entire system at a telephoto limit, and $f_W$ is a focal length of the entire system at a wide-angle limit.

(III) The novel concepts disclosed herein were achieved in order to solve the foregoing problems in the conventional art, and herein is disclosed:

a zoom lens system, in order from an object side to an image side, comprising a first lens unit having positive optical power, a second lens unit having negative optical power, a third lens unit having positive optical power, and a fourth lens unit having positive optical power, wherein the third lens unit includes at least one set of cemented lens element, wherein in zooming from a wide-angle limit to a telephoto limit at the time of image taking, the first lens unit, the second lens unit, the third lens unit and the fourth lens unit are moved individually along an optical axis such that air spaces between the individual lens units should vary, so that variable magnification is achieved, and wherein the following conditions (1-3), (8), (a) and (b) are satisfied:

$$53 < (f_T/f_W) \times f_{G1}/t_{G1} < 900 \tag{1-3}$$

$$0.15 < t_{G3ce}/t_{G3} < 0.39 \tag{8}$$

$$\omega_W \geq 30 \tag{a}$$

$$f_T/f_W \geq 4.5 \tag{b}$$

where, $f_{G1}$ is a composite focal length of the first lens unit, $t_{G1}$ is a thickness of the first lens unit (an optical axial distance measured from the object side surface of the most object side lens element to the image side surface of the most image side lens element), $t_{G3ce}$ is a center thickness of the cemented lens element of the third lens unit, $t_{G3}$ is a thickness of the third lens unit (an optical axial distance measured from the object side surface of the most object side lens element to the image side surface of the most image side lens element), $\omega_W$ is a half view angle (°) at a wide-angle limit, $f_T$ is a focal length of the entire system at a telephoto limit, and $f_W$ is a focal length of the entire system at a wide-angle limit.

The novel concepts disclosed herein were achieved in order to solve the foregoing problems in the conventional art, and herein is disclosed:

an imaging device capable of outputting an optical image of an object as an electric image signal, comprising:

a zoom lens system that forms the optical image of the object; and an image sensor that converts the optical image formed by the zoom lens system into the electric image signal, wherein in the zoom lens system, the zoom lens system, in order from an object side to an image side, comprises a first lens unit having positive optical power, a second lens unit having negative optical power, a third lens unit having positive optical power, and a fourth lens unit having positive optical power, wherein the third lens unit includes at least one set of cemented lens element, wherein in zooming from a wide-angle limit to a telephoto limit at the time of image taking, the first lens unit, the second lens unit, the third lens unit and the fourth lens unit are moved individually along an optical axis such that air spaces between the individual lens units should vary, so that variable magnification is achieved, and wherein the following conditions (1-3), (8), (a) and (b) are satisfied:

$$53 < (f_T/f_W) \times f_{G1}/t_{G1} < 900 \quad (1\text{-}3)$$

$$0.15 < t_{G3ce}/t_{G3} < 0.39 \quad (8)$$

$$\omega_W \geq 30 \quad (a)$$

$$f_T/f_W \geq 4.5 \quad (b)$$

where, $f_{G1}$ is a composite focal length of the first lens unit, $t_{G1}$ is a thickness of the first lens unit (an optical axial distance measured from the object side surface of the most object side lens element to the image side surface of the most image side lens element), $t_{G3ce}$ is a center thickness of the cemented lens element of the third lens unit, $t_{G3}$ is a thickness of the third lens unit (an optical axial distance measured from the object side surface of the most object side lens element to the image side surface of the most image side lens element), $\omega_W$ is a half view angle (°) at a wide-angle limit, $f_T$ is a focal length of the entire system at a telephoto limit, and $f_W$ is a focal length of the entire system at a wide-angle limit.

The novel concepts disclosed herein were achieved in order to solve the foregoing problems in the conventional art, and herein is disclosed:

a camera for converting an optical image of an object into an electric image signal and then performing at least one of displaying and storing of the converted image signal, comprising an imaging device including a zoom lens system that forms the optical image of the object and an image sensor that converts the optical image formed by the zoom lens system into the electric image signal, wherein in the zoom lens system, the zoom lens system, in order from an object side to an image side, comprises a first lens unit having positive optical power, a second lens unit having negative optical power, a third lens unit having positive optical power, and a fourth lens unit having positive optical power, wherein the third lens unit includes at least one set of cemented lens element, wherein in zooming from a wide-angle limit to a telephoto limit at the time of image taking, the first lens unit, the second lens unit, the third lens unit and the fourth lens unit are moved individually along an optical axis such that air spaces between the individual lens units should vary, so that variable magnification is achieved, and wherein the following conditions (1-3), (8), (a) and (b) are satisfied:

$$53 < (f_T/f_W) \times f_{G1}/t_{G1} < 900 \quad (1\text{-}3)$$

$$0.15 < t_{G3ce}/t_{G3} < 0.39 \quad (8)$$

$$\omega_W \geq 30 \quad (a)$$

$$f_T/f_W \geq 4.5 \quad (b)$$

where, $f_{G1}$ is a composite focal length of the first lens unit, $t_{G1}$ is a thickness of the first lens unit (an optical axial distance measured from the object side surface of the most object side lens element to the image side surface of the most image side lens element), $t_{G3ce}$ is a center thickness of the cemented lens element of the third lens unit, $t_{G3}$ is a thickness of the third lens unit (an optical axial distance measured from the object side surface of the most object side lens element to the image side surface of the most image side lens element), $\omega_W$ is a half view angle (°) at a wide-angle limit, $f_T$ is a focal length of the entire system at a telephoto limit, and $f_W$ is a focal length of the entire system at a wide-angle limit.

(IV) The novel concepts disclosed herein were achieved in order to solve the foregoing problems in the conventional art, and herein is disclosed:

a zoom lens system, in order from an object side to an image side, comprising a first lens unit having positive optical power, a second lens unit having negative optical power, a third lens unit having positive optical power, and a fourth lens unit having positive optical power, wherein in zooming from a wide-angle limit to a telephoto limit at the time of image taking, the first lens unit, the second lens unit, the third lens unit and the fourth lens unit are moved individually along an optical axis such that air spaces between the individual lens units should vary, so that variable magnification is achieved, and wherein the following conditions (1-4), (6), (a) and (b) are satisfied:

$$83 < (f_T/f_W) \times f_{G4}/t_{G4} < 900 \quad (1\text{-}4)$$

$$4.0 < f_{G4}/f_W < 8.0 \quad (6)$$

$$\omega_W \geq 30 \quad (a)$$

$$f_T/f_W \geq 4.5 \quad (b)$$

where, $f_{G4}$ is a composite focal length of the fourth lens unit, $t_{G4}$ is a thickness of the fourth lens unit (an optical axial distance measured from the object side surface of the most object side lens element to the image side surface of the most image side lens element), $\omega_W$ is a half view angle (°) at a wide-angle limit, $f_T$ is a focal length of the entire system at a telephoto limit, and $f_W$ is a focal length of the entire system at a wide-angle limit.

The novel concepts disclosed herein were achieved in order to solve the foregoing problems in the conventional art, and herein is disclosed:

an imaging device capable of outputting an optical image of an object as an electric image signal, comprising:

a zoom lens system that forms the optical image of the object; and an image sensor that converts the optical image formed by the zoom lens system into the electric image signal, wherein in the zoom lens system, the zoom lens system, in order from an object side to an image side, comprises a first lens unit having positive optical power, a second lens unit having negative optical power, a third lens unit having positive optical power, and a fourth lens unit having positive optical power, wherein in zooming from a wide-angle limit to a telephoto limit at the time of image taking, the first lens unit, the second lens unit, the third lens unit and the fourth lens unit are moved individually along an optical axis such that air spaces between the individual lens units should vary, so that variable magnification is achieved, and wherein the following conditions (1-4), (6), (a) and (b) are satisfied:

$$83 < (f_T/f_W) \times f_{G4}/t_{G4} < 900 \quad (1\text{-}4)$$

$$4.0 < f_{G4}/f_W < 8.0 \quad (6)$$

$$\omega_W \geq 30 \quad (a)$$

$$f_T/f_W \geq 4.5 \quad (b)$$

where, $f_{G4}$ is a composite focal length of the fourth lens unit, $t_{G4}$ is a thickness of the fourth lens unit (an optical axial distance measured from the object side surface of the most object side lens element to the image side surface of the most image side lens element), $\omega_W$ is a half view angle (°) at a wide-angle limit, $f_T$ is a focal length of the entire system at a telephoto limit, and $f_W$ is a focal length of the entire system at a wide-angle limit.

The novel concepts disclosed herein were achieved in order to solve the foregoing problems in the conventional art, and herein is disclosed:

a camera for converting an optical image of an object into an electric image signal and then performing at least one of displaying and storing of the converted image signal, comprising an imaging device including a zoom lens system that forms the optical image of the object and an image sensor that converts the optical image formed by the zoom lens system into the electric image signal, wherein in the zoom lens system, the zoom lens system, in order from an object side to an image side, comprises a first lens unit having positive optical power, a second lens unit having negative optical power, a third lens unit having positive optical power, and a fourth lens unit having positive optical power, wherein in zooming from a wide-angle limit to a telephoto limit at the time of image taking, the first lens unit, the second lens unit, the third lens unit and the fourth lens unit are moved individually along an optical axis such that air spaces between the individual lens units should vary, so that variable magnification is achieved, and wherein the following conditions (1-4), (6), (a) and (b) are satisfied:

$$83 < (f_T/f_W) \times f_{G4}/t_{G4} < 900 \quad (1\text{-}4)$$

$$4.0 < f_{G4}/f_W < 8.0 \quad (6)$$

$$\omega_W \geq 30 \quad (a)$$

$$f_T/f_W \geq 4.5 \quad (b)$$

where, $f_{G4}$ is a composite focal length of the fourth lens unit, $t_{G4}$ is a thickness of the fourth lens unit (an optical axial distance measured from the object side surface of the most object side lens element to the image side surface of the most image side lens element), $\omega_W$ is a half view angle (°) at a wide-angle limit, $f_T$ is a focal length of the entire system at a telephoto limit, and $f_W$ is a focal length of the entire system at a wide-angle limit.

The present invention provides: a high-performance zoom lens system that has a remarkably reduced overall length of lens system and hence a reduced size and still has good balance between a wide view angle at a wide-angle limit and a high zooming ratio; an imaging device employing this zoom lens system; and a thin and compact camera employing this imaging device.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Embodiments I-1 to I-7

Figure 1:
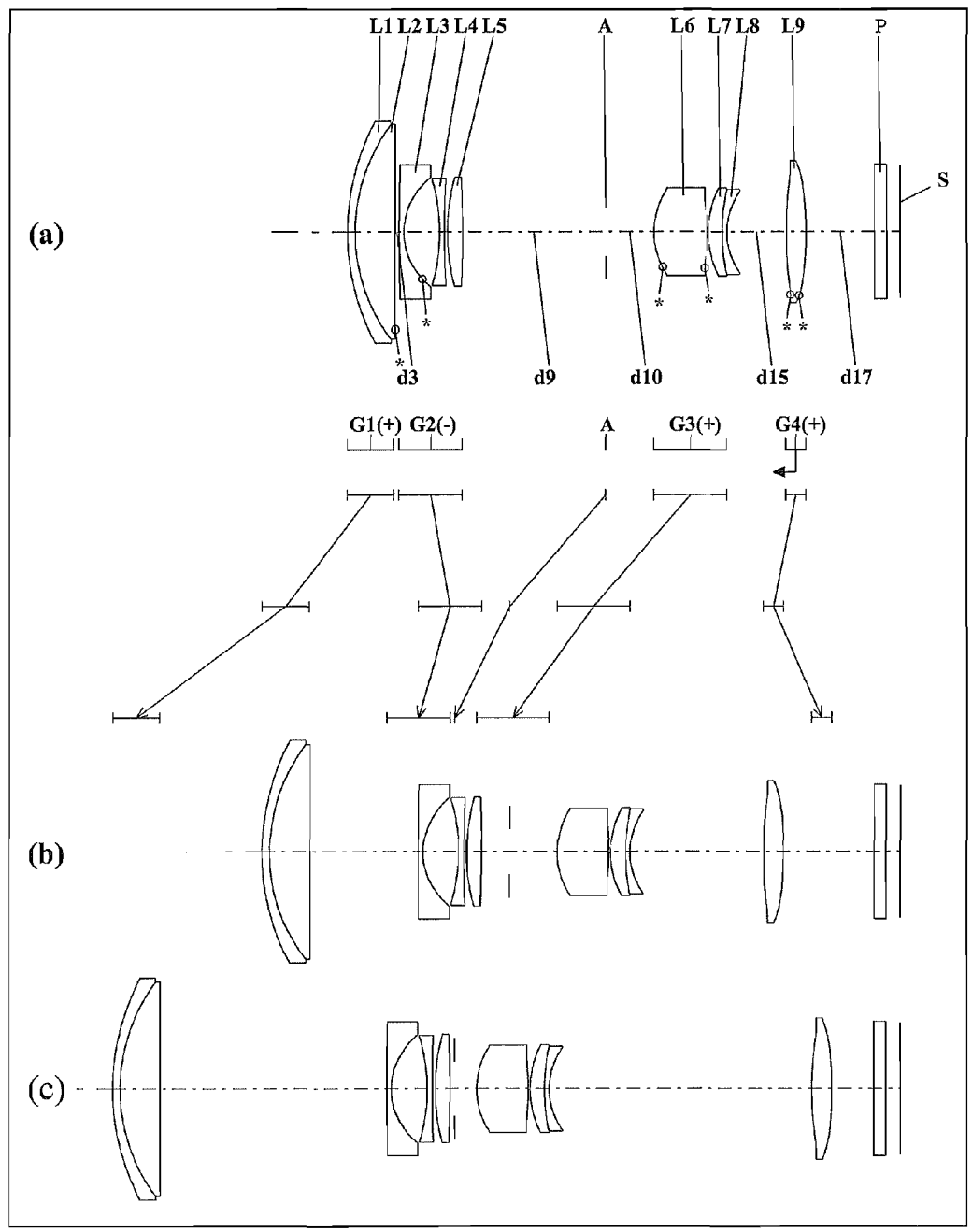
FIG. 1 is a lens arrangement diagram showing an infinity in-focus condition of a zoom lens system according to Embodiment I-1 (Example I-1)
Figure 2:
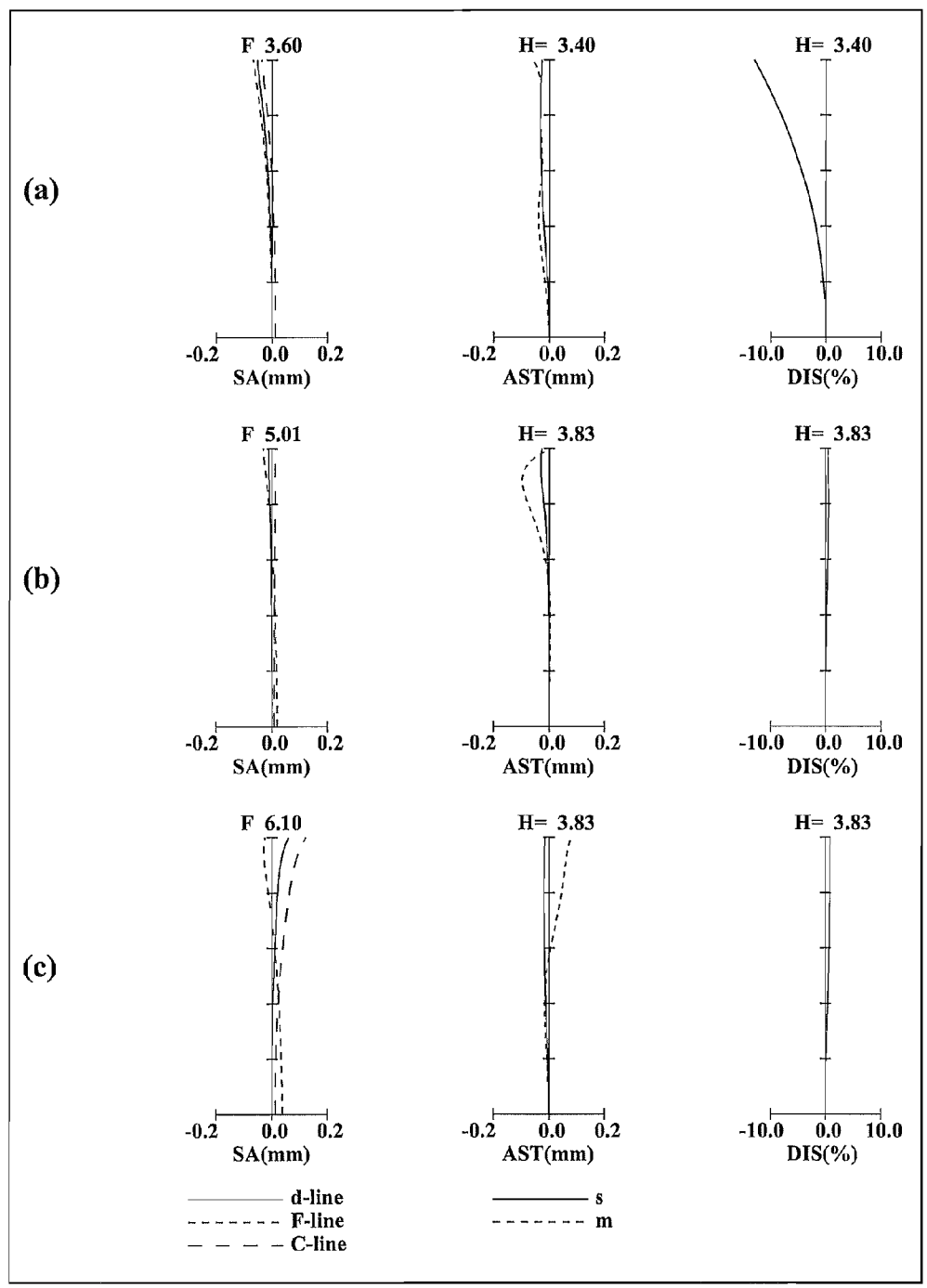
FIG. 2 is a longitudinal aberration diagram of an infinity in-focus condition of a zoom lens system according to Example I-1.
Figure 3:
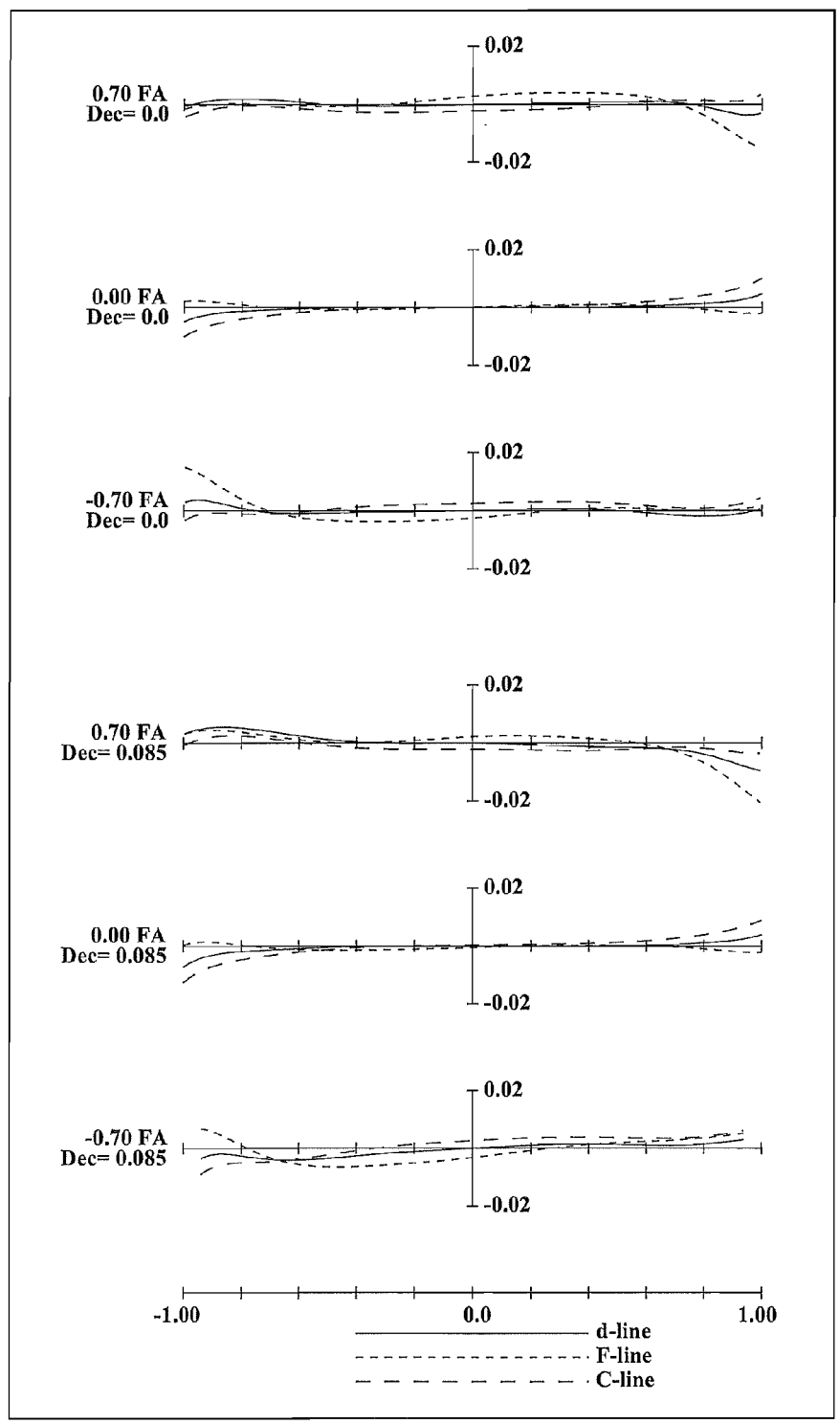
FIG. 3 is a lateral aberration diagram of a zoom lens system according to Example I-1 at a telephoto limit in a basic state where image blur compensation is not performed and in a blur compensation state.

FIGS. 1, 4, 7, 10, 13, 16 and 19 are lens arrangement diagrams of zoom lens systems according to Embodiments I-1 to I-7, respectively.

Each of FIGS. 1, 4, 7, 10, 13, 16 and 19 shows a zoom lens system in an infinity in-focus condition. In each FIG., part (a) shows a lens configuration at a wide-angle limit (in the minimum focal length condition: focal length f w), part (b) shows a lens configuration at a middle position (in an intermediate focal length condition: focal length $f_M = \sqrt{(f_W * f_T)}$), and part (c) shows a lens configuration at a telephoto limit (in the maximum focal length condition: focal length $f_T$). Further, in each FIG., each bent arrow located between part (a) and part (b) indicates a line obtained by connecting the positions of each lens unit respectively at a wide-angle limit, a middle position and a telephoto limit. Thus, in the part between the wide-angle limit and the middle position and the part between the middle position and the telephoto limit, the positions are connected simply with a straight line, and hence this line does not indicate actual motion of each lens unit. Moreover, in each FIG., an arrow imparted to a lens unit indicates focusing from an infinity in-focus condition to a close-object in-focus condition. That is, the arrow indicates the moving direction at the time of focusing from an infinity in-focus condition to a close-object in-focus condition.

The zoom lens system according to each embodiment, in order from the object side to the image side, comprises a first lens unit G1 having positive optical power, a second lens unit G2 having negative optical power, a third lens unit G3 having positive optical power, and a fourth lens unit G4 having positive optical power. Then, in zooming, the individual lens units move in a direction along the optical axis such that intervals between the lens units, that is, the interval between the first lens unit G1 and the second lens unit G2, the interval between the second lens unit G2 and the third lens unit G3, and the interval between the third lens unit G3 and the fourth lens unit G4 should all vary. In the zoom lens system according to each embodiment, since these lens units are arranged in the desired optical power configuration, high optical performance is obtained and still size reduction is achieved in the entire lens system.

Further, in FIGS. 1, 4, 7, 10, 13, 16 and 19, an asterisk "*" imparted to a particular surface indicates that the surface is aspheric. In each FIG., symbol (+) or (−) imparted to the symbol of each lens unit corresponds to the sign of the optical power of the lens unit. In each FIG., the straight line located on the most right-hand side indicates the position of the image surface S. On the object side relative to the image surface S (that is, between the image surface S and the most image side lens surface of the fourth lens unit G4), a plane parallel plate P such as an optical low-pass filter and a face plate of an image sensor is provided.

Further, in FIGS. 1, 4, 7, 10, 13, 16 and 19, an aperture diaphragm A is provided between the second lens unit G2 and the third lens unit G3. In zooming from a wide-angle limit to a telephoto limit at the time of image taking, the aperture diaphragm A moves along the optical axis independently of the individual lens units in Embodiment I-1 shown in FIG. 1. In contrast, in Embodiments I-2 to I-7 shown in FIGS. 4, 7, 10, 13, 16, and 19, the aperture diaphragm A moves along the optical axis integrally with the third lens unit G3.

As shown in FIG. 1, in the zoom lens system according to Embodiment I-1, the first lens unit G1, in order from the object side to the image side, comprises: a negative meniscus first lens element L1 with the convex surface facing the object side; and a positive meniscus second lens element L2 with the convex surface facing the object side. The first lens element L1 and the second lens element L2 are cemented with each other. Further, the second lens element L2 has an aspheric image side surface.

In the zoom lens system according to Embodiment I-1, the second lens unit G2, in order from the object side to the image side, comprises: a negative meniscus third lens element L3 with the convex surface facing the object side; a bi-concave fourth lens element L4; and a bi-convex fifth lens element L5. Among these, the third lens element L3 has an aspheric image side surface.

Further, in the zoom lens system according to Embodiment I-1, the third lens unit G3, in order from the object side to the image side, comprises: a bi-convex sixth lens element L6; a positive meniscus seventh lens element L7 with the convex surface facing the object side; and a negative meniscus eighth lens element L8 with the convex surface facing the object side. Among these, the seventh lens element L7 and the eighth lens element L8 are cemented with each other. Further, the sixth lens element L6 has two aspheric surfaces.

Further, in the zoom lens system according to Embodiment I-1, the fourth lens unit G4 comprises solely a bi-convex ninth lens element L9. The ninth lens element L9 has two aspheric surfaces.

Here, in the zoom lens system according to Embodiment I-1, a plane parallel plate P is provided on the object side relative to the image surface S (that is, between the image surface S and the ninth lens element L9).

In the zoom lens system according to Embodiment I-1, in zooming from a wide-angle limit to a telephoto limit at the time of image taking, the first lens unit G1 and the third lens unit G3 move monotonically to the object side, the second lens unit G2 moves to the object side with locus of a slight convex to the image side, and the fourth lens unit G4 moves to the image side with locus of a convex to the object side. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

Further, in the zoom lens system according to Embodiment I-1, in zooming from a wide-angle limit to a telephoto limit at the time of image taking, the aperture diaphragm A provided between the second lens unit G2 and the third lens unit G3 moves monotonically to the object side. That is, in zooming, the interval between the second lens unit G2 and the aperture diaphragm A decreases.

Figure 4:
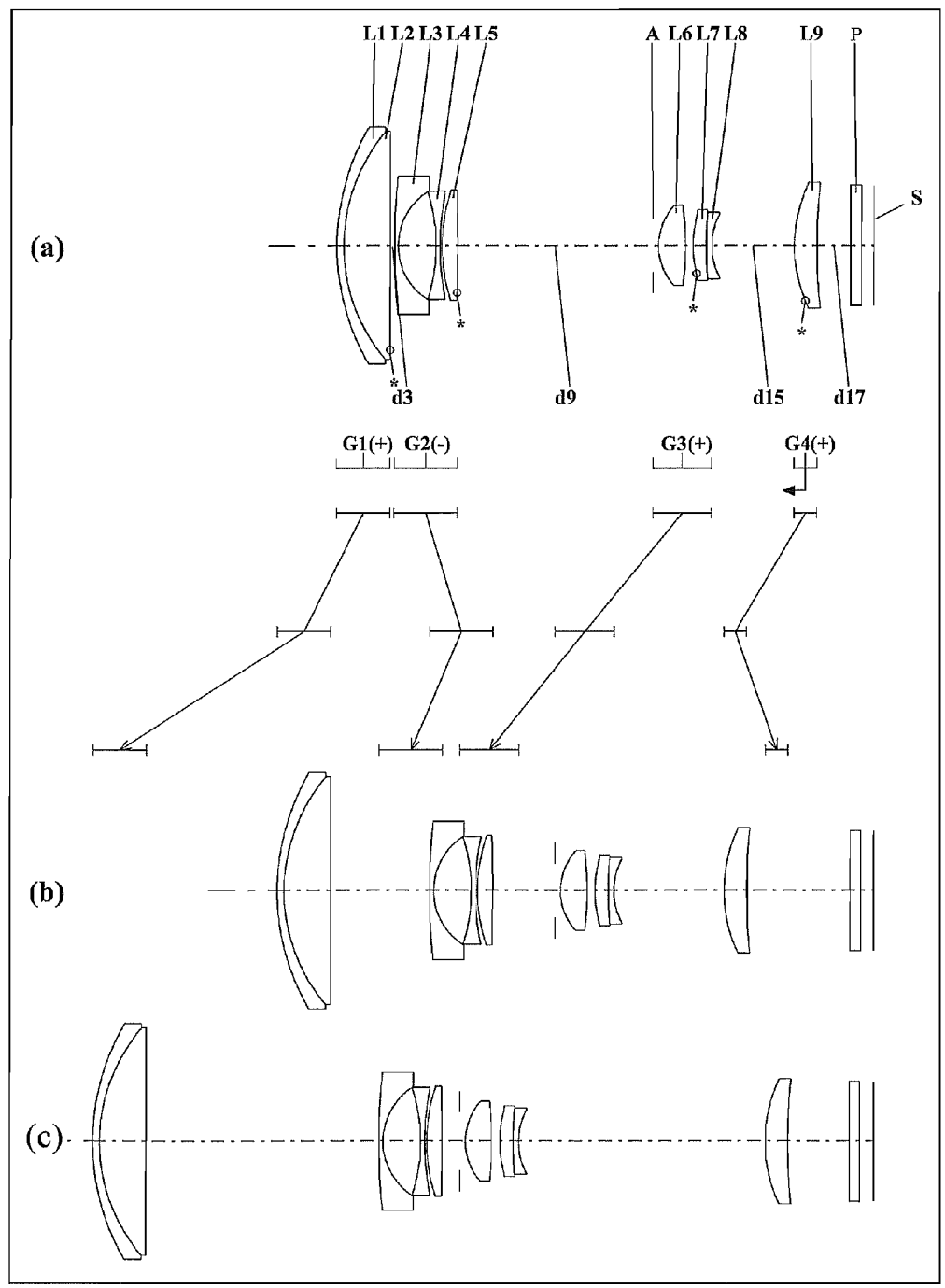
FIG. 4 is a lens arrangement diagram showing an infinity in-focus condition of a zoom lens system according to Embodiment I-2 (Example I-2)
Figure 5:
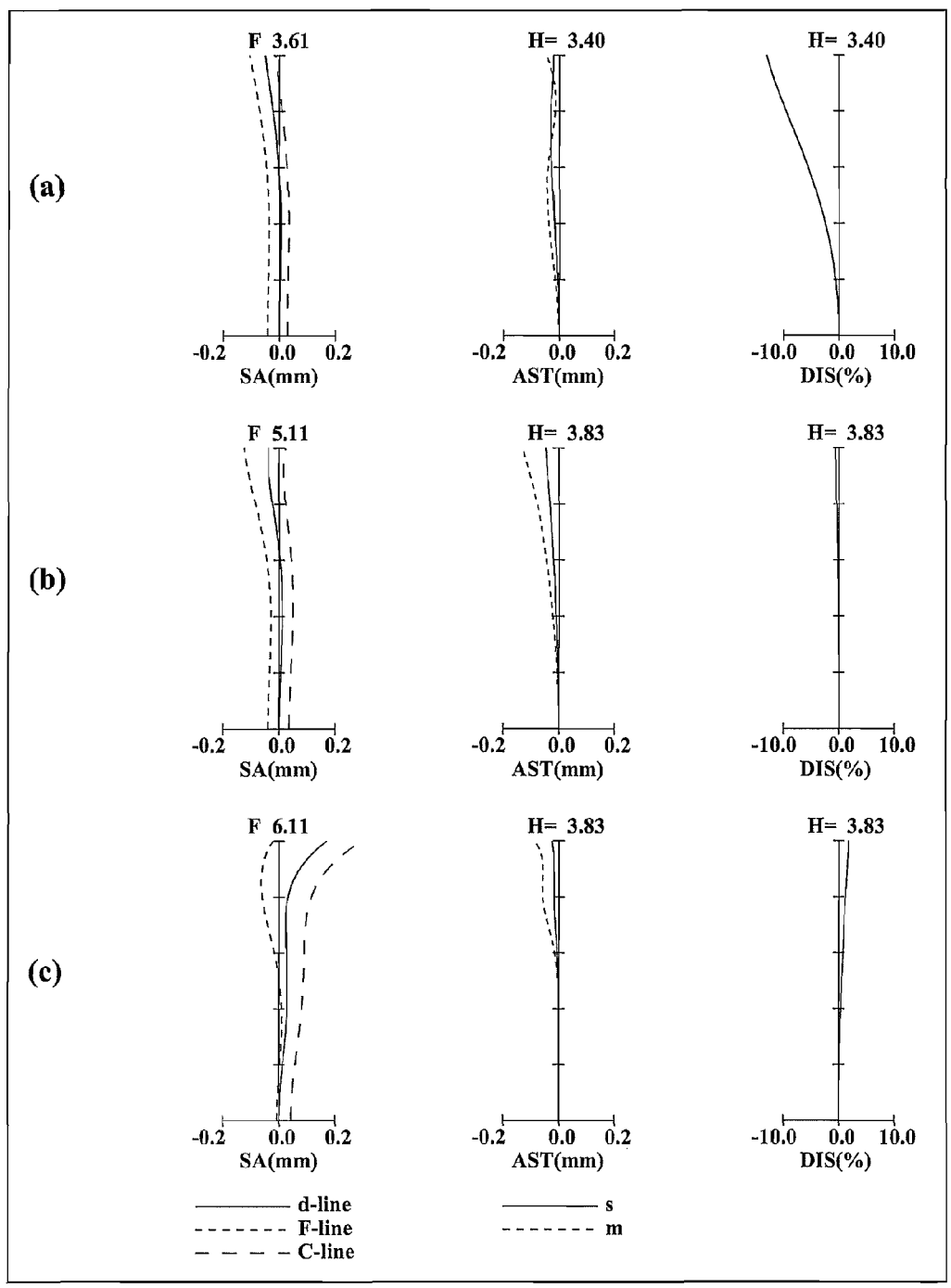
FIG. 5 is a longitudinal aberration diagram of an infinity in-focus condition of a zoom lens system according to Example I-2.
Figure 6:
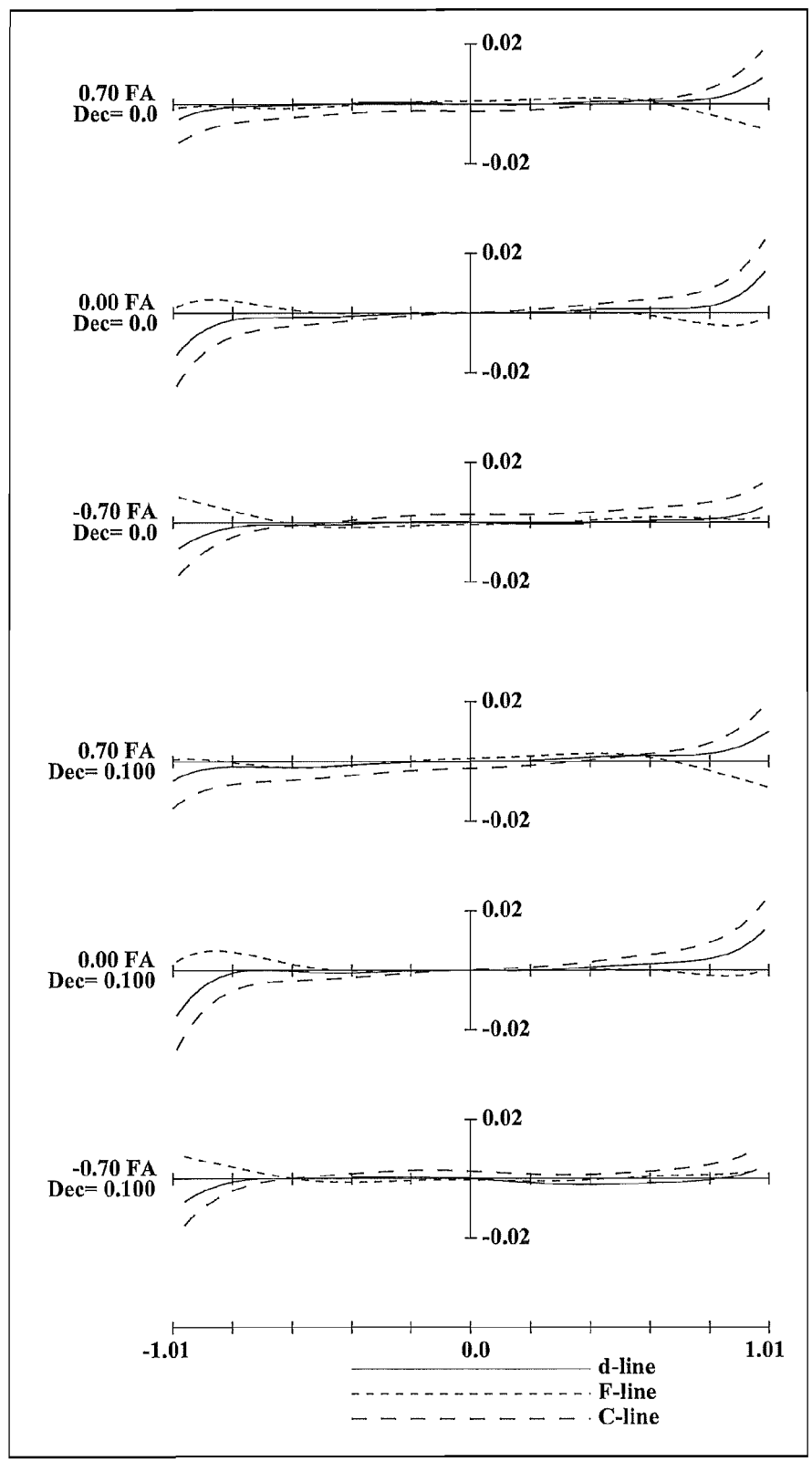
FIG. 6 is a lateral aberration diagram of a zoom lens system according to Example I-2 at a telephoto limit in a basic state where image blur compensation is not performed and in a blur compensation state.

As shown in FIG. 4, in the zoom lens system according to Embodiment I-2, the first lens unit G1, in order from the object side to the image side, comprises: a negative meniscus first lens element L1 with the convex surface facing the object side; and a bi-convex second lens element L2. The first lens element L1 and the second lens element L2 are cemented with each other. Further, the second lens element L2 has an aspheric image side surface.

In the zoom lens system according to Embodiment I-2, the second lens unit G2, in order from the object side to the image side, comprises: a negative meniscus third lens element L3 with the convex surface facing the object side; a bi-concave fourth lens element L4; and a bi-convex fifth lens element L5. Among these, the fifth lens element L5 has an aspheric image side surface.

Further, in the zoom lens system according to Embodiment I-2, the third lens unit G3, in order from the object side to the image side, comprises: a bi-convex sixth lens element L6; a positive meniscus seventh lens element L7 with the convex surface facing the object side; and a negative meniscus eighth lens element L8 with the convex surface facing the object side. Among these, the seventh lens element L7 and the eighth lens element L8 are cemented with each other. Further, the seventh lens element L7 has an aspheric object side surface.

Further, in the zoom lens system according to Embodiment I-2, the fourth lens unit G4 comprises solely a positive meniscus ninth lens element L9 with the convex surface facing the object side. The ninth lens element L9 has an aspheric object side surface.

Here, in the zoom lens system according to Embodiment I-2, a plane parallel plate P is provided on the object side relative to the image surface S (that is, between the image surface S and the ninth lens element L9).

In the zoom lens system according to Embodiment I-2, in zooming from a wide-angle limit to a telephoto limit at the time of image taking, the first lens unit G1 moves to the object side, the second lens unit G2 moves to the object side with locus of a convex to the image side, the third lens unit G3 moves monotonically to the object side, and the fourth lens unit G4 moves with locus of a convex to the object side such that the position at a telephoto limit is located on the object side relative to the position at a wide-angle limit. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

Figure 7:
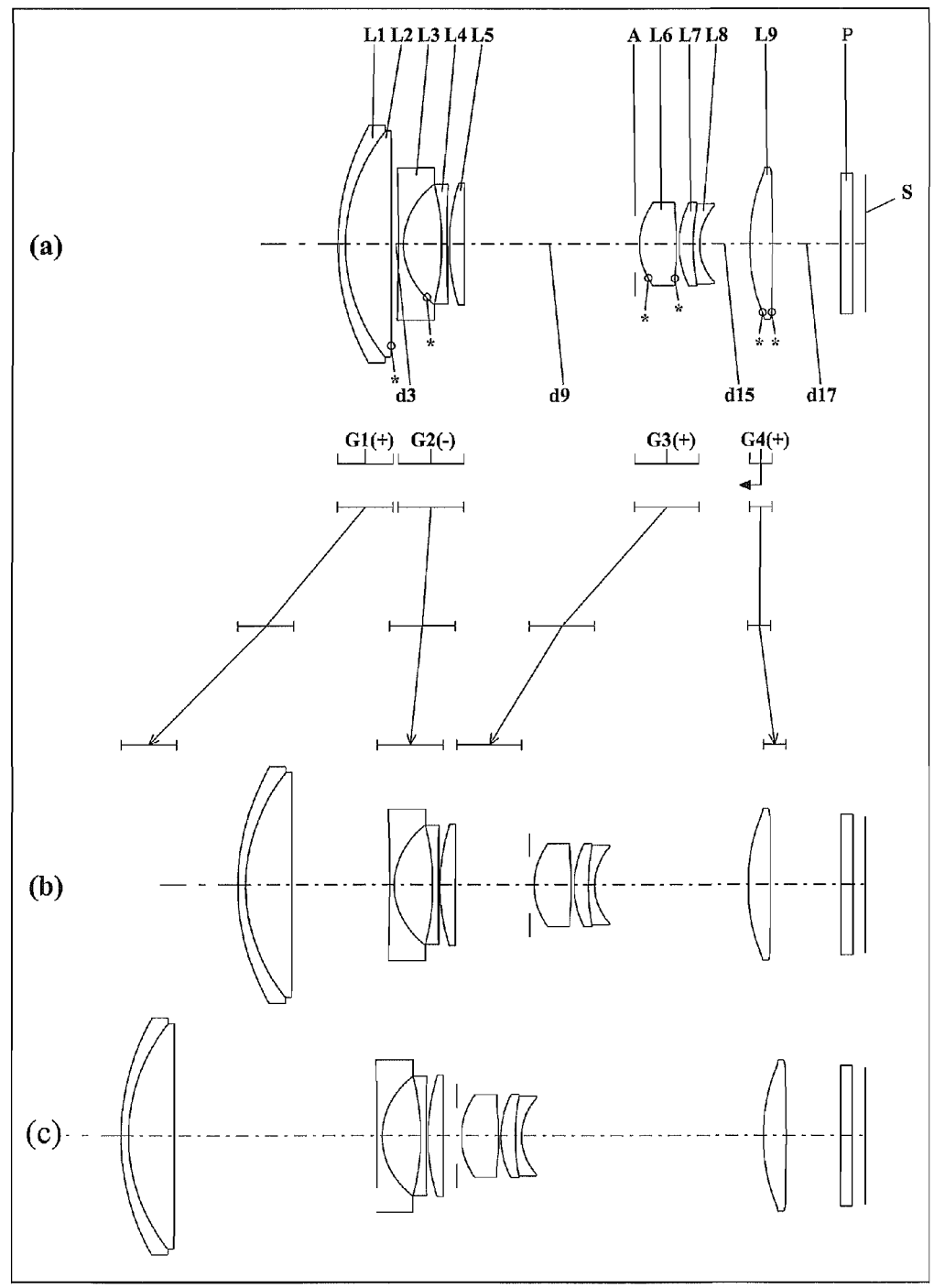
FIG. 7 is a lens arrangement diagram showing an infinity in-focus condition of a zoom lens system according to Embodiment I-3 (Example I-3)
Figure 8:
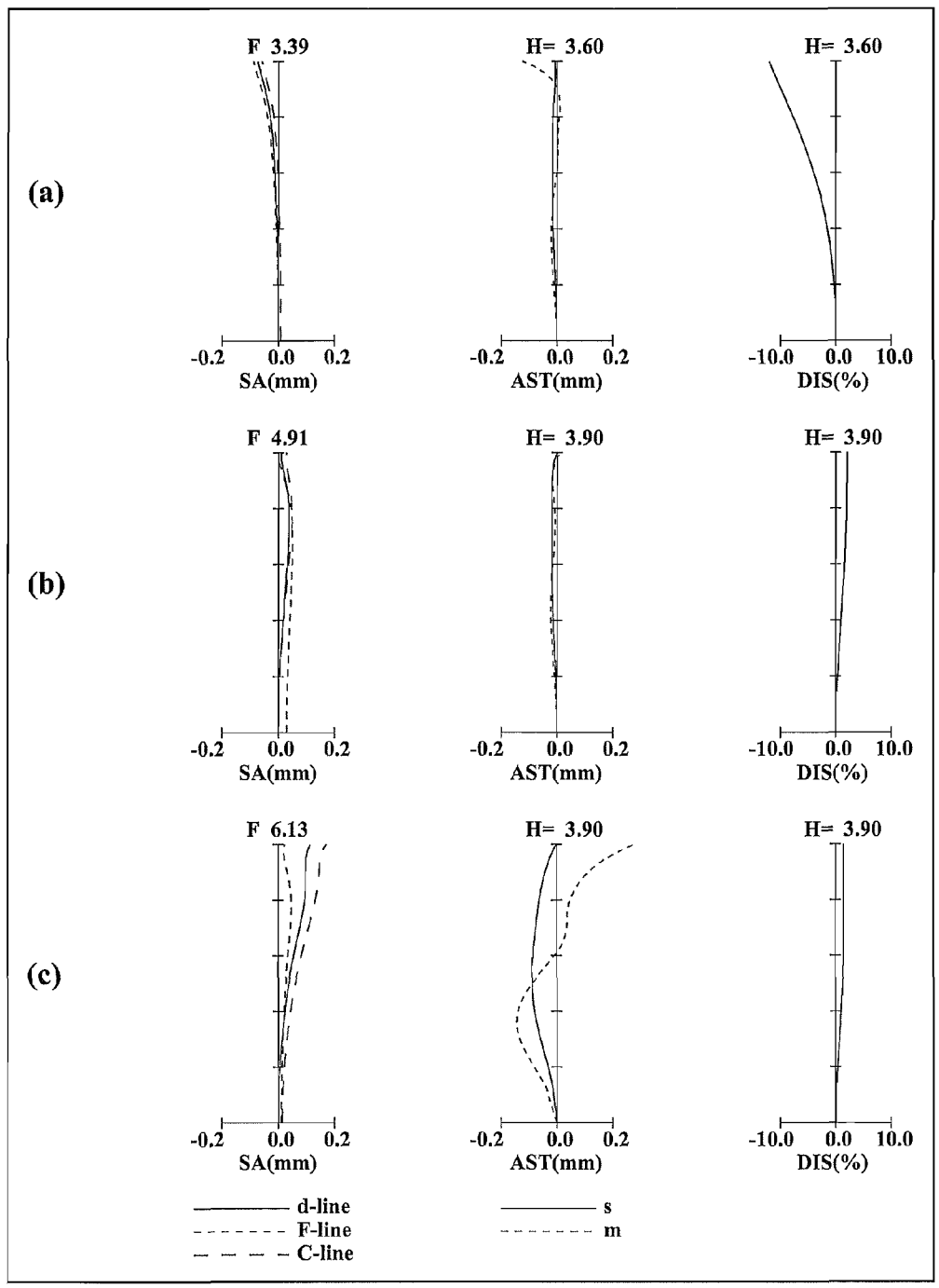
FIG. 8 is a longitudinal aberration diagram of an infinity in-focus condition of a zoom lens system according to Example I-3.
Figure 9:
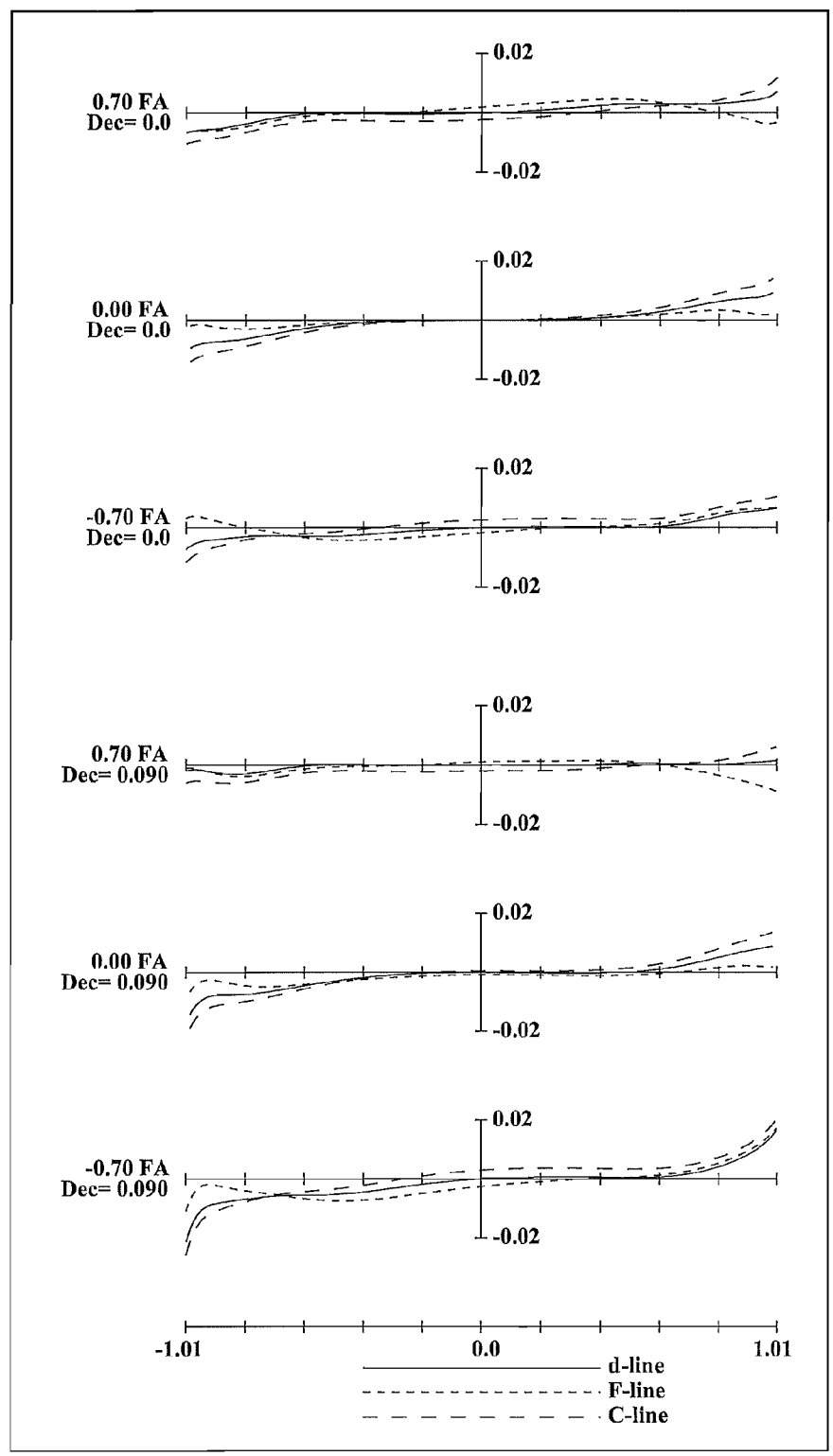
FIG. 9 is a lateral aberration diagram of a zoom lens system according to Example I-3 at a telephoto limit in a basic state where image blur compensation is not performed and in a blur compensation state.

As shown in FIG. 7, in the zoom lens system according to Embodiment I-3, the first lens unit G1, in order from the object side to the image side, comprises: a negative meniscus first lens element L1 with the convex surface facing the object side; and a bi-convex second lens element L2. The first lens element L1 and the second lens element L2 are cemented with each other. Further, the second lens element L2 has an aspheric image side surface.

Further, in the zoom lens system according to Embodiment I-3, the second lens unit G2, in order from the object side to the image side, comprises: a bi-concave third lens element L3; a bi-concave fourth lens element L4; and a planer-convex fifth lens element L5 with the convex surface facing the object side. Among these, the third lens element L3 has an aspheric image side surface.

Further, in the zoom lens system according to Embodiment I-3, the third lens unit G3, in order from the object side to the image side, comprises: a bi-convex sixth lens element L6; a positive meniscus seventh lens element L7 with the convex surface facing the object side; and a negative meniscus eighth lens element L8 with the convex surface facing the object side. Among these, the seventh lens element L7 and the eighth lens element L8 are cemented with each other. Further, the sixth lens element L6 has two aspheric surfaces.

Further, in the zoom lens system according to Embodiment I-3, the fourth lens unit G4 comprises solely a bi-convex ninth lens element L9. The ninth lens element L9 has two aspheric surfaces.

Here, in the zoom lens system according to Embodiment I-3, a plane parallel plate P is provided on the object side relative to the image surface S (that is, between the image surface S and the ninth lens element L9).

In the zoom lens system according to Embodiment I-3, in zooming from a wide-angle limit to a telephoto limit at the time of image taking, the first lens unit G1 and the third lens unit G3 move monotonically to the object side, the second lens unit G2 slightly moves monotonically to the object side, and the fourth lens unit G4 moves to the image side. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

Figure 10:
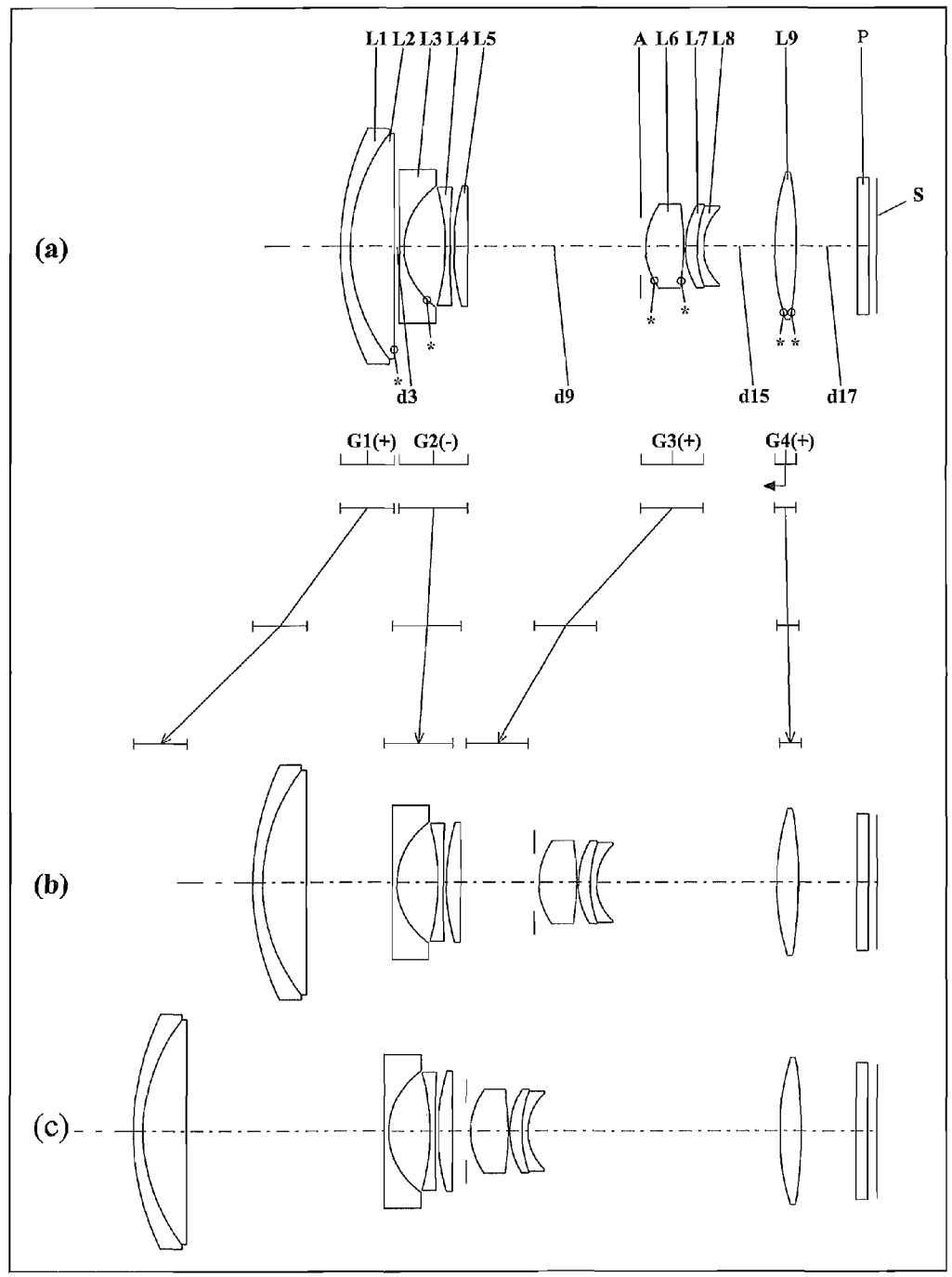
FIG. 10 is a lens arrangement diagram showing an infinity in-focus condition of a zoom lens system according to Embodiment I-4 (Example I-4)
Figure 11:
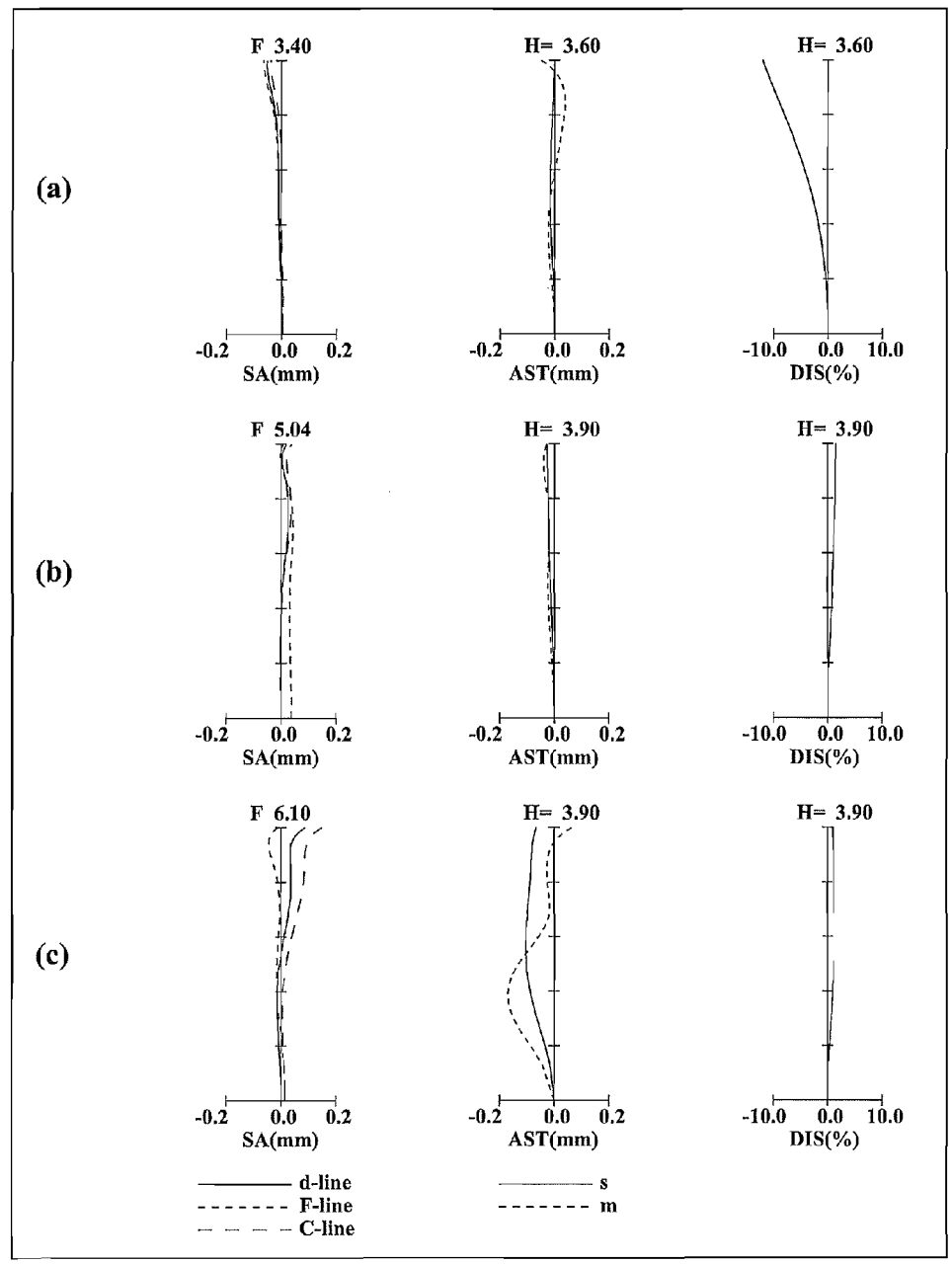
FIG. 11 is a longitudinal aberration diagram of an infinity in-focus condition of a zoom lens system according to Example I-4.
Figure 12:
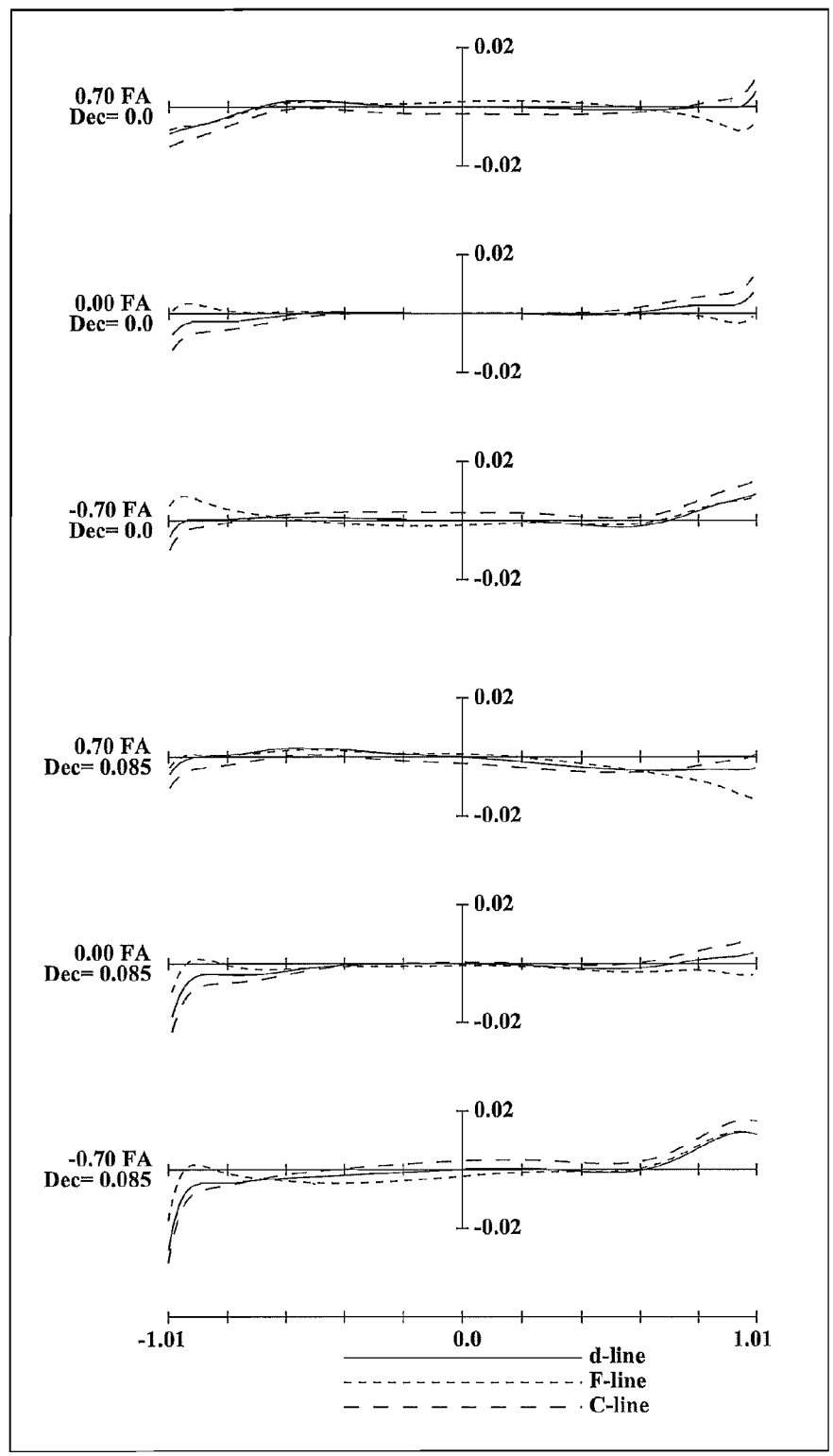
FIG. 12 is a lateral aberration diagram of a zoom lens system according to Example I-4 at a telephoto limit in a basic state where image blur compensation is not performed and in a blur compensation state.

As shown in FIG. 10, in the zoom lens system according to Embodiment I-4, the first lens unit G1, in order from the object side to the image side, comprises: a negative meniscus first lens element L1 with the convex surface facing the object side; and a bi-convex second lens element L2. The first lens element L1 and the second lens element L2 are cemented with each other. Further, the second lens element L2 has an aspheric image side surface.

Further, in the zoom lens system according to Embodiment I-4, the second lens unit G2, in order from the object side to the image side, comprises a bi-concave third lens element L3, a bi-concave fourth lens element L4, and a bi-convex fifth lens element L5. Among these, the third lens element L3 has an aspheric image side surface.

Further, in the zoom lens system according to Embodiment I-4, the third lens unit G3, in order from the object side to the image side, comprises: a bi-convex sixth lens element L6; a positive meniscus seventh lens element L7 with the convex surface facing the object side; and a negative meniscus eighth lens element L8 with the convex surface facing the object side. Among these, the seventh lens element L7 and the eighth lens element L8 are cemented with each other. Further, the sixth lens element L6 has two aspheric surfaces.

Further, in the zoom lens system according to Embodiment I-4, the fourth lens unit G4 comprises solely a bi-convex ninth lens element L9. The ninth lens element L9 has two aspheric surfaces.

Here, in the zoom lens system according to Embodiment I-4, a plane parallel plate P is provided on the object side relative to the image surface S (that is, between the image surface S and the ninth lens element L9).

In the zoom lens system according to Embodiment I-4, in zooming from a wide-angle limit to a telephoto limit at the time of image taking, the first lens unit G1 and the third lens unit G3 move almost monotonically to the object side, the second lens unit G2 slightly moves monotonically to the object side, and the fourth lens unit G4 slightly moves monotonically to the image side. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

Figure 13:
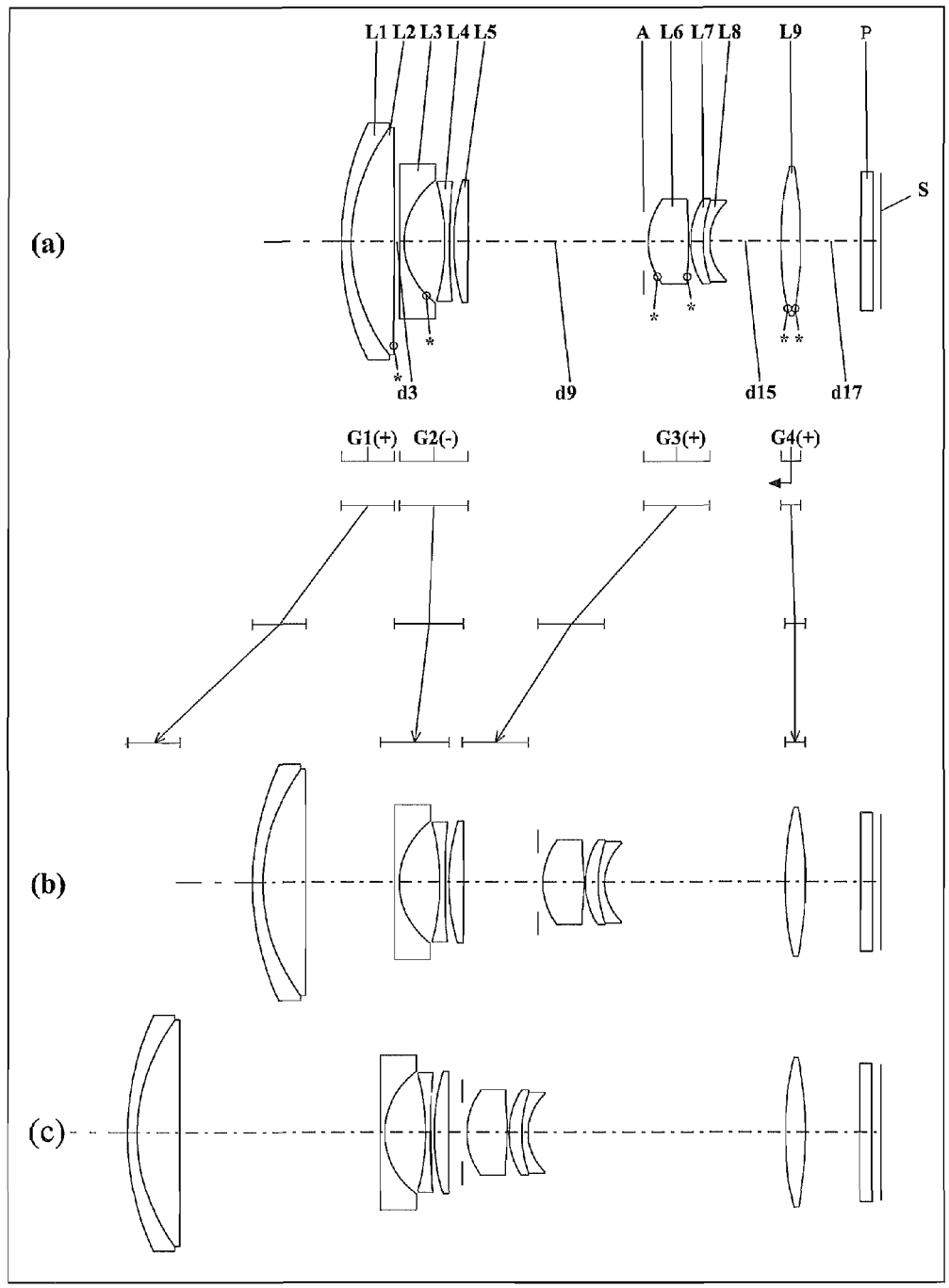
FIG. 13 is a lens arrangement diagram showing an infinity in-focus condition of a zoom lens system according to Embodiment I-5 (Example I-5)
Figure 14:
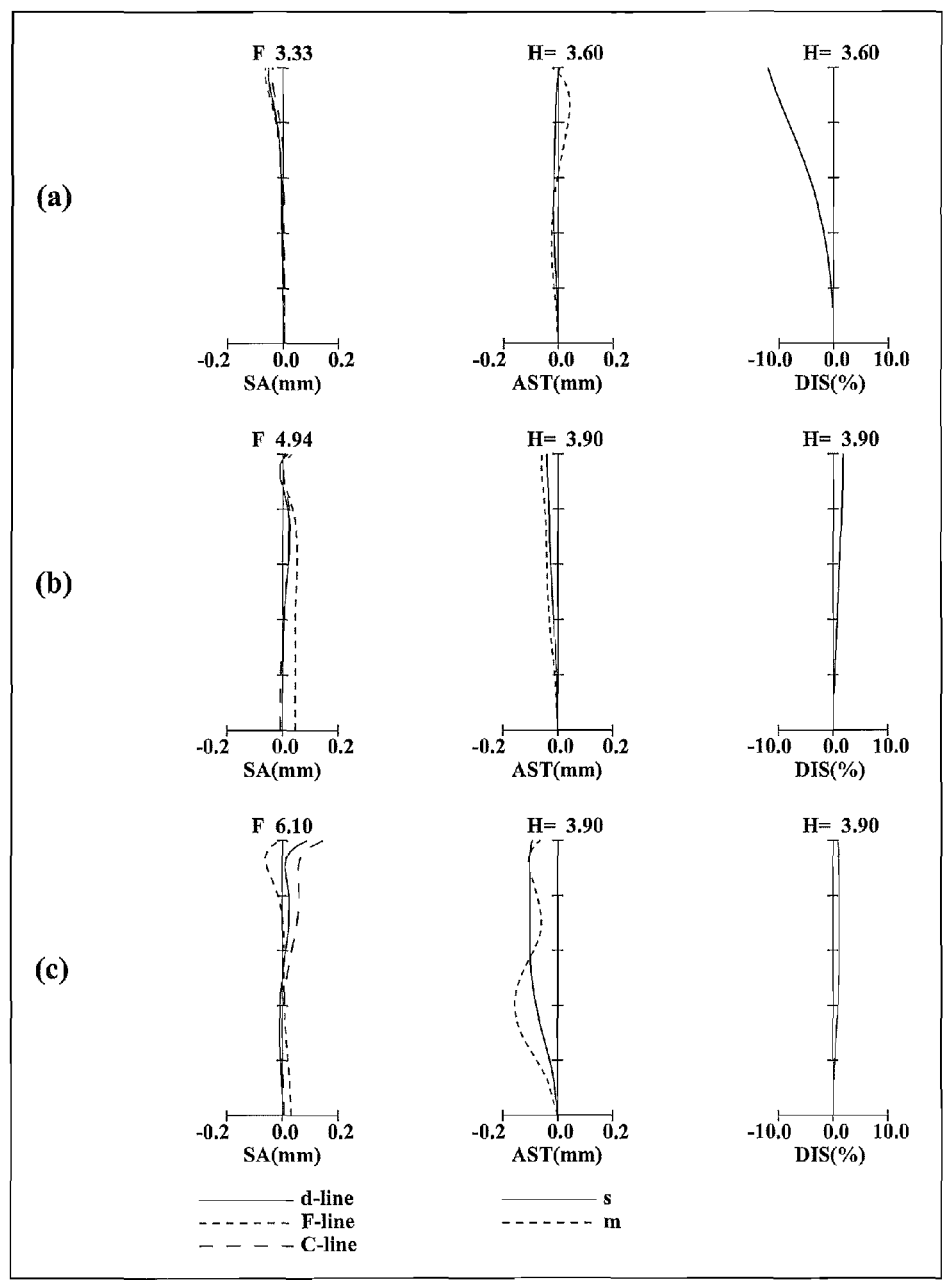
FIG. 14 is a longitudinal aberration diagram of an infinity in-focus condition of a zoom lens system according to Example I-5.
Figure 15:
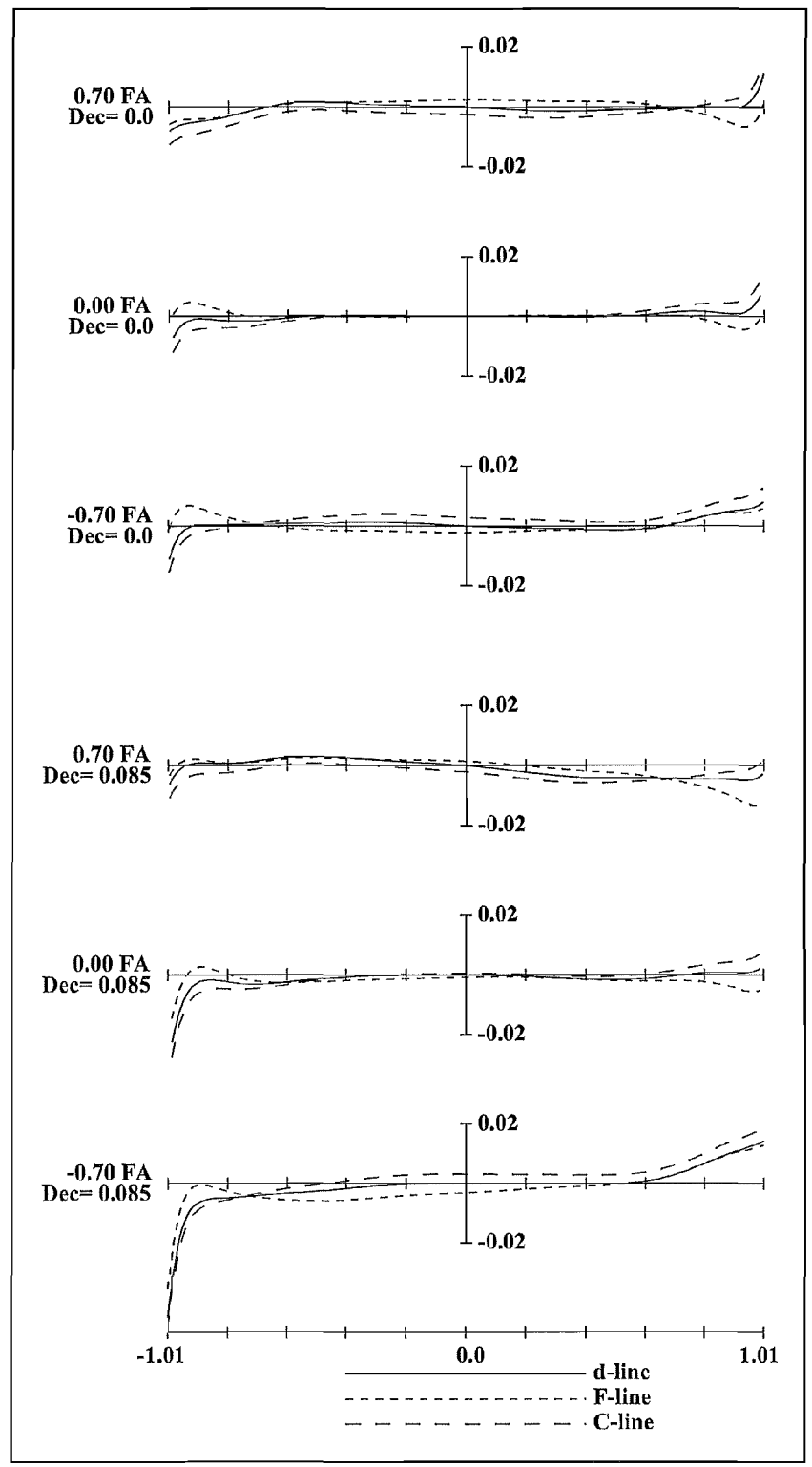
FIG. 15 is a lateral aberration diagram of a zoom lens system according to Example I-5 at a telephoto limit in a basic state where image blur compensation is not performed and in a blur compensation state.

As shown in FIG. 13, in the zoom lens system according to Embodiment I-5, the first lens unit G1, in order from the object side to the image side, comprises: a negative meniscus first lens element L1 with the convex surface facing the object side; and a bi-convex second lens element L2. The first lens element L1 and the second lens element L2 are cemented with each other. Further, the second lens element L2 has an aspheric image side surface.

Further, in the zoom lens system according to Embodiment I-5, the second lens unit G2, in order from the object side to the image side, comprises: a planer-concave third lens element L3 with the concave surface facing the image side; a bi-concave fourth lens element L4; and a bi-convex fifth lens element L5. Among these, the third lens element L3 has an aspheric image side surface.

Further, in the zoom lens system according to Embodiment I-5, the third lens unit G3, in order from the object side to the image side, comprises: a bi-convex sixth lens element L6; a positive meniscus seventh lens element L7 with the convex surface facing the object side; and a negative meniscus eighth lens element L8 with the convex surface facing the object side. Among these, the seventh lens element L7 and the eighth lens element L8 are cemented with each other. Further, the sixth lens element L6 has two aspheric surfaces.

Further, in the zoom lens system according to Embodiment I-5, the fourth lens unit G4 comprises solely a bi-convex ninth lens element L9. The ninth lens element L9 has two aspheric surfaces.

Here, in the zoom lens system according to Embodiment I-5, a plane parallel plate P is provided on the object side relative to the image surface S (that is, between the image surface S and the ninth lens element L9).

In the zoom lens system according to Embodiment I-5, in zooming from a wide-angle limit to a telephoto limit at the time of image taking, the first lens unit G1 and the third lens unit G3 move almost monotonically to the object side, the second lens unit G2 slightly moves monotonically to the object side, and the fourth lens unit G4 slightly moves monotonically to the image side. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

Figure 16:
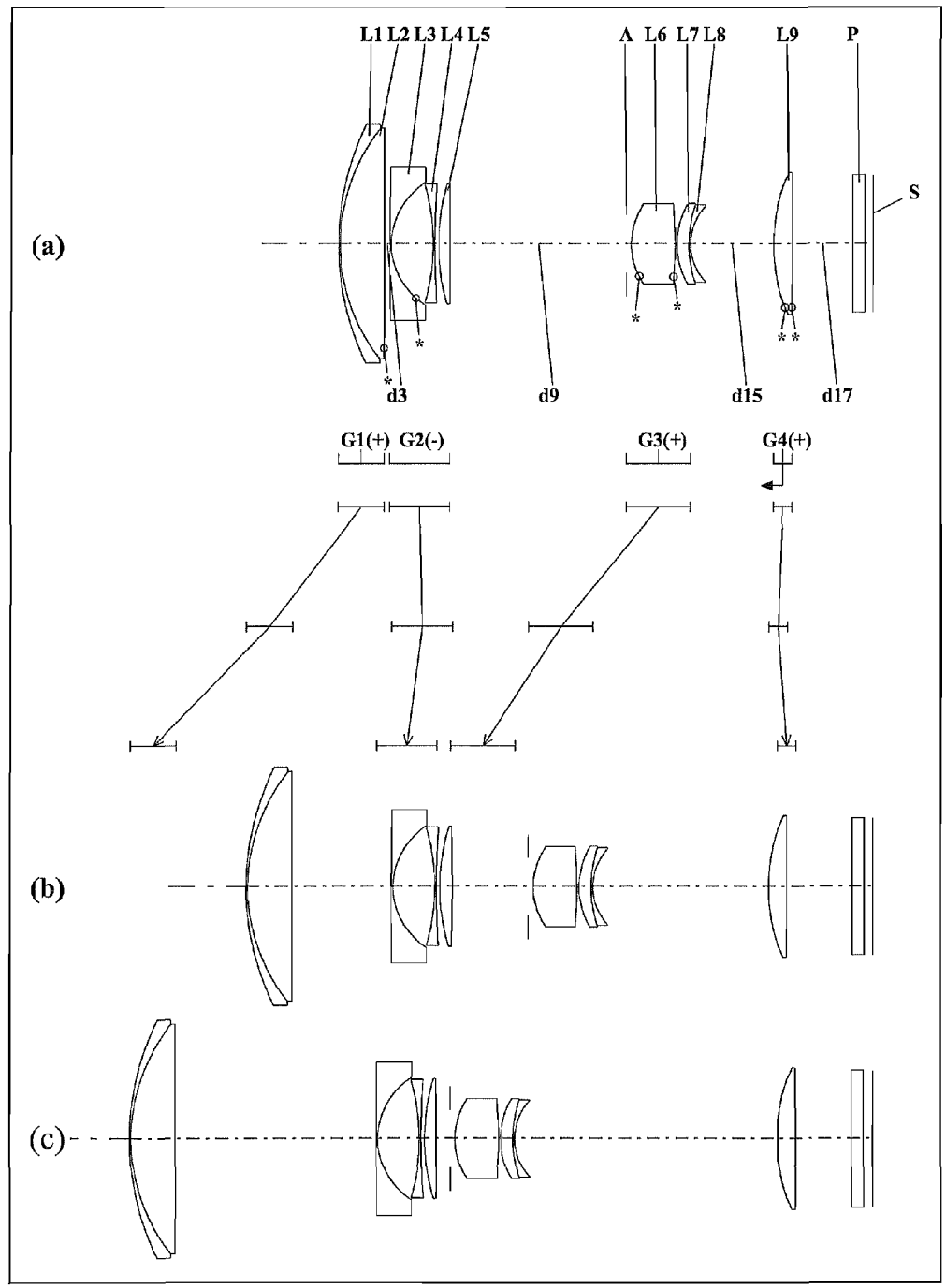
FIG. 16 is a lens arrangement diagram showing an infinity in-focus condition of a zoom lens system according to Embodiment I-6 (Example I-6)
Figure 17:
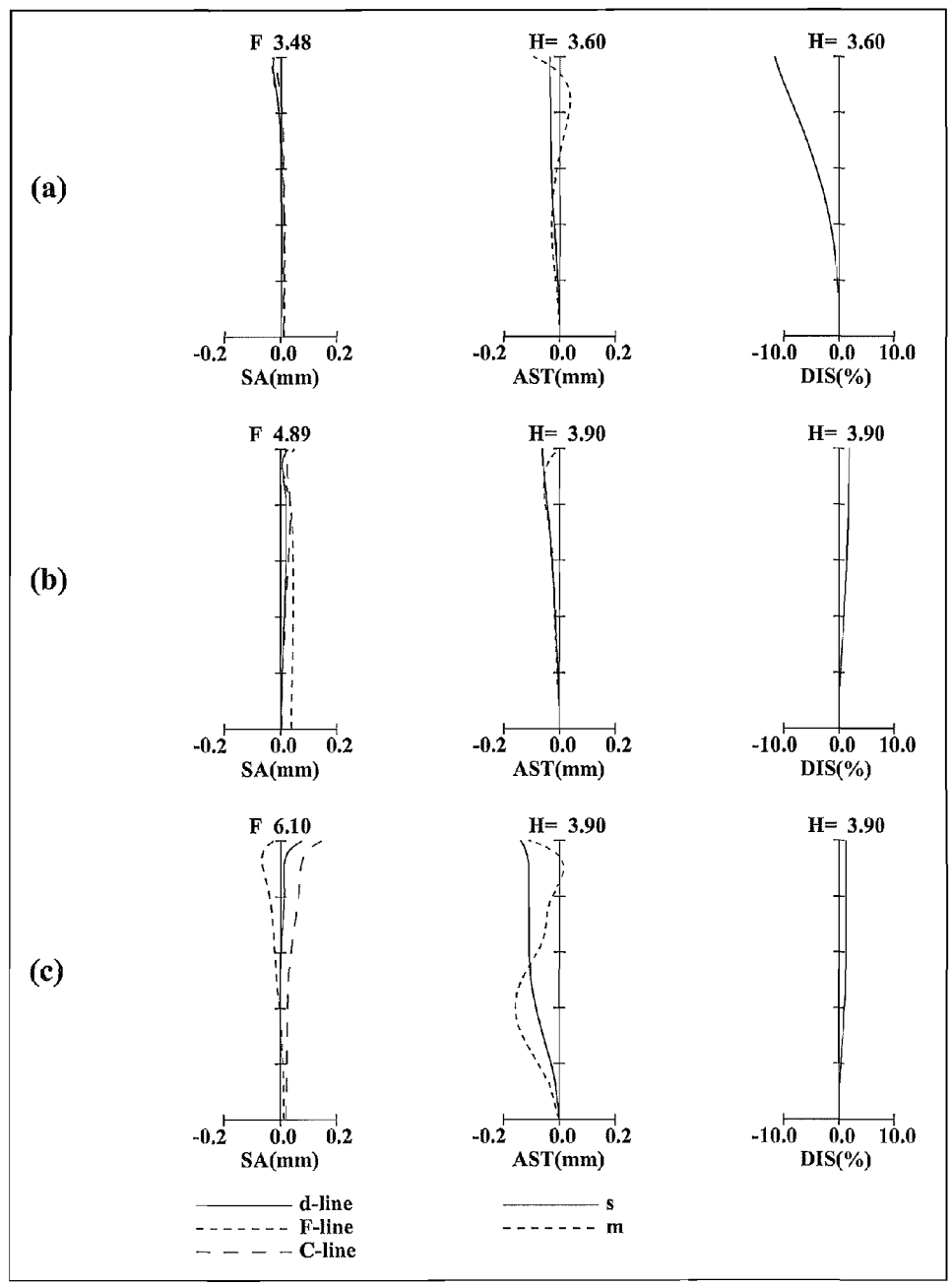
FIG. 17 is a longitudinal aberration diagram of an infinity in-focus condition of a zoom lens system according to Example I-6.
Figure 18:
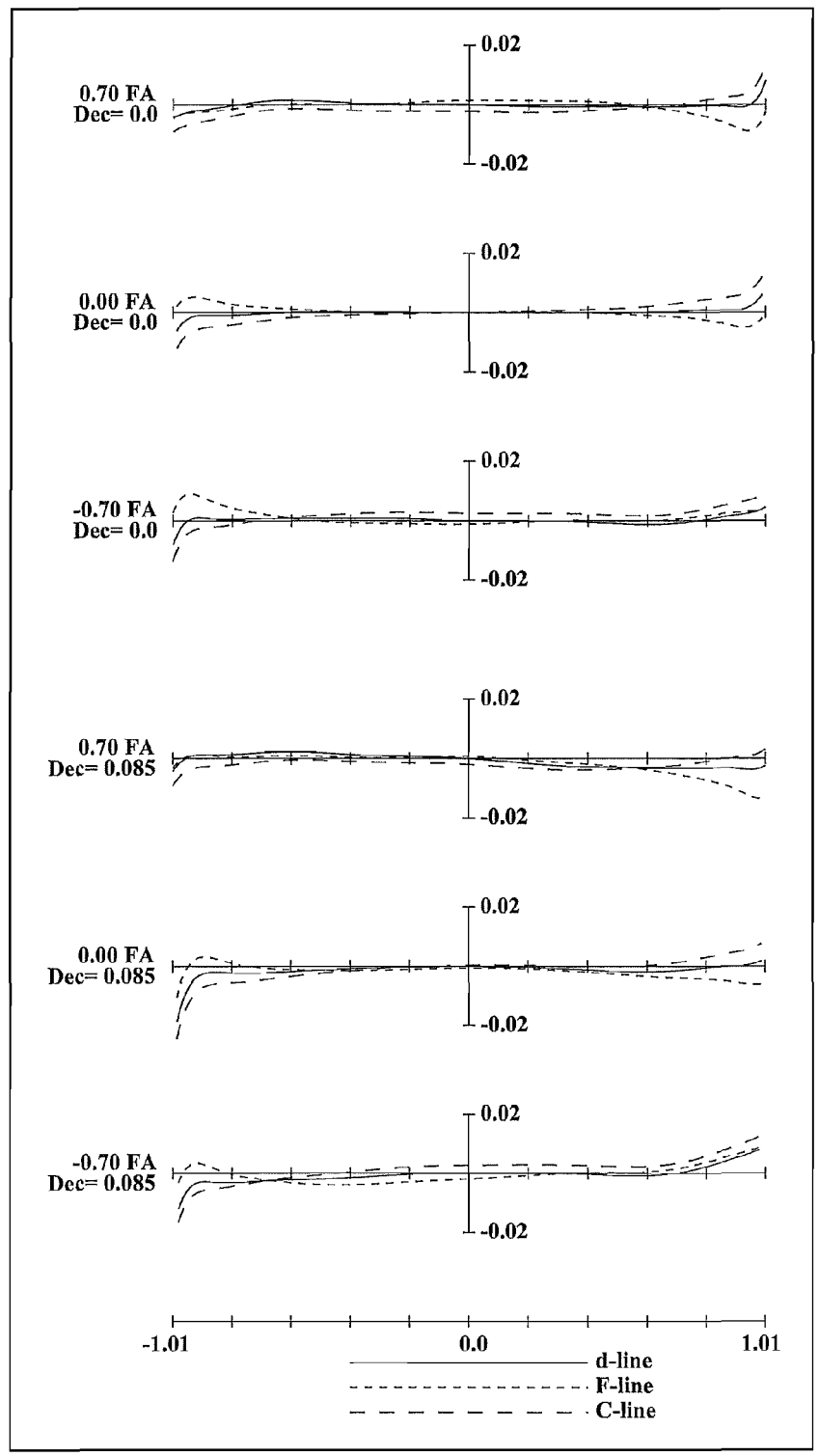
FIG. 18 is a lateral aberration diagram of a zoom lens system according to Example I-6 at a telephoto limit in a basic state where image blur compensation is not performed and in a blur compensation state.

As shown in FIG. 16, in the zoom lens system according to Embodiment I-6, the first lens unit G1, in order from the object side to the image side, comprises: a negative meniscus first lens element L1 with the convex surface facing the object side; and a bi-convex second lens element L2. The first lens element L1 and the second lens element L2 are cemented with each other. Further, the second lens element L2 has an aspheric image side surface.

In the zoom lens system according to Embodiment I-6, the second lens unit G2, in order from the object side to the image side, comprises: a negative meniscus third lens element L3 with the convex surface facing the object side; a bi-concave fourth lens element L4; and a bi-convex fifth lens element L5. Among these, the third lens element L3 has an aspheric image side surface.

Further, in the zoom lens system according to Embodiment I-6, the third lens unit G3, in order from the object side to the image side, comprises: a bi-convex sixth lens element L6; a positive meniscus seventh lens element L7 with the convex surface facing the object side; and a negative meniscus eighth lens element L8 with the convex surface facing the object side. Among these, the seventh lens element L7 and the eighth lens element L8 are cemented with each other. Further, the sixth lens element L6 has two aspheric surfaces.

Further, in the zoom lens system according to Embodiment I-6, the fourth lens unit G4 comprises solely a bi-convex ninth lens element L9. The ninth lens element L9 has two aspheric surfaces.

Here, in the zoom lens system according to Embodiment I-6, a plane parallel plate P is provided on the object side relative to the image surface S (that is, between the image surface S and the ninth lens element L9).

In the zoom lens system according to Embodiment I-6, in zooming from a wide-angle limit to a telephoto limit at the time of image taking, the first lens unit G1 and the third lens unit G3 move almost monotonically to the object side, the second lens unit G2 moves to the object side with locus of a slight convex to the image side, and the fourth lens unit G4 moves to the image side with locus of a convex to the object side. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

Figure 19:
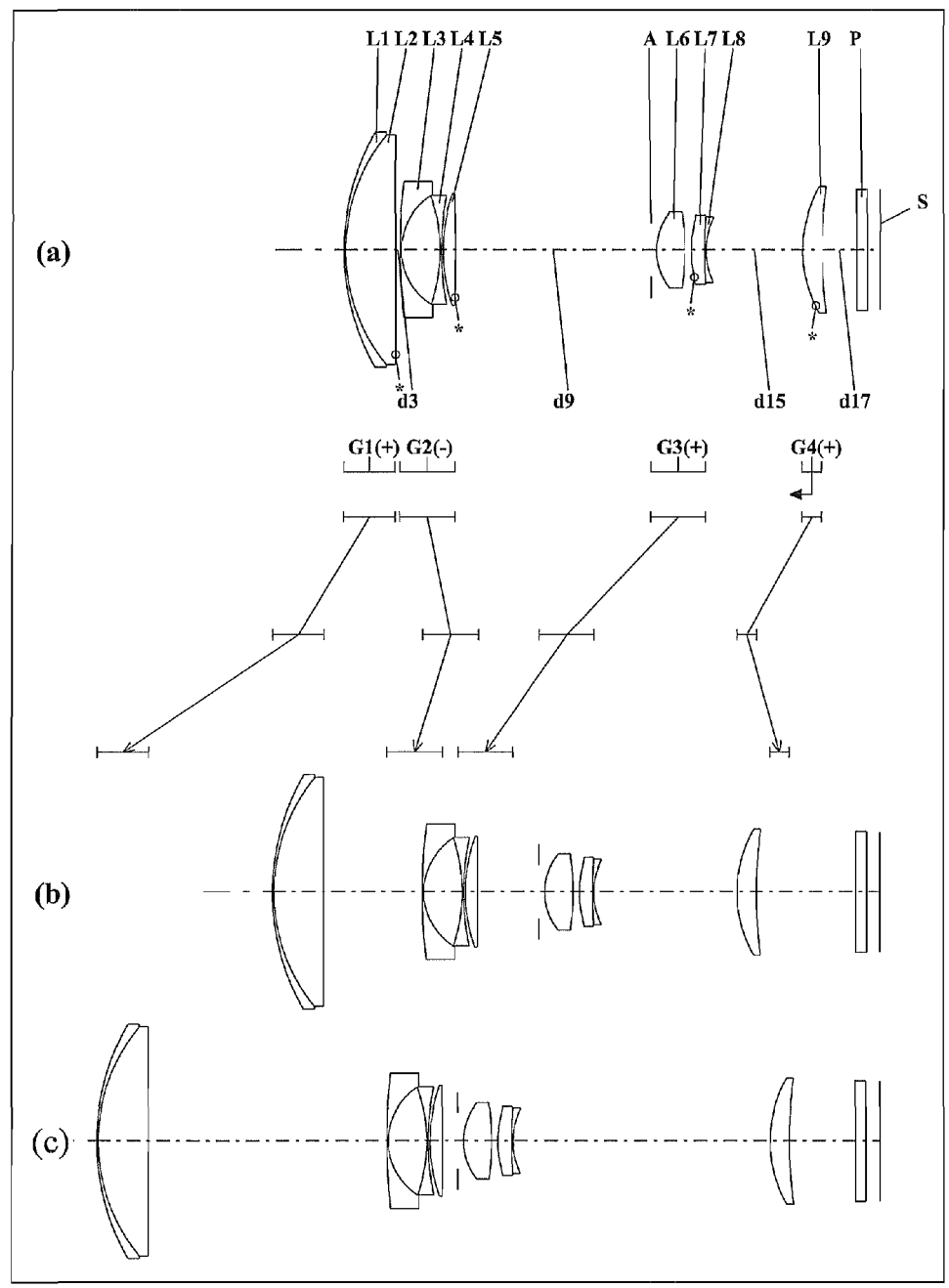
FIG. 19 is a lens arrangement diagram showing an infinity in-focus condition of a zoom lens system according to Embodiment I-7 (Example I-7)
Figure 20:
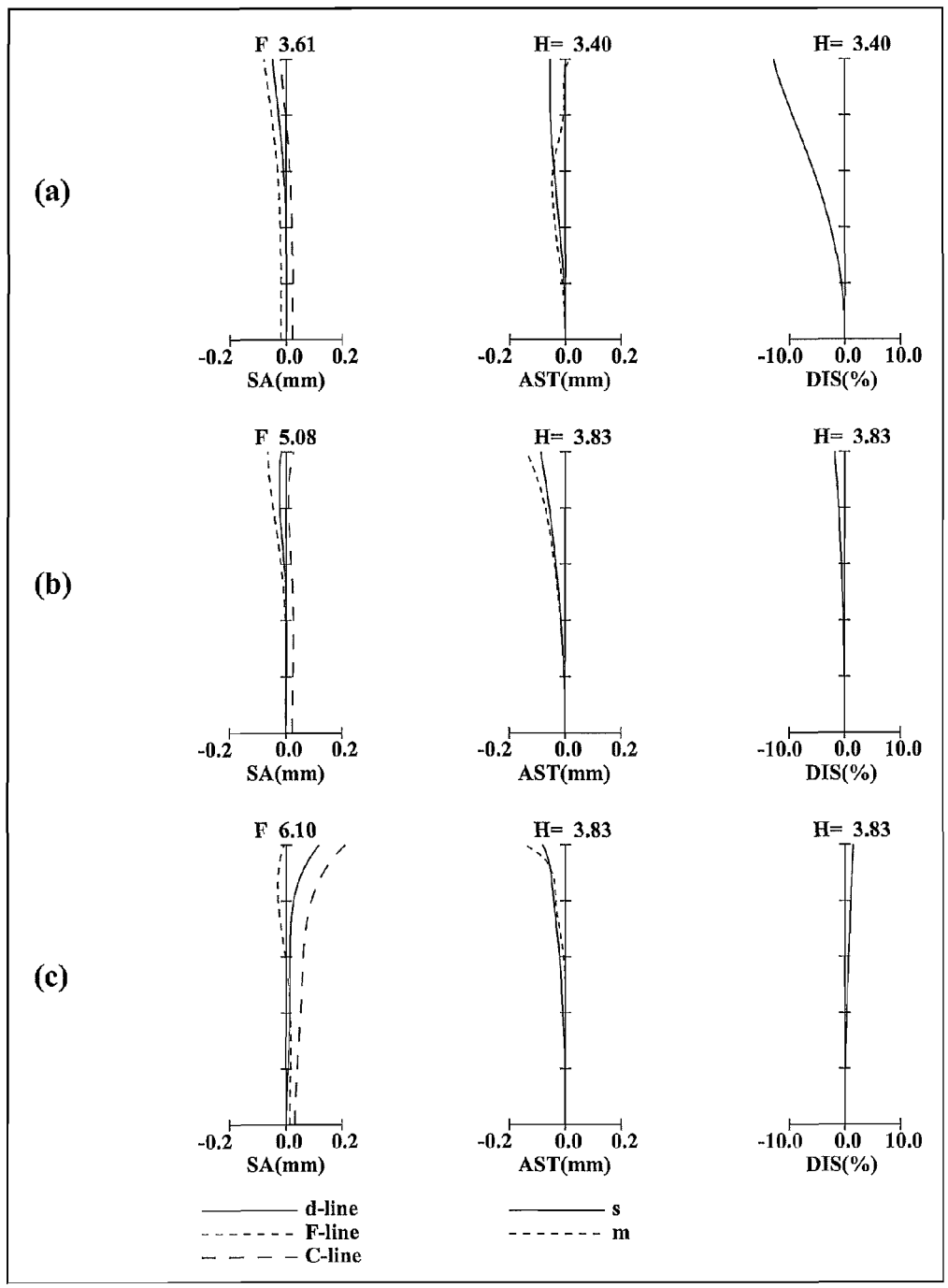
FIG. 20 is a longitudinal aberration diagram of an infinity in-focus condition of a zoom lens system according to Example I-7.
Figure 21:
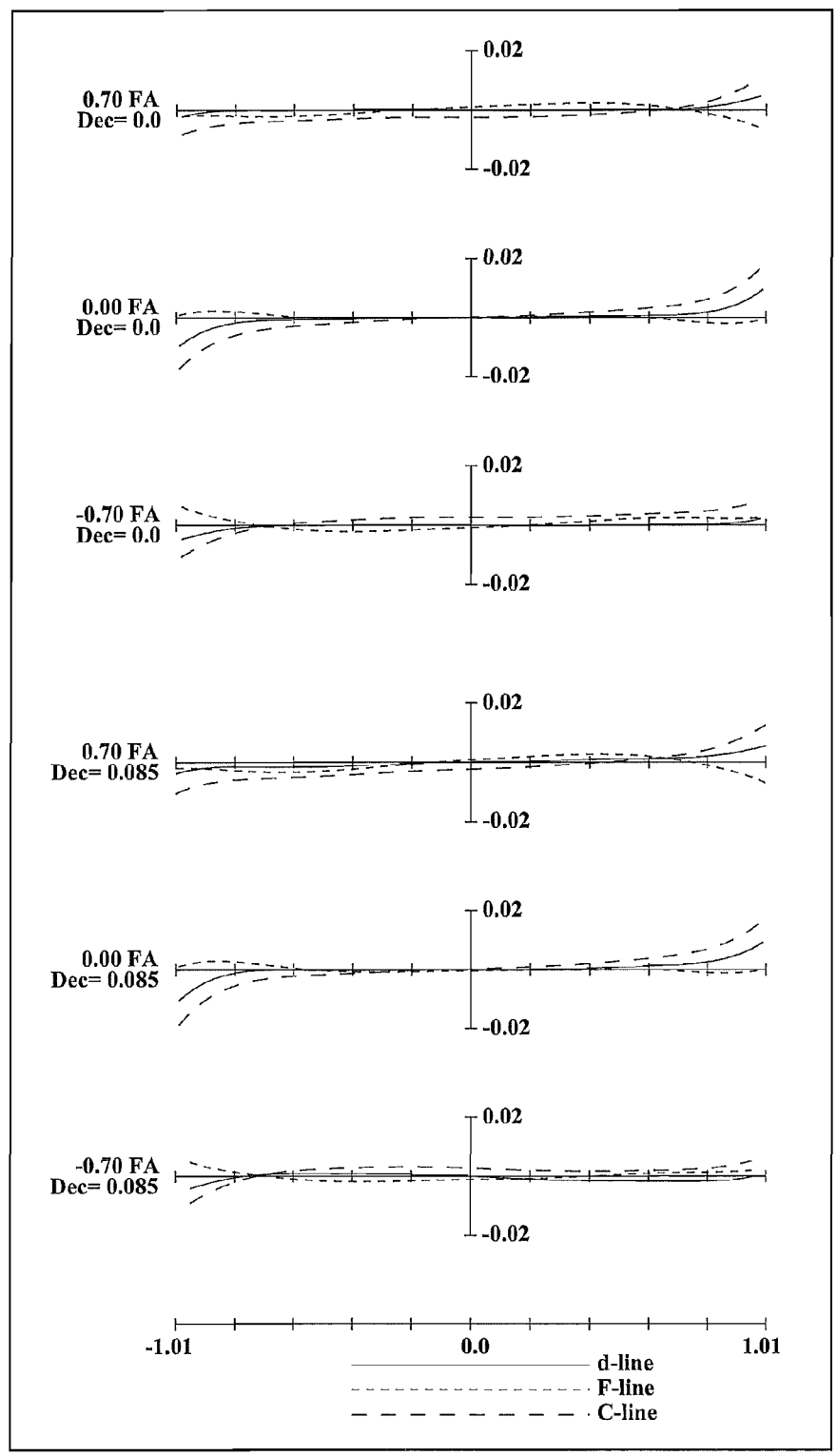
FIG. 21 is a lateral aberration diagram of a zoom lens system according to Example I-7 at a telephoto limit in a basic state where image blur compensation is not performed and in a blur compensation state.

As shown in FIG. 19, in the zoom lens system according to Embodiment I-7, the first lens unit G1, in order from the object side to the image side, comprises: a negative meniscus first lens element L1 with the convex surface facing the object side; and a bi-convex second lens element L2. The first lens element L1 and the second lens element L2 are cemented with each other. Further, the second lens element L2 has an aspheric image side surface.

In the zoom lens system according to Embodiment I-7, the second lens unit G2, in order from the object side to the image side, comprises: a negative meniscus third lens element L3 with the convex surface facing the object side; a bi-concave fourth lens element L4; and a bi-convex fifth lens element L5. Among these, the fifth lens element L5 has an aspheric image side surface.

Further, in the zoom lens system according to Embodiment I-7, the third lens unit G3, in order from the object side to the image side, comprises: a bi-convex sixth lens element L6; a positive meniscus seventh lens element L7 with the convex surface facing the object side; and a negative meniscus eighth lens element L8 with the convex surface facing the object side. Among these, the seventh lens element L7 and the eighth lens element L8 are cemented with each other. Further, the seventh lens element L7 has an aspheric object side surface.

Further, in the zoom lens system according to Embodiment I-7, the fourth lens unit G4 comprises solely a positive meniscus ninth lens element L9 with the convex surface facing the object side. The ninth lens element L9 has an aspheric object side surface.

Here, in the zoom lens system according to Embodiment I-7, a plane parallel plate P is provided on the object side relative to the image surface S (that is, between the image surface S and the ninth lens element L9).

In the zoom lens system according to Embodiment I-7, in zooming from a wide-angle limit to a telephoto limit at the time of image taking, the first lens unit G1 moves to the object side, the second lens unit G2 moves to the object side with locus of a convex to the image side, the third lens unit G3 moves monotonically to the object side, and the fourth lens unit G4 moves with locus of a convex to the object side such that the position at a telephoto limit is located on the object side relative to the position at a wide-angle limit. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

In the zoom lens system according to Embodiments I-1 to I-7, the first lens unit G1 is composed of two lens elements while the fourth lens unit G4 is composed of one lens element. Thus, the lens system has a remarkably short overall length of lens system.

In the zoom lens system according to Embodiments I-1 to I-7, the first lens unit G1, in order from the object side to the image side, comprises a first lens element L1 having negative optical power and a second lens element L2 having positive optical power. Further, these lens elements are cemented with each other so that a cemented lens element is formed. Thus, a more compact lens system is achieved. Furthermore, the image side surface of the second lens element L2 is aspheric. This permits satisfactory suppression of an increase in distortion and astigmatism caused by a wide angle construction and a high variable magnification construction.

In the zoom lens system according to Embodiments I-1 to I-7, the one lens element constituting the fourth lens unit G4 has positive optical power. Thus, at the time of focusing from an infinite-distance object to a short-distance object, as shown in each FIG., the fourth lens unit G4 is moved to the object side so that rapid focusing is achieved easily. Further, the one lens element constituting the fourth lens unit G4 has an aspheric surface. This permits satisfactory compensation of curvature of off-axial field over the range from a wide-angle limit to a telephoto limit.

Further, in the zoom lens system according to Embodiments I-1 to I-7, in zooming from a wide-angle limit to a telephoto limit at the time of image taking, the first lens unit G1, the second lens unit G2, the third lens unit G3 and the fourth lens unit G4 are moved individually along the optical axis so that zooming is achieved. Then, any lens unit among the first lens unit G1, the second lens unit G2, the third lens unit G3 and the fourth lens unit G4, or alternatively a sub lens unit consisting of a part of a lens unit is moved in a direction perpendicular to the optical axis so that image point movement caused by vibration of the entire system is compensated, that is, image blur caused by hand blurring, vibration and the like can be compensated optically.

When image point movement caused by vibration of the entire system is to be compensated, for example, the third lens unit G3 is moved in a direction perpendicular to the optical axis, so that image blur is compensated in a state that size increase in the entire zoom lens system is suppressed and a compact construction is realized and that excellent imaging characteristics such as small decentering coma aberration and decentering astigmatism are satisfied.

Here, in a case that a lens unit is composed of a plurality of lens elements, the above-mentioned sub lens unit consisting of a part of a lens unit indicates any one lens element or alternatively a plurality of adjacent lens elements among the plurality of lens elements.

Embodiments II-1 to II-6

FIGS. 23, 26, 29, 32, 35 and 38 are lens arrangement diagrams of zoom lens systems according to Embodiments II-1 to II-6, respectively.

Each of FIGS. 23, 26, 29, 32, 35 and 38 shows a zoom lens system in an infinity in-focus condition. In each FIG., part (a) shows a lens configuration at a wide-angle limit (in the minimum focal length condition: focal length $f_W$), part (b) shows a lens configuration at a middle position (in an intermediate focal length condition: focal length $f_M = \sqrt{(f_W * f_T)}$), and part (c) shows a lens configuration at a telephoto limit (in the maximum focal length condition: focal length $f_T$). Further, in each FIG., each bent arrow located between part (a) and part (b) indicates a line obtained by connecting the positions of each lens unit respectively at a wide-angle limit, a middle position and a telephoto limit. Thus, in the part between the wide-angle limit and the middle position and the part between the middle position and the telephoto limit, the positions are connected simply with a straight line, and hence this line does not indicate actual motion of each lens unit. Moreover, in each FIG., an arrow imparted to a lens unit indicates focusing from an infinity in-focus condition to a close-object in-focus condition. That is, the arrow indicates the moving direction at the time of focusing from an infinity in-focus condition to a close-object in-focus condition.

The zoom lens system according to each embodiment, in order from the object side to the image side, comprises a first lens unit G1 having positive optical power, a second lens unit G2 having negative optical power, a third lens unit G3 having positive optical power, and a fourth lens unit G4 having positive optical power. Then, in zooming, the individual lens units move in a direction along the optical axis such that intervals between the lens units, that is, the interval between the first lens unit G1 and the second lens unit G2, the interval between the second lens unit G2 and the third lens unit G3, and the interval between the third lens unit G3 and the fourth lens unit G4 should all vary. In the zoom lens system according to each embodiment, since these lens units are arranged in the desired optical power configuration, high optical performance is obtained and still size reduction is achieved in the entire lens system.

Further, in FIGS. 23, 26, 29, 32, 35 and 38, an asterisk "*" imparted to a particular surface indicates that the surface is aspheric. In each FIG., symbol (+) or (−) imparted to the symbol of each lens unit corresponds to the sign of the optical power of the lens unit. In each FIG., the straight line located on the most right-hand side indicates the position of the image surface S. On the object side relative to the image surface S (that is, between the image surface S and the most image side lens surface of the fourth lens unit G4), a plane parallel plate P such as an optical low-pass filter and a face plate of an image sensor is provided.

Further, in FIGS. 23, 26, 29, 32, 35 and 38, an aperture diaphragm A is provided between the second lens unit G2 and the third lens unit G3. In zooming from a wide-angle limit to a telephoto limit at the time of image taking, the aperture diaphragm A moves along the optical axis independently of the individual lens units in Embodiments II-1 and II-2 shown in FIGS. 23 and 26. In contrast, in Embodiments II-3 to II-6 shown in FIGS. 29, 32, 35 and 38, the aperture diaphragm A moves along the optical axis integrally with the third lens unit G3.

Figure 23:
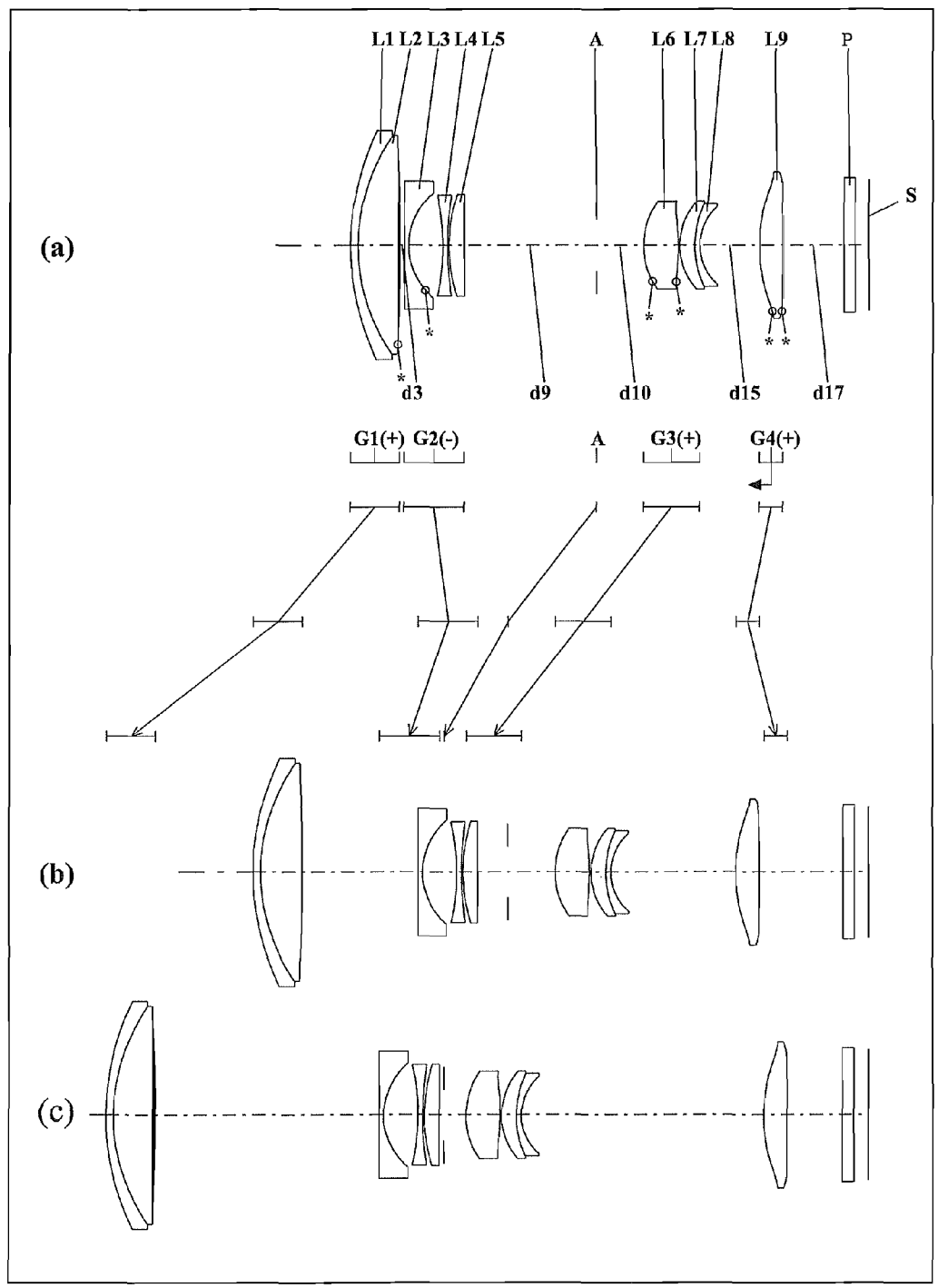
FIG. 23 is a lens arrangement diagram showing an infinity in-focus condition of a zoom lens system according to Embodiment II-1 (Example II-1)
Figure 24:
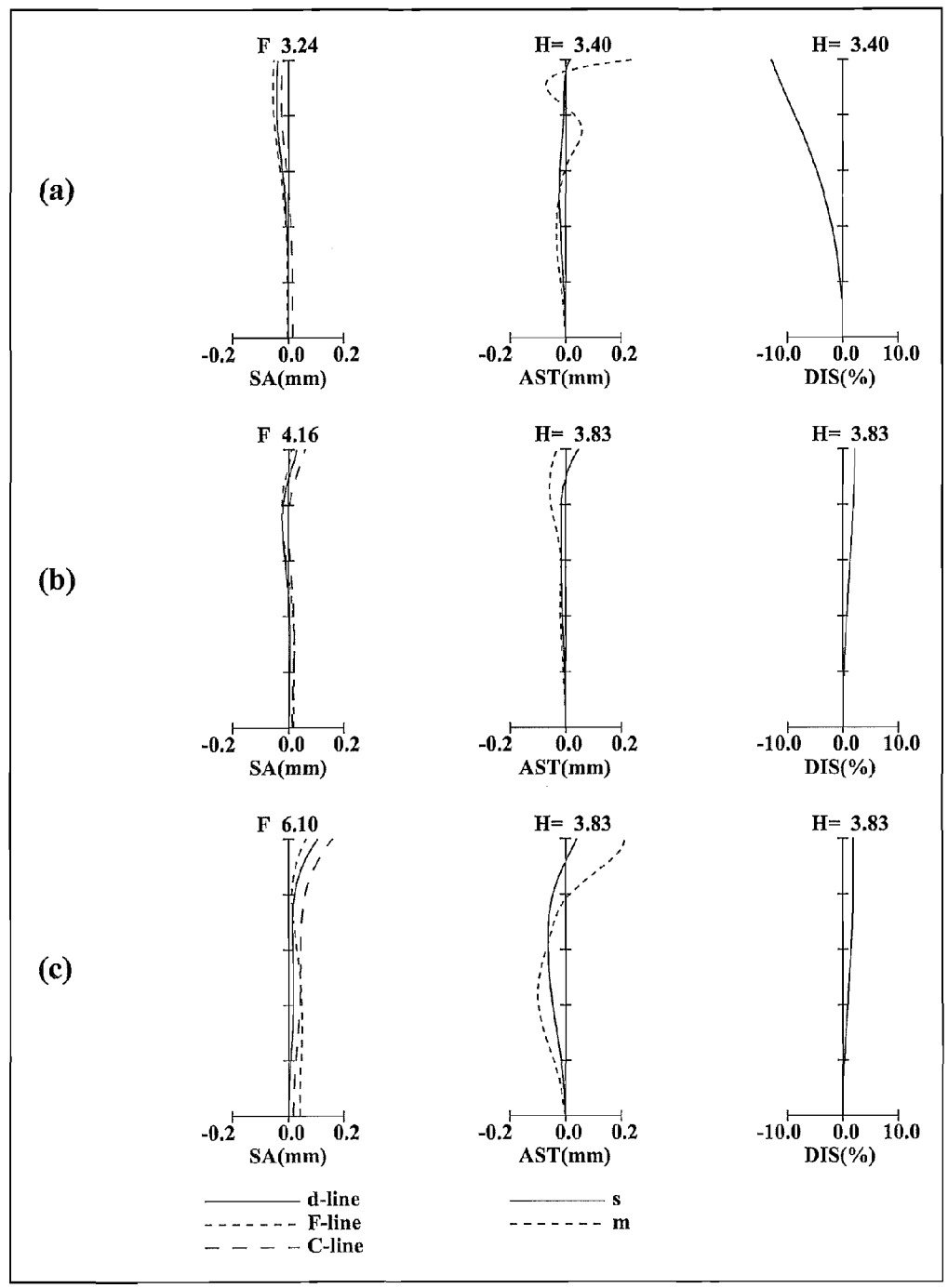
FIG. 24 is a longitudinal aberration diagram of an infinity in-focus condition of a zoom lens system according to Example II-1.
Figure 25:
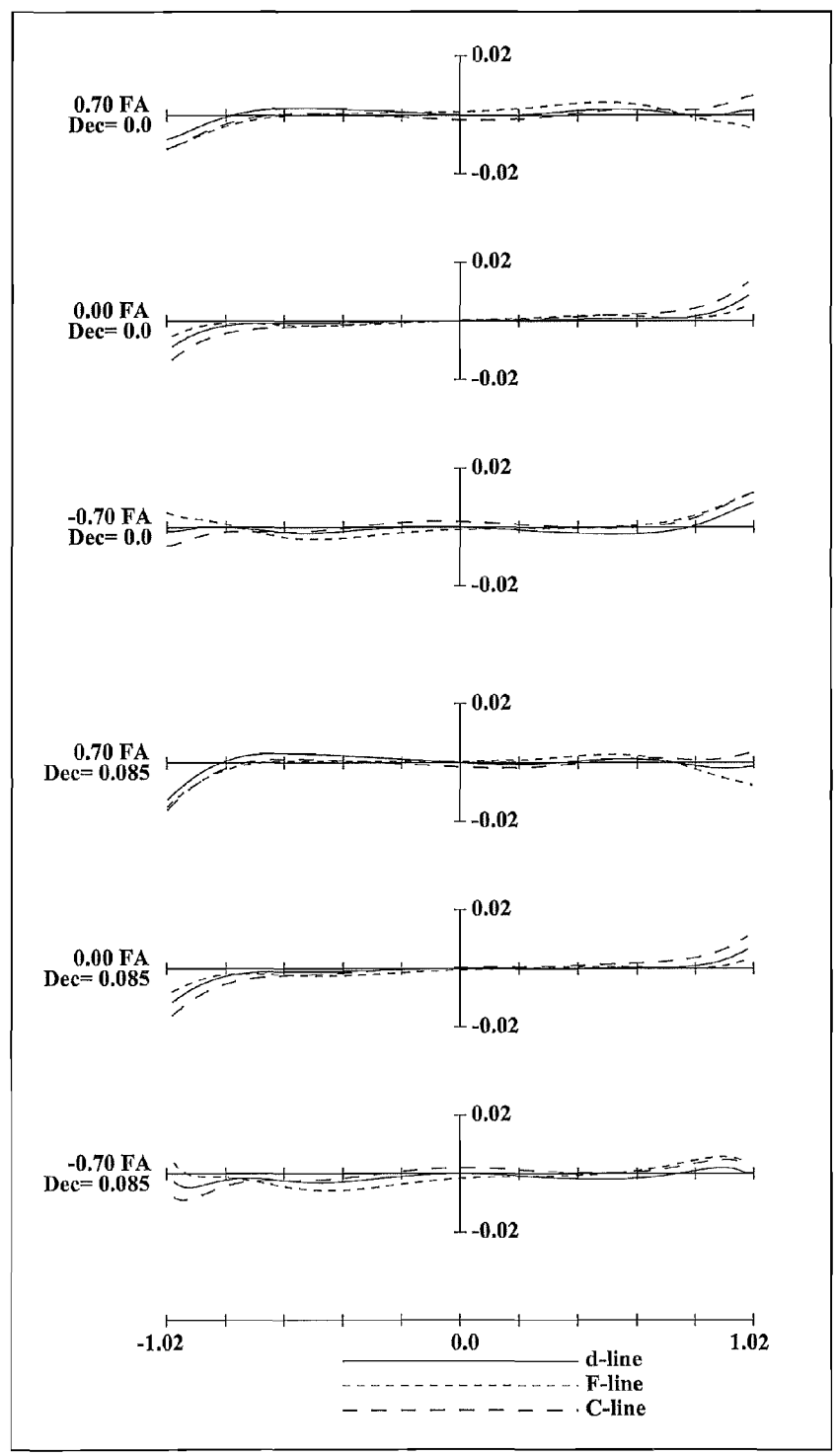
FIG. 25 is a lateral aberration diagram of a zoom lens system according to Example II-1 at a telephoto limit in a basic state where image blur compensation is not performed and in a blur compensation state.

As shown in FIG. 23, in the zoom lens system according to Embodiment II-1, the first lens unit G1, in order from the object side to the image side, comprises: a negative meniscus first lens element L1 with the convex surface facing the object side; and a bi-convex second lens element L2. The first lens element L1 and the second lens element L2 are cemented with each other. Further, the second lens element L2 has an aspheric image side surface.

In the zoom lens system according to Embodiment II-1, the second lens unit G2, in order from the object side to the image side, comprises: a negative meniscus third lens element L3 with the convex surface facing the object side; a bi-concave fourth lens element L4; and a bi-convex fifth lens element L5. Among these, the third lens element L3 has an aspheric image side surface.

Further, in the zoom lens system according to Embodiment II-1, the third lens unit G3, in order from the object side to the image side, comprises: a bi-convex sixth lens element L6; a positive meniscus seventh lens element L7 with the convex surface facing the object side; and a negative meniscus eighth lens element L8 with the convex surface facing the object side. Among these, the seventh lens element L7 and the eighth lens element L8 are cemented with each other. Further, the sixth lens element L6 has two aspheric surfaces.

Further, in the zoom lens system according to Embodiment II-1, the fourth lens unit G4 comprises solely a bi-convex ninth lens element L9. The ninth lens element L9 has two aspheric surfaces.

Here, in the zoom lens system according to Embodiment II-1, a plane parallel plate P is provided on the object side relative to the image surface S (that is, between the image surface S and the ninth lens element L9).

In the zoom lens system according to Embodiment II-1, in zooming from a wide-angle limit to a telephoto limit at the time of image taking, the first lens unit G1 and the third lens unit G3 move monotonically to the object side, the second lens unit G2 moves to the object side with locus of a slight convex to the image side, and the fourth lens unit G4 moves to the image side with locus of a slight convex to the object side. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

Further, in the zoom lens system according to Embodiment II-1, in zooming from a wide-angle limit to a telephoto limit at the time of image taking, the aperture diaphragm A provided between the second lens unit G2 and the third lens unit G3 moves monotonically to the object side. That is, in zooming, the interval between the second lens unit G2 and the aperture diaphragm A decreases.

Figure 26:
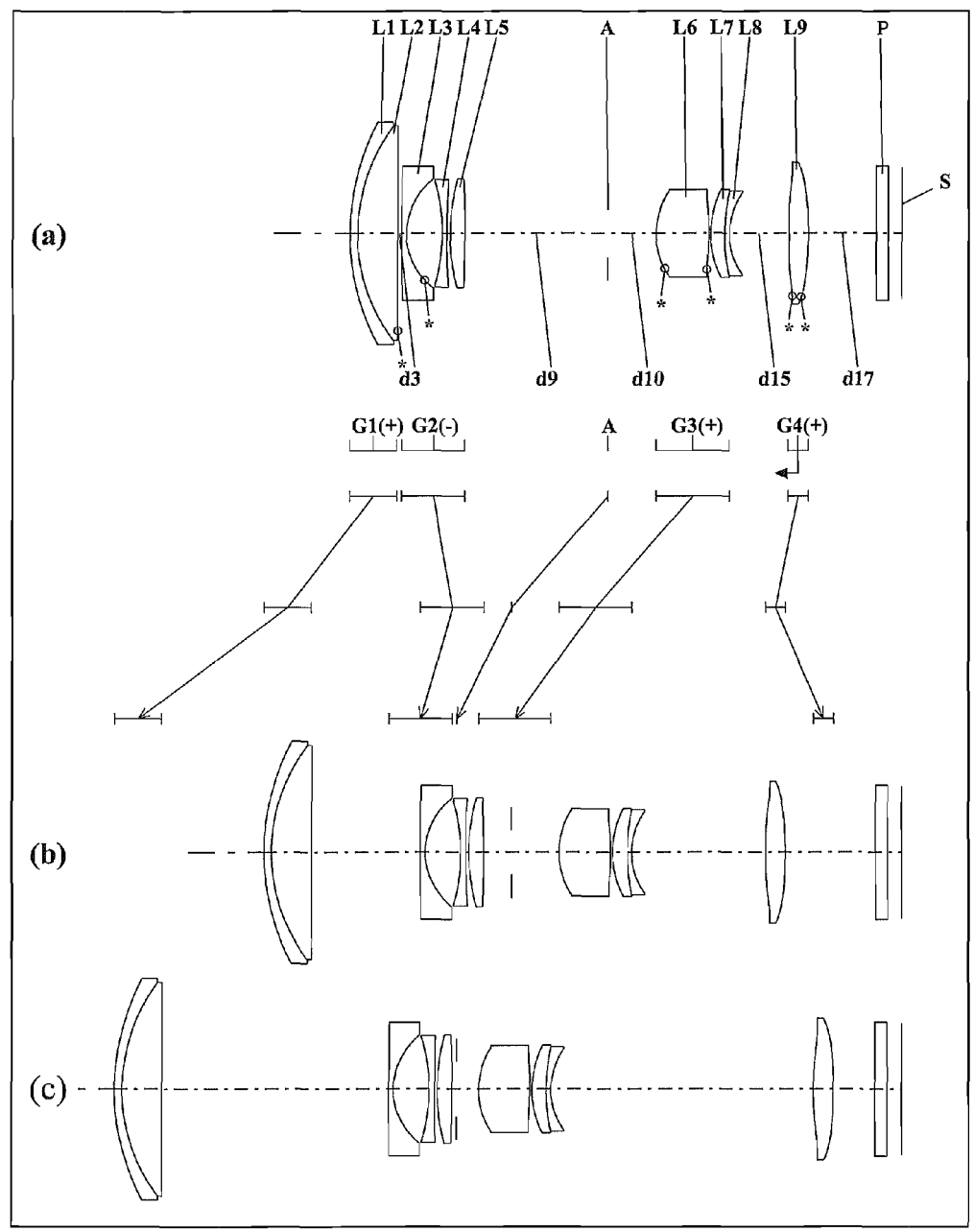
FIG. 26 is a lens arrangement diagram showing an infinity in-focus condition of a zoom lens system according to Embodiment II-2 (Example II-2)
Figure 27:
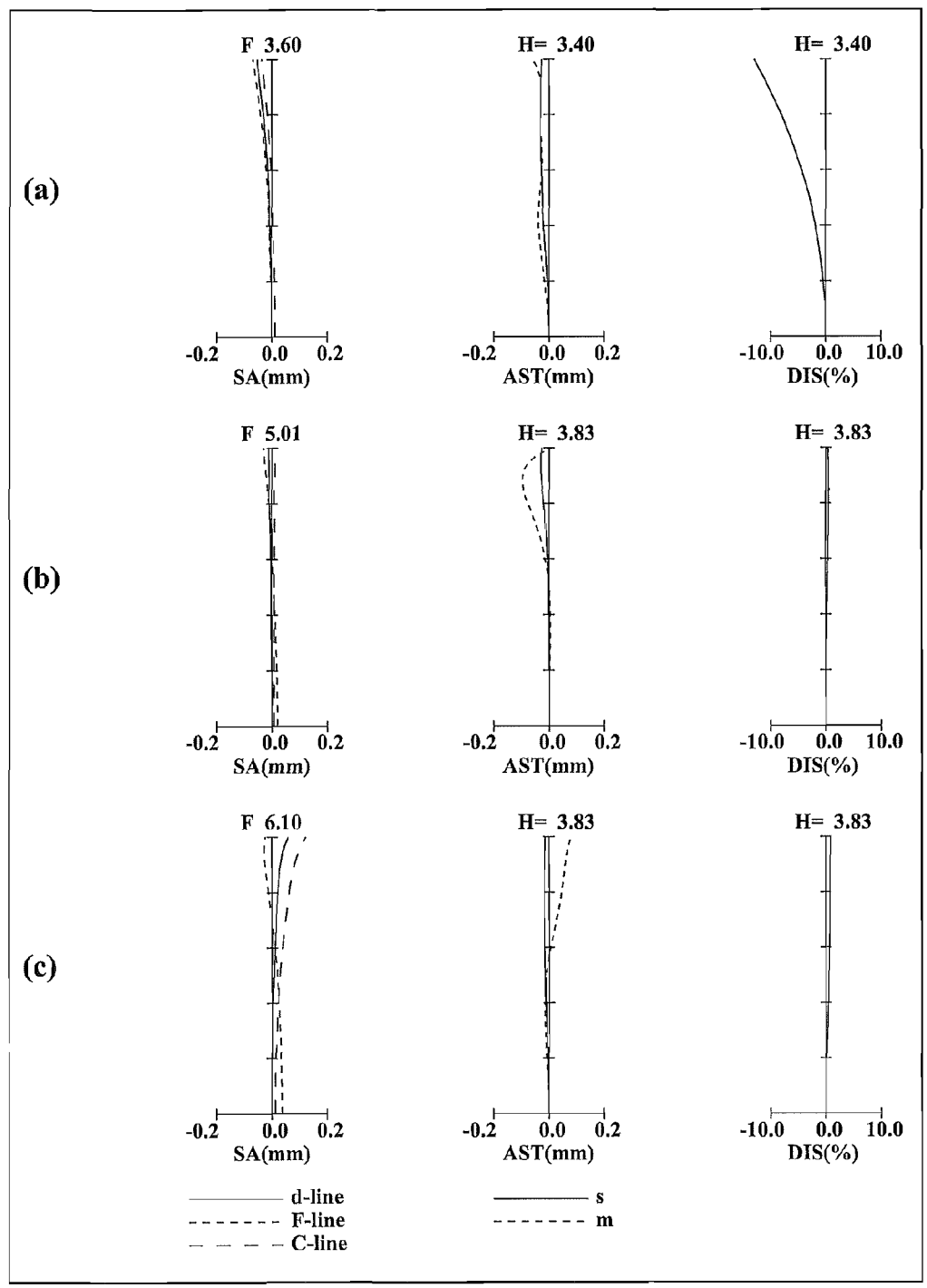
FIG. 27 is a longitudinal aberration diagram of an infinity in-focus condition of a zoom lens system according to Example II-2.
Figure 28:
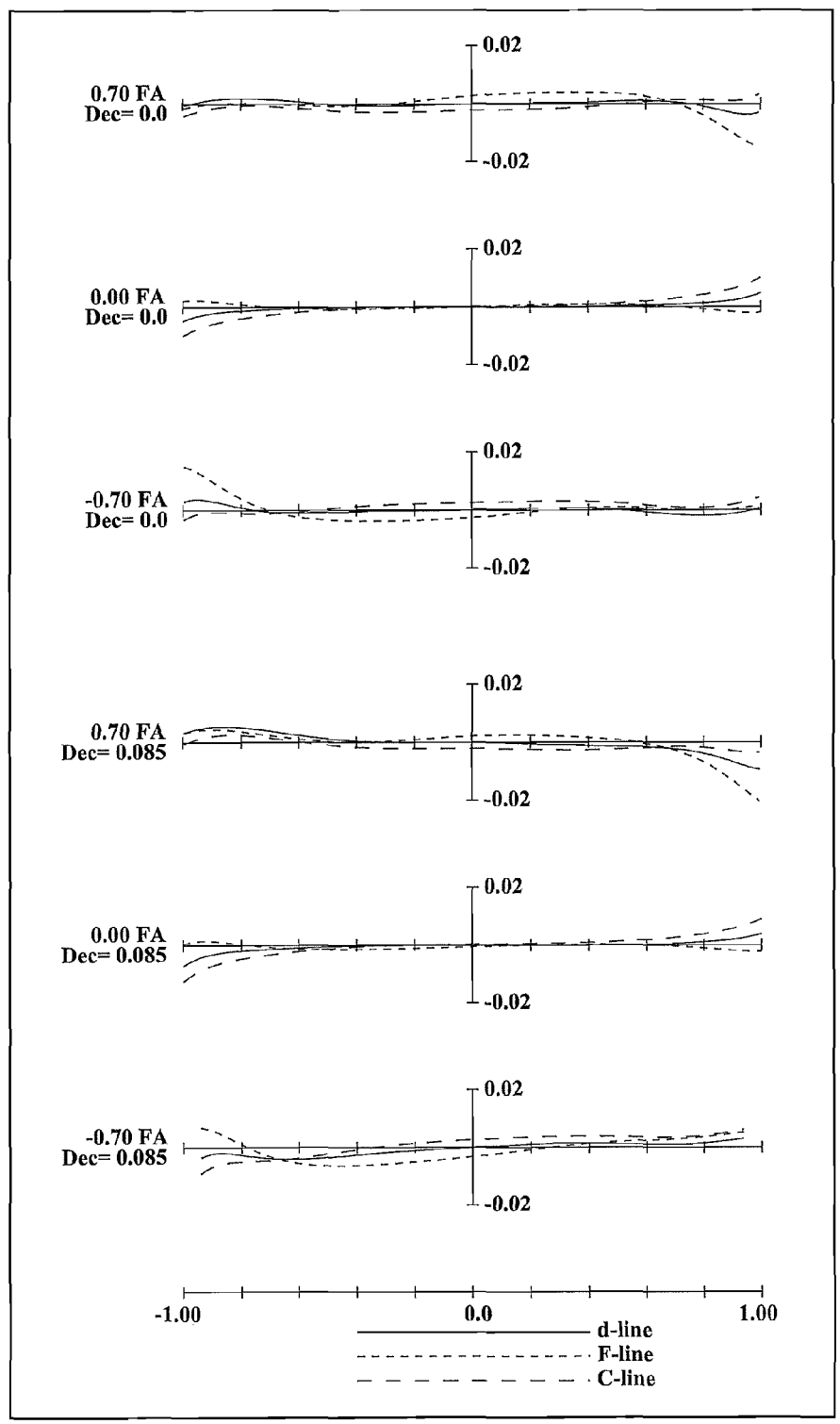
FIG. 28 is a lateral aberration diagram of a zoom lens system according to Example II-2 at a telephoto limit in a basic state where image blur compensation is not performed and in a blur compensation state.

As shown in FIG. 26, in the zoom lens system according to Embodiment II-2, the first lens unit G1, in order from the object side to the image side, comprises: a negative meniscus first lens element L1 with the convex surface facing the object side; and a positive meniscus second lens element L2 with the convex surface facing the object side. The first lens element L1 and the second lens element L2 are cemented with each other. Further, the second lens element L2 has an aspheric image side surface.

In the zoom lens system according to Embodiment II-2, the second lens unit G2, in order from the object side to the image side, comprises: a negative meniscus third lens element L3 with the convex surface facing the object side; a bi-concave fourth lens element L4; and a bi-convex fifth lens element L5. Among these, the third lens element L3 has an aspheric image side surface.

Further, in the zoom lens system according to Embodiment II-2, the third lens unit G3, in order from the object side to the image side, comprises: a bi-convex sixth lens element L6; a positive meniscus seventh lens element L7 with the convex surface facing the object side; and a negative meniscus eighth lens element L8 with the convex surface facing the object side. Among these, the seventh lens element L7 and the eighth lens element L8 are cemented with each other. Further, the sixth lens element L6 has two aspheric surfaces.

Further, in the zoom lens system according to Embodiment II-2, the fourth lens unit G4 comprises solely a bi-convex ninth lens element L9. The ninth lens element L9 has two aspheric surfaces.

Here, in the zoom lens system according to Embodiment II-2, a plane parallel plate P is provided on the object side relative to the image surface S (that is, between the image surface S and the ninth lens element L9).

In the zoom lens system according to Embodiment II-2, in zooming from a wide-angle limit to a telephoto limit at the time of image taking, the first lens unit G1 and the third lens unit G3 move monotonically to the object side, the second lens unit G2 moves to the object side with locus of a slight convex to the image side, and the fourth lens unit G4 moves to the image side with locus of a convex to the object side. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

Further, in the zoom lens system according to Embodiment II-2, in zooming from a wide-angle limit to a telephoto limit at the time of image taking, the aperture diaphragm A provided between the second lens unit G2 and the third lens unit G3 moves monotonically to the object side. That is, in zooming, the interval between the second lens unit G2 and the aperture diaphragm A decreases.

Figure 29:
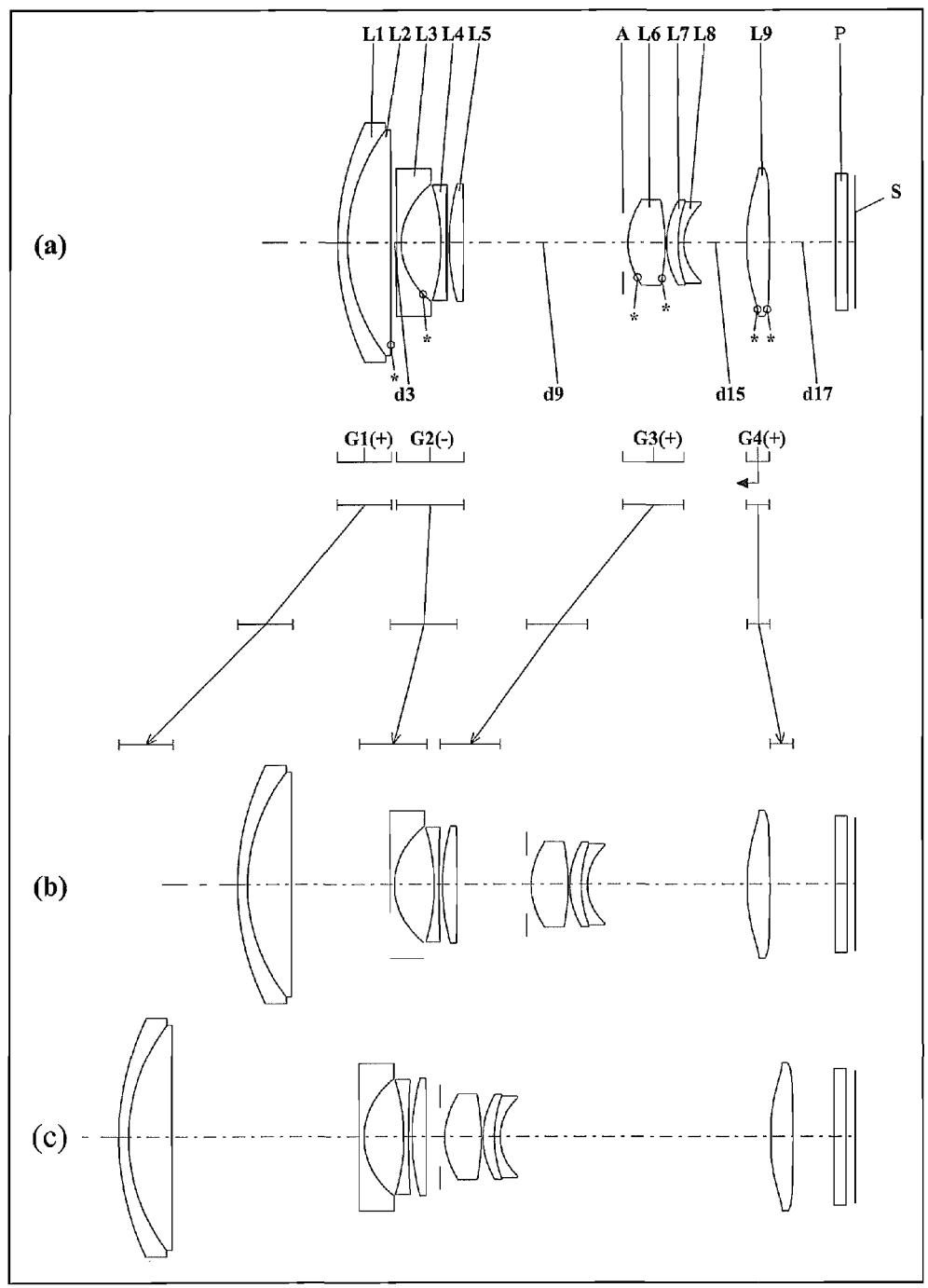
FIG. 29 is a lens arrangement diagram showing an infinity in-focus condition of a zoom lens system according to Embodiment II-3 (Example II-3)
Figure 30:
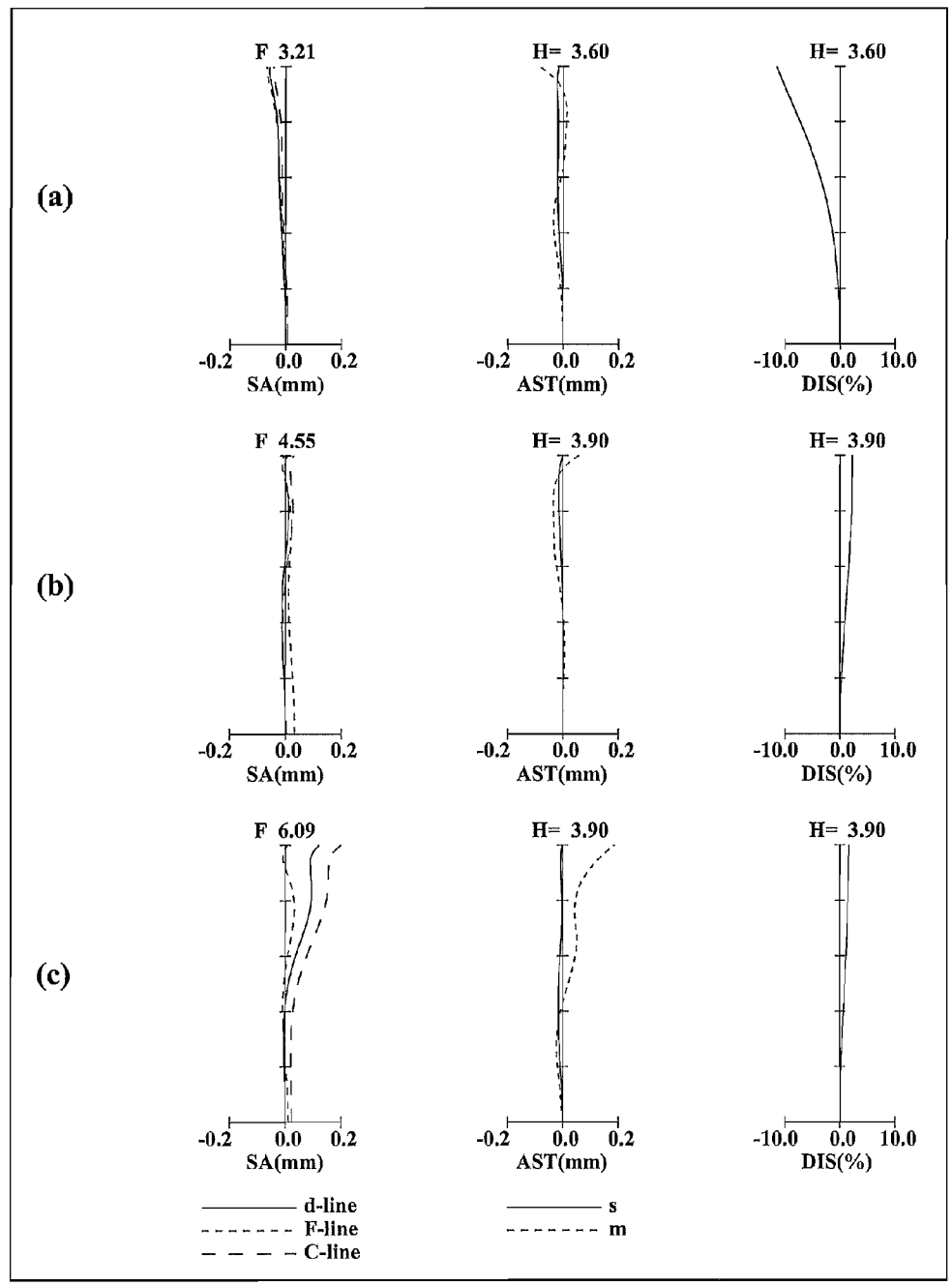
FIG. 30 is a longitudinal aberration diagram of an infinity in-focus condition of a zoom lens system according to Example II-3.
Figure 31:
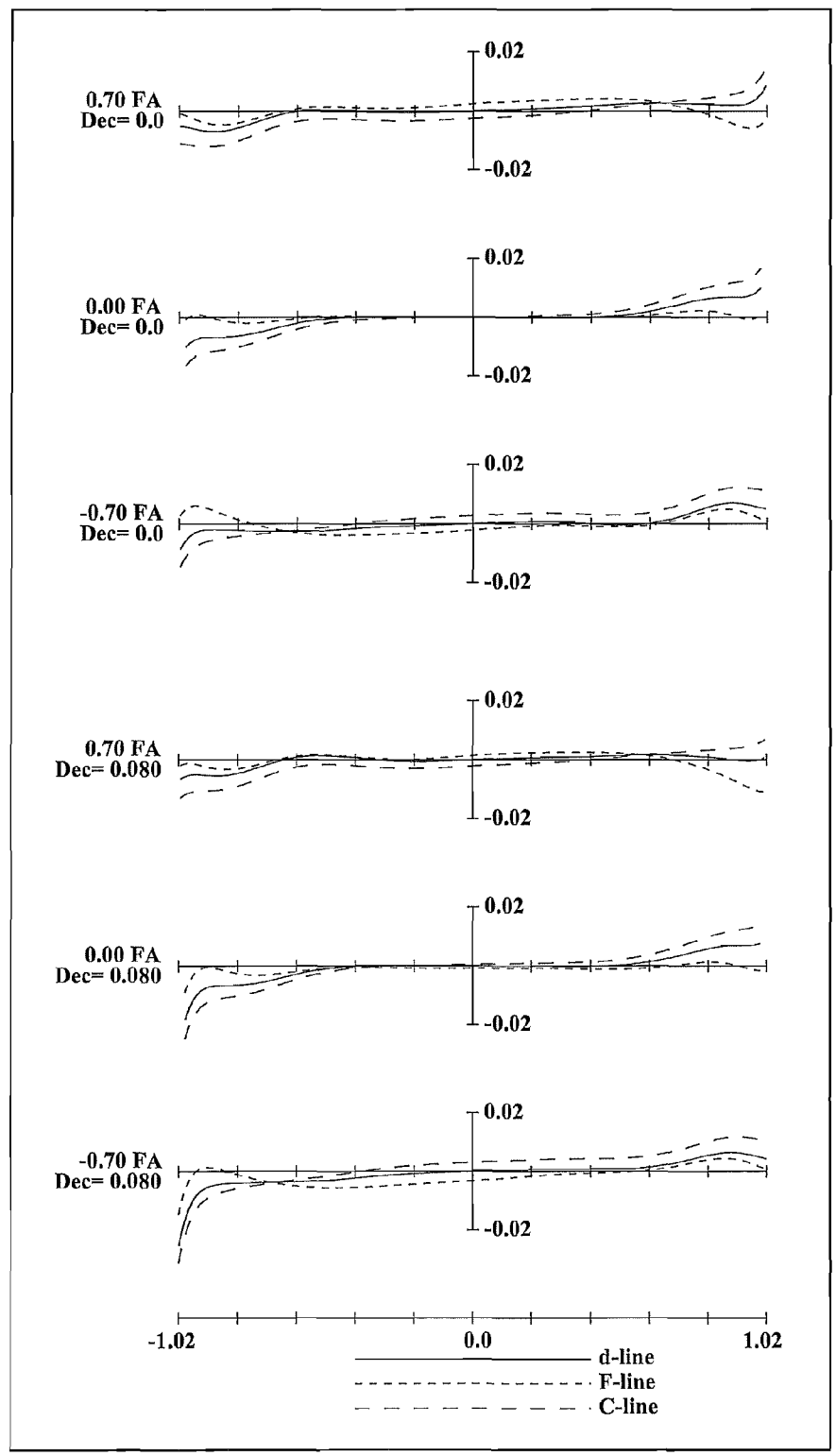
FIG. 31 is a lateral aberration diagram of a zoom lens system according to Example II-3 at a telephoto limit in a basic state where image blur compensation is not performed and in a blur compensation state.

As shown in FIG. 29, in the zoom lens system according to Embodiment II-3, the first lens unit G1, in order from the object side to the image side, comprises: a negative meniscus first lens element L1 with the convex surface facing the object side; and a bi-convex second lens element L2. The first lens element L1 and the second lens element L2 are cemented with each other. Further, the second lens element L2 has an aspheric image side surface.

Further, in the zoom lens system according to Embodiment II-3, the second lens unit G2, in order from the object side to the image side, comprises a bi-concave third lens element L3, a bi-concave fourth lens element L4, and a bi-convex fifth lens element L5. Among these, the third lens element L3 has an aspheric image side surface.

Further, in the zoom lens system according to Embodiment II-3, the third lens unit G3, in order from the object side to the image side, comprises: a bi-convex sixth lens element L6; a positive meniscus seventh lens element L7 with the convex surface facing the object side; and a negative meniscus eighth lens element L8 with the convex surface facing the object side. Among these, the seventh lens element L7 and the eighth lens element L8 are cemented with each other. Further, the sixth lens element L6 has two aspheric surfaces.

Further, in the zoom lens system according to Embodiment II-3, the fourth lens unit G4 comprises solely a bi-convex ninth lens element L9. The ninth lens element L9 has two aspheric surfaces.

Here, in the zoom lens system according to Embodiment II-3, a plane parallel plate P is provided on the object side relative to the image surface S (that is, between the image surface S and the ninth lens element L9).

In the zoom lens system according to Embodiment II-3, in zooming from a wide-angle limit to a telephoto limit at the time of image taking, the first lens unit G1 and the third lens unit G3 move monotonically to the object side, the second lens unit G2 slightly moves monotonically to the object side, and the fourth lens unit G4 moves to the image side. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

Figure 32:
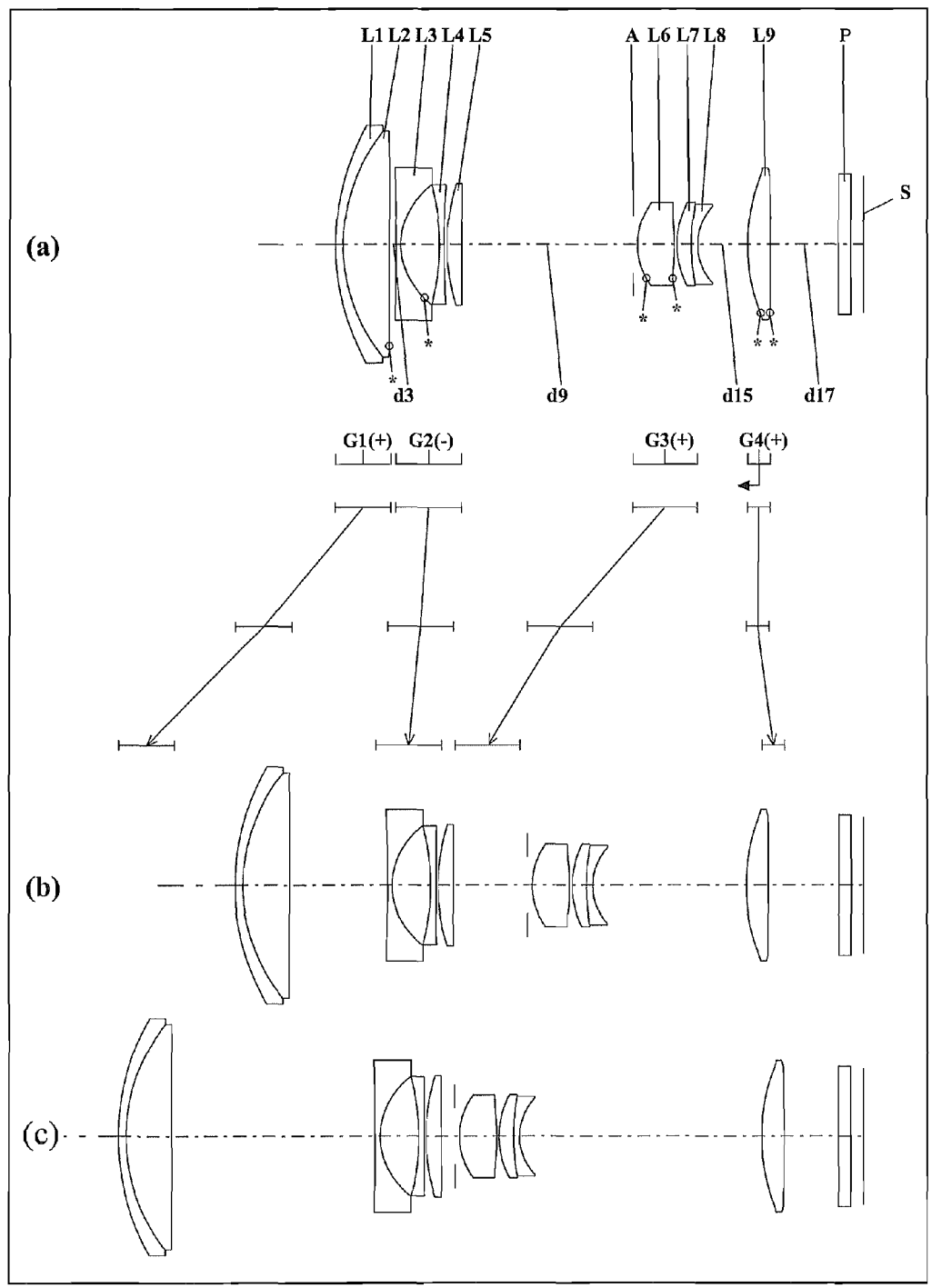
FIG. 32 is a lens arrangement diagram showing an infinity in-focus condition of a zoom lens system according to Embodiment II-4 (Example II-4)
Figure 33:
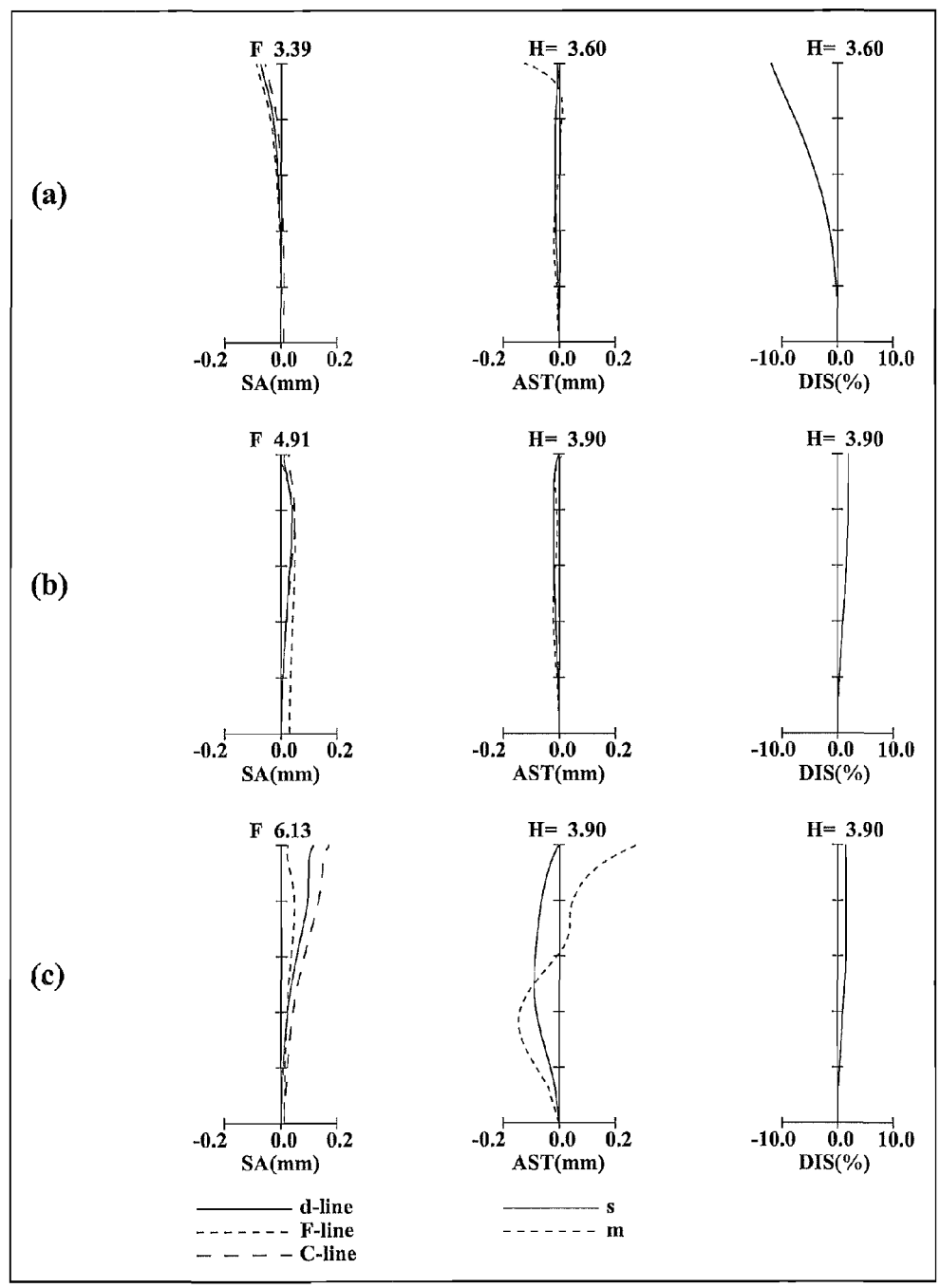
FIG. 33 is a longitudinal aberration diagram of an infinity in-focus condition of a zoom lens system according to Example II-4.
Figure 34:
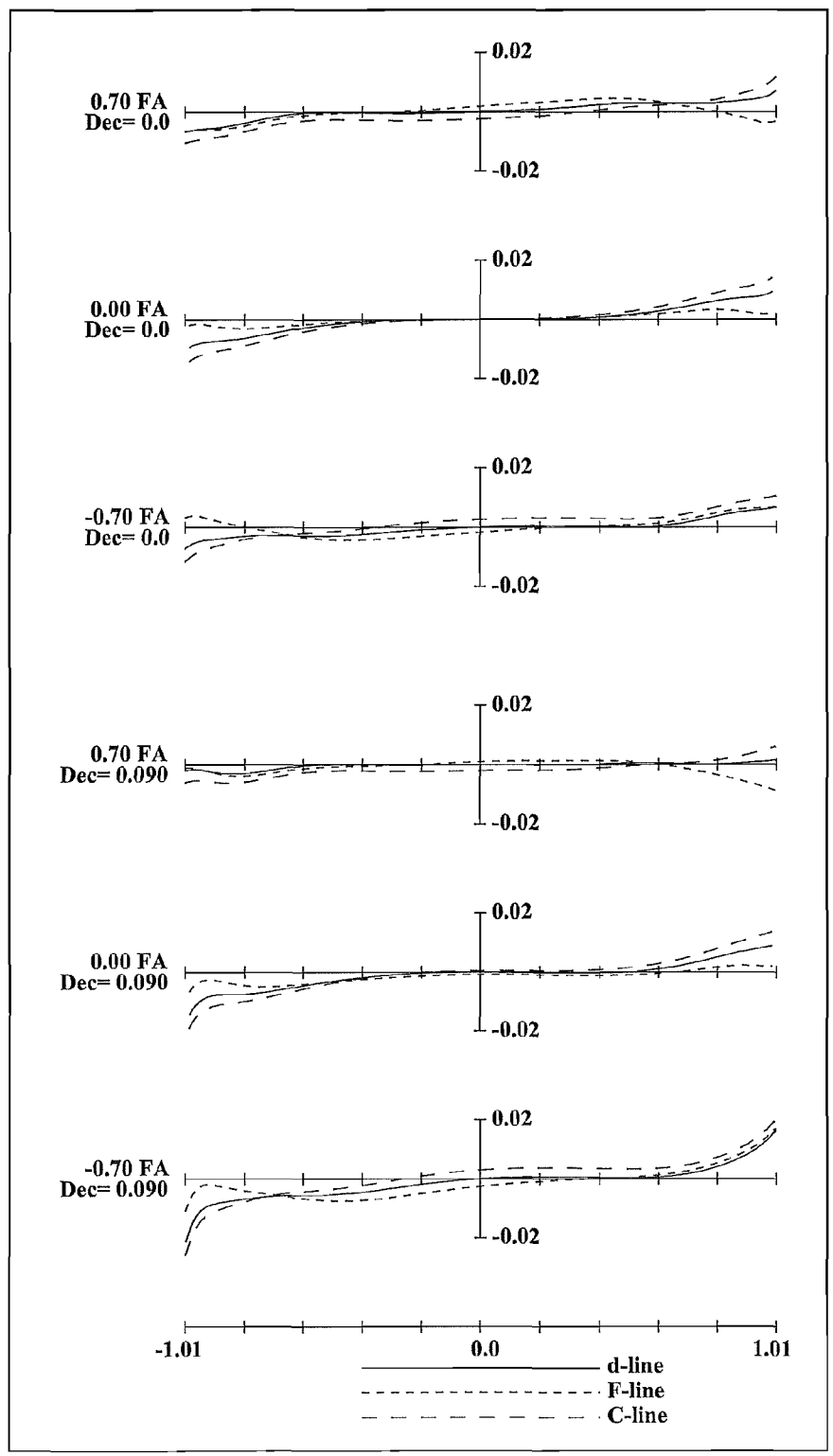
FIG. 34 is a lateral aberration diagram of a zoom lens system according to Example II-4 at a telephoto limit in a basic state where image blur compensation is not performed and in a blur compensation state.

As shown in FIG. 32, in the zoom lens system according to Embodiment II-4, the first lens unit G1, in order from the object side to the image side, comprises: a negative meniscus first lens element L1 with the convex surface facing the object side; and a bi-convex second lens element L2. The first lens element L1 and the second lens element L2 are cemented with each other. Further, the second lens element L2 has an aspheric image side surface.

Further, in the zoom lens system according to Embodiment II-4, the second lens unit G2, in order from the object side to the image side, comprises: a bi-concave third lens element L3; a bi-concave fourth lens element L4; and a planer-convex fifth lens element L5 with the convex surface facing the object side. Among these, the third lens element L3 has an aspheric image side surface.

Further, in the zoom lens system according to Embodiment II-4, the third lens unit G3, in order from the object side to the image side, comprises: a bi-convex sixth lens element L6; a positive meniscus seventh lens element L7 with the convex surface facing the object side; and a negative meniscus eighth lens element L8 with the convex surface facing the object side. Among these, the seventh lens element L7 and the eighth lens element L8 are cemented with each other. Further, the sixth lens element L6 has two aspheric surfaces.

Further, in the zoom lens system according to Embodiment II-4, the fourth lens unit G4 comprises solely a bi-convex ninth lens element L9. The ninth lens element L9 has two aspheric surfaces.

Here, in the zoom lens system according to Embodiment II-4, a plane parallel plate P is provided on the object side relative to the image surface S (that is, between the image surface S and the ninth lens element L9).

In the zoom lens system according to Embodiment II-4, in zooming from a wide-angle limit to a telephoto limit at the time of image taking, the first lens unit G1 and the third lens unit G3 move monotonically to the object side, the second lens unit G2 slightly moves monotonically to the object side, and the fourth lens unit G4 moves to the image side. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

Figure 35:
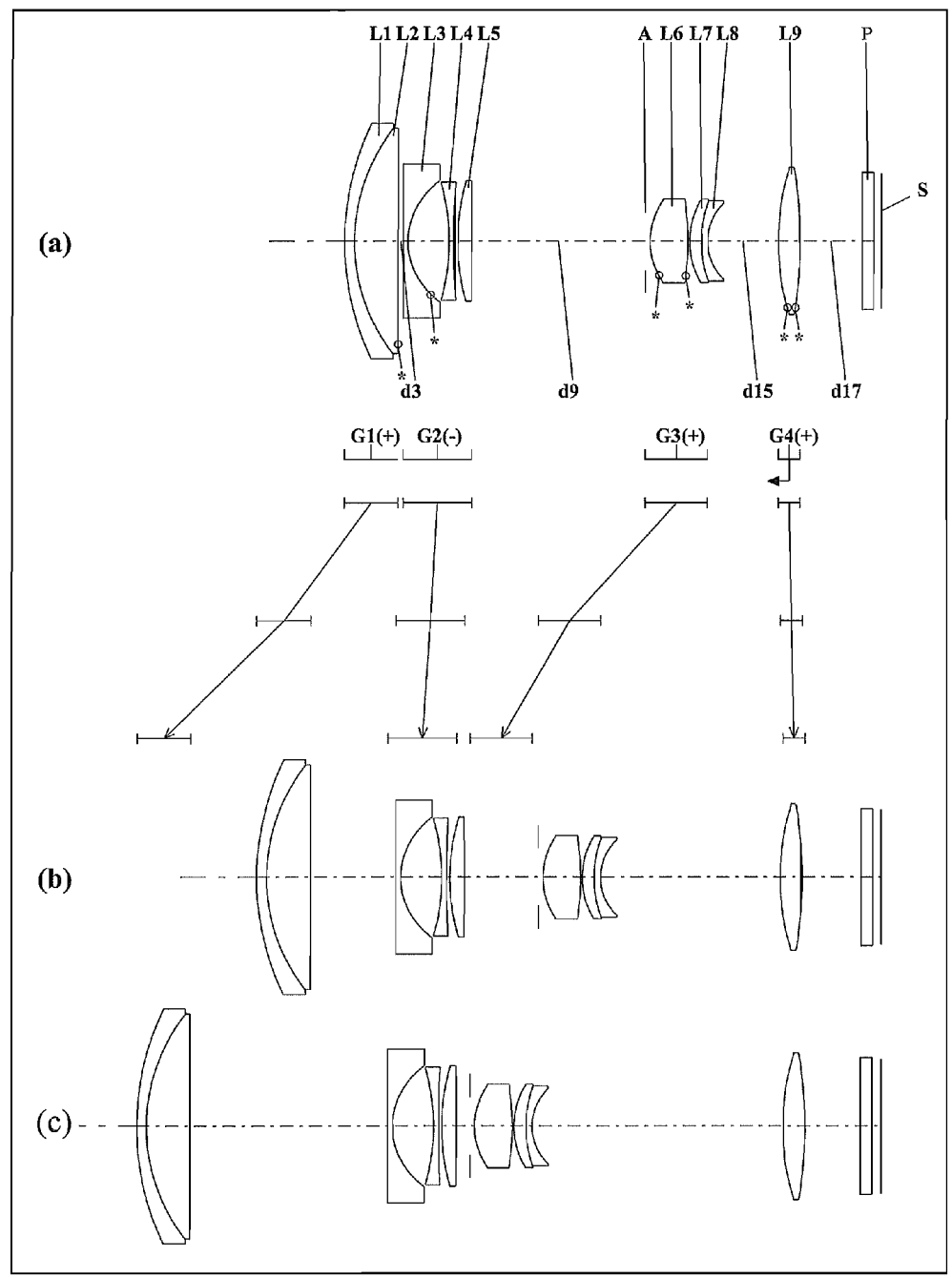
FIG. 35 is a lens arrangement diagram showing an infinity in-focus condition of a zoom lens system according to Embodiment II-5 (Example II-5)
Figure 36:
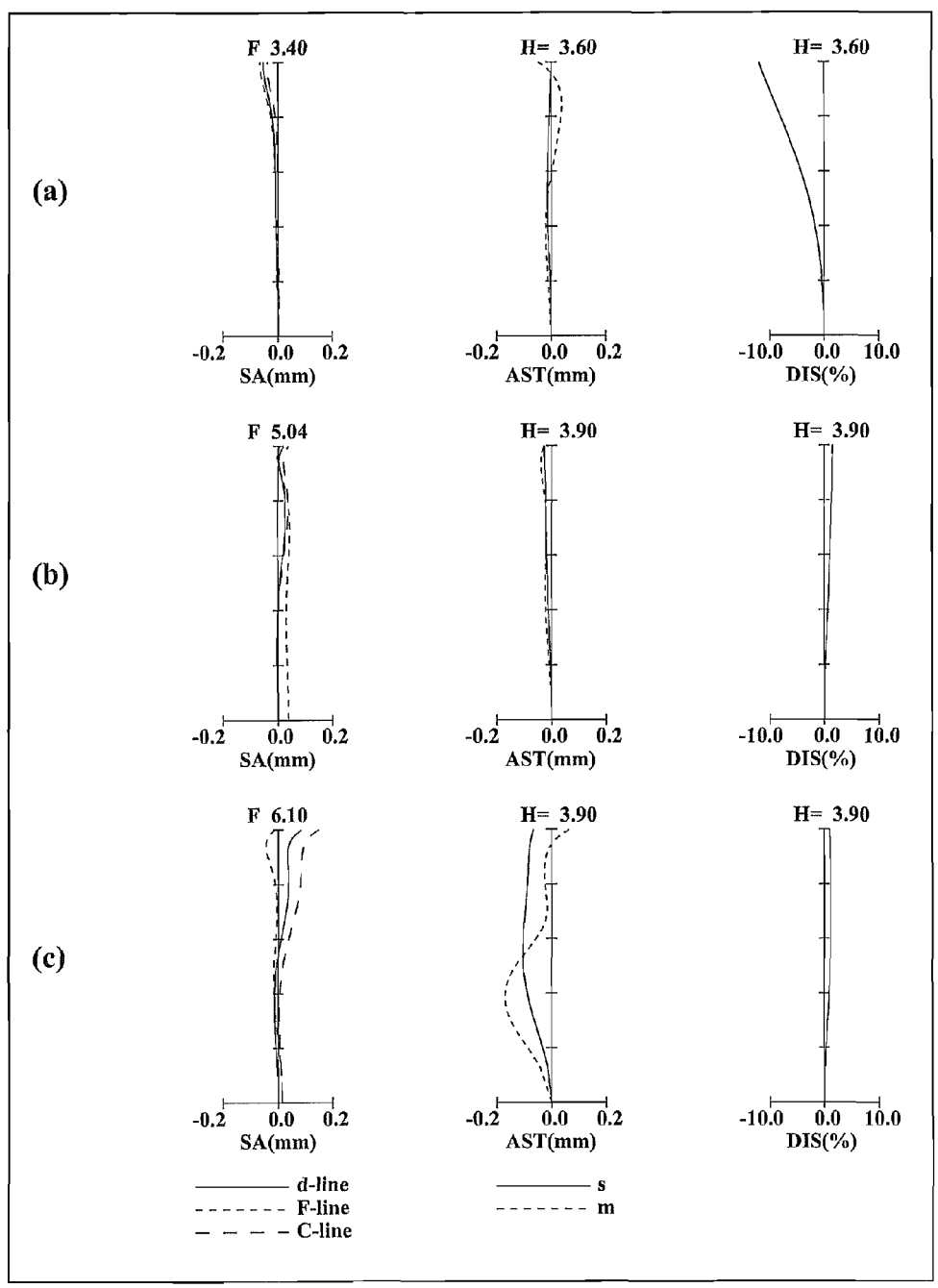
FIG. 36 is a longitudinal aberration diagram of an infinity in-focus condition of a zoom lens system according to Example II-5.
Figure 37:
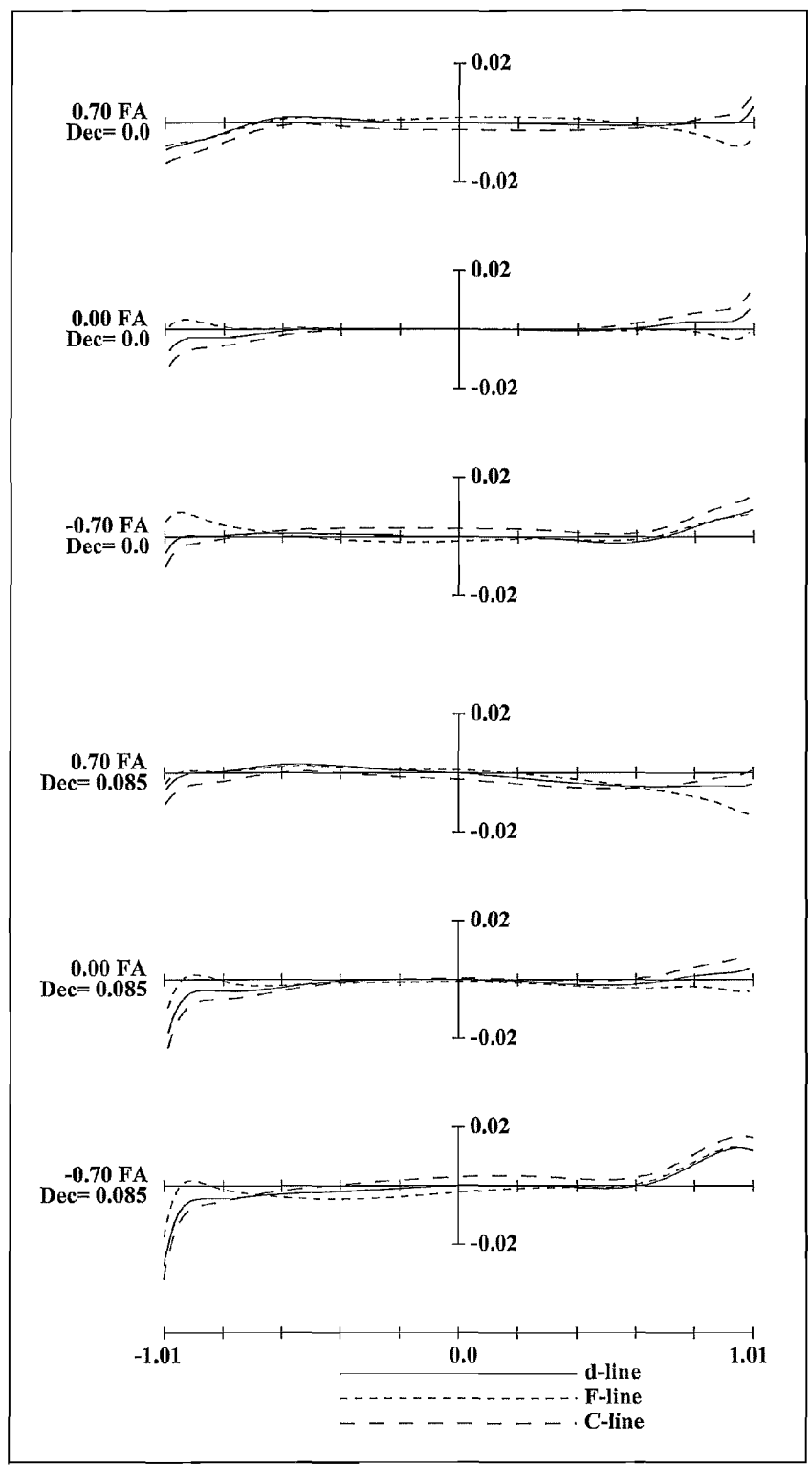
FIG. 37 is a lateral aberration diagram of a zoom lens system according to Example II-5 at a telephoto limit in a basic state where image blur compensation is not performed and in a blur compensation state.

As shown in FIG. 35, in the zoom lens system according to Embodiment II-5, the first lens unit G1, in order from the object side to the image side, comprises: a negative meniscus first lens element L1 with the convex surface facing the object side; and a bi-convex second lens element L2. The first lens element L1 and the second lens element L2 are cemented with each other. Further, the second lens element L2 has an aspheric image side surface.

Further, in the zoom lens system according to Embodiment II-5, the second lens unit G2, in order from the object side to the image side, comprises a bi-concave third lens element L3, a bi-concave fourth lens element L4, and a bi-convex fifth lens element L5. Among these, the third lens element L3 has an aspheric image side surface.

Further, in the zoom lens system according to Embodiment II-5, the third lens unit G3, in order from the object side to the image side, comprises: a bi-convex sixth lens element L6; a positive meniscus seventh lens element L7 with the convex surface facing the object side; and a negative meniscus eighth lens element L8 with the convex surface facing the object side. Among these, the seventh lens element L7 and the eighth lens element L8 are cemented with each other. Further, the sixth lens element L6 has two aspheric surfaces.

Further, in the zoom lens system according to Embodiment II-5, the fourth lens unit G4 comprises solely a bi-convex ninth lens element L9. The ninth lens element L9 has two aspheric surfaces.

Here, in the zoom lens system according to Embodiment II-5, a plane parallel plate P is provided on the object side relative to the image surface S (that is, between the image surface S and the ninth lens element L9).

In the zoom lens system according to Embodiment II-5, in zooming from a wide-angle limit to a telephoto limit at the time of image taking, the first lens unit G1 and the third lens unit G3 move almost monotonically to the object side, the second lens unit G2 slightly moves monotonically to the object side, and the fourth lens unit G4 slightly moves monotonically to the image side. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

Figure 38:
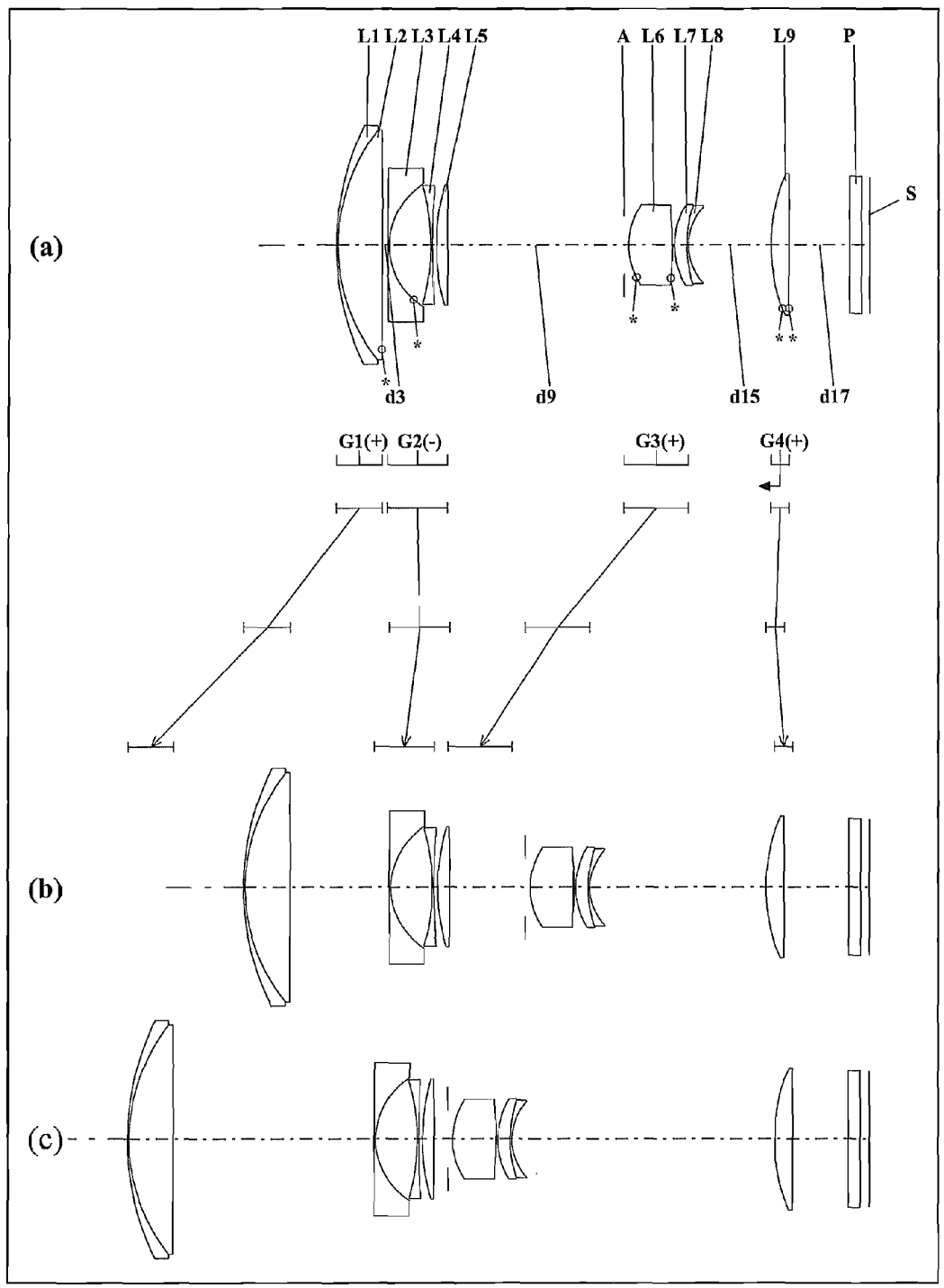
FIG. 38 is a lens arrangement diagram showing an infinity in-focus condition of a zoom lens system according to Embodiment II-6 (Example II-6)
Figure 39:
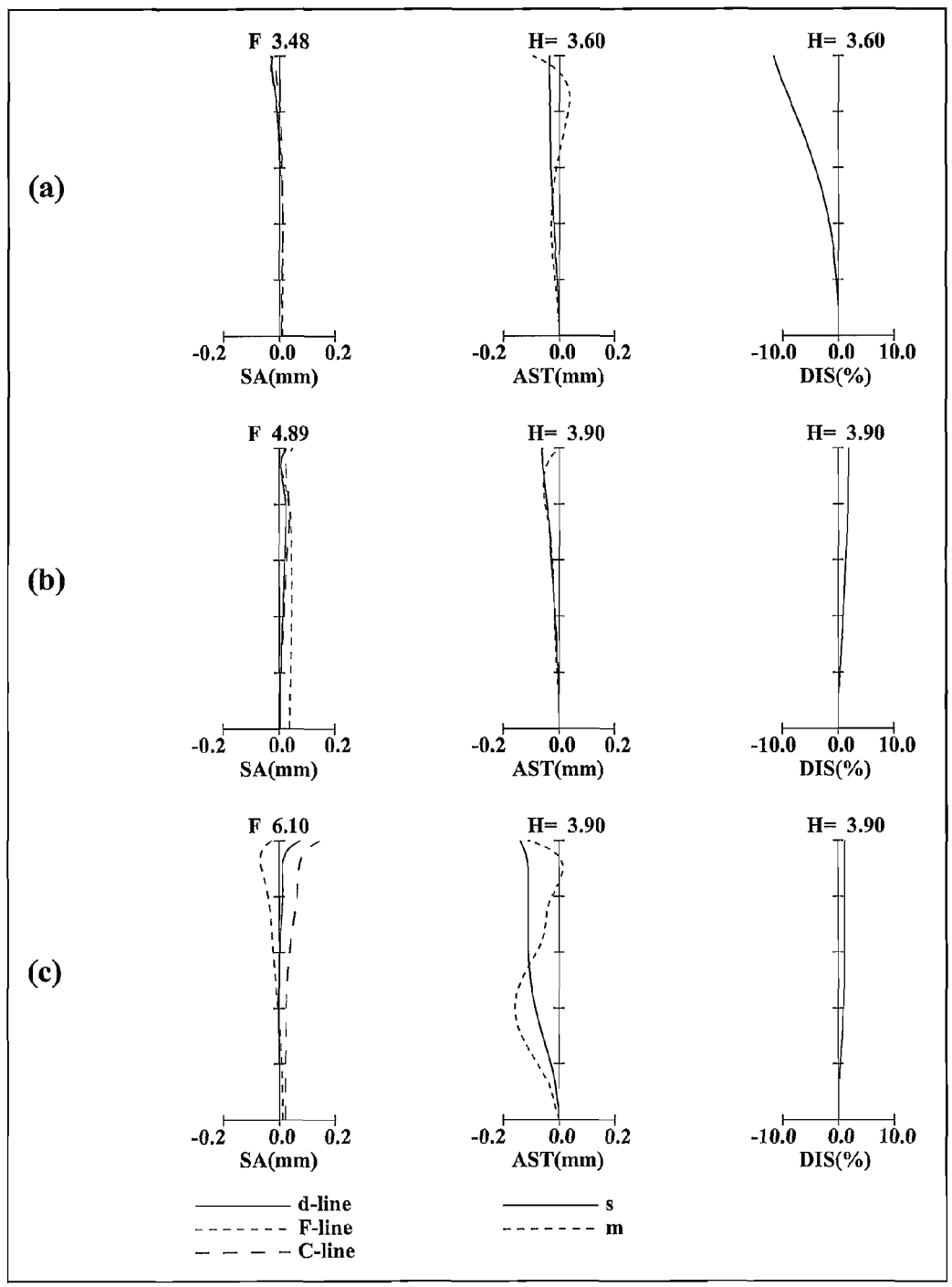
FIG. 39 is a longitudinal aberration diagram of an infinity in-focus condition of a zoom lens system according to Example II-6.
Figure 40:
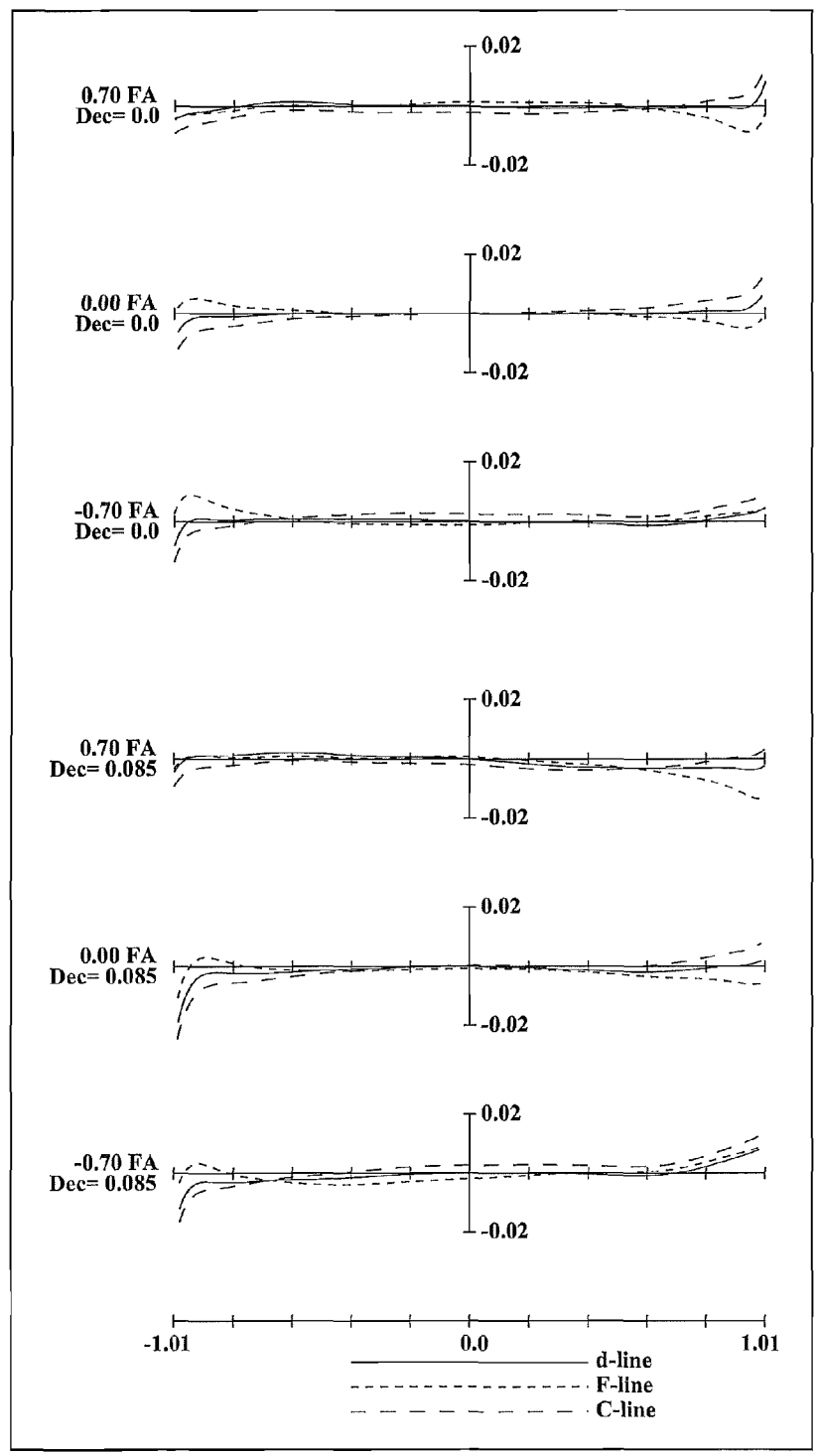
FIG. 40 is a lateral aberration diagram of a zoom lens system according to Example II-6 at a telephoto limit in a basic state where image blur compensation is not performed and in a blur compensation state.

As shown in FIG. 38, in the zoom lens system according to Embodiment II-6, the first lens unit G1, in order from the object side to the image side, comprises: a negative meniscus first lens element L1 with the convex surface facing the object side; and a bi-convex second lens element L2. The first lens element L1 and the second lens element L2 are cemented with each other. Further, the second lens element L2 has an aspheric image side surface.

In the zoom lens system according to Embodiment II-6, the second lens unit G2, in order from the object side to the image side, comprises: a negative meniscus third lens element L3 with the convex surface facing the object side; a bi-concave fourth lens element L4; and a bi-convex fifth lens element L5. Among these, the third lens element L3 has an aspheric image side surface.

Further, in the zoom lens system according to Embodiment II-6, the third lens unit G3, in order from the object side to the image side, comprises: a bi-convex sixth lens element L6; a positive meniscus seventh lens element L7 with the convex surface facing the object side; and a negative meniscus eighth lens element L8 with the convex surface facing the object side. Among these, the seventh lens element L7 and the eighth lens element L8 are cemented with each other. Further, the sixth lens element L6 has two aspheric surfaces.

Further, in the zoom lens system according to Embodiment II-6, the fourth lens unit G4 comprises solely a bi-convex ninth lens element L9. The ninth lens element L9 has two aspheric surfaces.

Here, in the zoom lens system according to Embodiment II-6, a plane parallel plate P is provided on the object side relative to the image surface S (that is, between the image surface S and the ninth lens element L9).

In the zoom lens system according to Embodiment II-6, in zooming from a wide-angle limit to a telephoto limit at the time of image taking, the first lens unit G1 and the third lens unit G3 move almost monotonically to the object side, the second lens unit G2 moves to the object side with locus of a slight convex to the image side, and the fourth lens unit G4 moves to the image side with locus of a convex to the object side. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

In the zoom lens system according to Embodiments II-1 to II-6, the first lens unit G1 is composed of two lens elements while the fourth lens unit G4 is composed of one lens element. Thus, the lens system has a remarkably short overall length of lens system.

In the zoom lens system according to Embodiments II-1 to II-6, the first lens unit G1, in order from the object side to the image side, comprises a first lens element L1 having negative optical power and a second lens element L2 having positive optical power. Further, these lens elements are cemented with each other so that a cemented lens element is formed. Thus, a more compact lens system is achieved. Furthermore, the image side surface of the second lens element L2 is aspheric. This permits satisfactory suppression of an increase in distortion and astigmatism caused by a wide angle construction and a high variable magnification construction.

In the zoom lens system according to Embodiments II-1 to II-6, the image side surface of the third lens element L3 having negative optical power and serving as the most object side lens element of the second lens unit G2 is aspheric. This permits satisfactory suppression of an increase in distortion and astigmatism caused by a wide angle construction and a high variable magnification construction.

In the zoom lens system according to Embodiments II-1 to II-6, the one lens element constituting the fourth lens unit G4 has positive optical power. Thus, at the time of focusing from an infinite-distance object to a short-distance object, as shown in each FIG., the fourth lens unit G4 is moved to the object side so that rapid focusing is achieved easily. Further, the one lens element constituting the fourth lens unit G4 has an aspheric surface. This permits satisfactory compensation of curvature of off-axial field over the range from a wide-angle limit to a telephoto limit.

Further, in the zoom lens system according to Embodiments II-1 to II-6, in zooming from a wide-angle limit to a telephoto limit at the time of image taking, the first lens unit G1, the second lens unit G2, the third lens unit G3 and the fourth lens unit G4 are moved individually along the optical axis so that zooming is achieved. Then, any lens unit among the first lens unit G1, the second lens unit G2, the third lens unit G3 and the fourth lens unit G4, or alternatively a sub lens unit consisting of a part of a lens unit is moved in a direction perpendicular to the optical axis so that image point movement caused by vibration of the entire system is compensated, that is, image blur caused by hand blurring, vibration and the like can be compensated optically.

When image point movement caused by vibration of the entire system is to be compensated, for example, the third lens unit G3 is moved in a direction perpendicular to the optical axis, so that image blur is compensated in a state that size increase in the entire zoom lens system is suppressed and a compact construction is realized and that excellent imaging characteristics such as small decentering coma aberration and decentering astigmatism are satisfied.

Here, in a case that a lens unit is composed of a plurality of lens elements, the above-mentioned sub lens unit consisting of a part of a lens unit indicates any one lens element or alternatively a plurality of adjacent lens elements among the plurality of lens elements.

Embodiments III-1 to III-6

FIGS. 42, 45, 48, 51, 54 and 57 are lens arrangement diagrams of zoom lens systems according to Embodiments III-1 to III-6, respectively.

Each of FIGS. 42, 45, 48, 51, 54 and 57 shows a zoom lens system in an infinity in-focus condition. In each FIG., part (a) shows a lens configuration at a wide-angle limit (in the minimum focal length condition: focal length $f_W$), part (b) shows a lens configuration at a middle position (in an intermediate focal length condition: focal length $f_M=\sqrt{(f_W*f_T)}$), and part (c) shows a lens configuration at a telephoto limit (in the maximum focal length condition: focal length $f_T$). Further, in each FIG., each bent arrow located between part (a) and part (b) indicates a line obtained by connecting the positions of each lens unit respectively at a wide-angle limit, a middle position and a telephoto limit. Thus, in the part between the wide-angle limit and the middle position and the part between the middle position and the telephoto limit, the positions are connected simply with a straight line, and hence this line does not indicate actual motion of each lens unit. Moreover, in each FIG., an arrow imparted to a lens unit indicates focusing from an infinity in-focus condition to a close-object in-focus condition. That is, the arrow indicates the moving direction at the time of focusing from an infinity in-focus condition to a close-object in-focus condition.

The zoom lens system according to each embodiment, in order from the object side to the image side, comprises a first lens unit G1 having positive optical power, a second lens unit G2 having negative optical power, a third lens unit G3 having positive optical power, and a fourth lens unit G4 having positive optical power. Then, in zooming, the individual lens units move in a direction along the optical axis such that intervals between the lens units, that is, the interval between the first lens unit G1 and the second lens unit G2, the interval between the second lens unit G2 and the third lens unit G3, and the interval between the third lens unit G3 and the fourth lens unit G4 should all vary. In the zoom lens system according to each embodiment, since these lens units are arranged in the desired optical power configuration, high optical performance is obtained and still size reduction is achieved in the entire lens system.

Further, in FIGS. 42, 45, 48, 51, 54 and 57, an asterisk "*" imparted to a particular surface indicates that the surface is aspheric. In each FIG., symbol (+) or (−) imparted to the symbol of each lens unit corresponds to the sign of the optical power of the lens unit. In each FIG., the straight line located on the most right-hand side indicates the position of the image surface S. On the object side relative to the image surface S (that is, between the image surface S and the most image side lens surface of the fourth lens unit G4), a plane parallel plate P such as an optical low-pass filter and a face plate of an image sensor is provided.

Further, in FIGS. 42, 45, 48, 51, 54 and 57, an aperture diaphragm A is provided between the second lens unit G2 and the third lens unit G3. In zooming from a wide-angle limit to a telephoto limit at the time of image taking, the aperture diaphragm A moves along the optical axis independently of the individual lens units in Embodiment III-1 shown in FIG. 42. In contrast, in Embodiments III-2 to III-6 shown in FIGS. 45, 48, 51, 54 and 57, the aperture diaphragm A moves along the optical axis integrally with the third lens unit G3.

Figure 42:
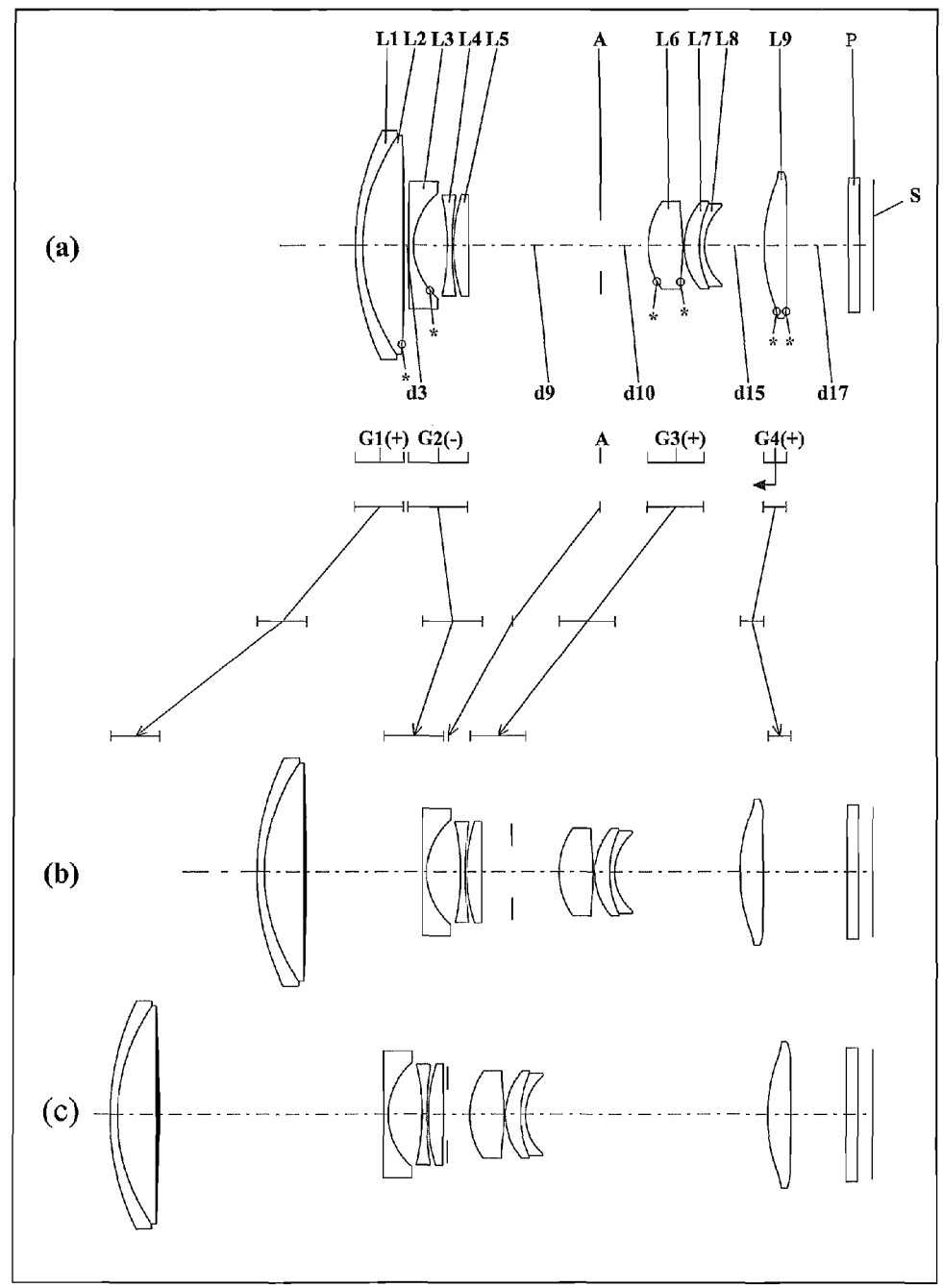
FIG. 42 is a lens arrangement diagram showing an infinity in-focus condition of a zoom lens system according to Embodiment III-1 (Example III-1)
Figure 43:
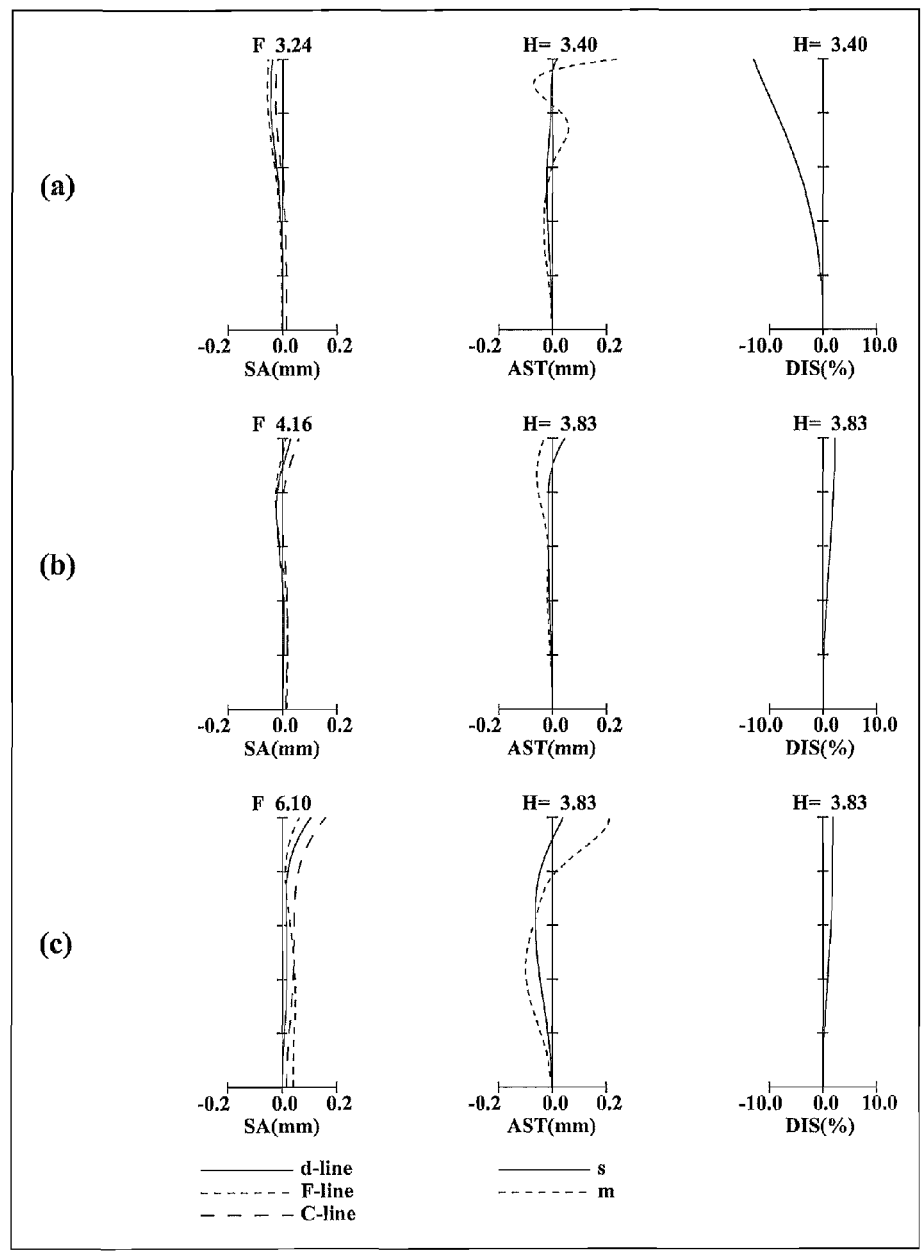
FIG. 43 is a longitudinal aberration diagram of an infinity in-focus condition of a zoom lens system according to Example III-1.
Figure 44:
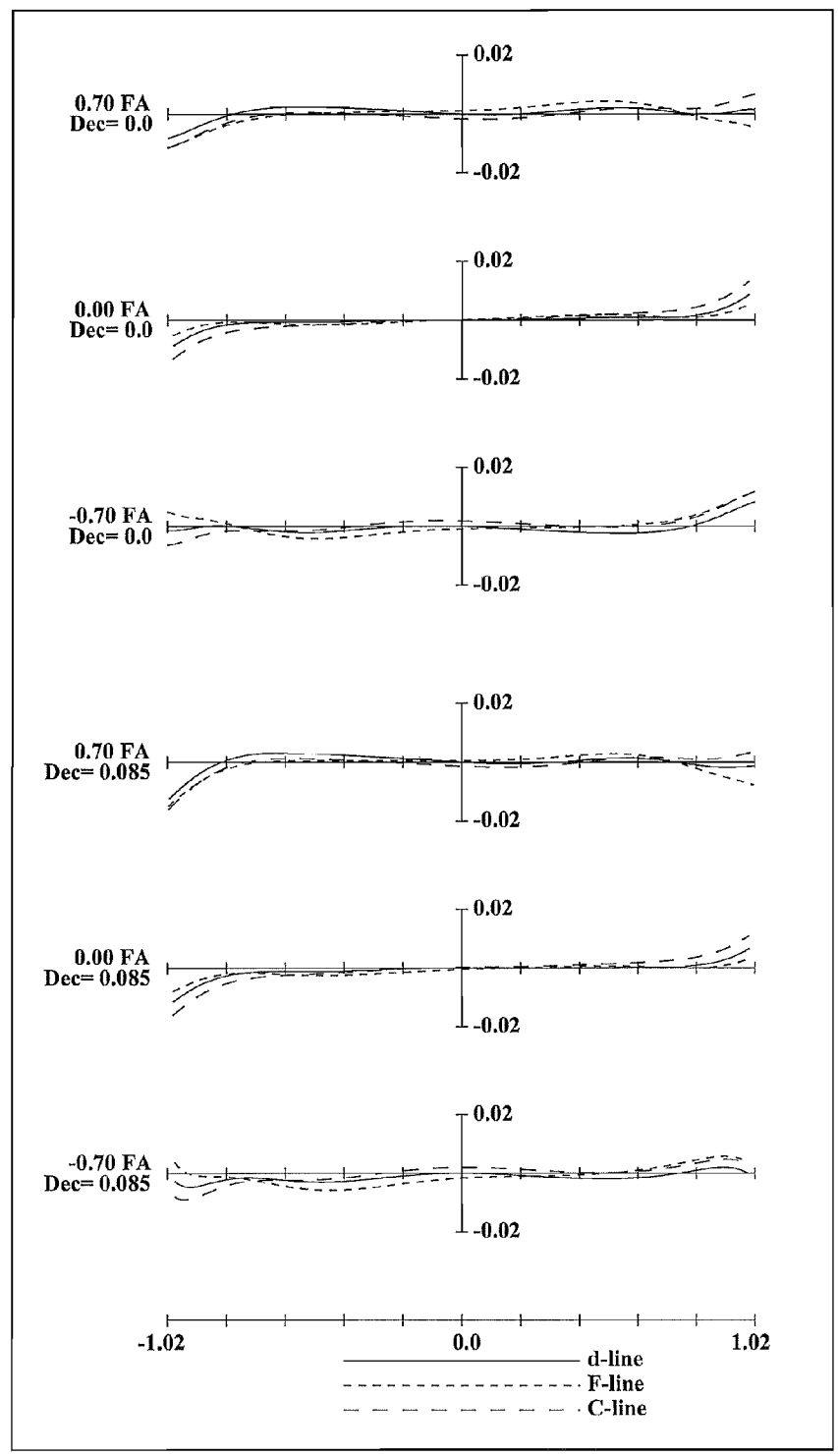
FIG. 44 is a lateral aberration diagram of a zoom lens system according to Example III-1 at a telephoto limit in a basic state where image blur compensation is not performed and in a blur compensation state.

As shown in FIG. 42, in the zoom lens system according to Embodiment III-1, the first lens unit G1, in order from the object side to the image side, comprises: a negative meniscus first lens element L1 with the convex surface facing the object side; and a bi-convex second lens element L2. The first lens element L1 and the second lens element L2 are cemented with each other. Further, the second lens element L2 has an aspheric image side surface.

In the zoom lens system according to Embodiment III-1, the second lens unit G2, in order from the object side to the image side, comprises: a negative meniscus third lens element L3 with the convex surface facing the object side; a bi-concave fourth lens element L4; and a bi-convex fifth lens element L5. Among these, the third lens element L3 has an aspheric image side surface.

Further, in the zoom lens system according to Embodiment III-1, the third lens unit G3, in order from the object side to the image side, comprises: a bi-convex sixth lens element L6; a positive meniscus seventh lens element L7 with the convex surface facing the object side; and a negative meniscus eighth lens element L8 with the convex surface facing the object side. Among these, the seventh lens element L7 and the eighth lens element L8 are cemented with each other. Further, the sixth lens element L6 has two aspheric surfaces.

Further, in the zoom lens system according to Embodiment III-1, the fourth lens unit G4 comprises solely a bi-convex ninth lens element L9. The ninth lens element L9 has two aspheric surfaces.

Here, in the zoom lens system according to Embodiment III-1, a plane parallel plate P is provided on the object side relative to the image surface S (that is, between the image surface S and the ninth lens element L9).

In the zoom lens system according to Embodiment III-1, in zooming from a wide-angle limit to a telephoto limit at the time of image taking, the first lens unit G1 and the third lens unit G3 move monotonically to the object side, the second lens unit G2 moves to the object side with locus of a slight convex to the image side, and the fourth lens unit G4 moves to the image side with locus of a slight convex to the object side. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

Further, in the zoom lens system according to Embodiment III-1, in zooming from a wide-angle limit to a telephoto limit at the time of image taking, the aperture diaphragm A provided between the second lens unit G2 and the third lens unit G3 moves monotonically to the object side. That is, in zooming, the interval between the second lens unit G2 and the aperture diaphragm A decreases.

Figure 45:
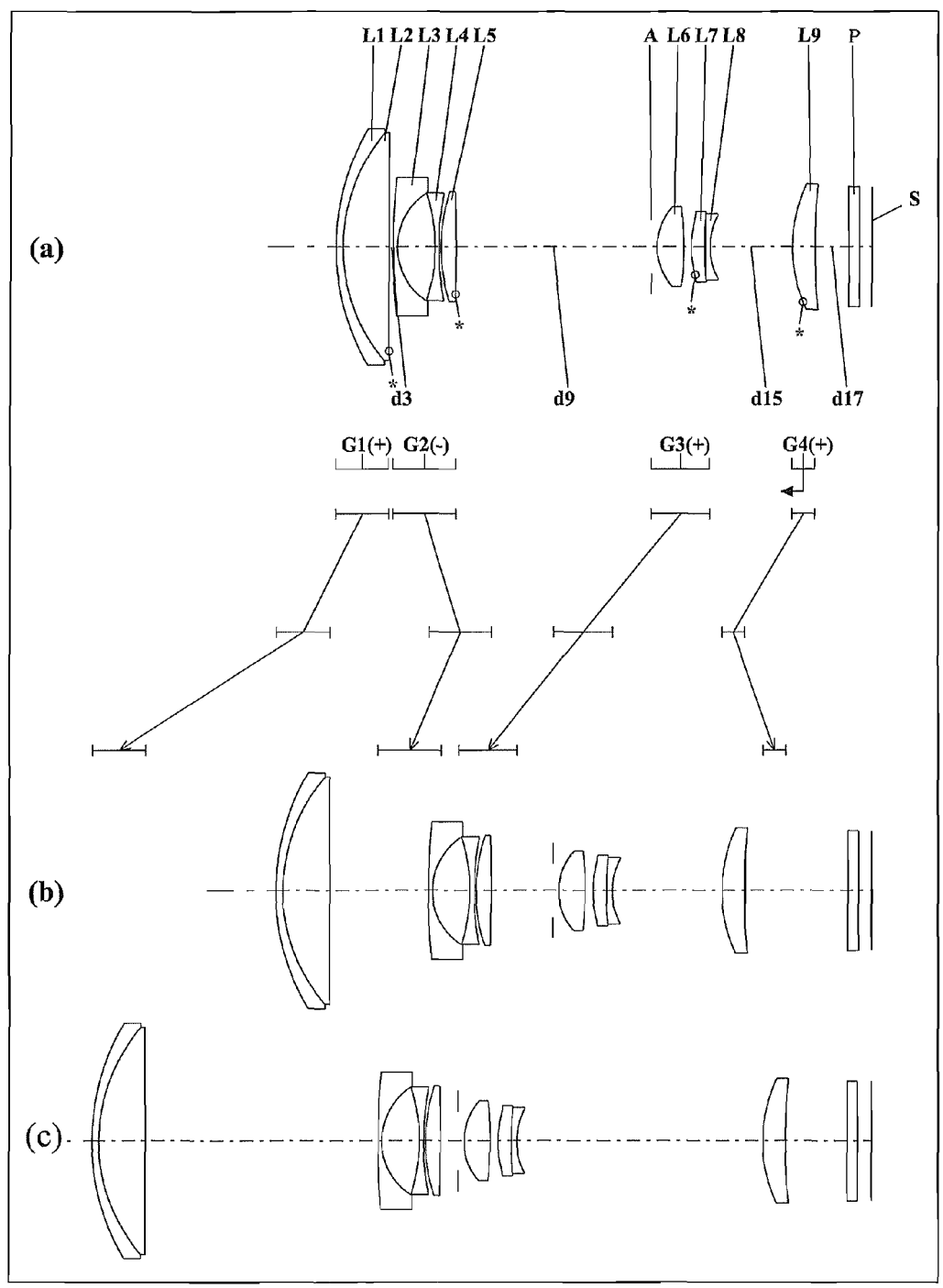
FIG. 45 is a lens arrangement diagram showing an infinity in-focus condition of a zoom lens system according to Embodiment III-2 (Example III-2)
Figure 46:
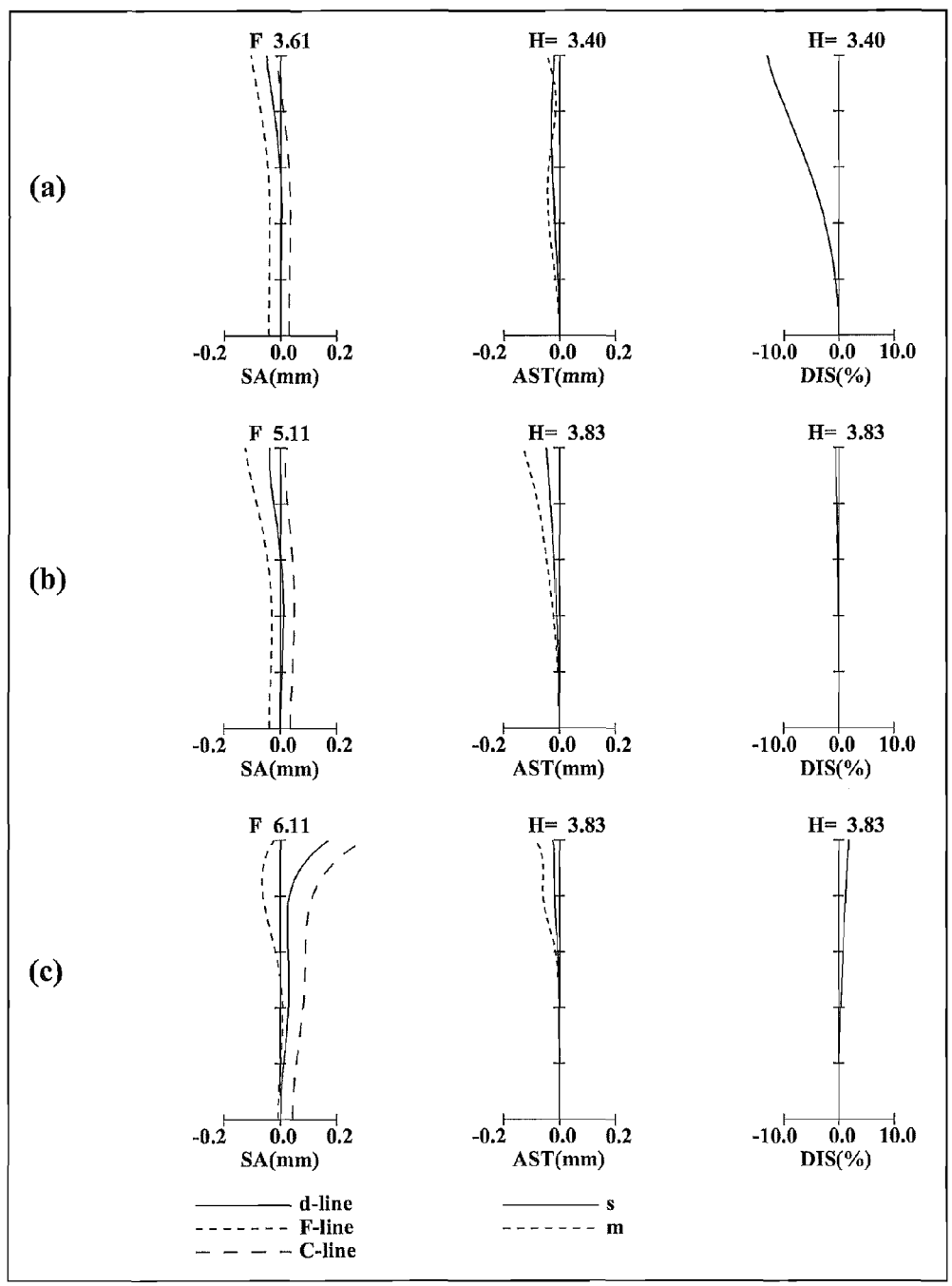
FIG. 46 is a longitudinal aberration diagram of an infinity in-focus condition of a zoom lens system according to Example III-2.
Figure 47:
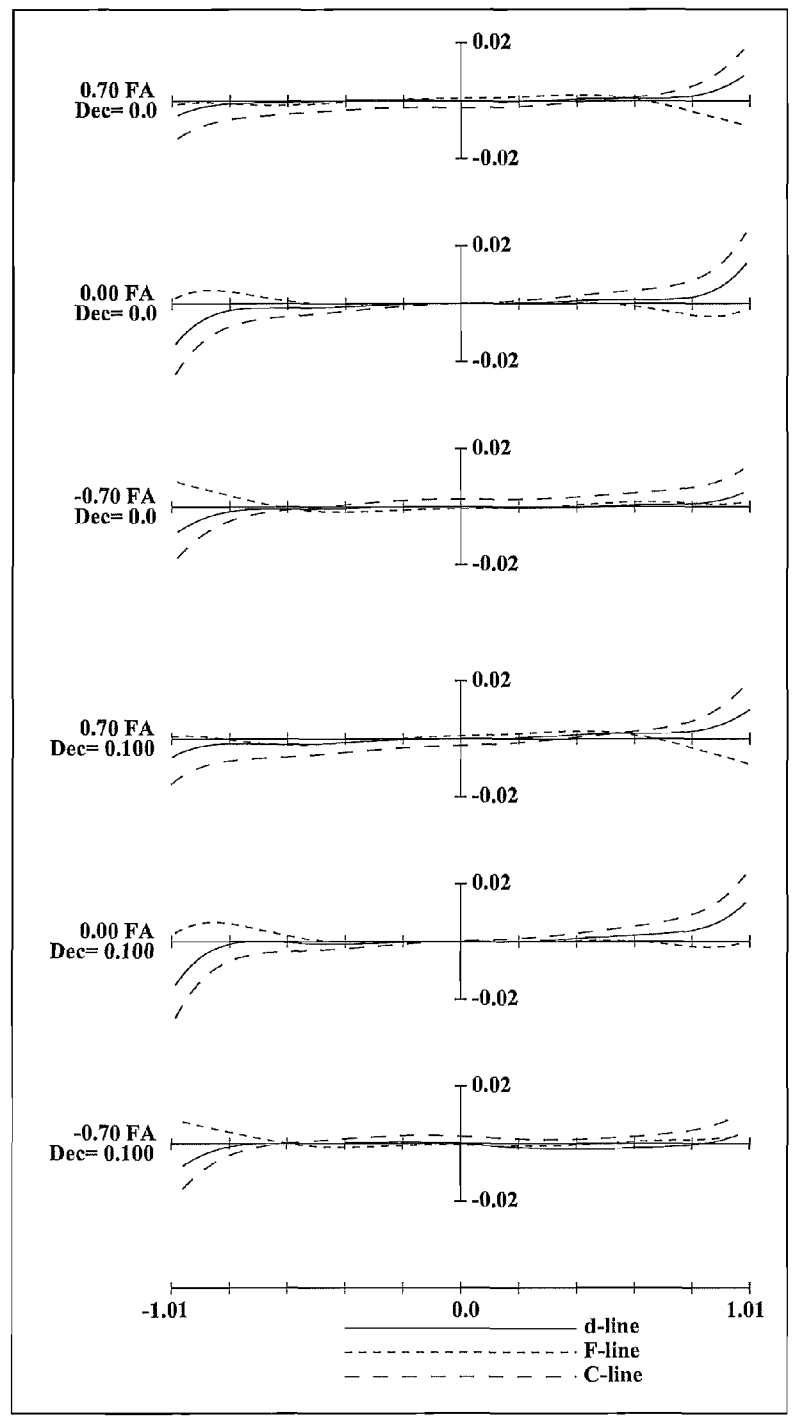
FIG. 47 is a lateral aberration diagram of a zoom lens system according to Example III-2 at a telephoto limit in a basic state where image blur compensation is not performed and in a blur compensation state.

As shown in FIG. 45, in the zoom lens system according to Embodiment III-2, the first lens unit G1, in order from the object side to the image side, comprises: a negative meniscus first lens element L1 with the convex surface facing the object side; and a bi-convex second lens element L2. The first lens element L1 and the second lens element L2 are cemented with each other. Further, the second lens element L2 has an aspheric image side surface.

In the zoom lens system according to Embodiment III-2, the second lens unit G2, in order from the object side to the image side, comprises: a negative meniscus third lens element L3 with the convex surface facing the object side; a bi-concave fourth lens element L4; and a bi-convex fifth lens element L5. Among these, the fifth lens element L5 has an aspheric image side surface.

Further, in the zoom lens system according to Embodiment III-2, the third lens unit G3, in order from the object side to the image side, comprises: a bi-convex sixth lens element L6; a positive meniscus seventh lens element L7 with the convex surface facing the object side; and a negative meniscus eighth lens element L8 with the convex surface facing the object side. Among these, the seventh lens element L7 and the eighth lens element L8 are cemented with each other. Further, the seventh lens element L7 has an aspheric object side surface.

Further, in the zoom lens system according to Embodiment III-2, the fourth lens unit G4 comprises solely a positive meniscus ninth lens element L9 with the convex surface facing the object side. The ninth lens element L9 has an aspheric object side surface.

Here, in the zoom lens system according to Embodiment III-2, a plane parallel plate P is provided on the object side relative to the image surface S (that is, between the image surface S and the ninth lens element L9).

In the zoom lens system according to Embodiment III-2, in zooming from a wide-angle limit to a telephoto limit at the time of image taking, the first lens unit G1 moves to the object side, the second lens unit G2 moves to the object side with locus of a convex to the image side, the third lens unit G3 moves monotonically to the object side, and the fourth lens unit G4 moves with locus of a convex to the object side such that the position at a telephoto limit is located on the object side relative to the position at a wide-angle limit. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

Figure 48:
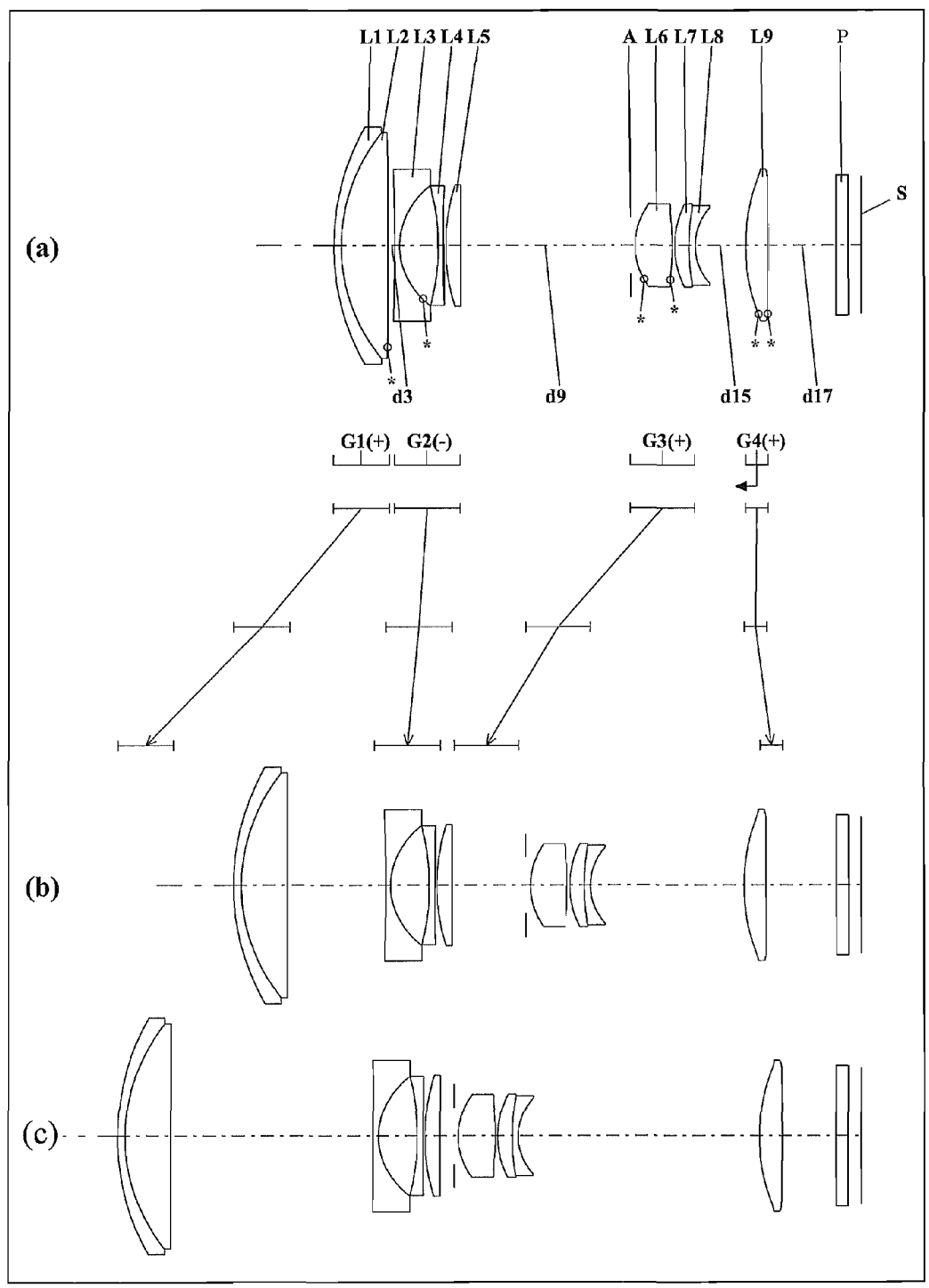
FIG. 48 is a lens arrangement diagram showing an infinity in-focus condition of a zoom lens system according to Embodiment III-3 (Example III-3)
Figure 49:
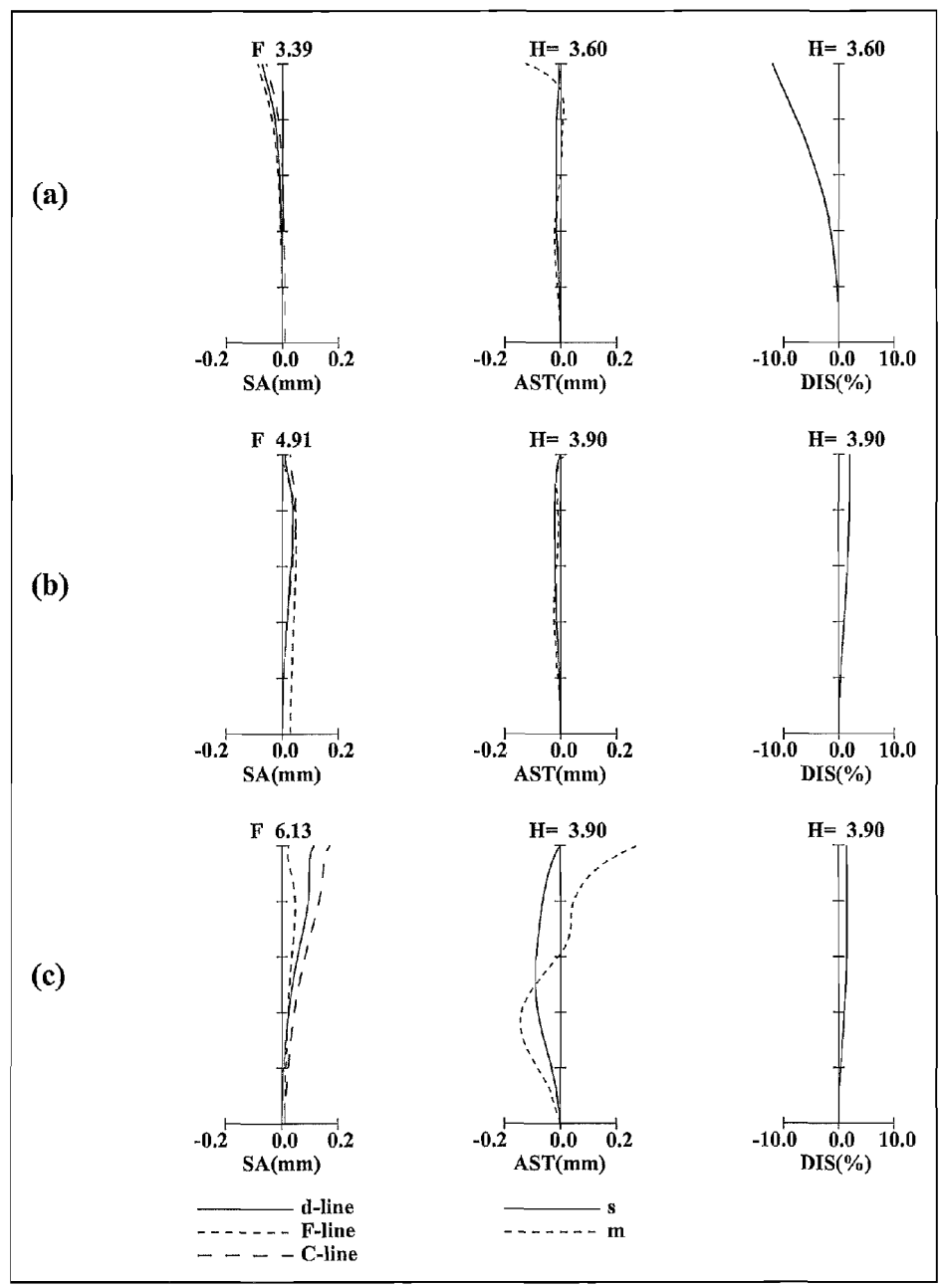
FIG. 49 is a longitudinal aberration diagram of an infinity in-focus condition of a zoom lens system according to Example III-3.
Figure 50:
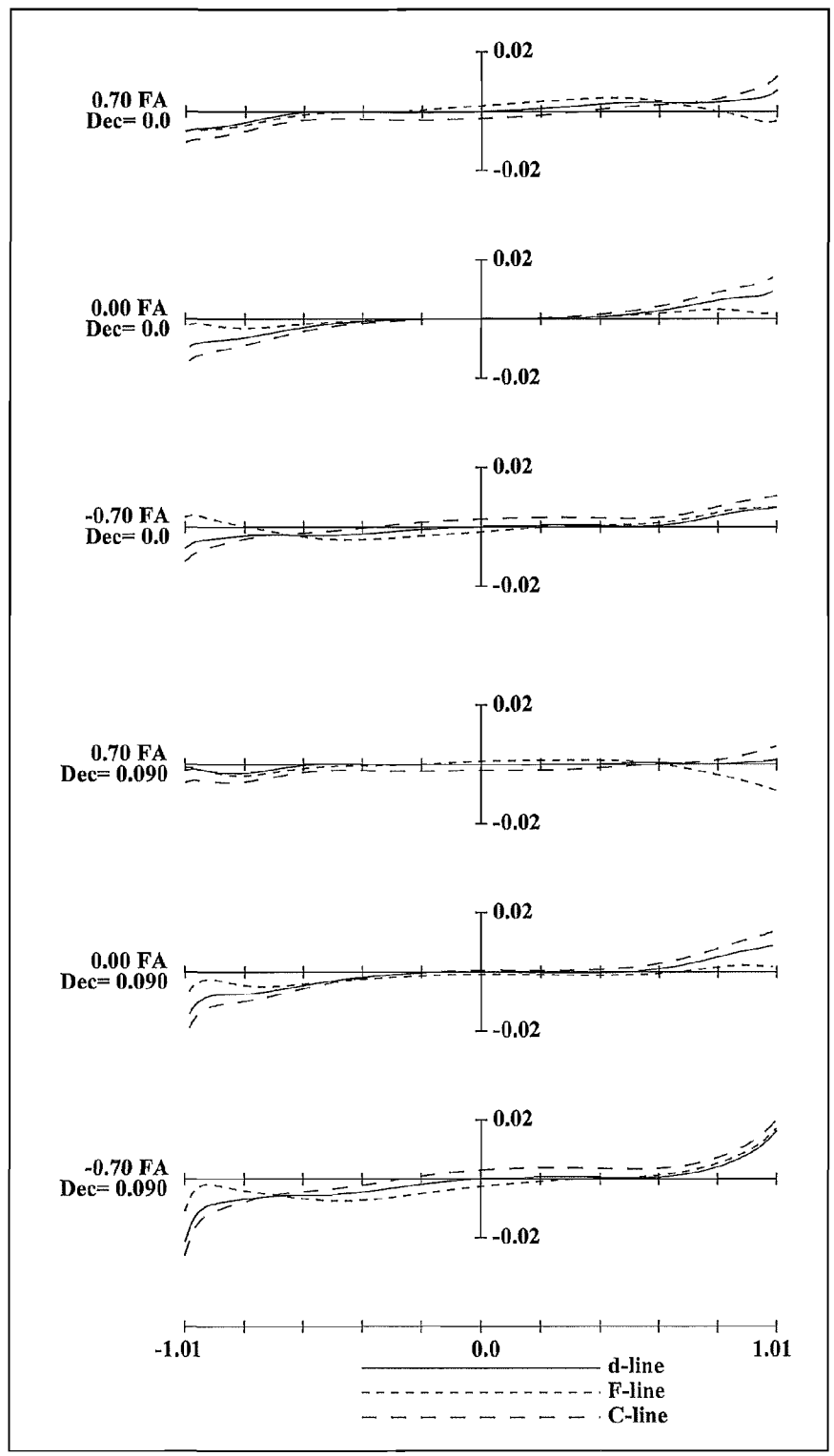
FIG. 50 is a lateral aberration diagram of a zoom lens system according to Example III-3 at a telephoto limit in a basic state where image blur compensation is not performed and in a blur compensation state.

As shown in FIG. 48, in the zoom lens system according to Embodiment III-3, the first lens unit G1, in order from the object side to the image side, comprises: a negative meniscus first lens element L1 with the convex surface facing the object side; and a bi-convex second lens element L2. The first lens element L1 and the second lens element L2 are cemented with each other. Further, the second lens element L2 has an aspheric image side surface.

Further, in the zoom lens system according to Embodiment III-3, the second lens unit G2, in order from the object side to the image side, comprises: a bi-concave third lens element L3; a bi-concave fourth lens element L4; and a planer-convex fifth lens element L5 with the convex surface facing the object side. Among these, the third lens element L3 has an aspheric image side surface.

Further, in the zoom lens system according to Embodiment III-3, the third lens unit G3, in order from the object side to the image side, comprises: a bi-convex sixth lens element L6; a positive meniscus seventh lens element L7 with the convex surface facing the object side; and a negative meniscus eighth lens element L8 with the convex surface facing the object side. Among these, the seventh lens element L7 and the eighth lens element L8 are cemented with each other. Further, the sixth lens element L6 has two aspheric surfaces.

Further, in the zoom lens system according to Embodiment III-3, the fourth lens unit G4 comprises solely a bi-convex ninth lens element L9. The ninth lens element L9 has two aspheric surfaces.

Here, in the zoom lens system according to Embodiment III-3, a plane parallel plate P is provided on the object side relative to the image surface S (that is, between the image surface S and the ninth lens element L9).

In the zoom lens system according to Embodiment III-3, in zooming from a wide-angle limit to a telephoto limit at the time of image taking, the first lens unit G1 and the third lens unit G3 move monotonically to the object side, the second lens unit G2 slightly moves monotonically to the object side, and the fourth lens unit G4 moves to the image side. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

Figure 51:
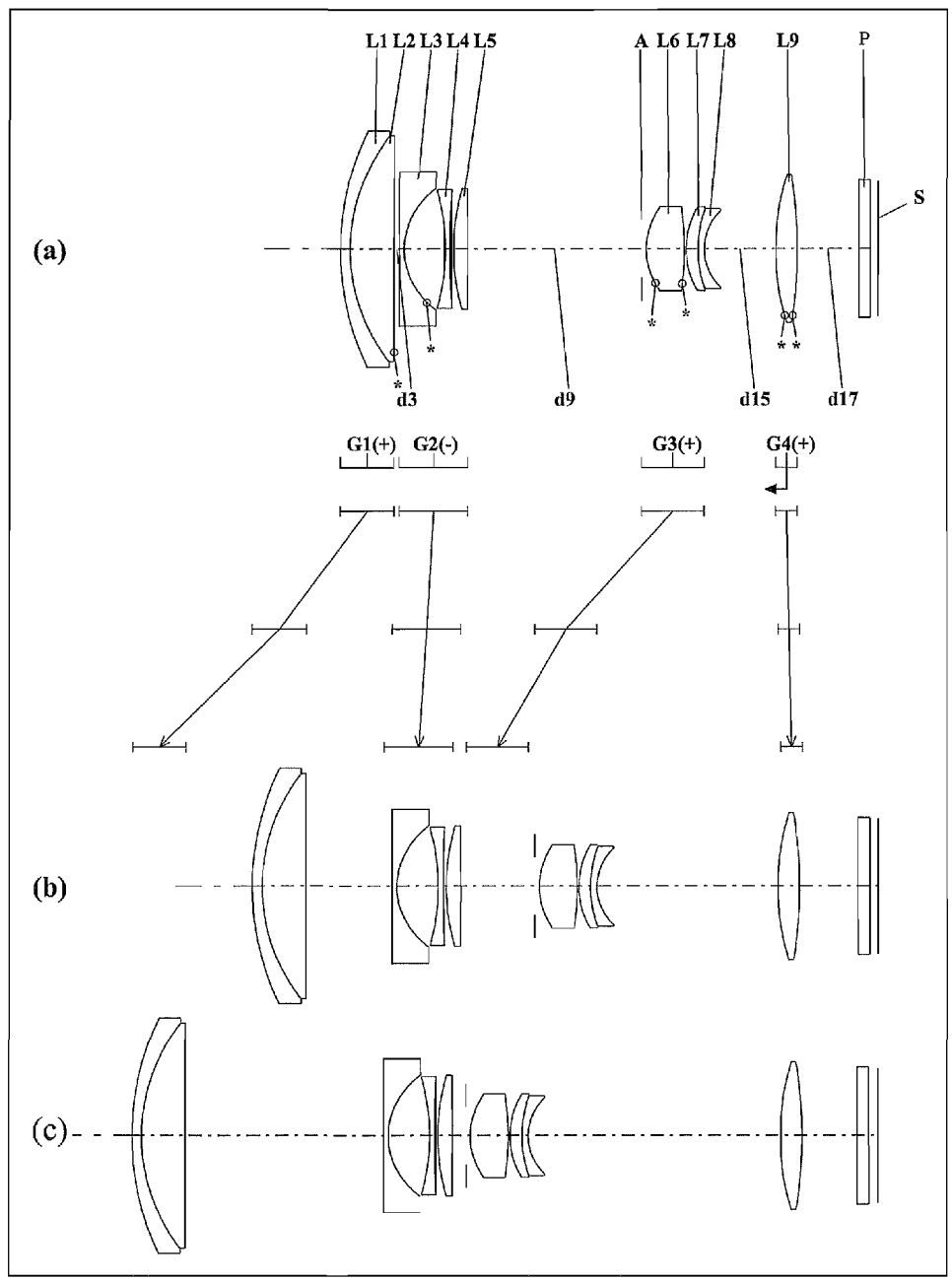
FIG. 51 is a lens arrangement diagram showing an infinity in-focus condition of a zoom lens system according to Embodiment III-4 (Example III-4)
Figure 52:
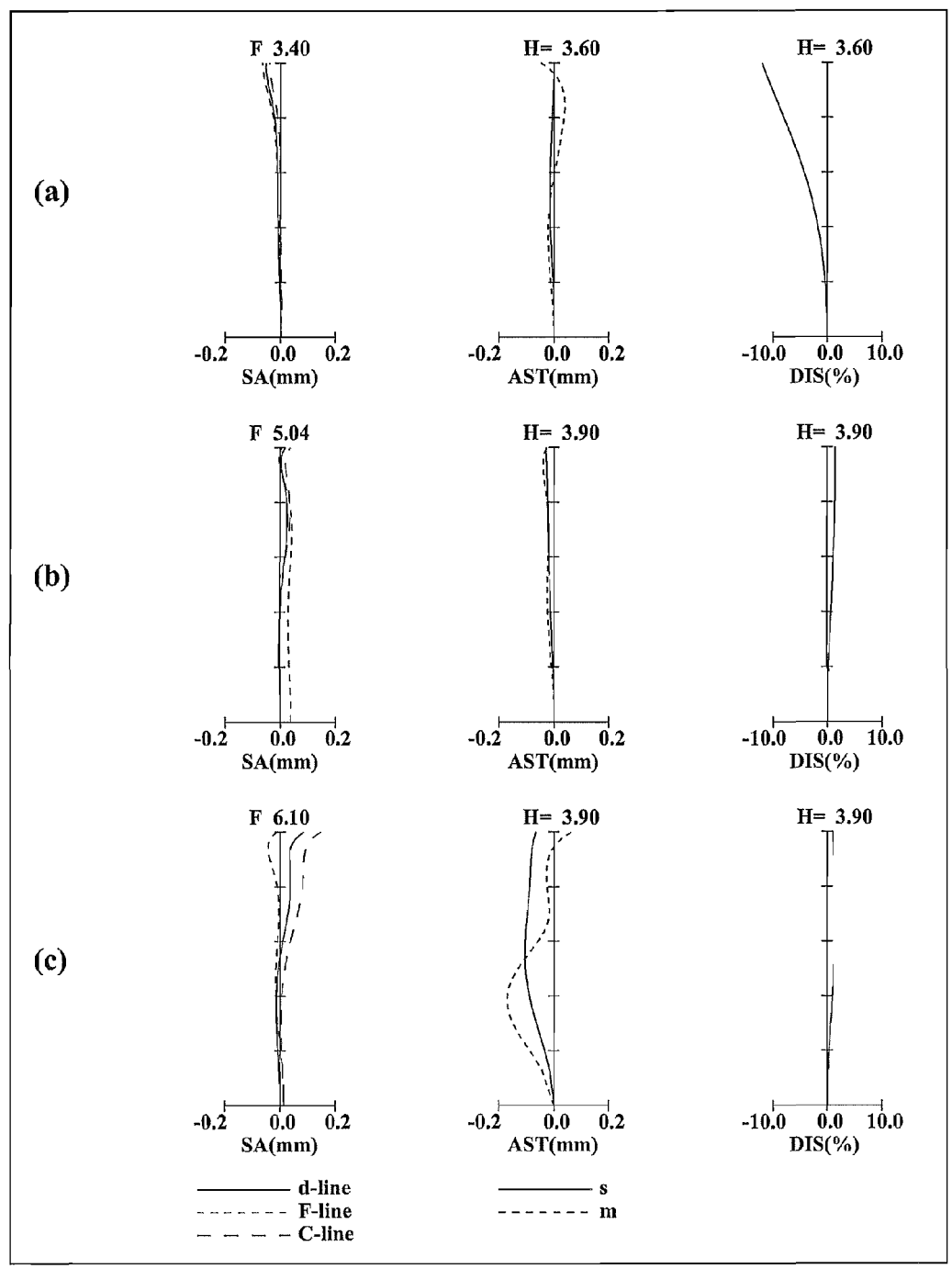
FIG. 52 is a longitudinal aberration diagram of an infinity in-focus condition of a zoom lens system according to Example III-4.
Figure 53:
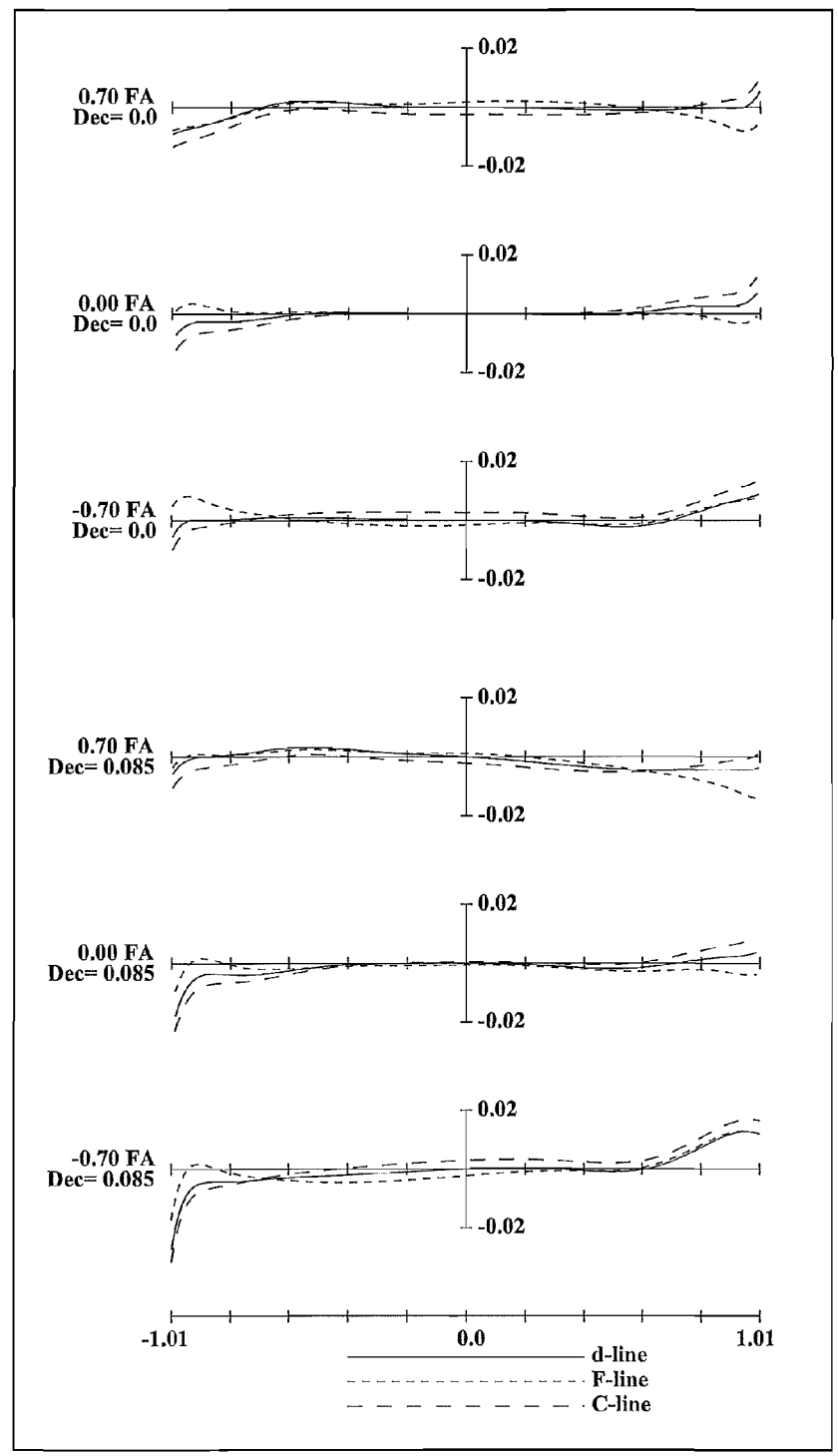
FIG. 53 is a lateral aberration diagram of a zoom lens system according to Example III-4 at a telephoto limit in a basic state where image blur compensation is not performed and in a blur compensation state.

As shown in FIG. 51, in the zoom lens system according to Embodiment III-4, the first lens unit G1, in order from the object side to the image side, comprises: a negative meniscus first lens element L1 with the convex surface facing the object side; and a bi-convex second lens element L2. The first lens element L1 and the second lens element L2 are cemented with each other. Further, the second lens element L2 has an aspheric image side surface.

Further, in the zoom lens system according to Embodiment III-4, the second lens unit G2, in order from the object side to the image side, comprises a bi-concave third lens element L3, a bi-concave fourth lens element L4, and a bi-convex fifth lens element L5. Among these, the third lens element L3 has an aspheric image side surface.

Further, in the zoom lens system according to Embodiment III-4, the third lens unit G3, in order from the object side to the image side, comprises: a bi-convex sixth lens element L6; a positive meniscus seventh lens element L7 with the convex surface facing the object side; and a negative meniscus eighth lens element L8 with the convex surface facing the object side. Among these, the seventh lens element L7 and the eighth lens element L8 are cemented with each other. Further, the sixth lens element L6 has two aspheric surfaces.

Further, in the zoom lens system according to Embodiment III-4, the fourth lens unit G4 comprises solely a bi-convex ninth lens element L9. The ninth lens element L9 has two aspheric surfaces.

Here, in the zoom lens system according to Embodiment III-4, a plane parallel plate P is provided on the object side relative to the image surface S (that is, between the image surface S and the ninth lens element L9).

In the zoom lens system according to Embodiment III-4, in zooming from a wide-angle limit to a telephoto limit at the time of image taking, the first lens unit G1 and the third lens unit G3 move almost monotonically to the object side, the second lens unit G2 slightly moves monotonically to the object side, and the fourth lens unit G4 slightly moves monotonically to the image side. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

Figure 54:
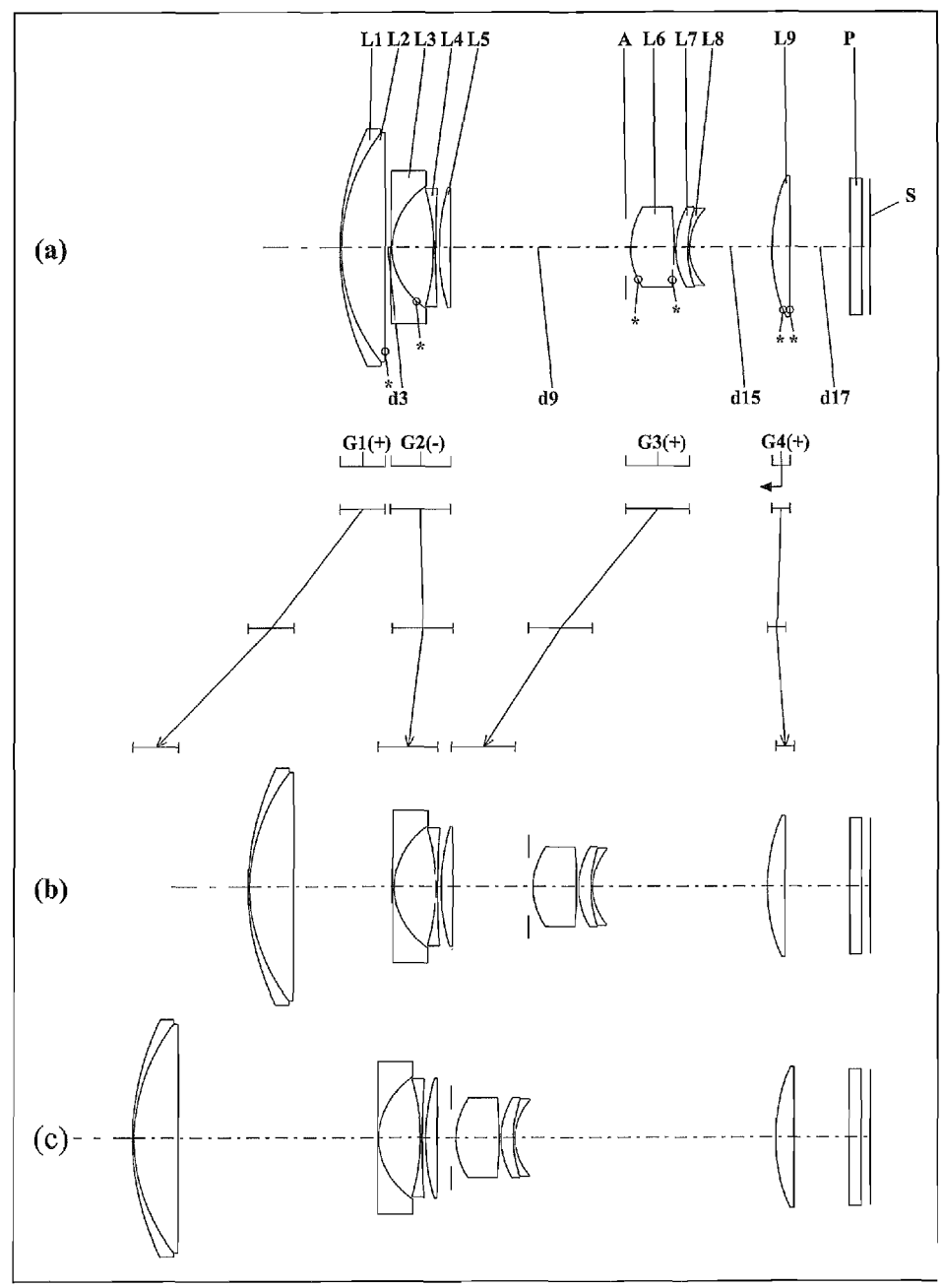
FIG. 54 is a lens arrangement diagram showing an infinity in-focus condition of a zoom lens system according to Embodiment III-5 (Example III-5)
Figure 55:
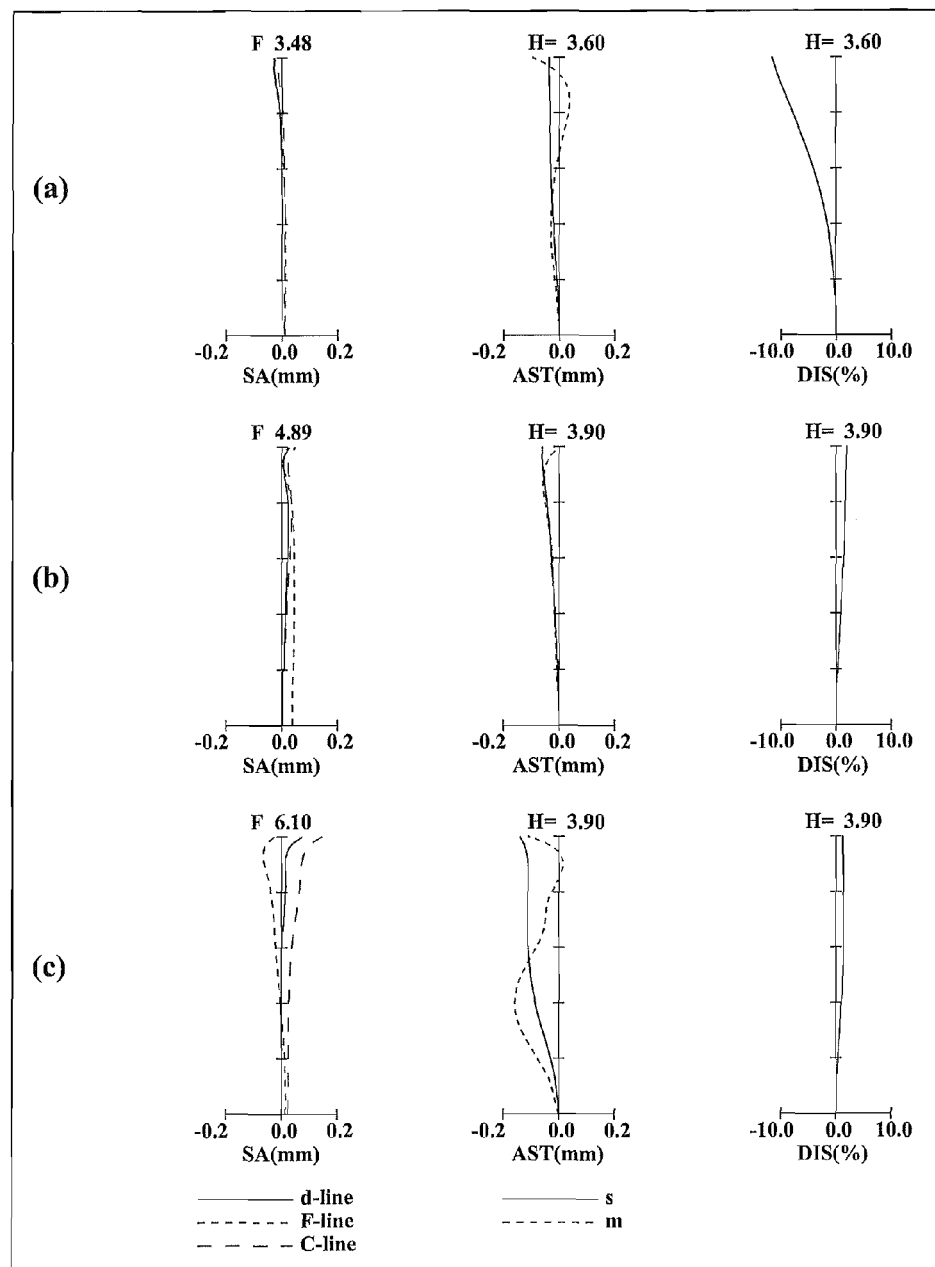
FIG. 55 is a longitudinal aberration diagram of an infinity in-focus condition of a zoom lens system according to Example III-5.
Figure 56:
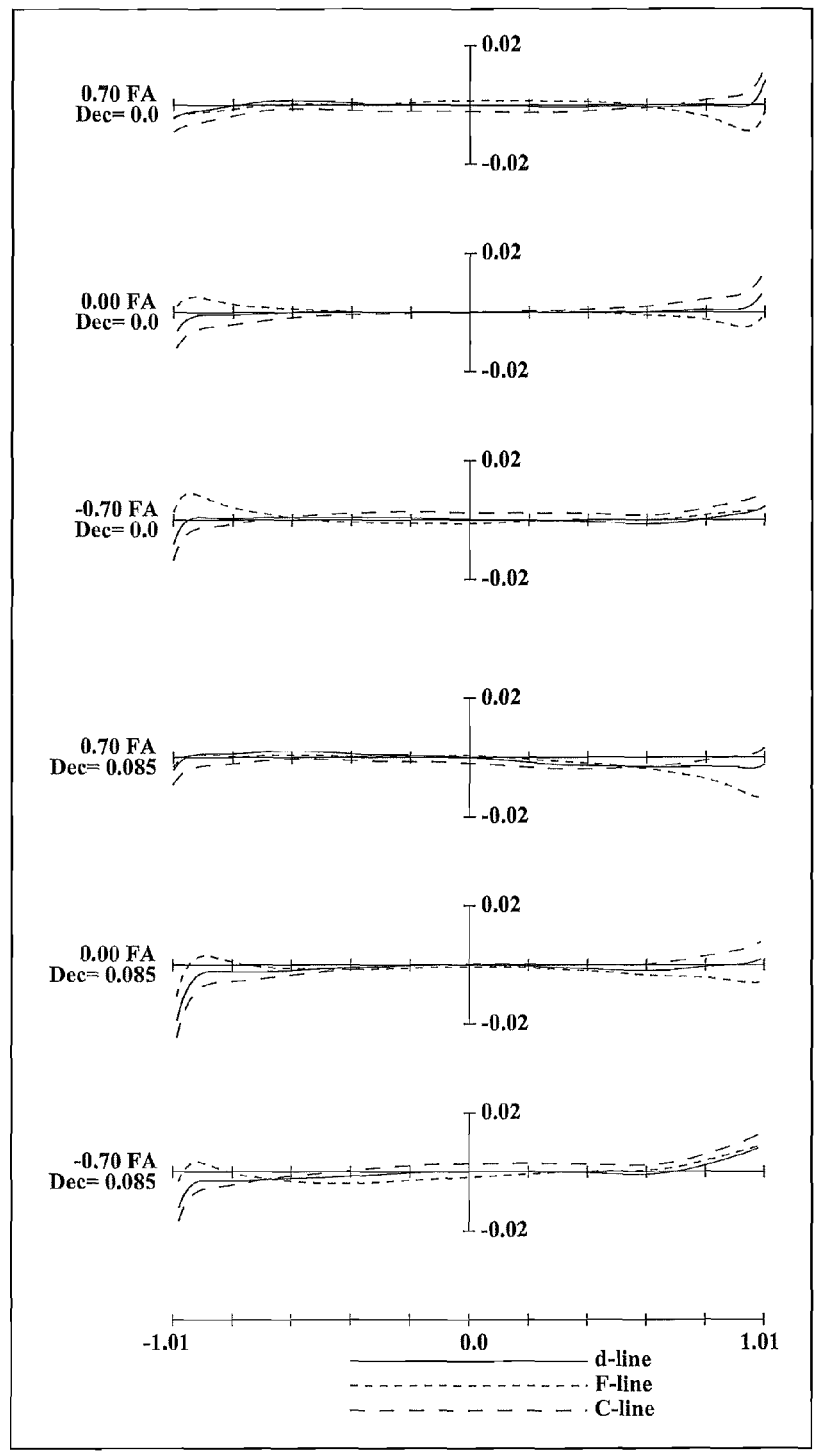
FIG. 56 is a lateral aberration diagram of a zoom lens system according to Example III-5 at a telephoto limit in a basic state where image blur compensation is not performed and in a blur compensation state.

As shown in FIG. 54, in the zoom lens system according to Embodiment III-5, the first lens unit G1, in order from the object side to the image side, comprises: a negative meniscus first lens element L1 with the convex surface facing the object side; and a bi-convex second lens element L2. The first lens element L1 and the second lens element L2 are cemented with each other. Further, the second lens element L2 has an aspheric image side surface.

In the zoom lens system according to Embodiment III-5, the second lens unit G2, in order from the object side to the image side, comprises: a negative meniscus third lens element L3 with the convex surface facing the object side; a bi-concave fourth lens element L4; and a bi-convex fifth lens element L5. Among these, the third lens element L3 has an aspheric image side surface.

Further, in the zoom lens system according to Embodiment III-5, the third lens unit G3, in order from the object side to the image side, comprises: a bi-convex sixth lens element L6; a positive meniscus seventh lens element L7 with the convex surface facing the object side; and a negative meniscus eighth lens element L8 with the convex surface facing the object side. Among these, the seventh lens element L7 and the eighth lens element L8 are cemented with each other. Further, the sixth lens element L6 has two aspheric surfaces.

Further, in the zoom lens system according to Embodiment III-5, the fourth lens unit G4 comprises solely a bi-convex ninth lens element L9. The ninth lens element L9 has two aspheric surfaces.

Here, in the zoom lens system according to Embodiment III-5, a plane parallel plate P is provided on the object side relative to the image surface S (that is, between the image surface S and the ninth lens element L9).

In the zoom lens system according to Embodiment III-5, in zooming from a wide-angle limit to a telephoto limit at the time of image taking, the first lens unit G1 and the third lens unit G3 move almost monotonically to the object side, the second lens unit G2 moves to the object side with locus of a slight convex to the image side, and the fourth lens unit G4 moves to the image side with locus of a convex to the object side. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

Figure 57:
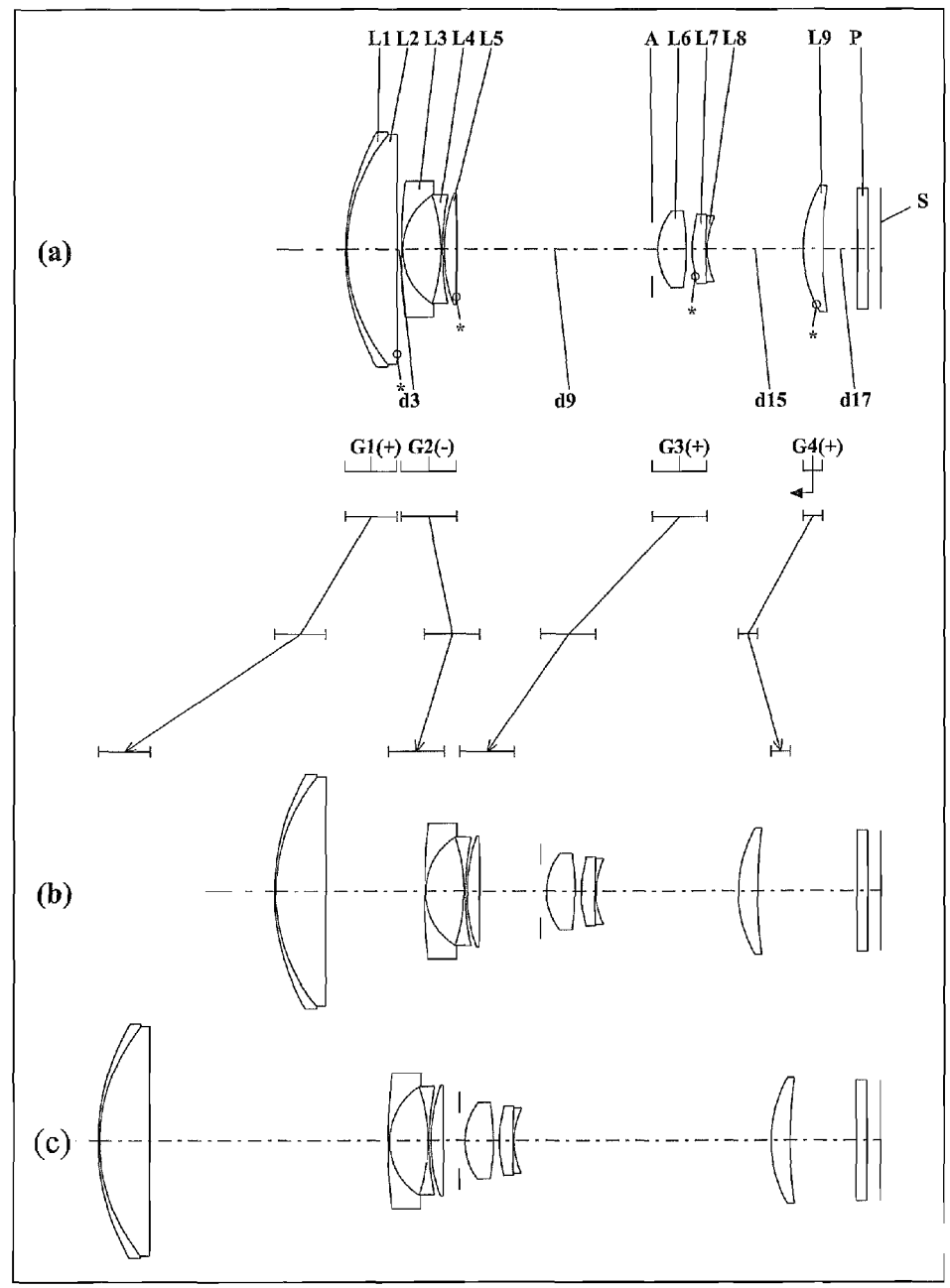
FIG. 57 is a lens arrangement diagram showing an infinity in-focus condition of a zoom lens system according to Embodiment III-6 (Example III-6)
Figure 58:
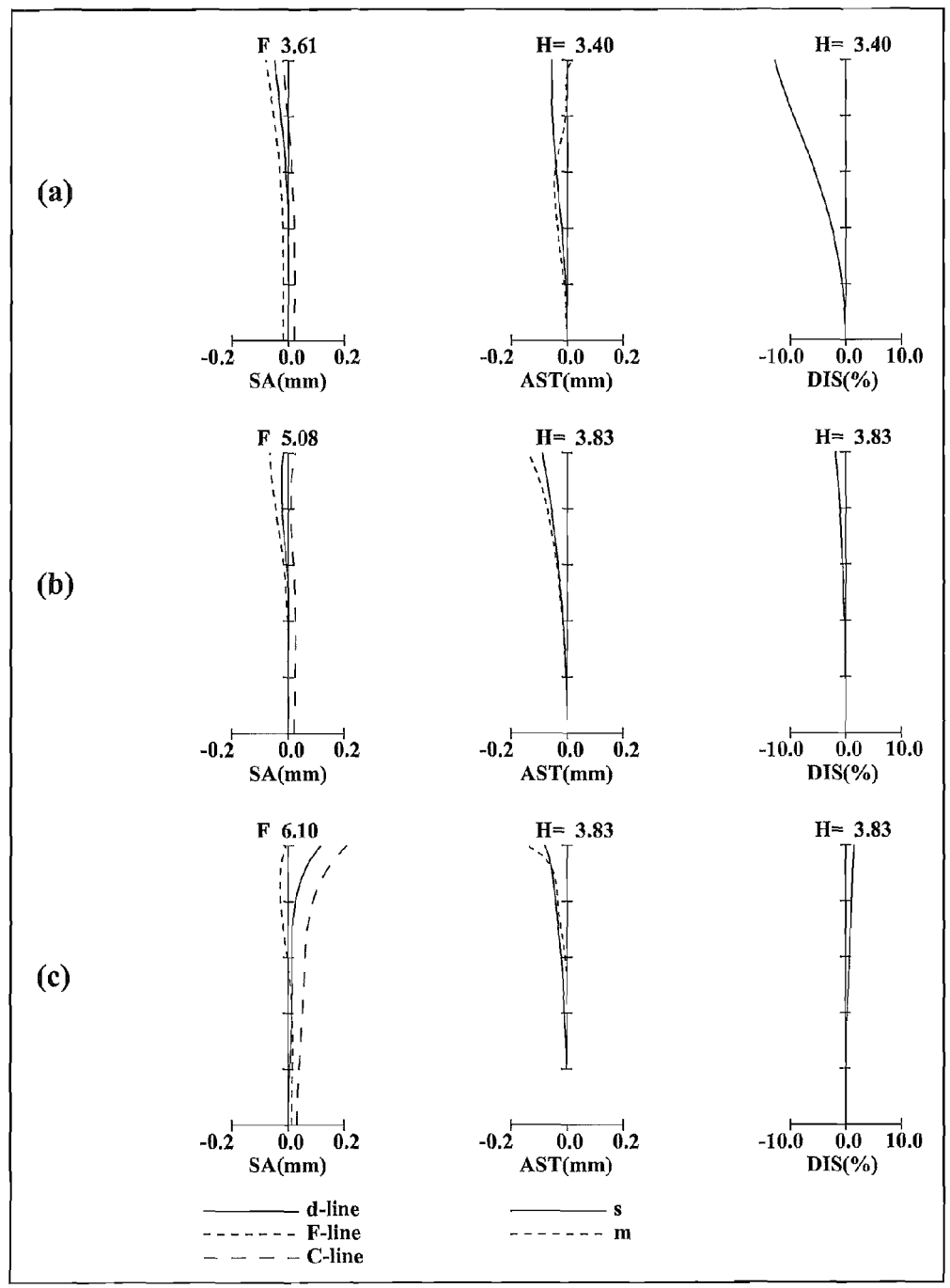
FIG. 58 is a longitudinal aberration diagram of an infinity in-focus condition of a zoom lens system according to Example III-6.
Figure 59:
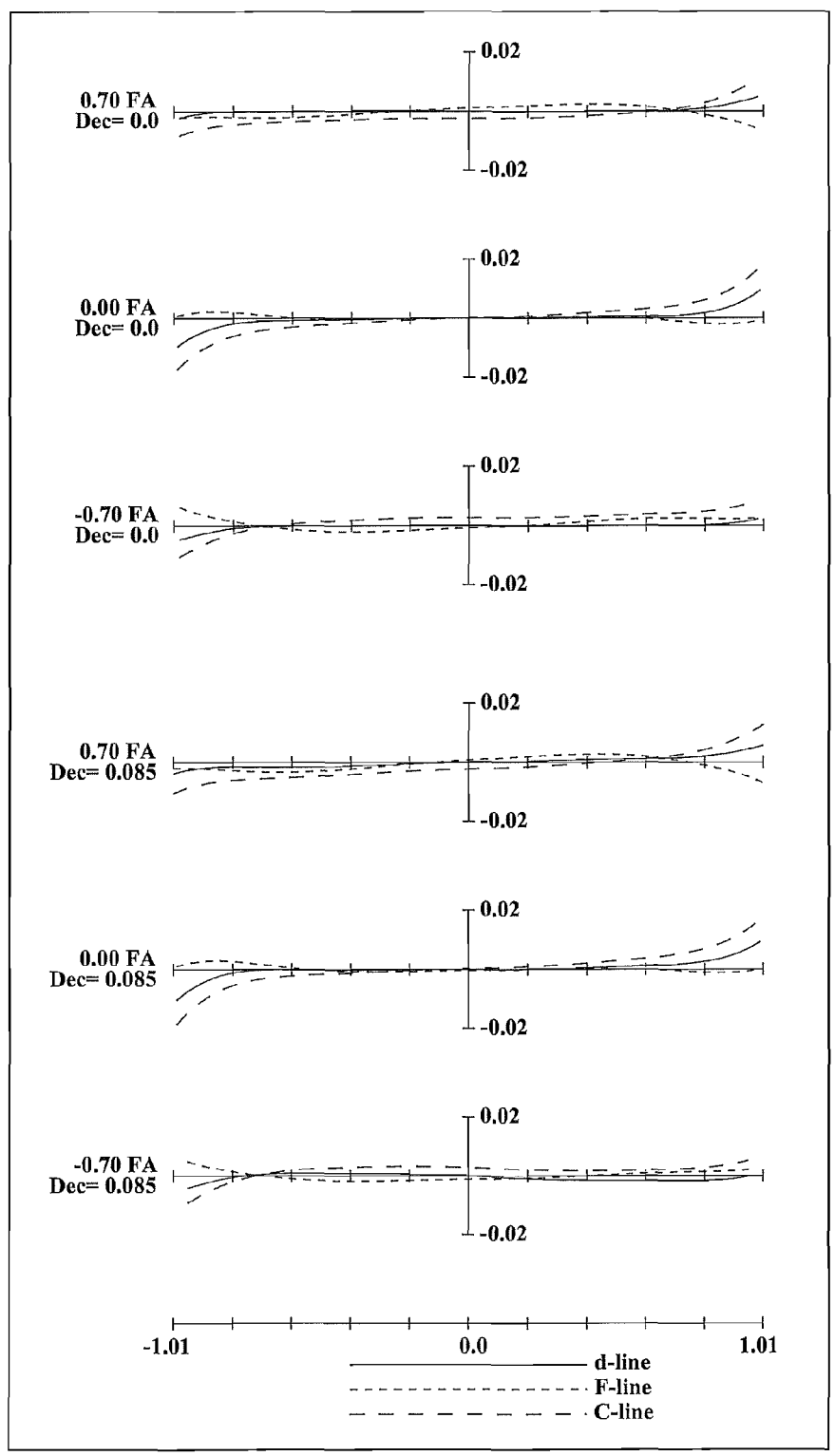
FIG. 59 is a lateral aberration diagram of a zoom lens system according to Example III-6 at a telephoto limit in a basic state where image blur compensation is not performed and in a blur compensation state.

As shown in FIG. 57, in the zoom lens system according to Embodiment III-6, the first lens unit G1, in order from the object side to the image side, comprises: a negative meniscus first lens element L1 with the convex surface facing the object side; and a bi-convex second lens element L2. The first lens element L1 and the second lens element L2 are cemented with each other. Further, the second lens element L2 has an aspheric image side surface.

In the zoom lens system according to Embodiment III-6, the second lens unit G2, in order from the object side to the image side, comprises: a negative meniscus third lens element L3 with the convex surface facing the object side; a bi-concave fourth lens element L4; and a bi-convex fifth lens element L5. Among these, the fifth lens element L5 has an aspheric image side surface.

Further, in the zoom lens system according to Embodiment III-6, the third lens unit G3, in order from the object side to the image side, comprises: a bi-convex sixth lens element L6; a positive meniscus seventh lens element L7 with the convex surface facing the object side; and a negative meniscus eighth lens element L8 with the convex surface facing the object side. Among these, the seventh lens element L7 and the eighth lens element L8 are cemented with each other. Further, the seventh lens element L7 has an aspheric object side surface.

Further, in the zoom lens system according to Embodiment III-6, the fourth lens unit G4 comprises solely a positive meniscus ninth lens element L9 with the convex surface facing the object side. The ninth lens element L9 has an aspheric object side surface.

Here, in the zoom lens system according to Embodiment III-6, a plane parallel plate P is provided on the object side relative to the image surface S (that is, between the image surface S and the ninth lens element L9).

In the zoom lens system according to Embodiment III-6, in zooming from a wide-angle limit to a telephoto limit at the time of image taking, the first lens unit G1 moves to the object side, the second lens unit G2 moves to the object side with locus of a convex to the image side, the third lens unit G3 moves monotonically to the object side, and the fourth lens unit G4 moves with locus of a convex to the object side such that the position at a telephoto limit is located on the object side relative to the position at a wide-angle limit. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

In the zoom lens system according to Embodiments III-1 to III-6, the first lens unit G1 is composed of two lens elements while the fourth lens unit G4 is composed of one lens element. Thus, the lens system has a remarkably short overall length of lens system.

In the zoom lens system according to Embodiments III-1 to III-6, the first lens unit G1, in order from the object side to the image side, comprises a first lens element L1 having negative optical power and a second lens element L2 having positive optical power. Further, these lens elements are cemented with each other so that a cemented lens element is formed. Thus, a more compact lens system is achieved. Furthermore, the image side surface of the second lens element L2 is aspheric. This permits satisfactory suppression of an increase in distortion and astigmatism caused by a wide angle construction and a high variable magnification construction.

In the zoom lens system according to Embodiments III-1 to III-6, among the three lens elements constituting the third lens unit G3, the seventh lens element L7 having positive optical power and the eighth lens element L8 having negative optical power are cemented with each other so that a cemented lens element is formed. Thus, a more compact lens system is achieved.

In the zoom lens system according to Embodiments III-1 to III-6, the one lens element constituting the fourth lens unit G4 has positive optical power. Thus, at the time of focusing from an infinite-distance object to a short-distance object, as shown in each FIG., the fourth lens unit G4 is moved to the object side so that rapid focusing is achieved easily. Further, the one lens element constituting the fourth lens unit G4 has an aspheric surface. This permits satisfactory compensation of curvature of off-axial field over the range from a wide-angle limit to a telephoto limit.

Further, in the zoom lens system according to Embodiments III-1 to III-6, in zooming from a wide-angle limit to a telephoto limit at the time of image taking, the first lens unit G1, the second lens unit G2, the third lens unit G3 and the fourth lens unit G4 are moved individually along the optical axis so that zooming is achieved. Then, any lens unit among the first lens unit G1, the second lens unit G2, the third lens unit G3 and the fourth lens unit G4, or alternatively a sub lens unit consisting of a part of a lens unit is moved in a direction perpendicular to the optical axis so that image point movement caused by vibration of the entire system is compensated, that is, image blur caused by hand blurring, vibration and the like can be compensated optically.

When image point movement caused by vibration of the entire system is to be compensated, for example, the third lens unit G3 is moved in a direction perpendicular to the optical axis, so that image blur is compensated in a state that size increase in the entire zoom lens system is suppressed and a compact construction is realized and that excellent imaging characteristics such as small decentering coma aberration and decentering astigmatism are satisfied.

Here, in a case that a lens unit is composed of a plurality of lens elements, the above-mentioned sub lens unit consisting of a part of a lens unit indicates any one lens element or alternatively a plurality of adjacent lens elements among the plurality of lens elements.

Embodiments IV-1 to IV-7

FIGS. 61, 64, 67, 70, 73, 76 and 79 are lens arrangement diagrams of zoom lens systems according to Embodiments IV-1 to IV-7, respectively.

Each of FIGS. 61, 64, 67, 70, 73, 76 and 79 shows a zoom lens system in an infinity in-focus condition. In each FIG., part (a) shows a lens configuration at a wide-angle limit (in the minimum focal length condition: focal length $f_W$), part (b) shows a lens configuration at a middle position (in an intermediate focal length condition: focal length $f_M=\sqrt{(f_W*f_T)}$), and part (c) shows a lens configuration at a telephoto limit (in the maximum focal length condition: focal length $f_T$). Further, in each FIG., each bent arrow located between part (a) and part (b) indicates a line obtained by connecting the positions of each lens unit respectively at a wide-angle limit, a middle position and a telephoto limit. Thus, in the part between the wide-angle limit and the middle position and the part between the middle position and the telephoto limit, the positions are connected simply with a straight line, and hence this line does not indicate actual motion of each lens unit. Moreover, in each FIG., an arrow imparted to a lens unit indicates focusing from an infinity in-focus condition to a close-object in-focus condition. That is, the arrow indicates the moving direction at the time of focusing from an infinity in-focus condition to a close-object in-focus condition.

The zoom lens system according to each embodiment, in order from the object side to the image side, comprises a first lens unit G1 having positive optical power, a second lens unit G2 having negative optical power, a third lens unit G3 having positive optical power, and a fourth lens unit G4 having positive optical power. Then, in zooming, the individual lens units move in a direction along the optical axis such that intervals between the lens units, that is, the interval between the first lens unit G1 and the second lens unit G2, the interval between the second lens unit G2 and the third lens unit G3, and the interval between the third lens unit G3 and the fourth lens unit G4 should all vary. In the zoom lens system according to each embodiment, since these lens units are arranged in the desired optical power configuration, high optical performance is obtained and still size reduction is achieved in the entire lens system.

Further, in FIGS. 61, 64, 67, 70, 73, 76 and 79, an asterisk "*" imparted to a particular surface indicates that the surface is aspheric. In each FIG., symbol (+) or (−) imparted to the symbol of each lens unit corresponds to the sign of the optical power of the lens unit. In each FIG., the straight line located on the most right-hand side indicates the position of the image surface S. On the object side relative to the image surface S (that is, between the image surface S and the most image side lens surface of the fourth lens unit G4), a plane parallel plate P such as an optical low-pass filter and a face plate of an image sensor is provided.

Further, in FIGS. 61, 64, 67, 70, 73, 76 and 79, an aperture diaphragm A is provided between the second lens unit G2 and the third lens unit G3. In zooming from a wide-angle limit to a telephoto limit at the time of image taking, the aperture diaphragm A moves along the optical axis independently of the individual lens units in Embodiments IV-1 and IV-2 shown in FIGS. 61 and 64. In contrast, in Embodiments IV-3 to IV-7 shown in FIGS. 67, 70, 73, 76 and 79, the aperture diaphragm A moves along the optical axis integrally with the third lens unit G3.

Figure 61:
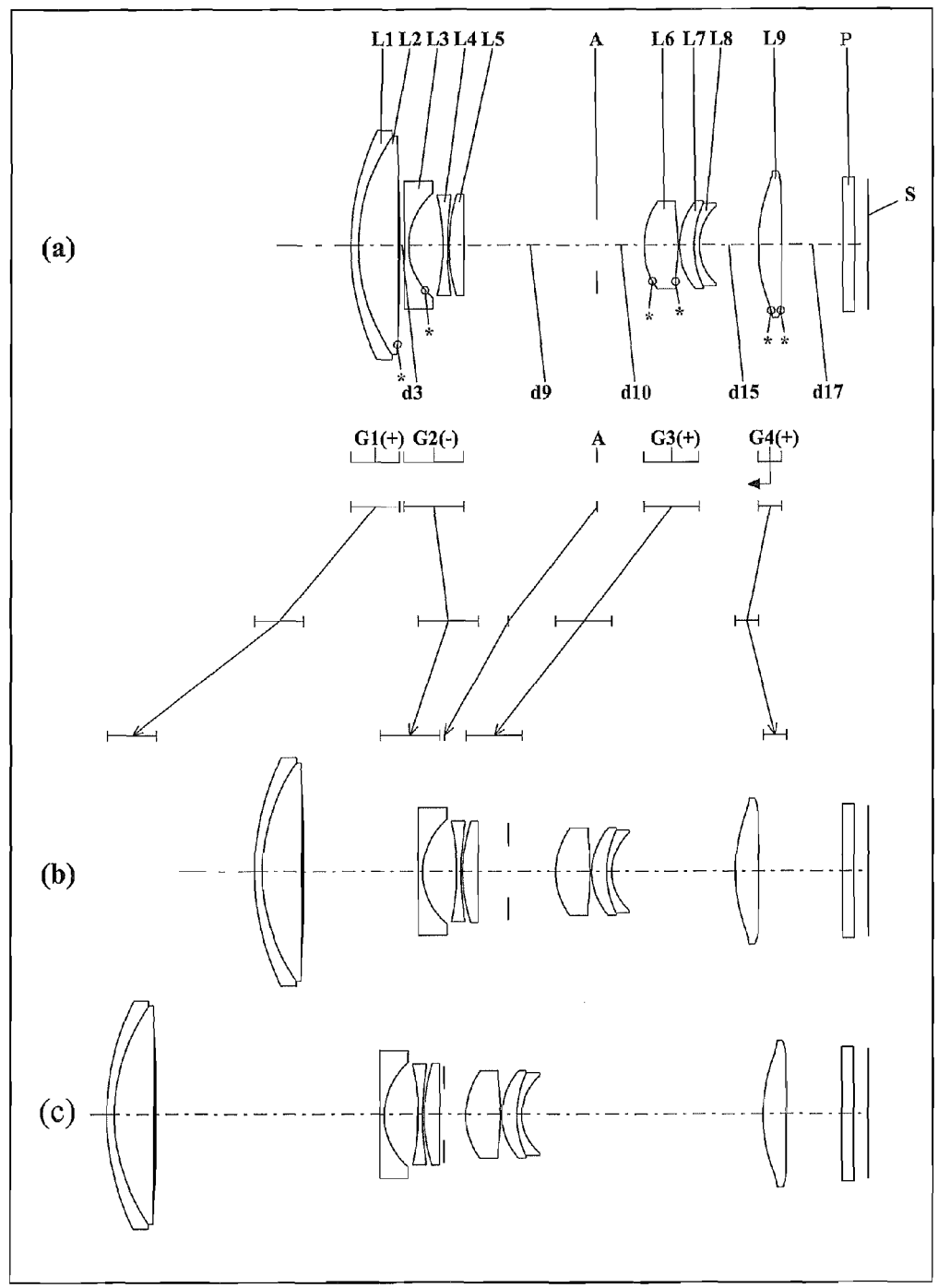
FIG. 61 is a lens arrangement diagram showing an infinity in-focus condition of a zoom lens system according to Embodiment IV-1 (Example IV-1)
Figure 62:
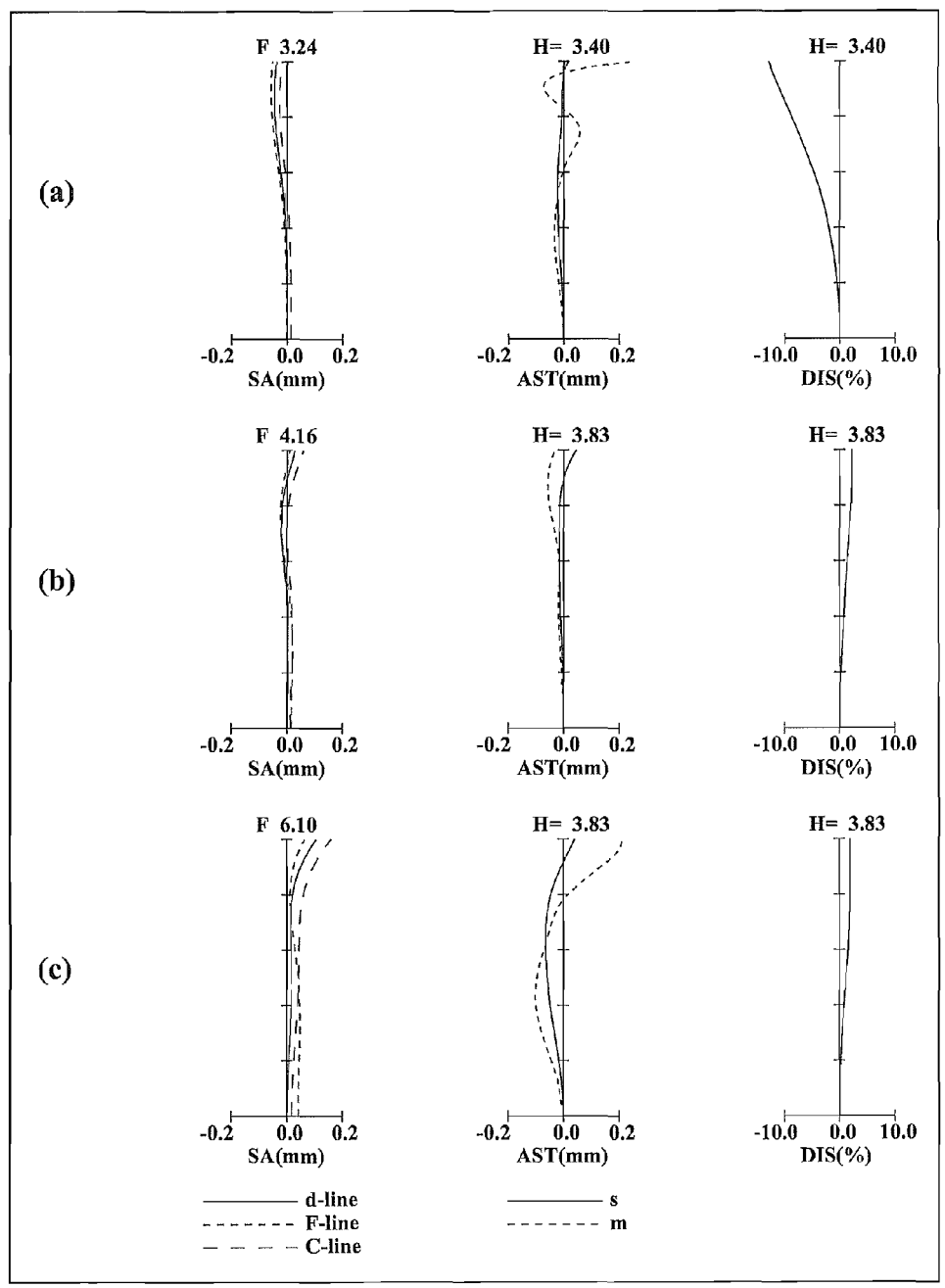
FIG. 62 is a longitudinal aberration diagram of an infinity in-focus condition of a zoom lens system according to Example IV-1.
Figure 63:
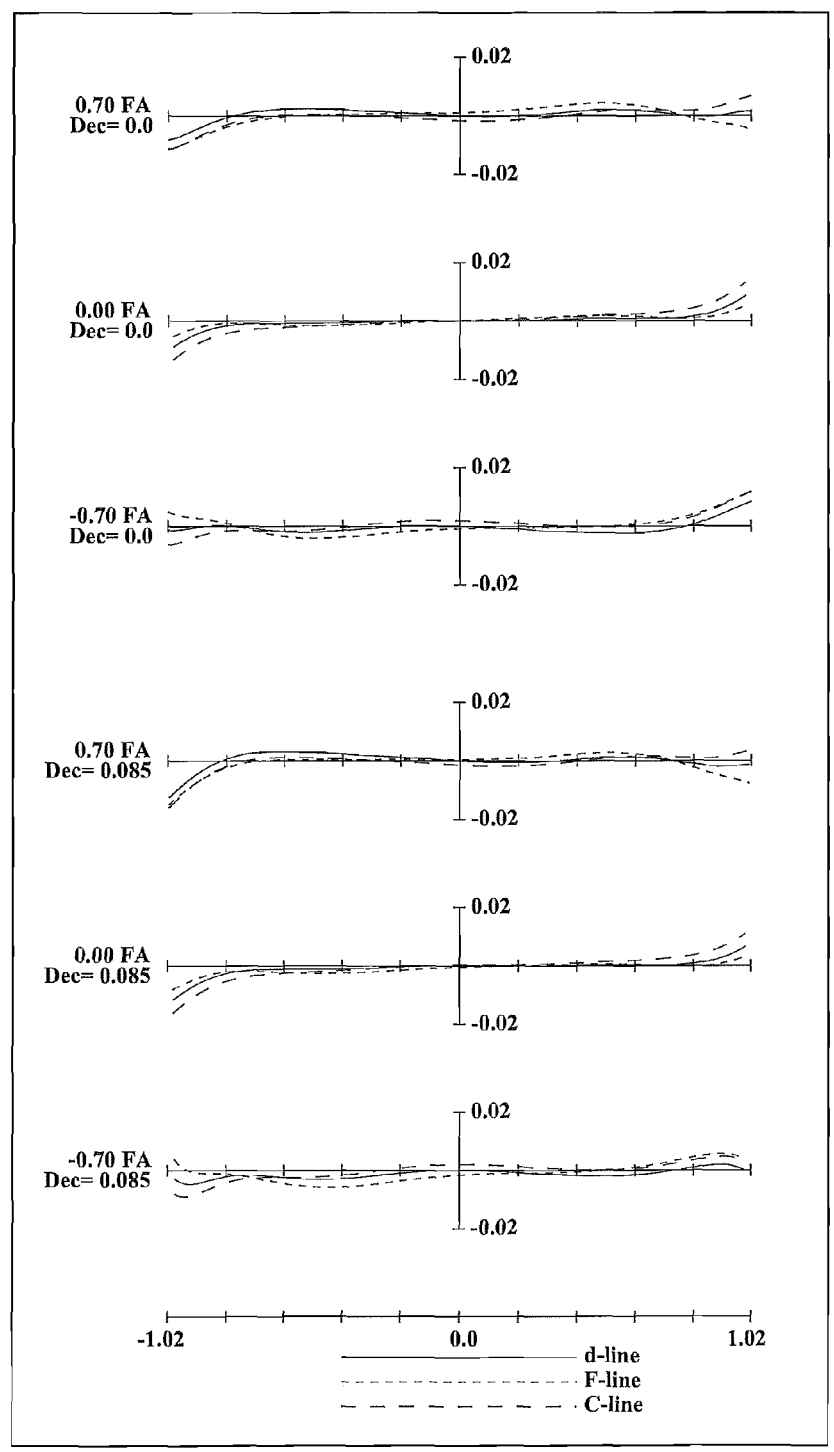
FIG. 63 is a lateral aberration diagram of a zoom lens system according to Example IV-1 at a telephoto limit in a basic state where image blur compensation is not performed and in a blur compensation state.

As shown in FIG. 61, in the zoom lens system according to Embodiment IV-1, the first lens unit G1, in order from the object side to the image side, comprises: a negative meniscus first lens element L1 with the convex surface facing the object side; and a bi-convex second lens element L2. The first lens element L1 and the second lens element L2 are cemented with each other. Further, the second lens element L2 has an aspheric image side surface.

In the zoom lens system according to Embodiment IV-1, the second lens unit G2, in order from the object side to the image side, comprises: a negative meniscus third lens element L3 with the convex surface facing the object side; a bi-concave fourth lens element L4; and a bi-convex fifth lens element L5. Among these, the third lens element L3 has an aspheric image side surface.

Further, in the zoom lens system according to Embodiment IV-1, the third lens unit G3, in order from the object side to the image side, comprises: a bi-convex sixth lens element L6; a positive meniscus seventh lens element L7 with the convex surface facing the object side; and a negative meniscus eighth lens element L8 with the convex surface facing the object side. Among these, the seventh lens element L7 and the eighth lens element L8 are cemented with each other. Further, the sixth lens element L6 has two aspheric surfaces.

Further, in the zoom lens system according to Embodiment IV-1, the fourth lens unit G4 comprises solely a bi-convex ninth lens element L9. The ninth lens element L9 has two aspheric surfaces.

Here, in the zoom lens system according to Embodiment IV-1, a plane parallel plate P is provided on the object side relative to the image surface S (that is, between the image surface S and the ninth lens element L9).

In the zoom lens system according to Embodiment IV-1, in zooming from a wide-angle limit to a telephoto limit at the time of image taking, the first lens unit G1 and the third lens unit G3 move monotonically to the object side, the second lens unit G2 moves to the object side with locus of a slight convex to the image side, and the fourth lens unit G4 moves to the image side with locus of a slight convex to the object side. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

Further, in the zoom lens system according to Embodiment IV-1, in zooming from a wide-angle limit to a telephoto limit at the time of image taking, the aperture diaphragm A provided between the second lens unit G2 and the third lens unit G3 moves monotonically to the object side. That is, in zooming, the interval between the second lens unit G2 and the aperture diaphragm A decreases.

Figure 64:
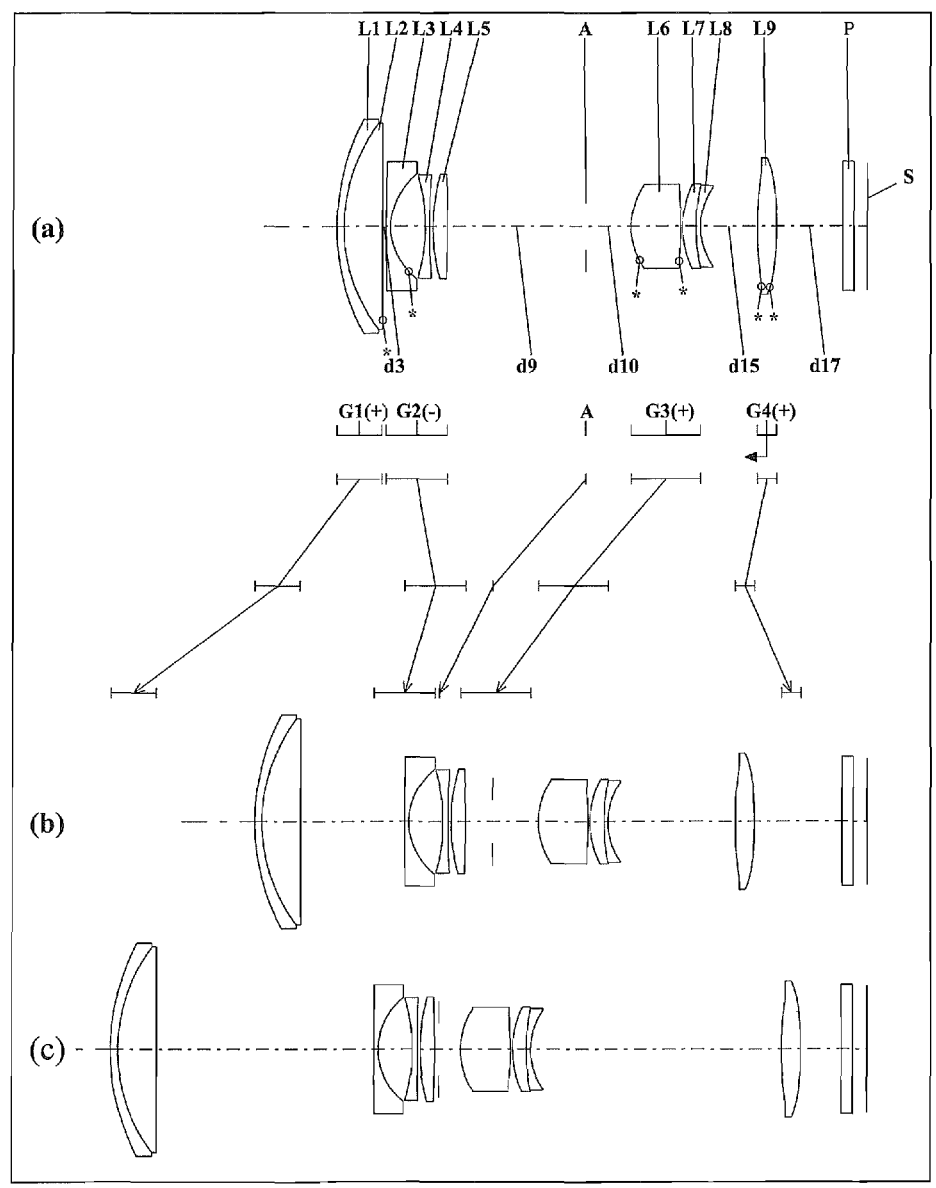
FIG. 64 is a lens arrangement diagram showing an infinity in-focus condition of a zoom lens system according to Embodiment IV-2 (Example IV-2)
Figure 65:
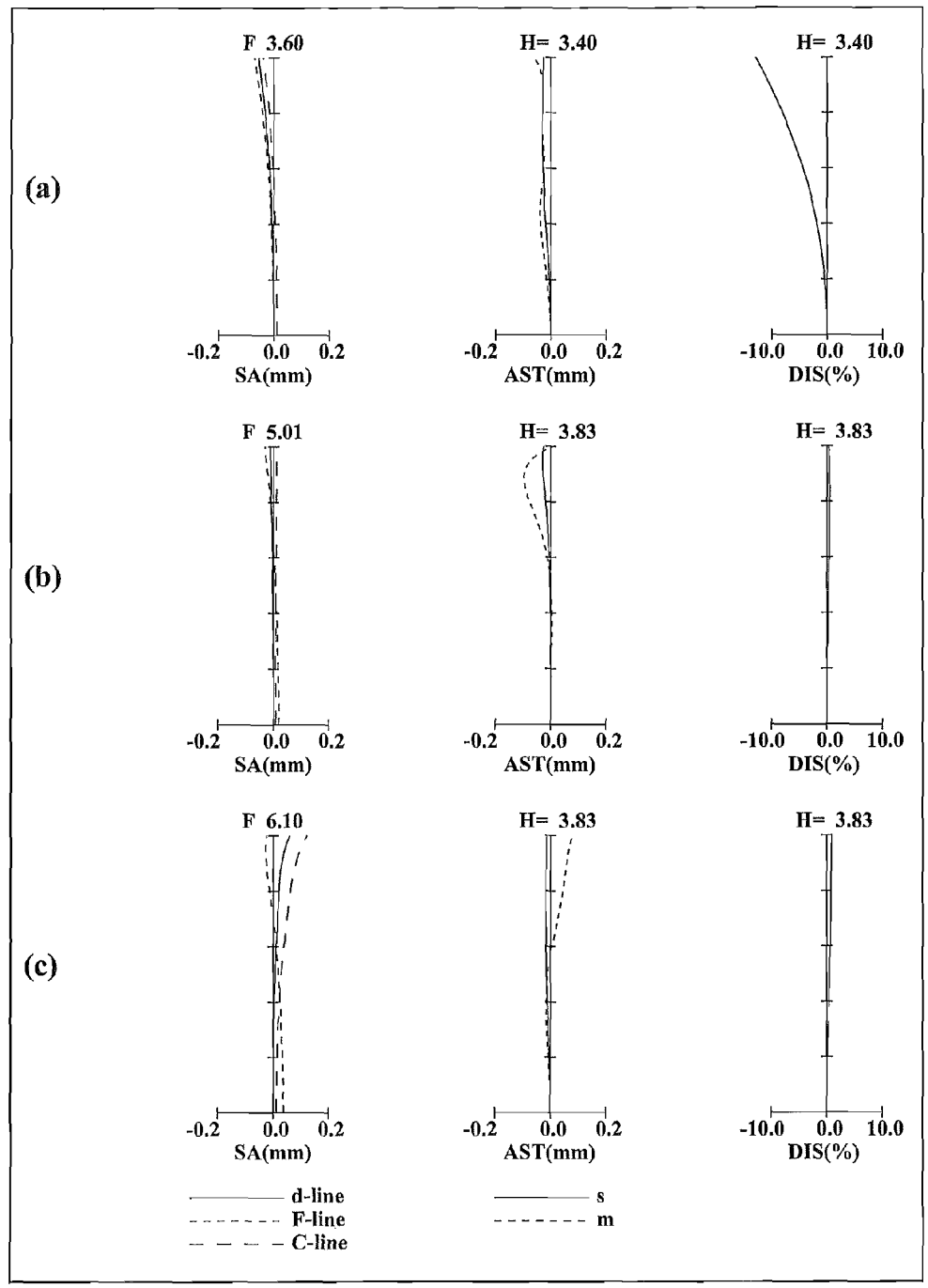
FIG. 65 is a longitudinal aberration diagram of an infinity in-focus condition of a zoom lens system according to Example IV-2.
Figure 66:
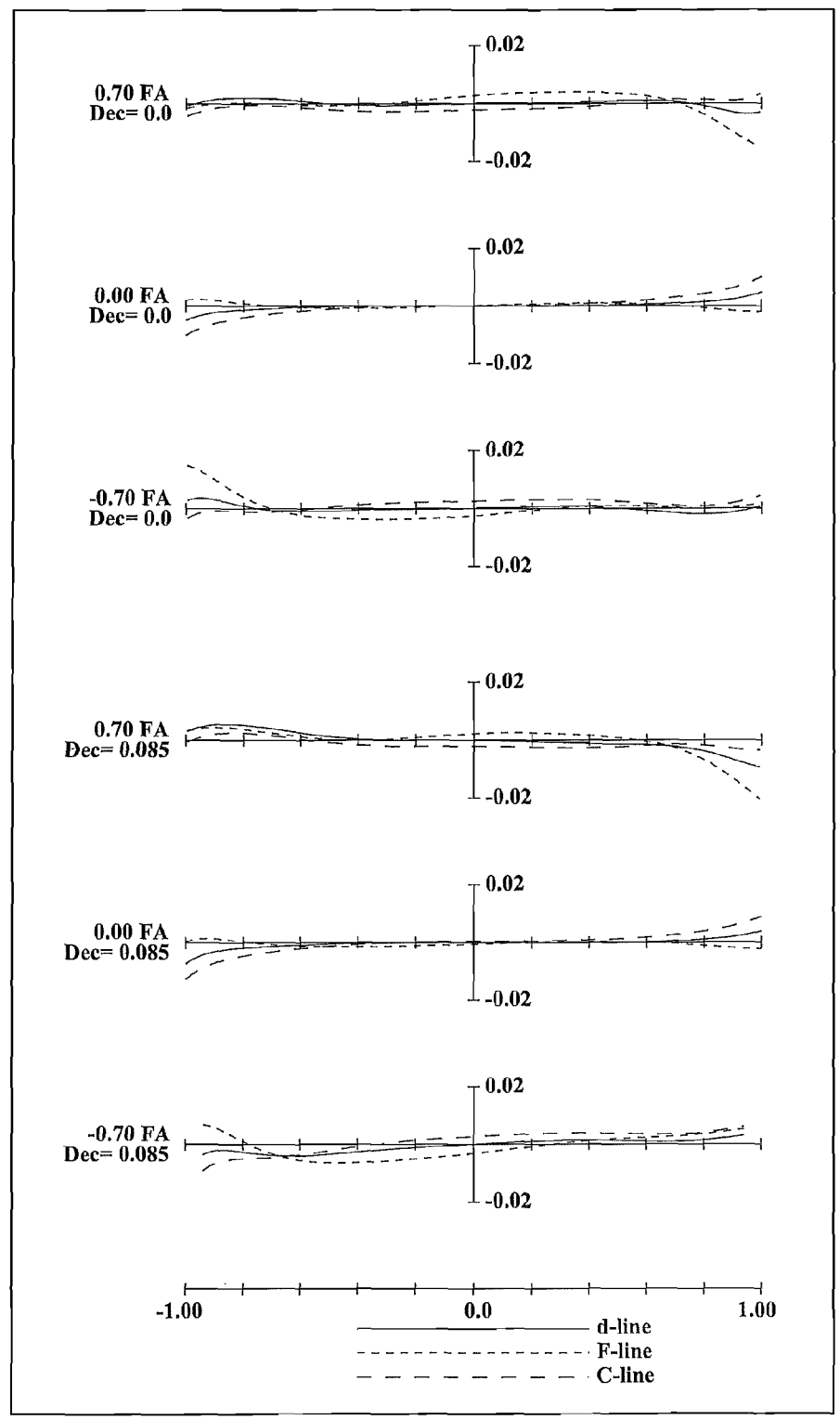
FIG. 66 is a lateral aberration diagram of a zoom lens system according to Example IV-2 at a telephoto limit in a basic state where image blur compensation is not performed and in a blur compensation state.

As shown in FIG. 64, in the zoom lens system according to Embodiment IV-2, the first lens unit G1, in order from the object side to the image side, comprises: a negative meniscus first lens element L1 with the convex surface facing the object side; and a positive meniscus second lens element L2 with the convex surface facing the object side. The first lens element L1 and the second lens element L2 are cemented with each other. Further, the second lens element L2 has an aspheric image side surface.

In the zoom lens system according to Embodiment IV-2, the second lens unit G2, in order from the object side to the image side, comprises: a negative meniscus third lens element L3 with the convex surface facing the object side; a bi-concave fourth lens element L4; and a bi-convex fifth lens element L5. Among these, the third lens element L3 has an aspheric image side surface.

Further, in the zoom lens system according to Embodiment IV-2, the third lens unit G3, in order from the object side to the image side, comprises: a bi-convex sixth lens element L6; a positive meniscus seventh lens element L7 with the convex surface facing the object side; and a negative meniscus eighth lens element L8 with the convex surface facing the object side. Among these, the seventh lens element L7 and the eighth lens element L8 are cemented with each other. Further, the sixth lens element L6 has two aspheric surfaces.

Further, in the zoom lens system according to Embodiment IV-2, the fourth lens unit G4 comprises solely a bi-convex ninth lens element L9. The ninth lens element L9 has two aspheric surfaces.

Here, in the zoom lens system according to Embodiment IV-2, a plane parallel plate P is provided on the object side relative to the image surface S (that is, between the image surface S and the ninth lens element L9).

In the zoom lens system according to Embodiment IV-2, in zooming from a wide-angle limit to a telephoto limit at the time of image taking, the first lens unit G1 and the third lens unit G3 move monotonically to the object side, the second lens unit G2 moves to the object side with locus of a slight convex to the image side, and the fourth lens unit G4 moves to the image side with locus of a convex to the object side. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

Further, in the zoom lens system according to Embodiment IV-2, in zooming from a wide-angle limit to a telephoto limit at the time of image taking, the aperture diaphragm A provided between the second lens unit G2 and the third lens unit G3 moves monotonically to the object side. That is, in zooming, the interval between the second lens unit G2 and the aperture diaphragm A decreases.

Figure 67:
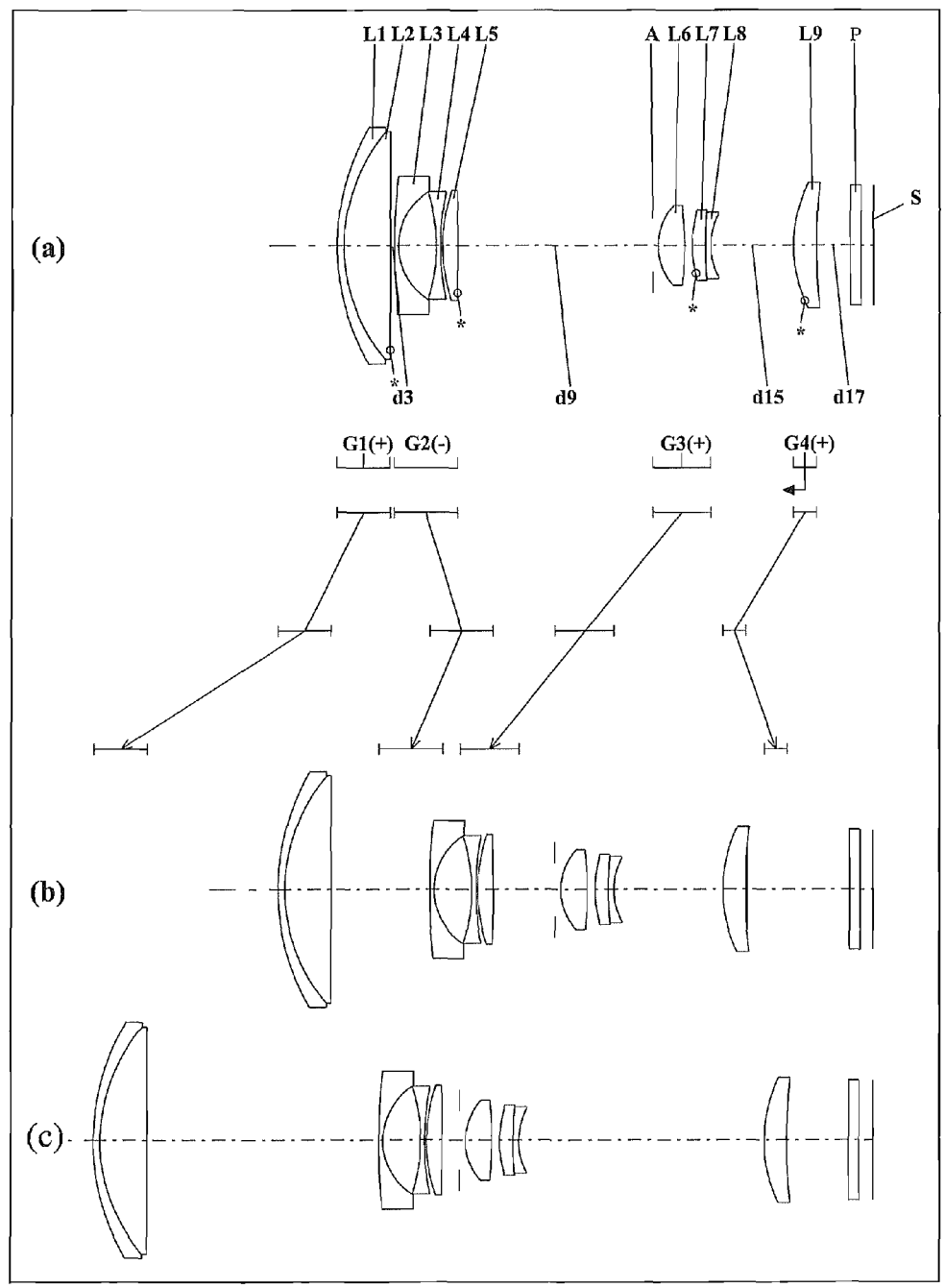
FIG. 67 is a lens arrangement diagram showing an infinity in-focus condition of a zoom lens system according to Embodiment IV-3 (Example IV-3)
Figure 68:
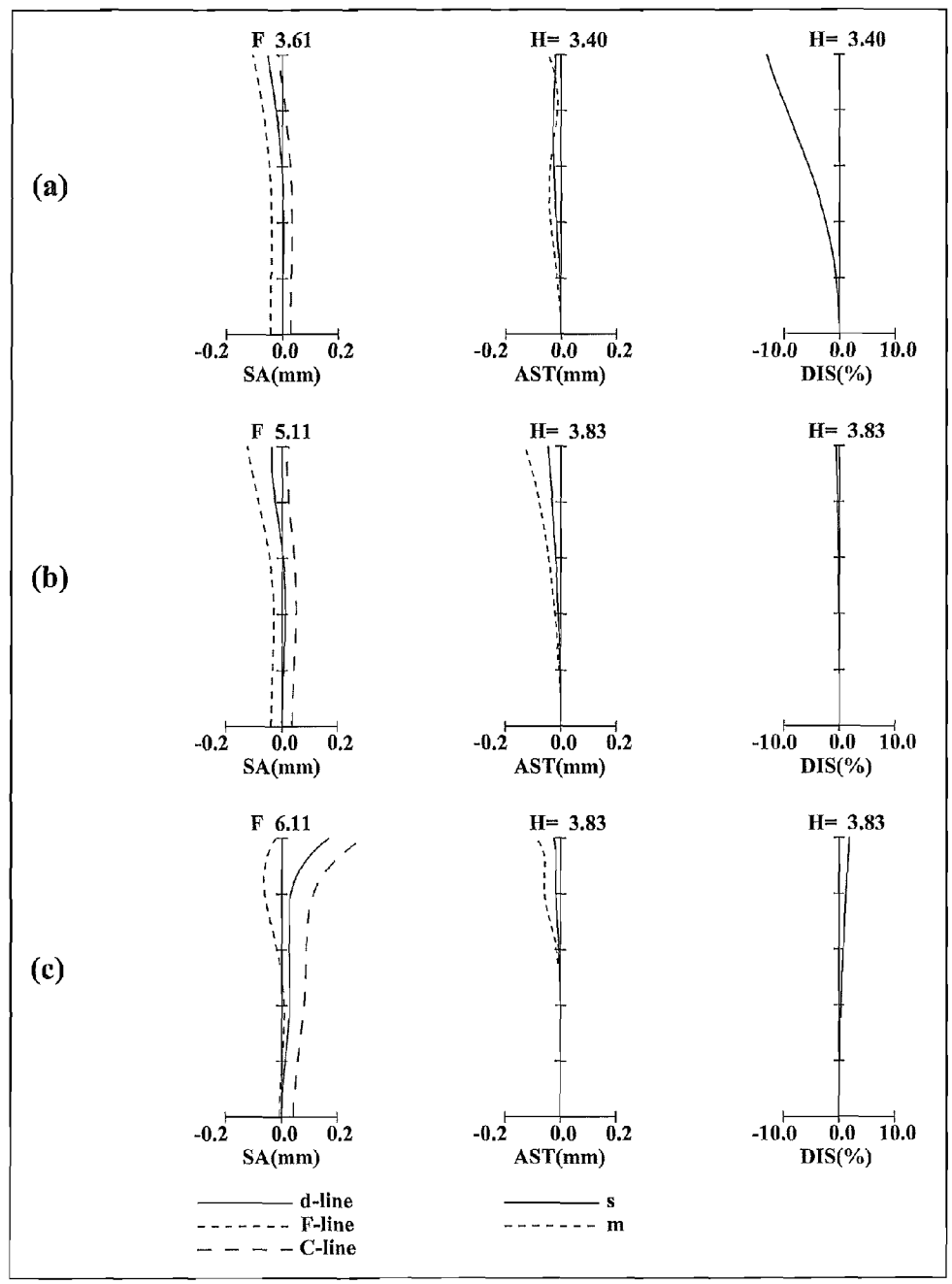
FIG. 68 is a longitudinal aberration diagram of an infinity in-focus condition of a zoom lens system according to Example IV-3.
Figure 69:
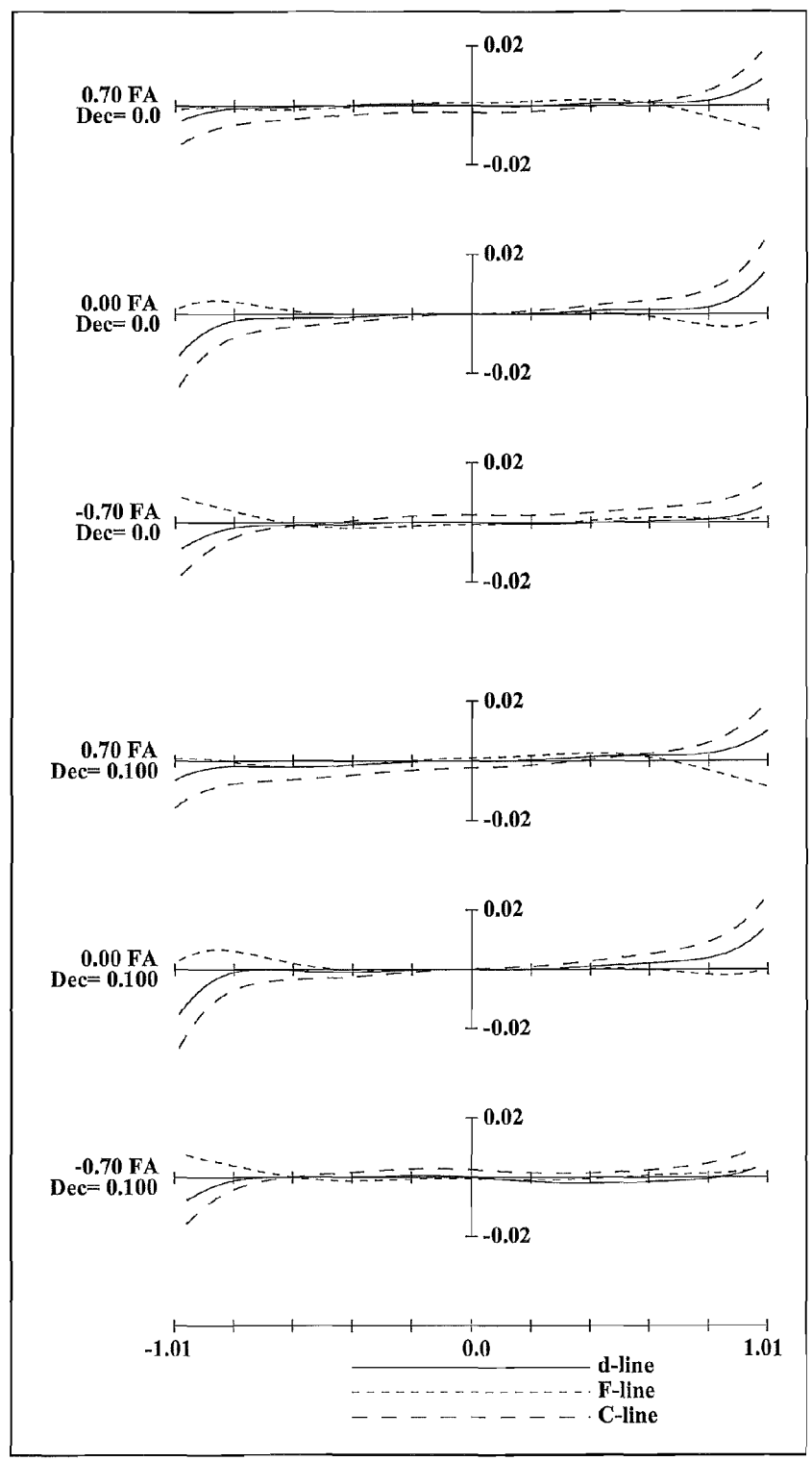
FIG. 69 is a lateral aberration diagram of a zoom lens system according to Example IV-3 at a telephoto limit in a basic state where image blur compensation is not performed and in a blur compensation state.

As shown in FIG. 67, in the zoom lens system according to Embodiment IV-3, the first lens unit G1, in order from the object side to the image side, comprises: a negative meniscus first lens element L1 with the convex surface facing the object side; and a bi-convex second lens element L2. The first lens element L1 and the second lens element L2 are cemented with each other. Further, the second lens element L2 has an aspheric image side surface.

In the zoom lens system according to Embodiment IV-3, the second lens unit G2, in order from the object side to the image side, comprises: a negative meniscus third lens element L3 with the convex surface facing the object side; a bi-concave fourth lens element L4; and a bi-convex fifth lens element L5. Among these, the fifth lens element L5 has an aspheric image side surface.

Further, in the zoom lens system according to Embodiment IV-3, the third lens unit G3, in order from the object side to the image side, comprises: a bi-convex sixth lens element L6; a positive meniscus seventh lens element L7 with the convex surface facing the object side; and a negative meniscus eighth lens element L8 with the convex surface facing the object side. Among these, the seventh lens element L7 and the eighth lens element L8 are cemented with each other. Further, the seventh lens element L7 has an aspheric object side surface.

Further, in the zoom lens system according to Embodiment IV-3, the fourth lens unit G4 comprises solely a positive meniscus ninth lens element L9 with the convex surface facing the object side. The ninth lens element L9 has an aspheric object side surface.

Here, in the zoom lens system according to Embodiment IV-3, a plane parallel plate P is provided on the object side relative to the image surface S (that is, between the image surface S and the ninth lens element L9).

In the zoom lens system according to Embodiment IV-3, in zooming from a wide-angle limit to a telephoto limit at the time of image taking, the first lens unit G1 moves to the object side, the second lens unit G2 moves to the object side with locus of a convex to the image side, the third lens unit G3 moves monotonically to the object side, and the fourth lens unit G4 moves with locus of a convex to the object side such that the position at a telephoto limit is located on the object side relative to the position at a wide-angle limit. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

Figure 70:
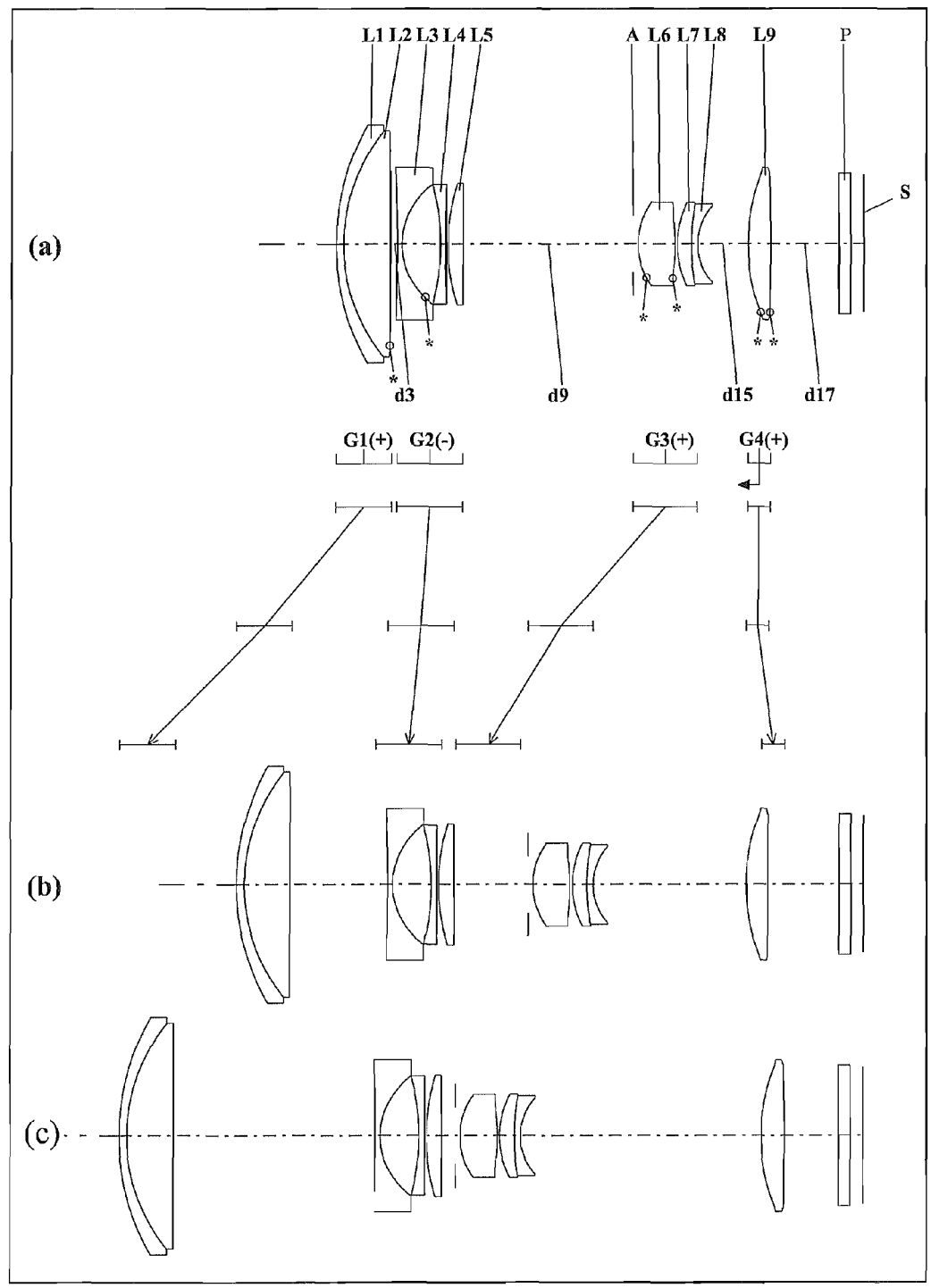
FIG. 70 is a lens arrangement diagram showing an infinity in-focus condition of a zoom lens system according to Embodiment IV-4 (Example IV-4)
Figure 71:
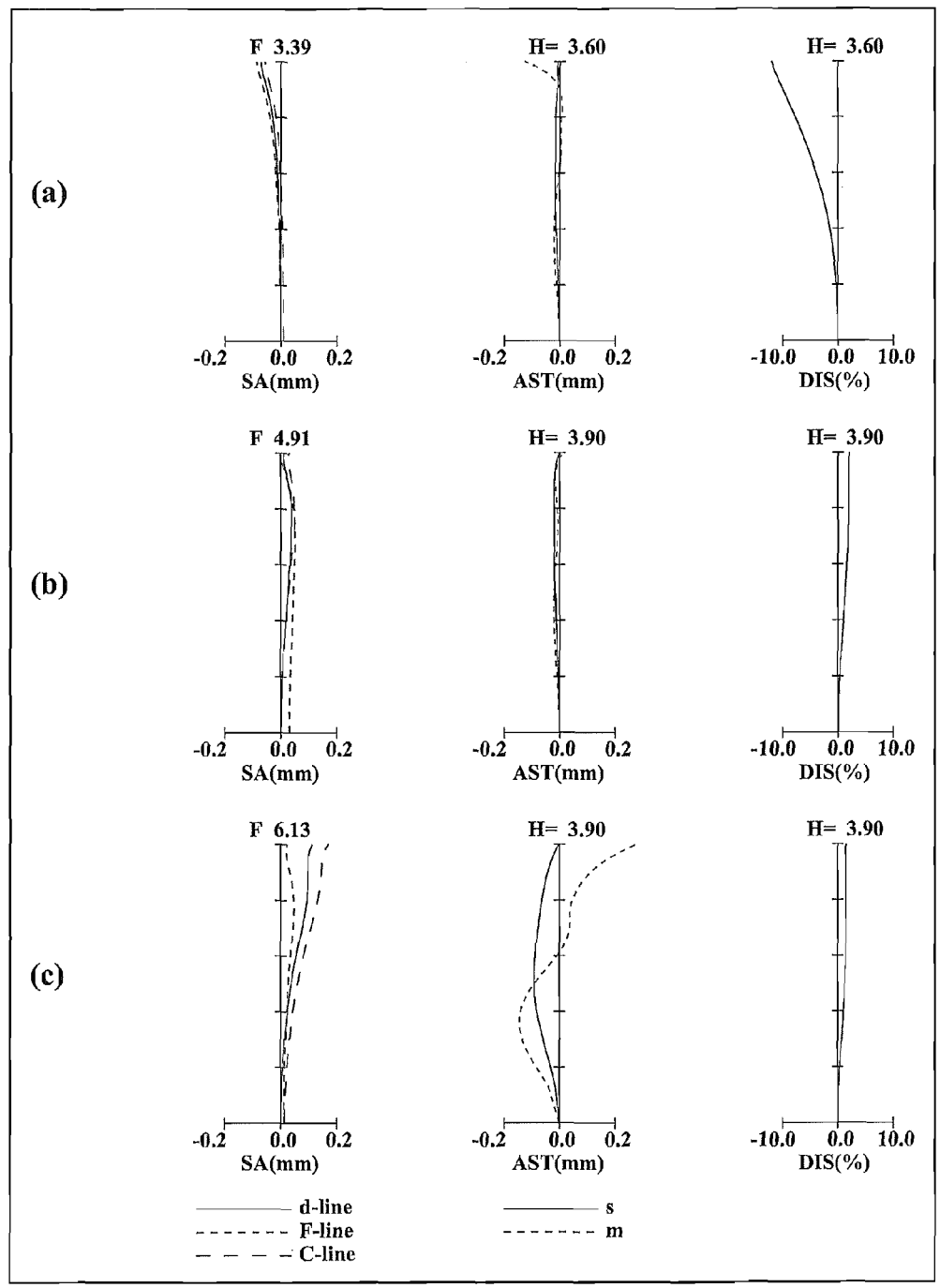
FIG. 71 is a longitudinal aberration diagram of an infinity in-focus condition of a zoom lens system according to Example IV-4.
Figure 72:
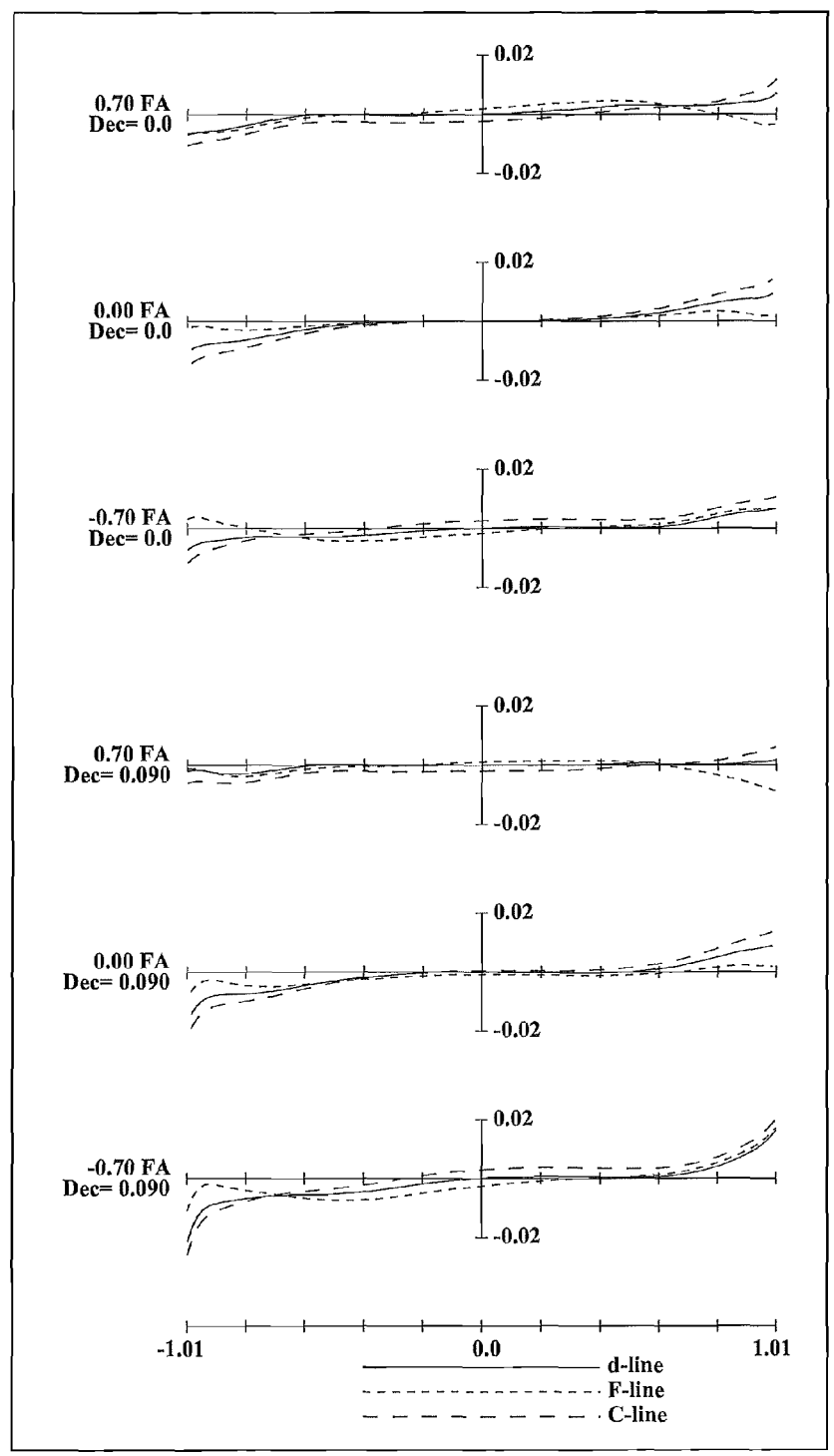
FIG. 72 is a lateral aberration diagram of a zoom lens system according to Example IV-4 at a telephoto limit in a basic state where image blur compensation is not performed and in a blur compensation state.

As shown in FIG. 70, in the zoom lens system according to Embodiment IV-4, the first lens unit G1, in order from the object side to the image side, comprises: a negative meniscus first lens element L1 with the convex surface facing the object side; and a bi-convex second lens element L2. The first lens element L1 and the second lens element L2 are cemented with each other. Further, the second lens element L2 has an aspheric image side surface.

Further, in the zoom lens system according to Embodiment IV-4, the second lens unit G2, in order from the object side to the image side, comprises: a bi-concave third lens element L3; a bi-concave fourth lens element L4; and a planer-convex fifth lens element L5 with the convex surface facing the object side. Among these, the third lens element L3 has an aspheric image side surface.

Further, in the zoom lens system according to Embodiment IV-4, the third lens unit G3, in order from the object side to the image side, comprises: a bi-convex sixth lens element L6; a positive meniscus seventh lens element L7 with the convex surface facing the object side; and a negative meniscus eighth lens element L8 with the convex surface facing the object side. Among these, the seventh lens element L7 and the eighth lens element L8 are cemented with each other. Further, the sixth lens element L6 has two aspheric surfaces.

Further, in the zoom lens system according to Embodiment IV-4, the fourth lens unit G4 comprises solely a bi-convex ninth lens element L9. The ninth lens element L9 has two aspheric surfaces.

Here, in the zoom lens system according to Embodiment IV-4, a plane parallel plate P is provided on the object side relative to the image surface S (that is, between the image surface S and the ninth lens element L9).

In the zoom lens system according to Embodiment IV-4, in zooming from a wide-angle limit to a telephoto limit at the time of image taking, the first lens unit G1 and the third lens unit G3 move monotonically to the object side, the second lens unit G2 slightly moves monotonically to the object side, and the fourth lens unit G4 moves to the image side. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

Figure 73:
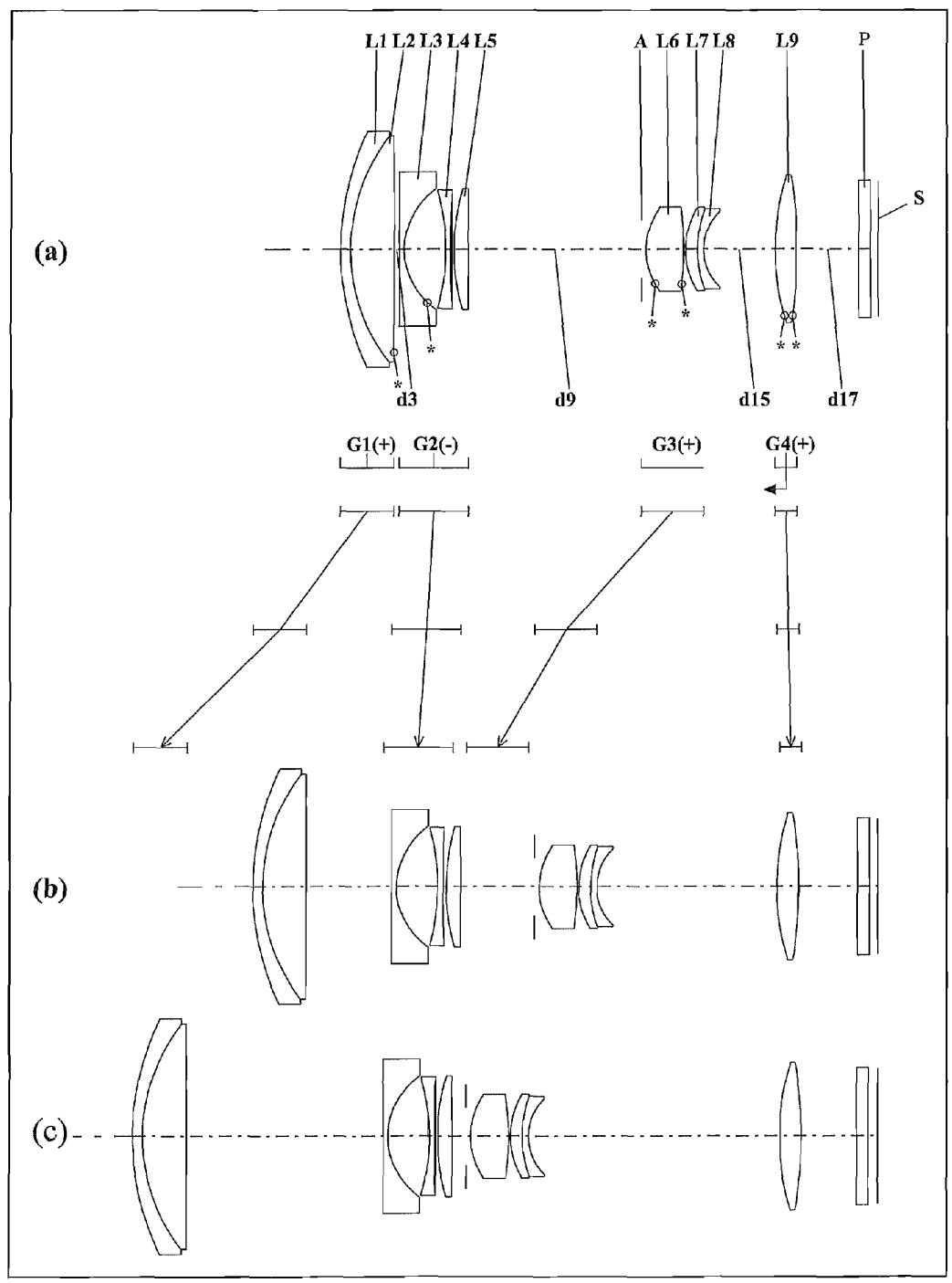
FIG. 73 is a lens arrangement diagram showing an infinity in-focus condition of a zoom lens system according to Embodiment IV-5 (Example IV-5)
Figure 74:
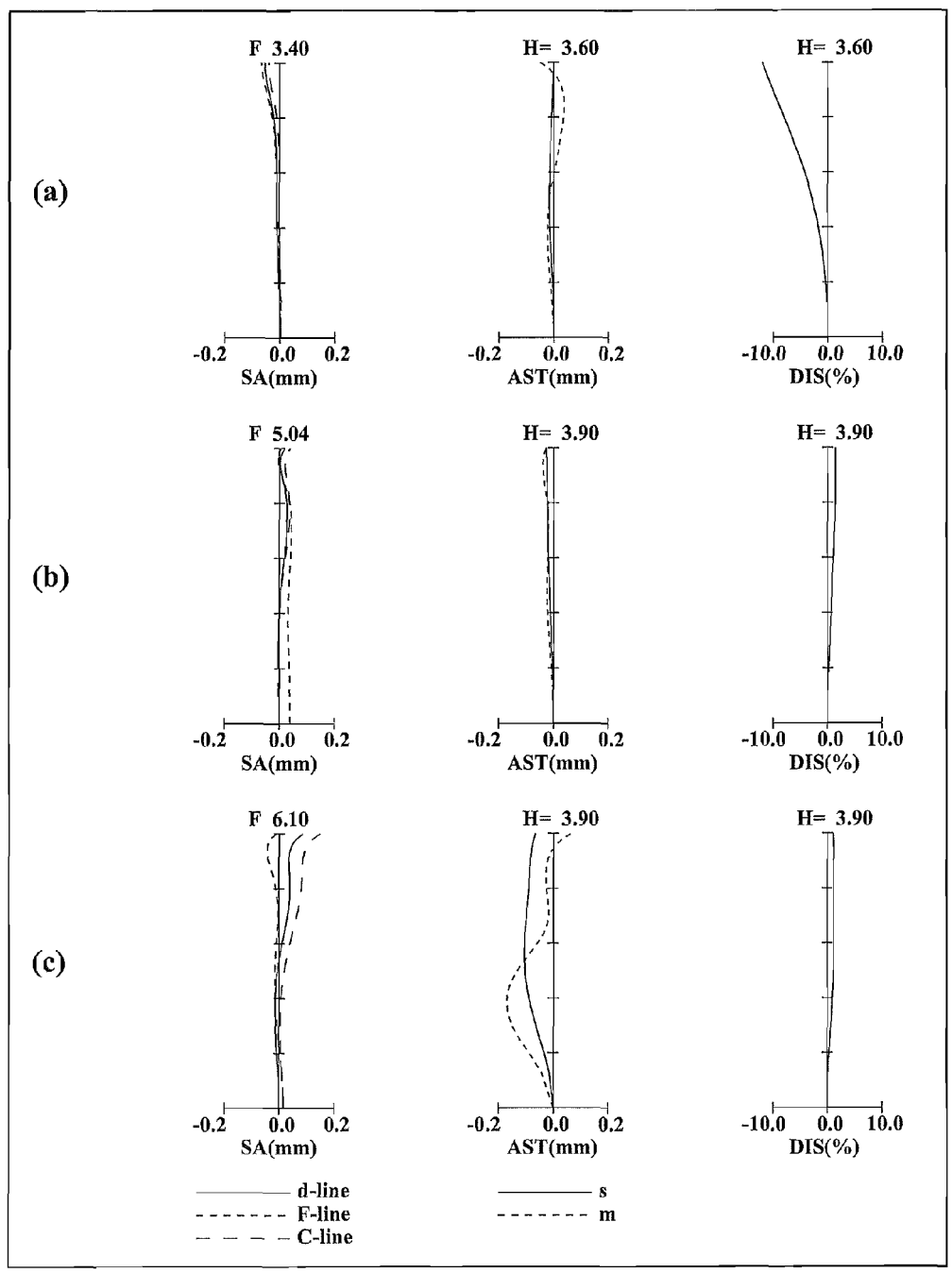
FIG. 74 is a longitudinal aberration diagram of an infinity in-focus condition of a zoom lens system according to Example IV-5.
Figure 75:
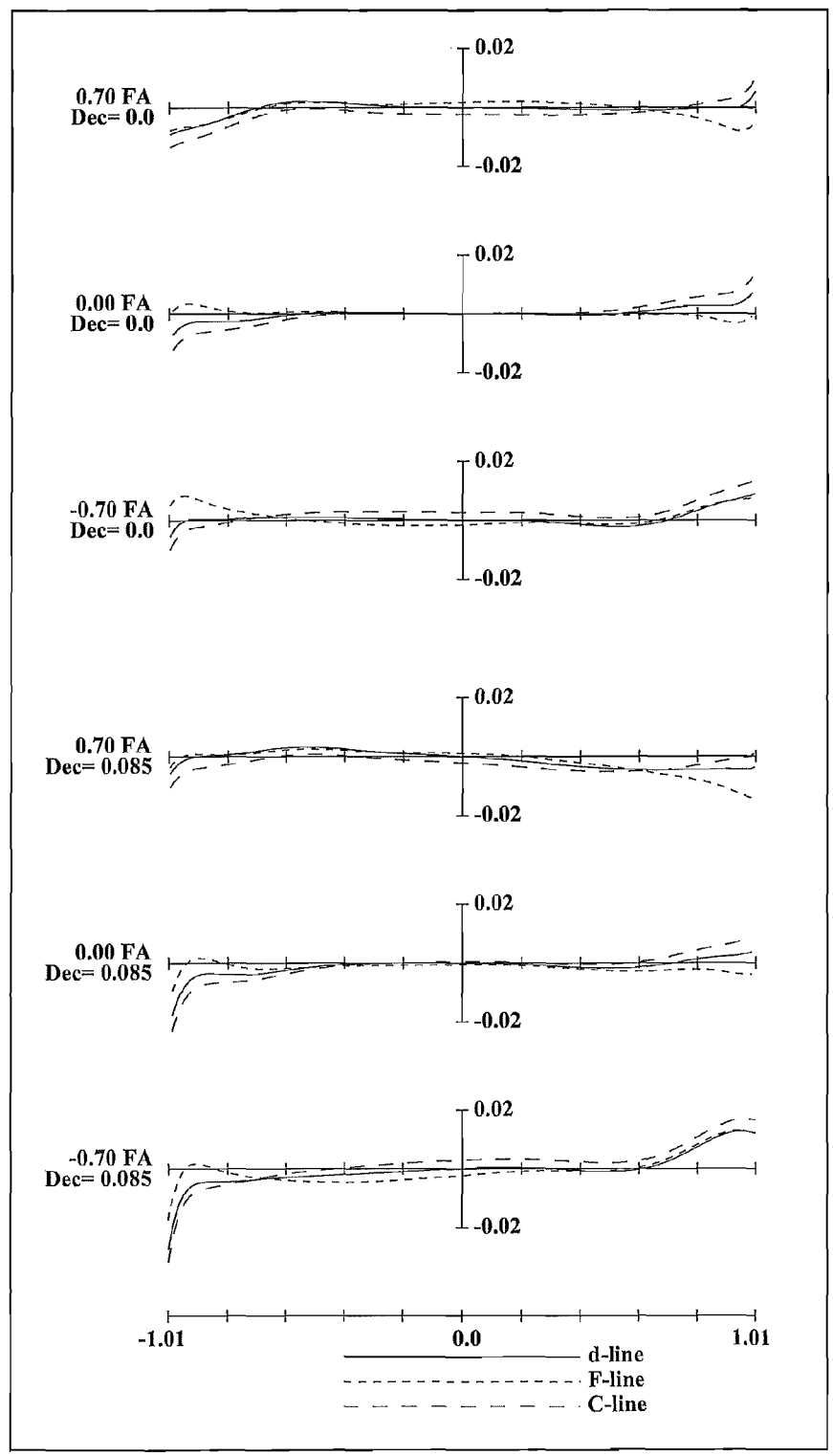
FIG. 75 is a lateral aberration diagram of a zoom lens system according to Example IV-5 at a telephoto limit in a basic state where image blur compensation is not performed and in a blur compensation state.

As shown in FIG. 73, in the zoom lens system according to Embodiment IV-5, the first lens unit G1, in order from the object side to the image side, comprises: a negative meniscus first lens element L1 with the convex surface facing the object side; and a bi-convex second lens element L2. The first lens element L1 and the second lens element L2 are cemented with each other. Further, the second lens element L2 has an aspheric image side surface.

Further, in the zoom lens system according to Embodiment IV-5, the second lens unit G2, in order from the object side to the image side, comprises a bi-concave third lens element L3, a bi-concave fourth lens element L4, and a bi-convex fifth lens element L5. Among these, the third lens element L3 has an aspheric image side surface.

Further, in the zoom lens system according to Embodiment IV-5, the third lens unit G3, in order from the object side to the image side, comprises: a bi-convex sixth lens element L6; a positive meniscus seventh lens element L7 with the convex surface facing the object side; and a negative meniscus eighth lens element L8 with the convex surface facing the object side. Among these, the seventh lens element L7 and the eighth lens element L8 are cemented with each other. Further, the sixth lens element L6 has two aspheric surfaces.

Further, in the zoom lens system according to Embodiment IV-5, the fourth lens unit G4 comprises solely a bi-convex ninth lens element L9. The ninth lens element L9 has two aspheric surfaces.

Here, in the zoom lens system according to Embodiment IV-5, a plane parallel plate P is provided on the object side relative to the image surface S (that is, between the image surface S and the ninth lens element L9).

In the zoom lens system according to Embodiment IV-5, in zooming from a wide-angle limit to a telephoto limit at the time of image taking, the first lens unit G1 and the third lens unit G3 move almost monotonically to the object side, the second lens unit G2 slightly moves monotonically to the object side, and the fourth lens unit G4 slightly moves monotonically to the image side. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

Figure 76:
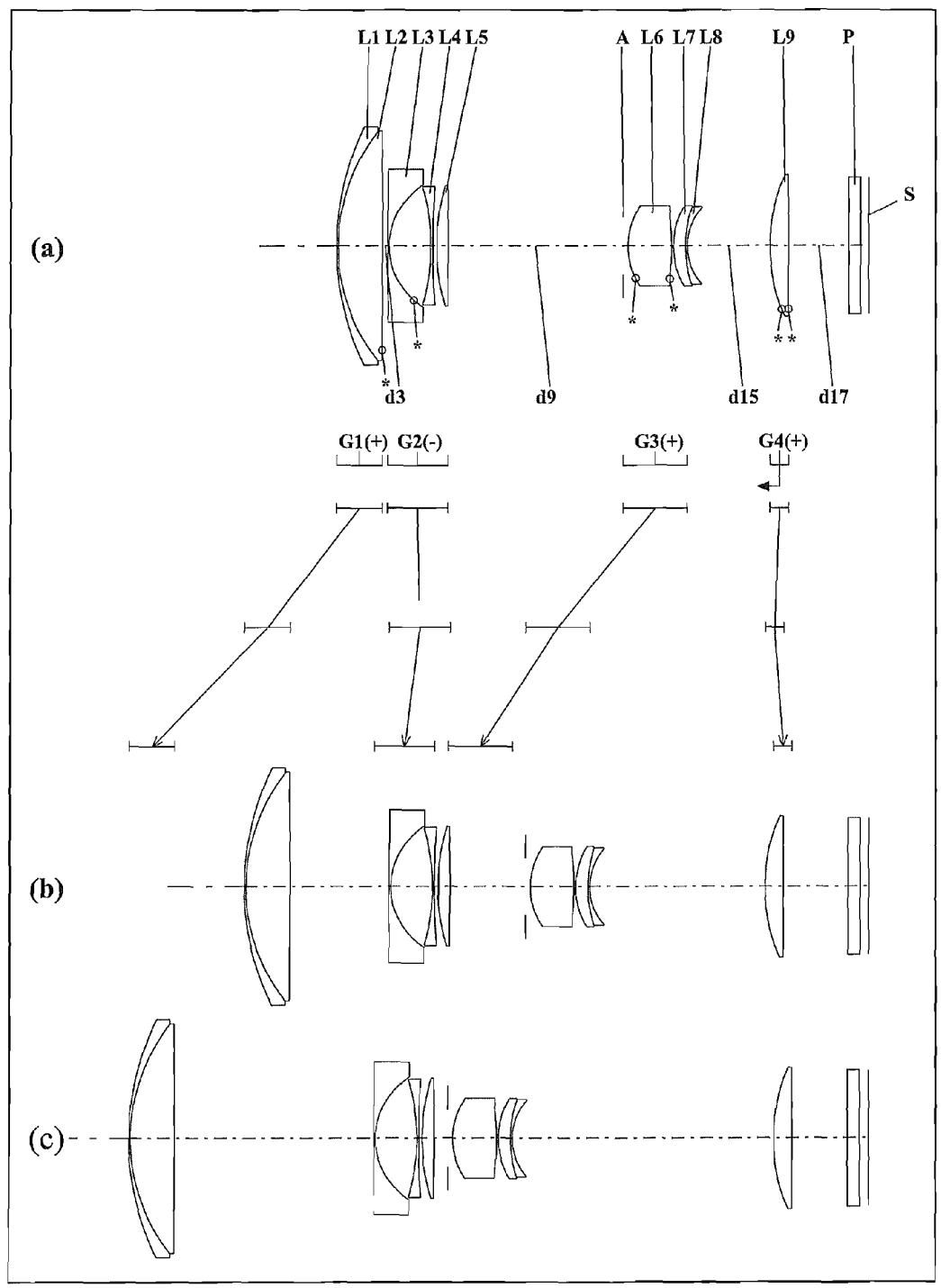
FIG. 76 is a lens arrangement diagram showing an infinity in-focus condition of a zoom lens system according to Embodiment IV-6 (Example IV-6)
Figure 77:
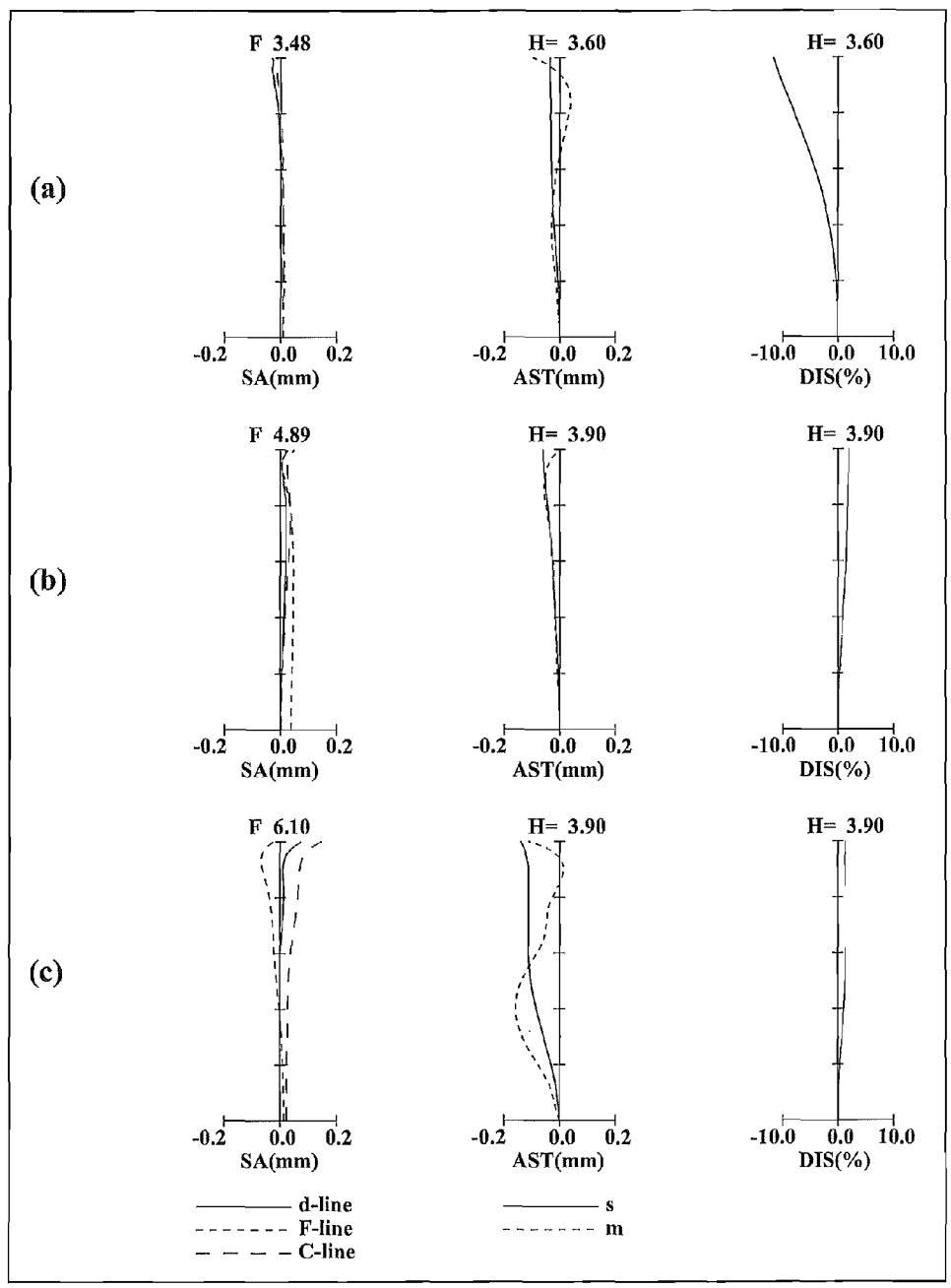
FIG. 77 is a longitudinal aberration diagram of an infinity in-focus condition of a zoom lens system according to Example IV-6.
Figure 78:
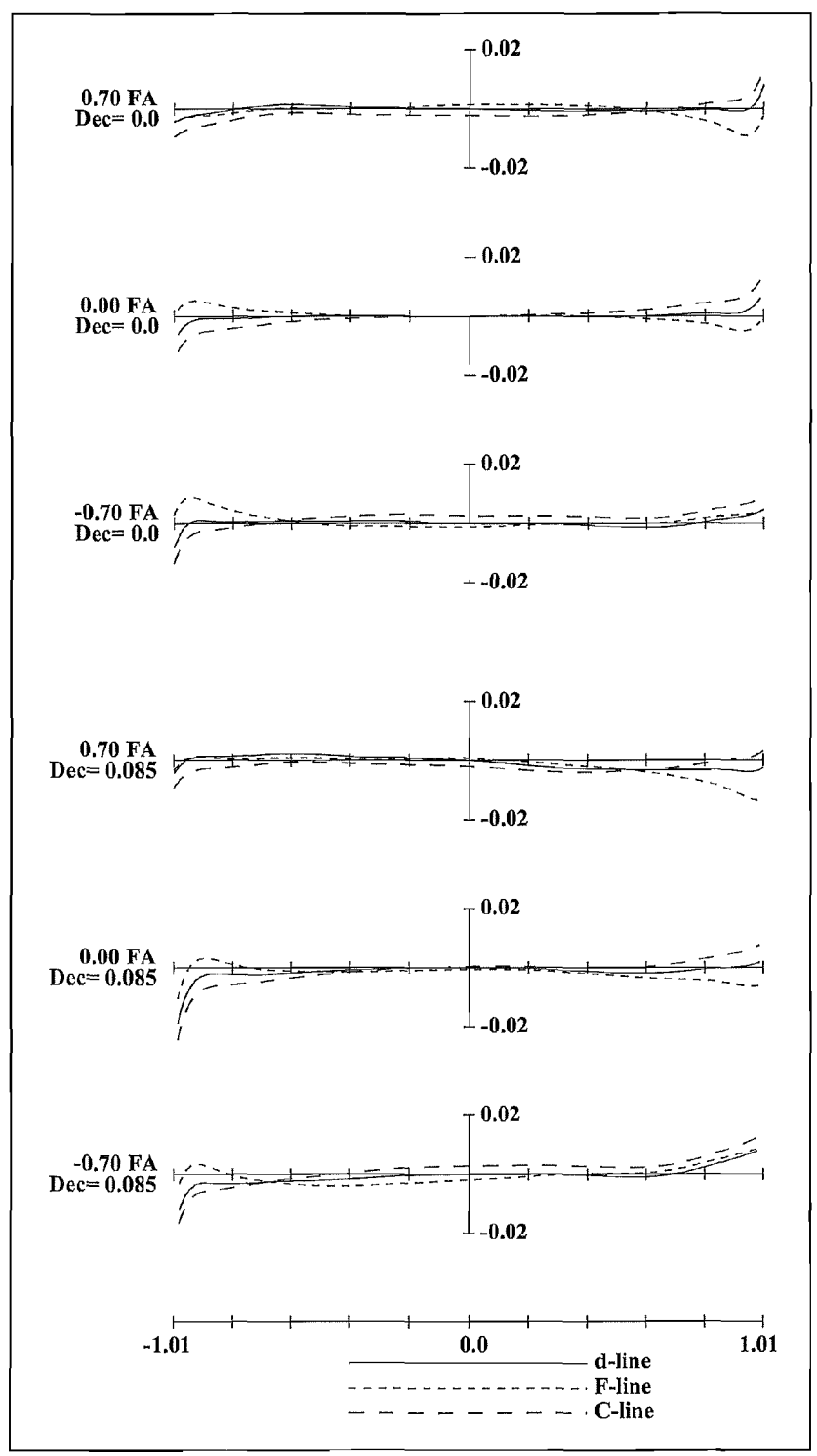
FIG. 78 is a lateral aberration diagram of a zoom lens system according to Example IV-6 at a telephoto limit in a basic state where image blur compensation is not performed and in a blur compensation state.

As shown in FIG. 76, in the zoom lens system according to Embodiment IV-6, the first lens unit G1, in order from the object side to the image side, comprises: a negative meniscus first lens element L1 with the convex surface facing the object side; and a bi-convex second lens element L2. The first lens element L1 and the second lens element L2 are cemented with each other. Further, the second lens element L2 has an aspheric image side surface.

In the zoom lens system according to Embodiment IV-6, the second lens unit G2, in order from the object side to the image side, comprises: a negative meniscus third lens element L3 with the convex surface facing the object side; a bi-concave fourth lens element L4; and a bi-convex fifth lens element L5. Among these, the third lens element L3 has an aspheric image side surface.

Further, in the zoom lens system according to Embodiment IV-6, the third lens unit G3, in order from the object side to the image side, comprises: a bi-convex sixth lens element L6; a positive meniscus seventh lens element L7 with the convex surface facing the object side; and a negative meniscus eighth lens element L8 with the convex surface facing the object side. Among these, the seventh lens element L7 and the eighth lens element L8 are cemented with each other. Further, the sixth lens element L6 has two aspheric surfaces.

Further, in the zoom lens system according to Embodiment IV-6, the fourth lens unit G4 comprises solely a bi-convex ninth lens element L9. The ninth lens element L9 has two aspheric surfaces.

Here, in the zoom lens system according to Embodiment IV-6, a plane parallel plate P is provided on the object side relative to the image surface S (that is, between the image surface S and the ninth lens element L9).

In the zoom lens system according to Embodiment IV-6, in zooming from a wide-angle limit to a telephoto limit at the time of image taking, the first lens unit G1 and the third lens unit G3 move almost monotonically to the object side, the second lens unit G2 moves to the object side with locus of a slight convex to the image side, and the fourth lens unit G4 moves to the image side with locus of a convex to the object side. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

Figure 79:
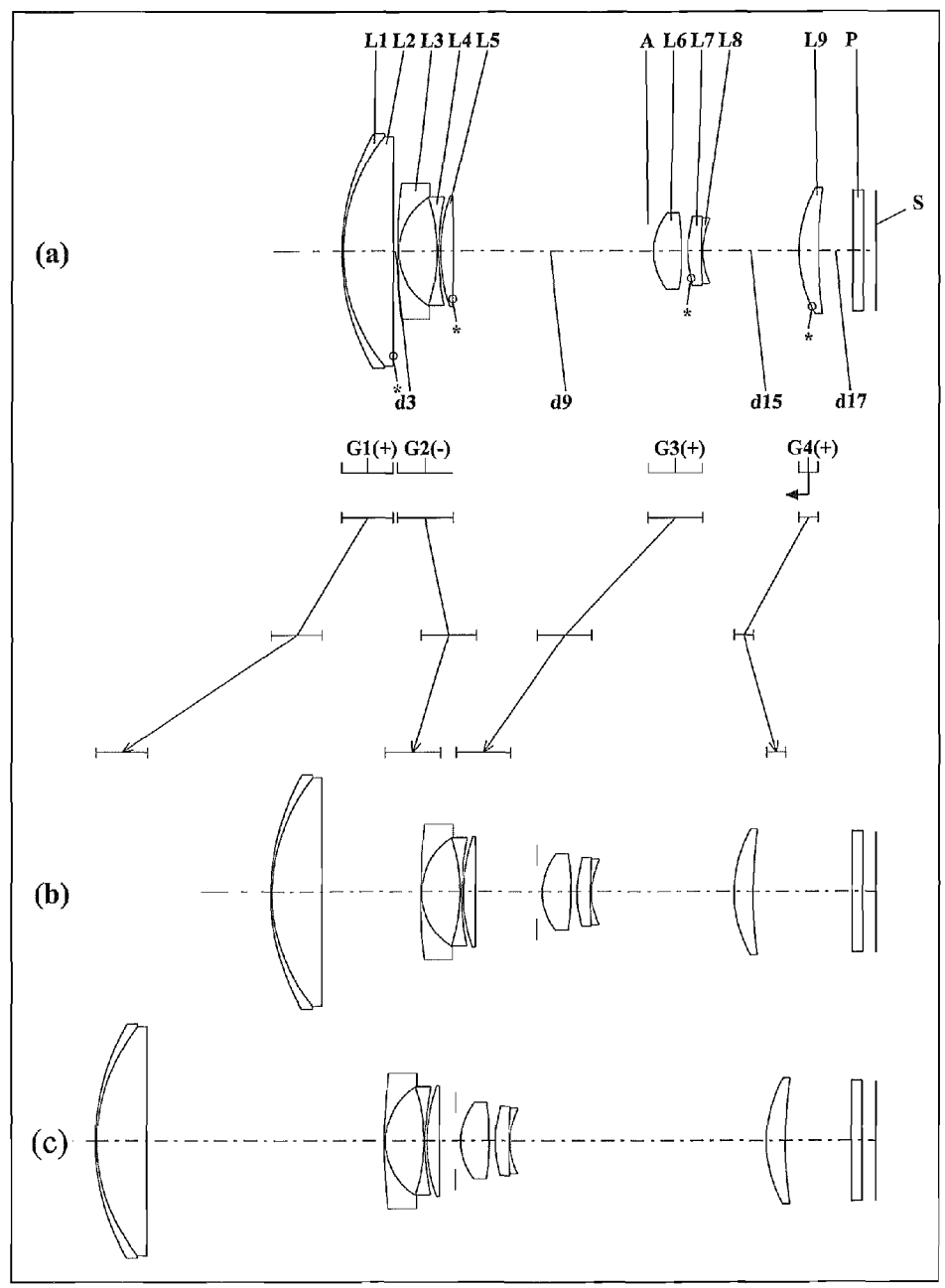
FIG. 79 is a lens arrangement diagram showing an infinity in-focus condition of a zoom lens system according to Embodiment IV-7 (Example IV-7)
Figure 80:
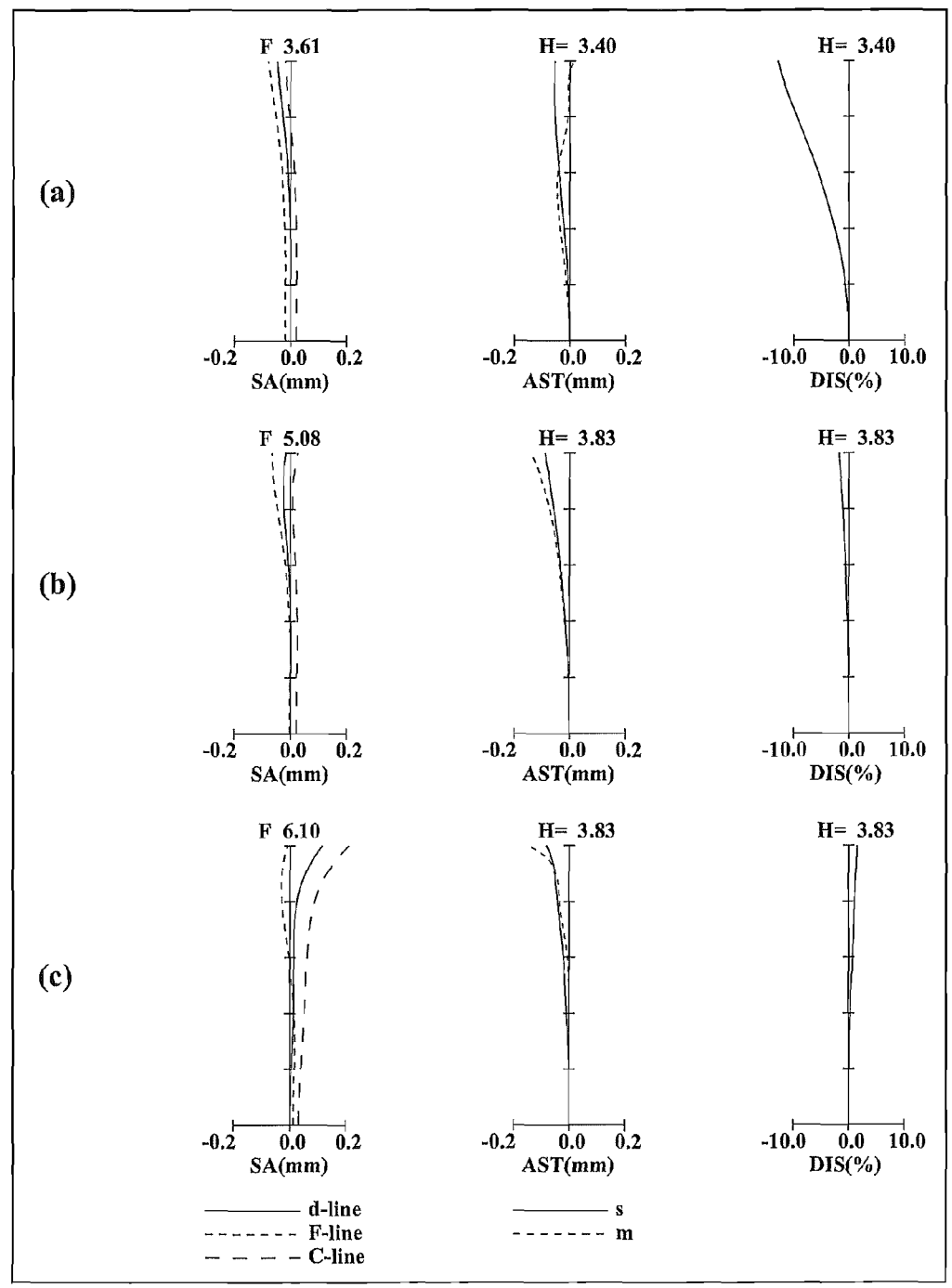
FIG. 80 is a longitudinal aberration diagram of an infinity in-focus condition of a zoom lens system according to Example IV-7.
Figure 81:
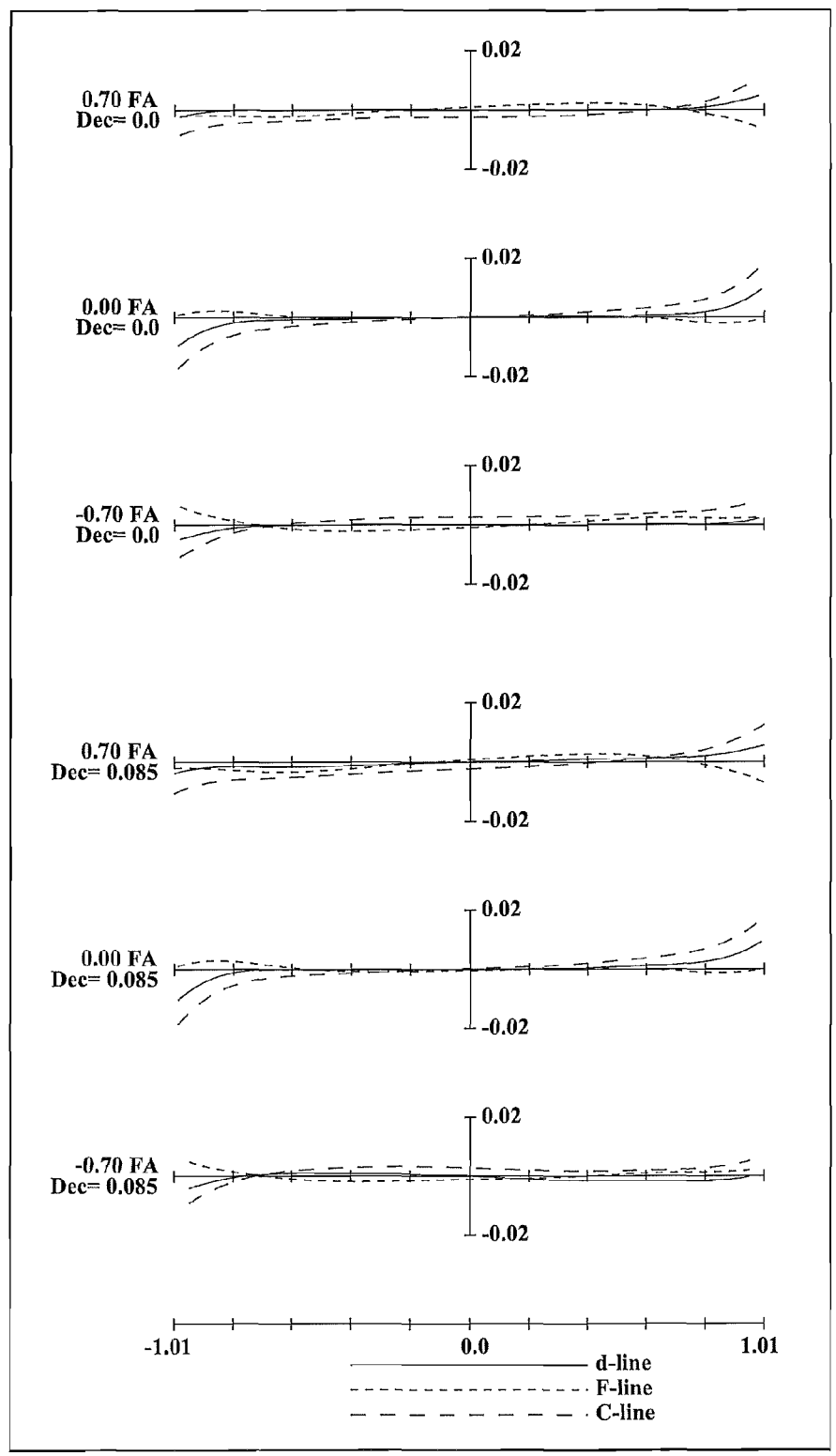
FIG. 81 is a lateral aberration diagram of a zoom lens system according to Example IV-7 at a telephoto limit in a basic state where image blur compensation is not performed and in a blur compensation state.

As shown in FIG. 79, in the zoom lens system according to Embodiment IV-7, the first lens unit G1, in order from the object side to the image side, comprises: a negative meniscus first lens element L1 with the convex surface facing the object side; and a bi-convex second lens element L2. The first lens element L1 and the second lens element L2 are cemented with each other. Further, the second lens element L2 has an aspheric image side surface.

In the zoom lens system according to Embodiment IV-7, the second lens unit G2, in order from the object side to the image side, comprises: a negative meniscus third lens element L3 with the convex surface facing the object side; a bi-concave fourth lens element L4; and a bi-convex fifth lens element L5. Among these, the fifth lens element L5 has an aspheric image side surface.

Further, in the zoom lens system according to Embodiment IV-7, the third lens unit G3, in order from the object side to the image side, comprises: a bi-convex sixth lens element L6; a positive meniscus seventh lens element L7 with the convex surface facing the object side; and a negative meniscus eighth lens element L8 with the convex surface facing the object side. Among these, the seventh lens element L7 and the eighth lens element L8 are cemented with each other. Further, the seventh lens element L7 has an aspheric object side surface.

Further, in the zoom lens system according to Embodiment IV-7, the fourth lens unit G4 comprises solely a positive meniscus ninth lens element L9 with the convex surface facing the object side. The ninth lens element L9 has an aspheric object side surface.

Here, in the zoom lens system according to Embodiment IV-7, a plane parallel plate P is provided on the object side relative to the image surface S (that is, between the image surface S and the ninth lens element L9).

In the zoom lens system according to Embodiment IV-7, in zooming from a wide-angle limit to a telephoto limit at the time of image taking, the first lens unit G1 moves to the object side, the second lens unit G2 moves to the object side with locus of a convex to the image side, the third lens unit G3 moves monotonically to the object side, and the fourth lens unit G4 moves with locus of a convex to the object side such that the position at a telephoto limit is located on the object side relative to the position at a wide-angle limit. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

In the zoom lens system according to Embodiments IV-1 to IV-7, the first lens unit G1 is composed of two lens elements while the fourth lens unit G4 is composed of one lens element. Thus, the lens system has a remarkably short overall length of lens system.

In the zoom lens system according to Embodiments IV-1 to IV-7, the first lens unit G1, in order from the object side to the image side, comprises a first lens element L1 having negative optical power and a second lens element L2 having positive optical power. Further, these lens elements are cemented with each other so that a cemented lens element is formed. Thus, a more compact lens system is achieved. Furthermore, the image side surface of the second lens element L2 is aspheric. This permits satisfactory suppression of an increase in distortion and astigmatism caused by a wide angle construction and a high variable magnification construction.

In the zoom lens system according to Embodiments IV-1 to IV-7, the one lens element constituting the fourth lens unit G4 has positive optical power. Thus, at the time of focusing from an infinite-distance object to a short-distance object, as shown in each FIG., the fourth lens unit G4 is moved to the object side so that rapid focusing is achieved easily. Further, the one lens element constituting the fourth lens unit G4 has an aspheric surface. This permits satisfactory compensation of curvature of off-axial field over the range from a wide-angle limit to a telephoto limit.

Further, in the zoom lens system according to Embodiments IV-1 to IV-7, in zooming from a wide-angle limit to a telephoto limit at the time of image taking, the first lens unit G1, the second lens unit G2, the third lens unit G3 and the fourth lens unit G4 are moved individually along the optical axis so that zooming is achieved. Then, any lens unit among the first lens unit G1, the second lens unit G2, the third lens unit G3 and the fourth lens unit G4, or alternatively a sub lens unit consisting of a part of a lens unit is moved in a direction perpendicular to the optical axis so that image point movement caused by vibration of the entire system is compensated, that is, image blur caused by hand blurring, vibration and the like can be compensated optically.

When image point movement caused by vibration of the entire system is to be compensated, for example, the third lens unit G3 is moved in a direction perpendicular to the optical axis, so that image blur is compensated in a state that size increase in the entire zoom lens system is suppressed and a compact construction is realized and that excellent imaging characteristics such as small decentering coma aberration and decentering astigmatism are satisfied.

Here, in a case that a lens unit is composed of a plurality of lens elements, the above-mentioned sub lens unit consisting of a part of a lens unit indicates any one lens element or alternatively a plurality of adjacent lens elements among the plurality of lens elements.

The following description is given for preferable conditions to be satisfied by a zoom lens system like the zoom lens system according to Embodiments I-1 to I-7, a zoom lens system like the zoom lens system according to Embodiments II-1 to II-6, a zoom lens system like the zoom lens system according to Embodiments III-1 to III-6, and a zoom lens system like the zoom lens system according to Embodiments IV-1 to IV-7. Here, a plurality of preferable conditions are set forth for the zoom lens system according to each embodiment. A construction that satisfies all the plural conditions is most desirable for the zoom lens system. However, when an individual condition is satisfied, a zoom lens system having the corresponding effect is obtained.

In a zoom lens system like the zoom lens system according to Embodiments I-1 to I-7, in order from the object side to the image side, comprising: a first lens unit having positive optical power, a second lens unit having negative optical power, a third lens unit having positive optical power, and a fourth lens unit having positive optical power (this lens configuration is referred to as basic configuration I of the embodiments, hereinafter), the following conditions (1-1), (a) and (b) are satisfied.

$$-0.60 < M_2/f_{G2} < -0.07 \qquad (1\text{-}1)$$

$$\omega_W \geq 30 \qquad (a)$$

$$f_T/f_W \geq 4.5 \qquad (b)$$

where, $M_2$ is an amount of axial movement of the second lens unit in zooming from a wide-angle limit to a telephoto limit (the wide-angle limit is adopted as a reference position, and movement from the image side to the object side is defined as positive), $f_{G2}$ is a composite focal length of the second lens unit, $\omega_W$ is a half view angle (°) at a wide-angle limit, $f_T$ is a focal length of the entire system at a telephoto limit, and $f_W$ is a focal length of the entire system at a wide-angle limit.

The condition (1-1) sets forth the amount of movement of the second lens unit in the optical axis direction in zooming from a wide-angle limit to a telephoto limit. When the value goes below the lower limit of the condition (1-1), contribution to variable magnification by the second lens unit is excessively small. This causes large fluctuation in spherical aberration in association with zooming. In contrast, when the value exceeds the upper limit of the condition (1-1), contribution to variable magnification by the second lens unit is excessively large. This causes large distortion at a wide-angle limit.

Here, when at least one of the following conditions (1-1)' and (1-1)" is satisfied, the above-mentioned effect is achieved more successfully.

$$-0.40 \geq M_2/f_{G2} \qquad (1\text{-}1)'$$

$$M_2/f_{G2} < -0.10 \qquad (1\text{-}1)'$$

Further, it is more preferable that the conditions (1-1), (1-1)' and (1-1)" are satisfied under at least one of the following conditions (a)' and (b)'.

$$\omega_W \geq 35 \qquad (a)'$$

$$f_T/f_W \geq 6.5 \qquad (b)'$$

In a zoom lens system like the zoom lens system according to Embodiments II-1 to II-6, in order from the object side to the image side, comprising a first lens unit having positive optical power, a second lens unit having negative optical power, a third lens unit having positive optical power, and a fourth lens unit having positive optical power (this lens configuration is referred to as basic configuration II of the embodiments, hereinafter), at least one lens element constituting the second lens unit satisfies the following condition (1-2), and the following conditions (a) and (b) are satisfied.

$$11.8 < f_W/t_{LG2} < 500.0 \tag{1-2}$$

$$\omega_W \geq 30 \tag{a}$$

$$f_T/f_W \geq 4.5 \tag{b}$$

where, $t_{LG2}$ is a center thickness of the lens elements constituting the second lens unit, $\omega_W$ is a half view angle (°) at a wide-angle limit, $f_T$ is a focal length of the entire system at a telephoto limit, and $f_W$ is a focal length of the entire system at a wide-angle limit.

The condition (1-2) sets forth the optical axial thickness of the lens elements constituting the second lens unit. When the value goes below the lower limit of the condition (1-2), achievement of a wide angle construction becomes difficult. In contrast, when the value exceeds the upper limit of the condition (1-2), control of distortion at a wide-angle limit becomes difficult Here, when at least one of the following conditions (1-2)' and (1-2)'' is satisfied, the above-mentioned effect is achieved more successfully.

$$13.0 < f_W/t_{LG2} \tag{1-2}'$$

$$f_W/t_{LG2} < 200.0 \tag{1-2}'$$

Further, it is more preferable that the conditions (1-2), (1-2)' and (1-2)'' are satisfied under at least one of the following conditions (a)' and (b)'.

$$\omega_W \geq 35 \tag{a}'$$

$$f_T/f_W \geq 6.5 \tag{b}'$$

In a zoom lens system like the zoom lens system according to Embodiments III-1 to III-6, in order from the object side to the image side, comprising a first lens unit having positive optical power, a second lens unit having negative optical power, a third lens unit having positive optical power, and a fourth lens unit having positive optical power in which the third lens unit includes at least one set of cemented lens element (this lens configuration is referred to as basic configuration III of the embodiments, hereinafter), the following conditions (1-3), (8), (a) and (b) are satisfied.

$$53 < (f_T/f_W) \times f_{G1}/t_{G1} < 900 \tag{1-3}$$

$$0.15 < t_{G3ce}/t_{G3} < 0.39 \tag{8}$$

$$\omega_W \geq 30 \tag{a}$$

$$f_T/f_W \geq 4.5 \tag{b}$$

where, $f_{G1}$ is a composite focal length of the first lens unit, $t_{G1}$ is a thickness of the first lens unit (an optical axial distance measured from the object side surface of the most object side lens element to the image side surface of the most image side lens element), $t_{G3ce}$ is a center thickness of the cemented lens element of the third lens unit, $t_{G3}$ is a thickness of the third lens unit (an optical axial distance measured from the object side surface of the most object side lens element to the image side surface of the most image side lens element), $\omega_W$ is a half view angle (°) at a wide-angle limit, $f_T$ is a focal length of the entire system at a telephoto limit, and $f_W$ is a focal length of the entire system at a wide-angle limit.

The condition (1-3) sets forth the ratio between the focal length and the optical axial thickness of the first lens unit. When the value goes below the lower limit of the condition (1-3), the focal length of the first lens unit is excessively small. This causes difficulty in controlling fluctuation in curvature of field and astigmatism that occurs in association with zooming. In contrast, when the value exceeds the upper limit of the condition (1-3), the amount of movement of the first lens unit need be increased. This causes difficulty in achieving size reduction.

Here, when at least one of the following conditions (1-3)' and (1-3)'' is satisfied, the above-mentioned effect is achieved more successfully.

$$55 < (f_T/f_W) \times f_{G1}/t_{G1} \tag{1-3}'$$

$$(f_T/f_W) \times f_{G1}/f_{G1} < 500 \tag{1-3}'$$

Further, it is more preferable that the conditions (1-3), (1-3)' and (1-3)'' are satisfied under at least one of the following conditions (a)' and (b)'.

$$\omega_W \geq 35 \tag{a}'$$

$$f_T/f_W \geq 6.5 \tag{b}'$$

The condition (8) sets forth the optical axial thickness of the cemented lens element included in the third lens unit. When the value goes below the lower limit of the condition (8), difficulty arises in compensating fluctuation in axial chromatic aberration caused in association with zooming. In contrast, when the value exceeds the upper limit of the condition (8), difficulty arises in compensating magnification chromatic aberration and spherical aberration at a wide-angle limit.

Here, when at least one of the following conditions (8)' and (8)'' is satisfied, the above-mentioned effect is achieved more successfully.

$$0.30 < t_{G3ce}/t_{G3} \tag{8}'$$

$$t_{G3ce}/t_{G3} < 0.36 \tag{8}'$$

Further, it is more preferable that the conditions (8), (8)' and (8)'' are satisfied under at least one of the following conditions (a)' and (b)'.

$$\omega_W \geq 35 \tag{a}'$$

$$f_T/f_W \geq 6.5 \tag{b}'$$

In a zoom lens system like the zoom lens system according to Embodiments IV-1 to IV-7, in order from the object side to the image side, comprising: a first lens unit having positive optical power, a second lens unit having negative optical power, a third lens unit having positive optical power, and a fourth lens unit having positive optical power (this lens configuration is referred to as basic configuration IV of the embodiments, hereinafter), the following conditions (1-4), (6), (a) and (b) are satisfied.

$$83 < (f_T/f_W) \times f_{G4}/t_{G4} < 900 \quad (1\text{-}4)$$

$$4.0 < f_{G4}/f_W < 8.0 \quad (6)$$

$$\omega_W \geq 30 \quad (a)$$

$$f_T/f_W \geq 4.5 \quad (b)$$

where, $f_{G4}$ is a composite focal length of the fourth lens unit, $t_{G4}$ is a thickness of the fourth lens unit (an optical axial distance measured from the object side surface of the most object side lens element to the image side surface of the most image side lens element), $\omega_W$ is a half view angle (°) at a wide-angle limit, $f_T$ is a focal length of the entire system at a telephoto limit, and $f_W$ is a focal length of the entire system at a wide-angle limit.

The condition (1-4) sets forth the ratio between the focal length and the optical axial thickness of the fourth lens unit. When the value goes below the lower limit of the condition (1-4), allowance to the occurrence of curvature of field at the time of short-distance object image taking becomes small. In contrast, when the value exceeds the upper limit of the condition (1-4), the amount of movement of the fourth lens unit need be increased. This causes difficulty in achieving size reduction.

Here, when at least one of the following conditions (1-4)' and (1-4)" is satisfied, the above-mentioned effect is achieved more successfully.

$$95 < (f_T/f_W) \times f_{G4}/t_{G4} \quad (1\text{-}4)'$$

$$(f_T/f_W) \times f_{G4}/t_{G4} < 300 \quad (1\text{-}4)'$$

Further, it is more preferable that the conditions (1-4), (1-4)' and (1-4)" are satisfied under at least one of the following conditions (a)' and (b)'.

$$\omega_W \geq 35 \quad (a)'$$

$$f_T/f_W \geq 6.5 \quad (b)'$$

The condition (6) sets forth a suitable focal length for the fourth lens unit. When the value goes below the lower limit of the condition (6), curvature of field is generated at an unallowable level at the time of short-distance object image taking. In contrast, when the value exceeds the upper limit of the condition (6), the amount of movement of the fourth lens unit need be increased. This causes difficulty in achieving size reduction.

Here, when at least one of the following conditions (6)' and (6)" is satisfied, the above-mentioned effect is achieved more successfully.

$$4.5 < f_{G4}/f_W \quad (6)'$$

$$f_{G4}/f_W < 6.0 \quad (6)'$$

Further, it is more preferable that the conditions (6), (6)' and (6)" are satisfied under at least one of the following conditions (a)' and (b)'.

$$\omega_W \geq 35 \quad (a)'$$

$$f_T/f_W \geq 6.5 \quad (b)'$$

In a zoom lens system having basic configuration I like the zoom lens system according to Embodiments I-1 to I-7, in a zoom lens system having basic configuration II like the zoom lens system according to Embodiments II-1 to II-6, in a zoom lens system having basic configuration III like the zoom lens system according to Embodiments III-1 to III-6, and in a zoom lens system having basic configuration IV like the zoom lens system according to Embodiments IV-1 to IV-7, it is preferable that the following condition (2) is satisfied.

$$1.15 < M_3/f_{G3} < 1.80 \quad (2)$$

where, $M_3$ is an amount of axial movement of the third lens unit in zooming from a wide-angle limit to a telephoto limit (the wide-angle limit is adopted as a reference position, and movement from the image side to the object side is defined as positive), and $f_{G3}$ is a composite focal length of the third lens unit.

The condition (2) sets forth the amount of movement of the third lens unit in the optical axis direction in zooming from a wide-angle limit to a telephoto limit. When the value goes below the lower limit of the condition (2), a possibility arises that control of fluctuation in spherical aberration caused in association with zooming becomes difficult. In contrast, when the value exceeds the upper limit of the condition (2), a possibility arises that the F-number at a telephoto limit is excessively high.

Here, when at least one of the following conditions (2)' and (2)" is satisfied, the above-mentioned effect is achieved more successfully.

$$1.20 < M_3/f_{G3} \quad (2)'$$

$$M_3/f_{G3} < 1.60 \quad (2)'$$

Further, it is more preferable that the conditions (2), (2)' and (2)" are satisfied under at least one of the following conditions (a)' and (b)'.

$$\omega_W \geq 35 \quad (a)'$$

$$f_T/f_W \geq 6.5 \quad (b)'$$

In a zoom lens system having basic configuration I like the zoom lens system according to Embodiments I-1 to I-7, in a zoom lens system having basic configuration II like the zoom lens system according to Embodiments II-1 to II-6, in a zoom lens system having basic configuration III like the zoom lens system according to Embodiments III-1 to III-6, and in a zoom lens system having basic configuration IV like the zoom lens system according to Embodiments IV-1 to IV-7, it is preferable that the following condition (3) is satisfied.

$$0.050 < (\beta_{4T}/\beta_{4W})/(f_T/f_W) < 0.155 \quad (3)$$

where, $\beta_{4T}$ is a lateral magnification of the fourth lens unit at a telephoto limit, $\beta_{4W}$ is a lateral magnification of the fourth lens unit at a wide-angle limit, $f_T$ is a focal length of the entire system at a telephoto limit, and $f_w$ is a focal length of the entire system at a wide-angle limit.

The condition (3) sets forth the ratio between the lateral magnification change of the fourth lens unit and the zooming ratio. When the value goes below the lower limit of the condition (3), contribution to variable magnification by the fourth lens unit is excessively small. This causes a possibility of difficulty in achieving size reduction. In contrast, when the value exceeds the upper limit of the condition (3), a possibility arises that curvature of field is generated at an unallowable level at the time of short-distance object image taking.

Here, when at least one of the following conditions (3)' and (3)" is satisfied, the above-mentioned effect is achieved more successfully.

$$0.070 < (\beta_{4T}/\beta_{4W})/(f_T/f_W) \quad (3)'$$

$$(\beta_{4T}/\beta_{4W})/(f_T/f_W) < 0.145 \quad (3)''$$

Further, it is more preferable that the conditions (3), (3)' and (3)" are satisfied under at least one of the following conditions (a)' and (b)'.

$$\omega_W \geq 35 \quad (a)'$$

$$f_T/f_W \geq 6.5 \quad (b)'$$

In a zoom lens system having basic configuration I like the zoom lens system according to Embodiments I-1 to I-7, in a zoom lens system having basic configuration II like the zoom lens system according to Embodiments II-1 to II-6, in a zoom lens system having basic configuration III like the zoom lens system according to Embodiments III-1 to III-6, and in a zoom lens system having basic configuration IV like the zoom lens system according to Embodiments IV-1 to IV-7, it is preferable that the following condition (4) is satisfied.

$$5.3 < \{f_{G3} \times (f_T/f_W)\}/\sqrt{(f_W \times f_T)} < 7.5 \quad (4)$$

where, $f_{G3}$ is a composite focal length of the third lens unit, $f_T$ is a focal length of the entire system at a telephoto limit, and $f_W$ is a focal length of the entire system at a wide-angle limit.

The condition (4) sets forth a suitable focal length for the third lens unit. When the value goes below the lower limit of the condition (4), the focal length of the third lens unit is excessively small. This causes a possibility of difficulty in controlling fluctuation in spherical aberration that occurs in association with zooming. In contrast, when the value exceeds the upper limit of the condition (4), the amount of movement of the third lens unit need be increased. This causes a possibility of difficulty in achieving size reduction.

Here, when at least one of the following conditions (4)' and (4)" is satisfied, the above-mentioned effect is achieved more successfully.

$$5.4 < \{f_{G3} \times (f_T/f_W)\}/\sqrt{(f_W \times f_T)} < 7.5 \quad (4)'$$

$$\{f_{G3} \times (f_T/f_W)\}/\sqrt{(f_W \times f_T)} < 6.5 \quad (4)''$$

Further, it is more preferable that the conditions (4), (4)' and (4)" are satisfied under at least one of the following conditions (a)' and (b)'.

$$\omega_W \geq 35 \quad (a)'$$

$$f_T/f_W \geq 6.5 \quad (b)'$$

In a zoom lens system having basic configuration I like the zoom lens system according to Embodiments I-1 to I-7, in a zoom lens system having basic configuration II like the zoom lens system according to Embodiments II-1 to II-6, in a zoom lens system having basic configuration III like the zoom lens system according to Embodiments III-1 to III-6, and in a zoom lens system having basic configuration IV like the zoom lens system according to Embodiments IV-1 to IV-7, it is preferable that the following condition (5) is satisfied.

$$10.6 < \{f_{G4} \times (f_T/f_W)\}/\sqrt{(f_W \times f_T)} < 35.0 \quad (5)$$

where, $f_{G4}$ is a composite focal length of the fourth lens unit, $f_T$ is a focal length of the entire system at a telephoto limit, and $f_W$ is a focal length of the entire system at a wide-angle limit.

The condition (5) sets forth a suitable focal length for the fourth lens unit. When the value goes below the lower limit of the condition (5), a possibility arises that curvature of field is generated at an unallowable level at the time of short-distance object image taking. In contrast, when the value exceeds the upper limit of the condition (5), the amount of movement of the fourth lens unit need be increased. This causes a possibility of difficulty in achieving size reduction.

Here, when at least one of the following conditions (5)' and (5)" is satisfied, the above-mentioned effect is achieved more successfully.

$$12.0 < \{f_{G4} \times (f_T/f_W)\}/\sqrt{(f_W \times f_T)} \quad (5)'$$

$$\{f_{G4} \times (f_T/f_W)\}/\sqrt{(f_W \times f_T)} < 15.0 \quad (5)''$$

Further, it is more preferable that the conditions (5), (5)' and (5)" are satisfied under at least one of the following conditions (a)' and (b)'.

$$\omega_W \geq 35 \quad (a)'$$

$$f_T/f_W \geq 6.5 \quad (b)'$$

In a zoom lens system having the basic configuration I like the zoom lens system according to Embodiments I-1 to I-7, in a zoom lens system having the basic configuration II like the zoom lens system according to Embodiments II-1 to II-6, and in a zoom lens system having the basic configuration III like the zoom lens system according to Embodiments III-1 to III-6, it is preferable that the following condition (6) is satisfied.

$$4.0 < f_{G4}/f_W < 8.0 \quad (6)$$

where, $f_{G4}$ is a composite focal length of the fourth lens unit, $f_T$ is a focal length of the entire system at a telephoto limit, and $f_W$ is a focal length of the entire system at a wide-angle limit.

The condition (6) also sets forth a suitable focal length for the fourth lens unit. When the value goes below the lower limit of the condition (6), a possibility arises that curvature of field is generated at an unallowable level at the time of short-distance object image taking. In contrast, when the value exceeds the upper limit of the condition (6), the amount of movement of the fourth lens unit need be increased. This causes a possibility of difficulty in achieving size reduction.

Here, when at least one of the following conditions (6)' and (6)" is satisfied, the above-mentioned effect is achieved more successfully.

$$4.5 < f_{G4}/f_W \quad (6)'$$

$$f_{G4}/f_W < 6.0 \quad (6)''$$

Further, it is more preferable that the conditions (6), (6)' and (6)" are satisfied under at least one of the following conditions (a)' and (b)'.

$$\omega_W \geq 35 \quad (a)'$$

$$f_T/f_W \geq 6.5 \quad (b)'$$

In a zoom lens system having basic configuration I like the zoom lens system according to Embodiments I-1 to I-7, in a zoom lens system having basic configuration II like the zoom lens system according to Embodiments II-1 to II-6, in a zoom lens system having basic configuration III like the zoom lens system according to Embodiments III-1 to III-6, and in a zoom lens system having basic configuration IV like the zoom lens system according to Embodiments IV-1 to IV-7, it is preferable that the following condition (7) is satisfied.

$$0.47 < M_1/f_{G1} < 0.70 \quad (7)$$

where, $M_1$ is an amount of axial movement of the first lens unit in zooming from a wide-angle limit to a telephoto limit (the wide-angle limit is adopted as a reference position, and movement from the image side to the object side is defined as positive), and $f_{G1}$ is a composite focal length of the first lens unit.

The condition (7) sets forth the amount of movement of the first lens unit in the optical axis direction in zooming from a wide-angle limit to a telephoto limit. When the value goes below the lower limit of the condition (7), a possibility of difficulty arises in control of distortion at a wide-angle limit and in control of curvature of field and astigmatism at a telephoto limit. In contrast, when the value exceeds the upper limit of the condition (7), a possibility arises that control of fluctuation in curvature of field caused in association with zooming becomes difficult.

Here, when at least one of the following conditions (7)' and (7)" is satisfied, the above-mentioned effect is achieved more successfully.

$$0.50 < M_1/f_{G1} \quad (7)'$$

$$M_1/f_{G1} < 0.60 \quad (7)'$$

Further, it is more preferable that the conditions (7), (7)' and (7)" are satisfied under at least one of the following conditions (a)' and (b)'.

$$\omega_W \geq 35 \quad (a)'$$

$$f_T/f_W \geq 6.5 \quad (b)'$$

In a zoom lens system like the zoom lens system according to Embodiments I-1 to I-7 that has basic configuration I and has a third lens unit including at least one set of cemented lens element, in a zoom lens system like the zoom lens system according to Embodiments II-1 to II-6 that has basic configuration II and has a third lens unit including at least one set of cemented lens element, and in a zoom lens system like the zoom lens system according to Embodiments IV-1 to IV-7 that has basic configuration IV and has a third lens unit including at least one set of cemented lens element, it is preferable that the following condition (8) is satisfied.

$$0.15 < t_{G3ce}/t_{G3} < 0.39 \quad (8)$$

where, $t_{G3ce}$ is a center thickness of the cemented lens element of the third lens unit, and $t_{G3}$ is a thickness of the third lens unit (an optical axial distance measured from the object side surface of the most object side lens element to the image side surface of the most image side lens element).

The condition (8) sets forth the optical axial thickness of the cemented lens element included in the third lens unit. When the value goes below the lower limit of the condition (8), a possibility of difficulty arises in compensating fluctuation in axial chromatic aberration caused in association with zooming. In contrast, when the value exceeds the upper limit of the condition (8), a possibility of difficulty arises in compensating magnification chromatic aberration and spherical aberration at a wide-angle limit.

Here, when at least one of the following conditions (8)' and (8)" is satisfied, the above-mentioned effect is achieved more successfully.

$$0.30 < t_{G3ce}/t_{G3} \quad (8)'$$

$$t_{G3ce}/t_{G3} < 0.36 \quad (8)'$$

Further, it is more preferable that the conditions (8), (8)' and (8)" are satisfied under at least one of the following conditions (a)' and (b)'.

$$\omega_W \geq 35 \quad (a)'$$

$$f_T/f_W \geq 6.5 \quad (b)'$$

In a zoom lens system having basic configuration I like the zoom lens system according to Embodiments I-1 to I-7, in a zoom lens system having basic configuration II like the zoom lens system according to Embodiments II-1 to II-6, in a zoom lens system having basic configuration III like the zoom lens system according to Embodiments III-1 to III-6, and in a zoom lens system having basic configuration IV like the zoom lens system according to Embodiments IV-1 to IV-7, it is preferable that the following condition (9) is satisfied.

$$-0.30 < f_{G2}/f_{AIR} < -0.12 \quad (9)$$

where, $f_{G2}$ is a composite focal length of the second lens unit, and $f_{AIR}$ is a focal length of an air lens formed between the object side surface of the most image side lens element and the image side surface of the lens element adjacent to the most image side lens element in the second lens unit.

The condition (9) sets forth the focal length of an air lens formed, in the second lens unit, between the most image side lens element and the lens element adjacent to the most image side lens element. When the value goes below the lower limit of the condition (9), a possibility arises that compensation of fluctuation in curvature of field caused in association with zooming becomes difficult. In contrast, when the value exceeds the upper limit of the condition (9), a possibility arises that compensation of distortion at a wide-angle limit becomes difficult.

Here, when at least one of the following conditions (9)' and (9)" is satisfied, the above-mentioned effect is achieved more successfully.

$$-0.25 < f_{G2}/f_{AIR} \quad (9)'$$

$$f_{G2}/f_{AIR} < -0.15 \quad (9)'$$

Further, it is more preferable that the conditions (9), (9)' and (9)" are satisfied under at least one of the following conditions (a)' and (b)'.

$$\omega_W \geq 35 \quad (a)'$$

$$f_T/f_W \geq 6.5 \quad (b)'$$

In a zoom lens system having basic configuration I like the zoom lens system according to Embodiments I-1 to I-7, in a zoom lens system having basic configuration II like the zoom lens system according to Embodiments II-1 to II-6, in a zoom lens system having basic configuration III like the zoom lens system according to Embodiments III-1 to III-6, and in a zoom lens system having basic configuration IV like the zoom lens system according to Embodiments IV-1 to IV-7, it is preferable that the following condition (10) is satisfied.

$$-9000 < (f_T/f_W) \times f_{L11}/t_{L11} < -526 \quad (10)$$

where, $f_{L11}$ is a focal length of the most object side lens element of the first lens unit, $t_{L11}$ is a center thickness of the most object side lens element of the first lens unit, $f_T$ is a focal length of the entire system at a telephoto limit, and $f_W$ is a focal length of the entire system at a wide-angle limit.

The condition (10) sets forth the relation between the focal length and the optical axial thickness of the most object side lens element of the first lens unit. When the value goes below the lower limit of the condition (10), a possibility arises that control of the axial chromatic aberration at a telephoto limit becomes difficult. Another possibility also arises that the excessively thin lens element causes difficulty in fabrication. In contrast, when the value exceeds the upper limit of the condition (10), a possibility arises that control of curvature of field and astigmatism becomes difficult at a telephoto limit.

Here, when at least one of the following conditions (10)' and (10)'' is satisfied, the above-mentioned effect is achieved more successfully.

$$-3000 < (f_T/f_W) \times f_{L11}/t_{L11} \tag{10}'$$

$$(f_T/f_W) \times f_{L11}/t_{L11} < -550 \tag{10}''$$

Further, it is more preferable that the conditions (10), (10)' and (10)'' are satisfied under at least one of the following conditions (a)' and (b)'.

$$\omega_W \geq 35 \tag{a}'$$

$$f_T/f_W \geq 6.5 \tag{b}'$$

In a zoom lens system having basic configuration I like the zoom lens system according to Embodiments I-1 to I-7, in a zoom lens system having basic configuration II like the zoom lens system according to Embodiments II-1 to II-6, in a zoom lens system having basic configuration III like the zoom lens system according to Embodiments III-1 to III-6, and in a zoom lens system having basic configuration IV like the zoom lens system according to Embodiments IV-1 to IV-7, it is preferable that the following condition (11) is satisfied.

$$65 < (f_T/f_W) \times f_{G1}/t_{L12} < 900 \tag{11}$$

where, $f_{G1}$ is a composite focal length of the first lens unit, $t_{L12}$ is a center thickness of the second most object side lens element of the first lens unit, $f_T$ is a focal length of the entire system at a telephoto limit, and $f_W$ is a focal length of the entire system at a wide-angle limit.

The condition (11) sets forth the optical axial thickness of the second most object side lens element of the first lens unit. When the value goes below the lower limit of the condition (11), a possibility arises that control of fluctuation in spherical aberration and curvature of field generated in association with zooming becomes difficult. In contrast, when the value exceeds the upper limit of the condition (11), a possibility arises that control of curvature of field and astigmatism becomes difficult at a telephoto limit. Another possibility also arises that the excessively thin lens element causes difficulty in fabrication.

Here, when at least one of the following conditions (11)' and (11)'' is satisfied, the above-mentioned effect is achieved more successfully.

$$70 < (f_T/f_W) \times f_{G1}/t_{L12} \tag{11}'$$

$$(f_T/f_W) \times f_{G1}/t_{L12} < 200 \tag{11}''$$

Further, it is more preferable that the conditions (11), (11)' and (11)'' are satisfied under at least one of the following conditions (a)' and (b)'.

$$\omega_W \geq 35 \tag{a}'$$

$$f_T/f_W \geq 6.5 \tag{b}'$$

In a zoom lens system having basic configuration I like the zoom lens system according to Embodiments I-1 to I-7, in a zoom lens system having basic configuration II like the zoom lens system according to Embodiments II-1 to II-6, in a zoom lens system having basic configuration III like the zoom lens system according to Embodiments III-1 to III-6, and in a zoom lens system having basic configuration IV like the zoom lens system according to Embodiments IV-1 to IV-7, it is preferable that the following condition (12) is satisfied.

$$-250 < f_{G2}/t_{L21} < -15 \tag{12}$$

where, $f_{G2}$ is a composite focal length of the second lens unit, and $t_{L21}$ is a center thickness of the most object side lens element of the second lens unit.

The condition (12) sets forth the optical axial thickness of the most object side lens element of the second lens unit. When the value goes below the lower limit of the condition (12), a possibility arises that achievement of a wide angle construction becomes difficult. Another possibility also arises that the excessively thin lens element causes difficulty in fabrication. In contrast, when the value exceeds the upper limit of the condition (12), a possibility arises that control of distortion at a wide-angle limit becomes difficult.

Here, when at least one of the following conditions (12)' and (12)'' is satisfied, the above-mentioned effect is achieved more successfully.

$$-100 < f_{G2}/t_{L21} \tag{12}'$$

$$f_{G2}/t_{L21} < -18 \tag{12}''$$

Further, it is more preferable that the conditions (12), (12)' and (12)'' are satisfied under at least one of the following conditions (a)' and (b)'.

$$\omega_W \geq 35 \tag{a}'$$

$$f_T/f_W \geq 6.5 \tag{b}'$$

In a zoom lens system having basic configuration I like the zoom lens system according to Embodiments I-1 to I-7, in a zoom lens system having basic configuration II like the zoom lens system according to Embodiments II-1 to II-6, in a zoom lens system having basic configuration III like the zoom lens system according to Embodiments III-1 to III-6, and in a zoom lens system having basic configuration IV like the zoom lens system according to Embodiments IV-1 to IV-7, it is preferable that the following condition (13) is satisfied.

$$-250 < f_{G2}/t_{L22n} < -16 \tag{13}$$

where, $f_{G2}$ is a composite focal length of the second lens unit, and $t_{L22n}$ is a center thickness of a negative lens element located at the most image side in the second lens unit.

The condition (13) sets forth the optical axial thickness of the most image side lens element having negative optical power in the second lens unit. When the value goes below the lower limit of the condition (13), a possibility arises that achievement of a wide angle construction becomes difficult. Another possibility also arises that the excessively thin lens element causes difficulty in fabrication. In contrast, when the value exceeds the upper limit of the condition (13), a possibility arises that control of distortion at a wide-angle limit becomes difficult.

Here, when at least one of the following conditions (13)' and (13)" is satisfied, the above-mentioned effect is achieved more successfully.

$$-100 < f_{G2}/t_{L22n} \quad (13)'$$

$$f_{G2}/t_{L22n} < -18 \quad (13)''$$

Further, it is more preferable that the conditions (13), (13)' and (13)" are satisfied under at least one of the following conditions (a)' and (b)'.

$$\omega_W \geq 35 \quad (a)'$$

$$f_T/f_W \geq 6.5 \quad (b)'$$

In a zoom lens system like the zoom lens system according to Embodiments II-1 to II-6 that has basic configuration II and has a construction that the image side surface of the most object side lens element of the second lens unit is aspheric, it is preferable that the following condition (14) is satisfied.

$$0.12 < \delta h_{L3R2}/\beta_{2T} < 0.70 \quad (14)$$

where, $\delta h_{L3R2}$ is an amount of aspheric deviation (a difference between the base spherical surface and the aspheric surface) of the image side surface of the most object side lens element of the second lens unit at a height of $0.5 \times f_w \times \tan \omega_W$, and $\beta_{2T}$ is a lateral magnification of the second lens unit at a telephoto limit.

The condition (14) sets forth the amount of aspheric deviation of the image side surface of the most object side lens element of the second lens unit. When the value goes below the lower limit of the condition (14), a larger diameter is required in the most object side lens element of the second lens unit. This causes a possibility of difficulty in compensating off-axial aberrations such as astigmatism and distortion at a wide-angle limit. In contrast, when the value exceeds the upper limit of the condition (14), contribution to variable magnification by the second lens unit is excessively small. This causes difficulty in compensating fluctuation in coma aberration caused in association with zooming. Thus, a possibility arises that simultaneous achievement of a high variable magnification ratio and compactness becomes difficult.

Here, when at least one of the following conditions (14)' and (14)" is satisfied, the above-mentioned effect is achieved more successfully.

$$0.20 < \delta h_{L3R2}/\beta_{2T} \quad (14)'$$

$$\delta h_{L3R2}/\beta_{2T} < 0.50 \quad (14)''$$

Further, it is more preferable that the conditions (14), (14)' and (14)" are satisfied under at least one of the following conditions (a)' and (b)'.

$$\omega_W \geq 35 \quad (a)'$$

$$f_T/f_W \geq 6.5 \quad (b)'$$

Each lens unit of the zoom lens system according to Embodiments I-1 to I-7, the zoom lens system according to Embodiments II-1 to II-6, the zoom lens system according to Embodiments III-1 to III-6, and the zoom lens system according to Embodiments IV-1 to IV-7 is composed exclusively of refractive type lens elements that deflect the incident light by refraction (that is, lens elements of a type in which deflection is achieved at the interface between media each having a distinct refractive index). However, the construction is not limited to this. For example, the lens units may employ diffractive type lens elements that deflect the incident light by diffraction; refractive-diffractive hybrid type lens elements that deflect the incident light by a combination of diffraction and refraction; or gradient index type lens elements that deflect the incident light by distribution of refractive index in the medium. In particular, in refractive-diffractive hybrid type lens elements, when a diffraction structure is formed in the interface between media having mutually different refractive indices, wavelength dependence in the diffraction efficiency is improved. Thus, such a configuration is preferable.

Moreover, in each embodiment, a configuration has been described that on the object side relative to the image surface S (that is, between the image surface S and the most image side lens surface of the fourth lens unit G4), a plane parallel plate P such as an optical low-pass filter and a face plate of an image sensor is provided. This low-pass filter may be: a birefringent type low-pass filter made of, for example, a crystal whose predetermined crystal orientation is adjusted; or a phase type low-pass filter that achieves required characteristics of optical cut-off frequency by diffraction.

Embodiment I-8

Figure 22:
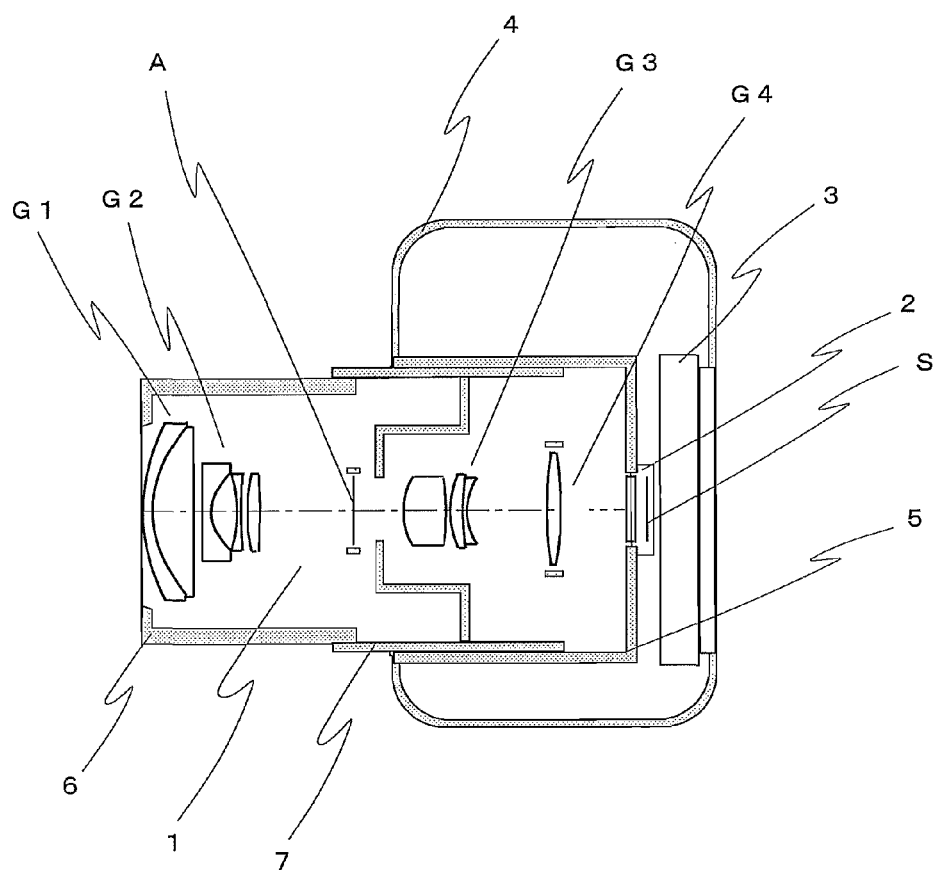
FIG. 22 is a schematic construction diagram of a digital still camera according to Embodiment I-8.

FIG. 22 is a schematic construction diagram of a digital still camera according to Embodiment I-8. In FIG. 22, the digital still camera comprises: an imaging device having a zoom lens system 1 and an image sensor 2 composed of a CCD; a liquid crystal display monitor 3; and a body 4. The employed zoom lens system 1 is a zoom lens system according to Embodiment I-1. In FIG. 22, the zoom lens system 1 comprises a first lens unit G1, a second lens unit G2, an aperture diaphragm A, a third lens unit G3 and a fourth lens unit G4. In the body 4, the zoom lens system 1 is arranged on the front side, while the image sensor 2 is arranged on the rear side of the zoom lens system 1. On the rear side of the body 4, the liquid crystal display monitor 3 is arranged, while an optical image of a photographic object generated by the zoom lens system 1 is formed on an image surface S.

The lens barrel comprises a main barrel 5, a moving barrel 6 and a cylindrical cam 7. When the cylindrical cam 7 is rotated, the first lens unit G1, the second lens unit G2, the aperture diaphragm A, the third lens unit G3 and the fourth lens unit G4 move to predetermined positions relative to the image sensor 2, so that zooming from a wide-angle limit to a telephoto limit is achieved. The fourth lens unit G4 is movable in an optical axis direction by a motor for focus adjustment.

As such, when the zoom lens system according to Embodiment I-1 is employed in a digital still camera, a small digital still camera is obtained that has a high resolution and high capability of compensating the curvature of field and that has a short overall length of lens system at the time of non-use. Here, in the digital still camera shown in FIG. 22, any one of the zoom lens systems according to Embodiments I-2 to I-7 may be employed in place of the zoom lens system according to Embodiment I-1. Further, the optical system of the digital still camera shown in FIG. 22 is applicable also to a digital video camera for moving images. In this case, moving images with high resolution can be acquired in addition to still images.

Here, the digital still camera according to the present Embodiment I-8 has been described for a case that the employed zoom lens system 1 is a zoom lens system according to Embodiments I-1 to I-7. However, in these zoom lens systems, the entire zooming range need not be used. That is, in accordance with a desired zooming range, a range where satisfactory optical performance is obtained may exclusively be used. Then, the zoom lens system may be used as one having a lower magnification than the zoom lens system described in Embodiments I-1 to I-7.

Further, Embodiment I-8 has been described for a case that the zoom lens system is applied to a lens barrel of so-called barrel retraction construction. However, the present invention is not limited to this. For example, the zoom lens system may be applied to a lens barrel of so-called bending configuration where a prism having an internal reflective surface or a front surface reflective mirror is arranged at an arbitrary position within the first lens unit G1 or the like. Further, in Embodiment I-8, the zoom lens system may be applied to a so-called sliding lens barrel in which a part of the lens units constituting the zoom lens system like the entirety of the second lens unit G2, the entirety of the third lens unit G3, or alternatively a part of the second lens unit G2 or the third lens unit G3 is caused to escape from the optical axis at the time of barrel retraction.

Embodiment II-7

Figure 41:
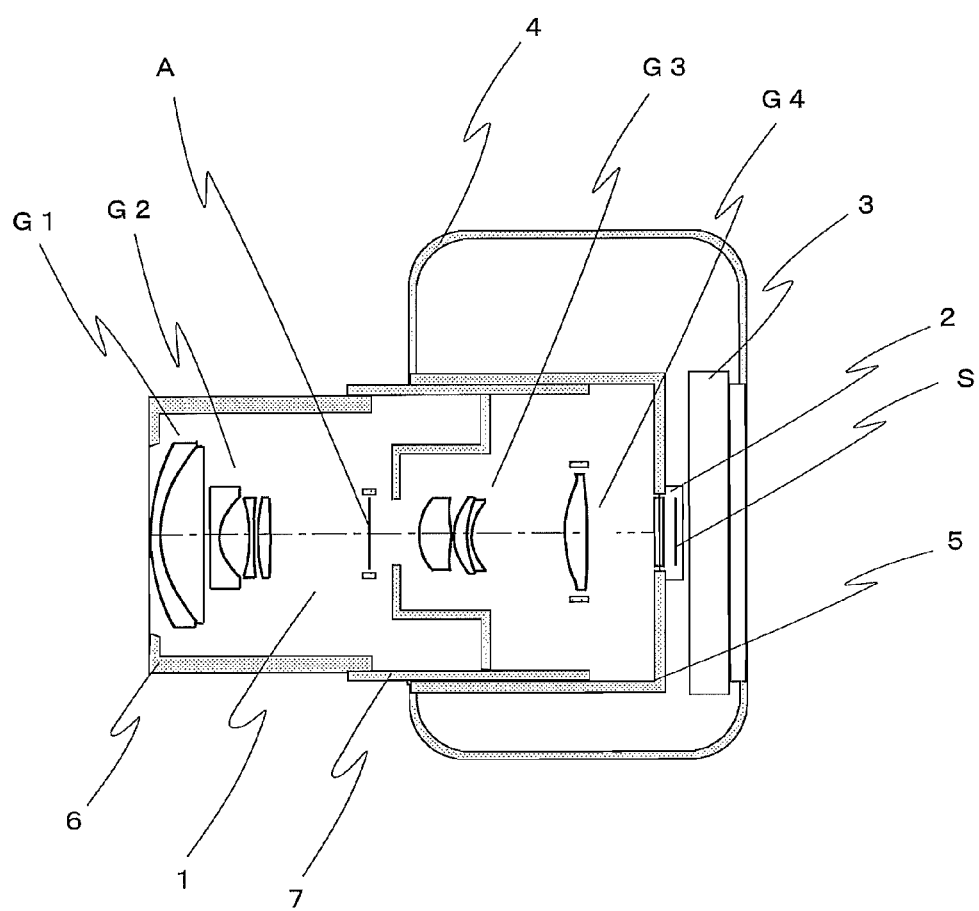
FIG. 41 is a schematic construction diagram of a digital still camera according to Embodiment II-7.

FIG. 41 is a schematic construction diagram of a digital still camera according to Embodiment II-7. In FIG. 41, the digital still camera comprises: an imaging device having a zoom lens system 1 and an image sensor 2 composed of a CCD; a liquid crystal display monitor 3; and a body 4. The employed zoom lens system 1 is a zoom lens system according to Embodiment II-1. In FIG. 41, the zoom lens system 1 comprises a first lens unit G1, a second lens unit G2, an aperture diaphragm A, a third lens unit G3 and a fourth lens unit G4. In the body 4, the zoom lens system 1 is arranged on the front side, while the image sensor 2 is arranged on the rear side of the zoom lens system 1. On the rear side of the body 4, the liquid crystal display monitor 3 is arranged, while an optical image of a photographic object generated by the zoom lens system 1 is formed on an image surface S.

The lens barrel comprises a main barrel 5, a moving barrel 6 and a cylindrical cam 7. When the cylindrical cam 7 is rotated, the first lens unit G1, the second lens unit G2, the aperture diaphragm A, the third lens unit G3 and the fourth lens unit G4 move to predetermined positions relative to the image sensor 2, so that zooming from a wide-angle limit to a telephoto limit is achieved. The fourth lens unit G4 is movable in an optical axis direction by a motor for focus adjustment.

As such, when the zoom lens system according to Embodiment II-1 is employed in a digital still camera, a small digital still camera is obtained that has a high resolution and high capability of compensating the curvature of field and that has a short overall length of lens system at the time of non-use. Here, in the digital still camera shown in FIG. 41, any one of the zoom lens systems according to Embodiments II-2 to II-6 may be employed in place of the zoom lens system according to Embodiment II-1. Further, the optical system of the digital still camera shown in FIG. 41 is applicable also to a digital video camera for moving images. In this case, moving images with high resolution can be acquired in addition to still images.

Here, the digital still camera according to the present Embodiment II-7 has been described for a case that the employed zoom lens system 1 is a zoom lens system according to Embodiments II-1 to II-6. However, in these zoom lens systems, the entire zooming range need not be used. That is, in accordance with a desired zooming range, a range where satisfactory optical performance is obtained may exclusively be used. Then, the zoom lens system may be used as one having a lower magnification than the zoom lens system described in Embodiments II-1 to II-6.

Further, Embodiment II-7 has been described for a case that the zoom lens system is applied to a lens barrel of so-called barrel retraction construction. However, the present invention is not limited to this. For example, the zoom lens system may be applied to a lens barrel of so-called bending configuration where a prism having an internal reflective surface or a front surface reflective mirror is arranged at an arbitrary position within the first lens unit G1 or the like. Further, in Embodiment II-7, the zoom lens system may be applied to a so-called sliding lens barrel in which a part of the lens units constituting the zoom lens system like the entirety of the second lens unit G2, the entirety of the third lens unit G3, or alternatively a part of the second lens unit G2 or the third lens unit G3 is caused to escape from the optical axis at the time of barrel retraction.

Embodiment III-7

Figure 60:
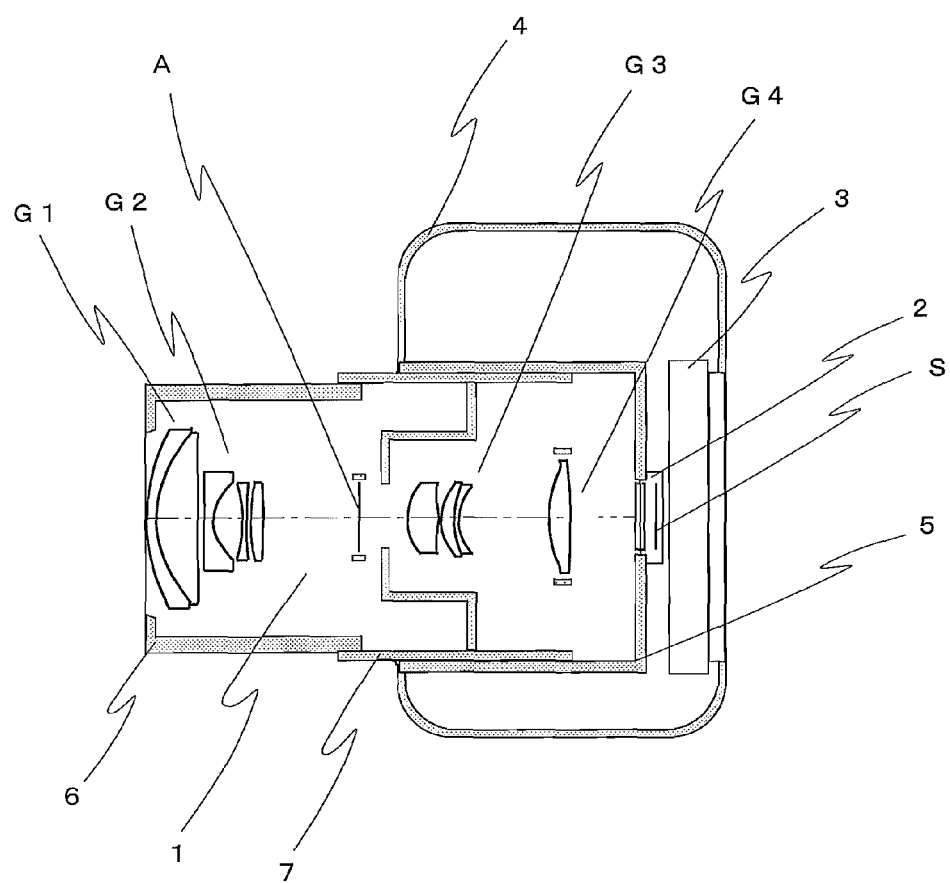
FIG. 60 is a schematic construction diagram of a digital still camera according to Embodiment III-7.

FIG. 60 is a schematic construction diagram of a digital still camera according to Embodiment III-7. In FIG. 60, the digital still camera comprises: an imaging device having a zoom lens system 1 and an image sensor 2 composed of a CCD; a liquid crystal display monitor 3; and a body 4. The employed zoom lens system 1 is a zoom lens system according to Embodiment III-1. In FIG. 60, the zoom lens system 1 comprises a first lens unit G1, a second lens unit G2, an aperture diaphragm A, a third lens unit G3 and a fourth lens unit G4. In the body 4, the zoom lens system 1 is arranged on the front side, while the image sensor 2 is arranged on the rear side of the zoom lens system 1. On the rear side of the body 4, the liquid crystal display monitor 3 is arranged, while an optical image of a photographic object generated by the zoom lens system 1 is formed on an image surface S.

The lens barrel comprises a main barrel 5, a moving barrel 6 and a cylindrical cam 7. When the cylindrical cam 7 is rotated, the first lens unit G1, the second lens unit G2, the aperture diaphragm A, the third lens unit G3 and the fourth lens unit G4 move to predetermined positions relative to the image sensor 2, so that zooming from a wide-angle limit to a telephoto limit is achieved. The fourth lens unit G4 is movable in an optical axis direction by a motor for focus adjustment.

As such, when the zoom lens system according to Embodiment III-1 is employed in a digital still camera, a small digital still camera is obtained that has a high resolution and high capability of compensating the curvature of field and that has a short overall length of lens system at the time of non-use. Here, in the digital still camera shown in FIG. 60, any one of the zoom lens systems according to Embodiments III-2 to III-6 may be employed in place of the zoom lens system according to Embodiment III-1. Further, the optical system of the digital still camera shown in FIG. 60 is applicable also to a digital video camera for moving images. In this case, moving images with high resolution can be acquired in addition to still images.

Here, the digital still camera according to the present Embodiment III-7 has been described for a case that the employed zoom lens system 1 is a zoom lens system according to Embodiments III-1 to III-6. However, in these zoom lens systems, the entire zooming range need not be used. That is, in accordance with a desired zooming range, a range where satisfactory optical performance is obtained may exclusively be used. Then, the zoom lens system may be used as one having a lower magnification than the zoom lens system described in Embodiments III-1 to III-6.

Further, Embodiment III-7 has been described for a case that the zoom lens system is applied to a lens barrel of so-called barrel retraction construction. However, the present invention is not limited to this. For example, the zoom lens system may be applied to a lens barrel of so-called bending configuration where a prism having an internal reflective surface or a front surface reflective mirror is arranged at an arbitrary position within the first lens unit G1 or the like. Further, in Embodiment III-7, the zoom lens system may be applied to a so-called sliding lens barrel in which a part of the lens units constituting the zoom lens system like the entirety of the second lens unit G2, the entirety of the third lens unit G3, or alternatively a part of the second lens unit G2 or the third lens unit G3 is caused to escape from the optical axis at the time of barrel retraction.

Embodiment IV-8

Figure 82:
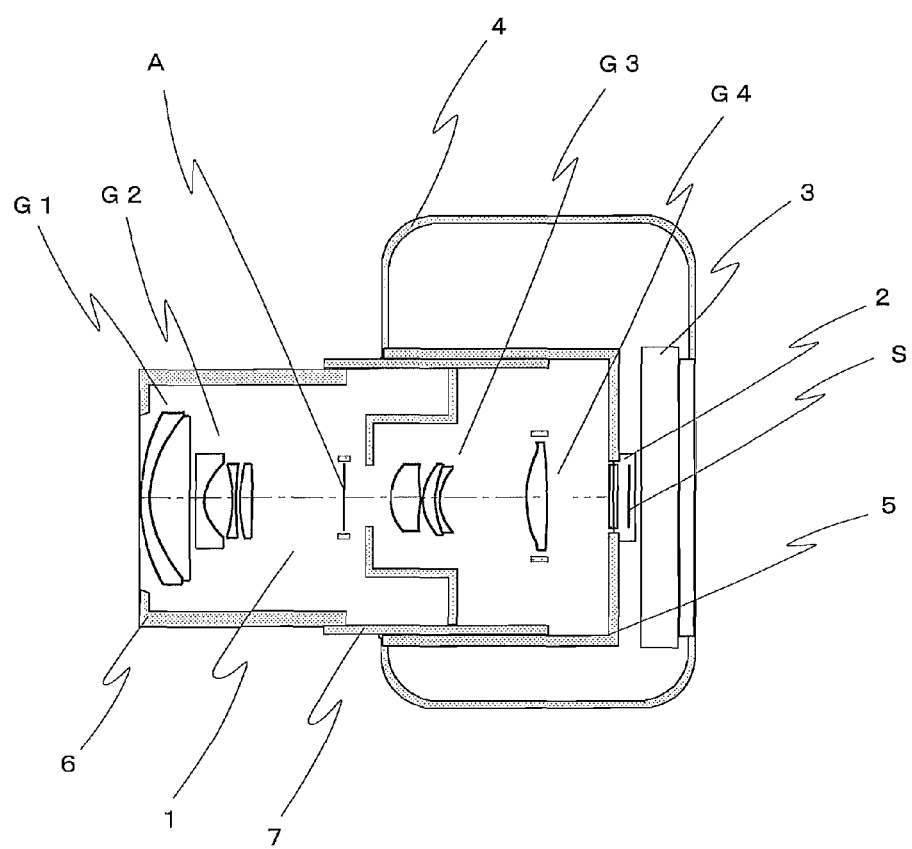
FIG. 82 is a schematic construction diagram of a digital still camera according to Embodiment IV-8.

FIG. 82 is a schematic construction diagram of a digital still camera according to Embodiment IV-8. In FIG. 82, the digital still camera comprises: an imaging device having a zoom lens system 1 and an image sensor 2 composed of a CCD; a liquid crystal display monitor 3; and a body 4. The employed zoom lens system 1 is a zoom lens system according to Embodiment IV-1. In FIG. 82, the zoom lens system 1 comprises a first lens unit G1, a second lens unit G2, an aperture diaphragm A, a third lens unit G3 and a fourth lens unit G4. In the body 4, the zoom lens system 1 is arranged on the front side, while the image sensor 2 is arranged on the rear side of the zoom lens system 1. On the rear side of the body 4, the liquid crystal display monitor 3 is arranged, while an optical image of a photographic object generated by the zoom lens system 1 is formed on an image surface S.

The lens barrel comprises a main barrel 5, a moving barrel 6 and a cylindrical cam 7. When the cylindrical cam 7 is rotated, the first lens unit G1, the second lens unit G2, the aperture diaphragm A, the third lens unit G3 and the fourth lens unit G4 move to predetermined positions relative to the image sensor 2, so that zooming from a wide-angle limit to a telephoto limit is achieved. The fourth lens unit G4 is movable in an optical axis direction by a motor for focus adjustment.

As such, when the zoom lens system according to Embodiment IV-1 is employed in a digital still camera, a small digital still camera is obtained that has a high resolution and high capability of compensating the curvature of field and that has a short overall length of lens system at the time of non-use. Here, in the digital still camera shown in FIG. 82, any one of the zoom lens systems according to Embodiments V-2 to IV-7 may be employed in place of the zoom lens system according to Embodiment IV-1. Further, the optical system of the digital still camera shown in FIG. 82 is applicable also to a digital video camera for moving images. In this case, moving images with high resolution can be acquired in addition to still images.

Here, the digital still camera according to the present Embodiment IV-8 has been described for a case that the employed zoom lens system 1 is a zoom lens system according to Embodiments IV-1 to IV-7. However, in these zoom lens systems, the entire zooming range need not be used. That is, in accordance with a desired zooming range, a range where satisfactory optical performance is obtained may exclusively be used. Then, the zoom lens system may be used as one having a lower magnification than the zoom lens system described in Embodiments IV-1 to IV-7.

Further, Embodiment IV-8 has been described for a case that the zoom lens system is applied to a lens barrel of so-called barrel retraction construction. However, the present invention is not limited to this. For example, the zoom lens system may be applied to a lens barrel of so-called bending configuration where a prism having an internal reflective surface or a front surface reflective mirror is arranged at an arbitrary position within the first lens unit G1 or the like. Further, in Embodiment IV-8, the zoom lens system may be applied to a so-called sliding lens barrel in which a part of the lens units constituting the zoom lens system like the entirety of the second lens unit G2, the entirety of the third lens unit G3, or alternatively a part of the second lens unit G2 or the third lens unit G3 is caused to escape from the optical axis at the time of barrel retraction.

An imaging device comprising a zoom lens system according to Embodiments I-1 to I-7, a zoom lens system according to Embodiments II-1 to II-6, a zoom lens system according to Embodiments III-1 to III-6, or a zoom lens system according to Embodiments IV-1 to IV-7, and an image sensor such as a CCD or a CMOS may be applied to a mobile telephone, a PDA (Personal Digital Assistance), a surveillance camera in a surveillance system, a Web camera, a vehicle-mounted camera or the like.

The following description is given for numerical examples in which the zoom lens system according to Embodiments I-1 to I-7, the zoom lens system according to Embodiments II-1 to II-6, the zoom lens system according to Embodiments III-1 to III-6, and the zoom lens system according to Embodiments IV-1 to IV-7 are implemented practically. In the numerical examples, the units of the length in the tables are all "mm", while the units of the view angle are all "°". Moreover, in the numerical examples, r is the radius of curvature, d is the axial distance, nd is the refractive index to the d-line, and vd is the Abbe number to the d-line. In the numerical examples, the surfaces marked with * are aspheric surfaces, and the aspheric surface configuration is defined by the following expression.

$$Z = \frac{h^2/r}{1+\sqrt{1-(1+\kappa)(h/r)^2}} + A4h^4 + A6h^6 + A8h^8 + A10h^{10} + A12h^{12} + A14h^{14}$$

Here, κ is the conic constant, A4, A6, A8, A10, A12 and A14 are a fourth-order, sixth-order, eighth-order, tenth-order, twelfth-order and fourteenth-order aspherical coefficients, respectively.

FIGS. 2, 5, 8, 11, 14, 17 and 20 are longitudinal aberration diagrams of the zoom lens systems according to Embodiments I-1 to I-7, respectively.

FIGS. 24, 27, 30, 33, 36 and 39 are longitudinal aberration diagrams of the zoom lens systems according to Embodiments II-1 to II-6, respectively.

FIGS. 43, 46, 49, 52, 55 and 58 are longitudinal aberration diagrams of the zoom lens systems according to Embodiments III-1 to III-6, respectively.

FIGS. 62, 65, 68, 71, 74, 77 and 80 are longitudinal aberration diagrams of the zoom lens systems according to Embodiments IV-1 to IV-7, respectively.

In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each FIG., indicated as F), and the solid line, the short dash line and the long dash line indicate the characteristics to the d-line, the F-line and the C-line, respectively. In each astigmatism diagram, the vertical axis indicates the image height (in each FIG., indicated as H), and the solid line and the dash line indicate the characteristics to the sagittal plane (in each FIG., indicated as "s") and the meridional plane (in each FIG., indicated as "m"), respectively. In each distortion diagram, the vertical axis indicates the image height (in each FIG., indicated as H).

FIGS. 3, 6, 9, 12, 15, 18 and 21 are lateral aberration diagrams of the zoom lens systems at a telephoto limit according to Embodiments I-1 to I-7, respectively.

FIGS. 25, 28, 31, 34, 37 and 40 are lateral aberration diagrams of the zoom lens systems at a telephoto limit according to Embodiments II-1 to II-6, respectively.

FIGS. 44, 47, 50, 53, 56 and 59 are lateral aberration diagrams of the zoom lens systems at a telephoto limit according to Embodiments III-1 to III-6, respectively.

FIGS. 63, 66, 69, 72, 75, 78 and 81 are lateral aberration diagrams of the zoom lens systems at a telephoto limit according to Embodiments IV-1 to IV-7, respectively.

In each lateral aberration diagram, the aberration diagrams in the upper three parts correspond to a basic state where image blur compensation is not performed at a telephoto limit, while the aberration diagrams in the lower three parts correspond to an image blur compensation state where the entire third lens unit G3 is moved by a predetermined amount in a direction perpendicular to the optical axis at a telephoto limit. Among the lateral aberration diagrams of a basic state, the upper part shows the lateral aberration at an image point of 70% of the maximum image height, the middle part shows the lateral aberration at the axial image point, and the lower part shows the lateral aberration at an image point of −70% of the maximum image height. Among the lateral aberration diagrams of an image blur compensation state, the upper part shows the lateral aberration at an image point of 70% of the maximum image height, the middle part shows the lateral aberration at the axial image point, and the lower part shows the lateral aberration at an image point of −70% of the maximum image height. In each lateral aberration diagram, the horizontal axis indicates the distance from the principal ray on the pupil surface, and the solid line, the short dash line and the long dash line indicate the characteristics to the d-line, the F-line and the C-line, respectively. In each lateral aberration diagram, the meridional plane is adopted as the plane containing the optical axis of the first lens unit G1 and the optical axis of the third lens unit G3.

Here, in the zoom lens system according to each example, the amount of movement of the third lens unit G3 in a direction perpendicular to the optical axis in an image blur compensation state at a telephoto limit is as follows.

| Example | Amount of movement (mm) | | | |
|---|---|---|---|---|
| | I- | II- | III- | IV- |
| 1 | 0.085 | 0.085 | 0.085 | 0.085 |
| 2 | 0.100 | 0.085 | 0.100 | 0.085 |
| 3 | 0.090 | 0.080 | 0.090 | 0.100 |
| 4 | 0.085 | 0.090 | 0.085 | 0.090 |
| 5 | 0.085 | 0.085 | 0.085 | 0.085 |
| 6 | 0.085 | 0.085 | 0.085 | 0.085 |
| 7 | 0.085 | — | — | 0.085 |

Here, when the shooting distance is infinity, at a telephoto limit, the amount of image decentering in a case that the zoom lens system inclines by 0.3° is equal to the amount of image decentering in a case that the entire third lens unit G3 displaces in parallel by each of the above-mentioned values in a direction perpendicular to the optical axis.

As seen from the lateral aberration diagrams, satisfactory symmetry is obtained in the lateral aberration at the axial image point. Further, when the lateral aberration at the +70% image point and the lateral aberration at the −70% image point are compared with each other in a basic state, all have a small degree of curvature and almost the same inclination in the aberration curve. Thus, decentering coma aberration and decentering astigmatism are small. This indicates that sufficient imaging performance is obtained even in an image blur compensation state. Further, when the image blur compensation angle of a zoom lens system is the same, the amount of parallel translation required for image blur compensation decreases with decreasing focal length of the entire zoom lens system. Thus, at arbitrary zoom positions, sufficient image blur compensation can be performed for image blur compensation angles up to 0.3° without degrading the imaging characteristics.

NUMERICAL EXAMPLE I-1

The zoom lens system of Numerical Example I-1 corresponds to Embodiment I-1 shown in FIG. 1. Table I-1 shows the surface data of the zoom lens system of Numerical Example I-1. Table I-2 shows the aspherical data. Table I-3 shows various data.

TABLE I-1

(Surface data)

| Surface number | r | d | nd | vd |
|---|---|---|---|---|
| Object surface | ∞ | | | |
| 1 | 15.52800 | 0.50000 | 1.84666 | 23.8 |
| 2 | 11.73920 | 2.60870 | 1.58332 | 59.1 |
| 3* | 1209.60330 | Variable | | |
| 4 | 213.97190 | 0.30000 | 1.80470 | 41.0 |
| 5* | 4.31340 | 2.36830 | | |
| 6 | −12.02920 | 0.30000 | 1.74993 | 45.4 |
| 7 | 56.78030 | 0.22420 | | |
| 8 | 13.63820 | 0.99930 | 1.99537 | 20.7 |
| 9 | −84.04160 | Variable | | |
| 10(Diaphragm) | ∞ | Variable | | |
| 11* | 5.18320 | 3.42370 | 1.51835 | 70.3 |
| 12* | −14.46730 | 0.11140 | | |
| 13 | 6.41420 | 0.94740 | 1.60602 | 57.4 |
| 14 | 13.28000 | 0.30000 | 1.84666 | 23.8 |
| 15 | 4.71130 | Variable | | |
| 16* | 21.14270 | 1.34650 | 1.51835 | 70.3 |
| 17* | −27.40220 | Variable | | |
| 18 | ∞ | 0.78000 | 1.51680 | 64.2 |
| 19 | ∞ | (BF) | | |
| Image surface | ∞ | | | |

TABLE I-2

(Aspherical data)

Surface No. 3

K = 0.00000E+00, A4 = 9.73935E−06, A6 = 2.01529E−07,
A8 = −6.57286E−09 A10 = 4.68826E−11, A12 = 1.10311E−12,
A14 = −1.55602E−14

Surface No. 5

K = 0.00000E+00, A4 = −5.00762E−04, A6 = −6.90163E−05,
A8 = 2.16078E−05 A10 = −3.70181E−06, A12 = 2.74194E−07,
A14 = −7.99916E−09

Surface No. 11

K = 0.00000E+00, A4 = −2.89479E−04, A6 = 4.08999E−05,
A8 = 1.11002E−06 A10 = −6.50928E−08, A12 = −3.06626E−10,
A14 = −7.38863E−16

TABLE I-2-continued (Aspherical data)

Surface No. 12

K = 0.00000E+00, A4 = 1.51249E−03, A6 = 1.03975E−04,
A8 = −2.90138E−06 A10 = 7.94844E−07, A12 = −1.32978E−08,
A14 = −1.27569E−15
Surface No. 16

K = 0.00000E+00, A4 = −6.52563E−04, A6 = 9.96884E−05,
A8 = −7.95833E−06 A10 = 1.69209E−07, A12 = 0.00000E+00,
A14 = 0.00000E+00
Surface No. 17

K = 0.00000E+00, A4 = −6.32636E−04, A6 = 9.76080E−05,
A8 = −8.09954E−06 A10 = 1.75608E−07, A12 = 0.00000E+00,
A14 = 0.00000E+00

TABLE I-3

(Various data)

Zooming ratio 7.49310

|  | Wide-angle limit | Middle position | Telephoto limit |
| --- | --- | --- | --- |
| Focal length | 4.6144 | 12.6373 | 34.5762 |
| F-number | 3.60485 | 5.00754 | 6.10263 |
| View angle | 40.2420 | 16.8085 | 6.2694 |
| Image height | 3.4000 | 3.8300 | 3.8300 |
| Overall length of lens system | 36.4903 | 42.0945 | 51.9662 |
| BF | 0.90174 | 0.92299 | 0.96731 |
| d3 | 0.3000 | 7.1976 | 14.9737 |
| d9 | 9.4785 | 1.8338 | 0.3000 |
| d10 | 3.1500 | 3.1500 | 1.4700 |
| d15 | 3.8949 | 8.7628 | 17.2798 |
| d17 | 4.5557 | 6.0178 | 2.7659 |

Zoom lens unit data

| Lens unit | Initial surface | Focal length |
| --- | --- | --- |
| 1 | 1 | 31.27548 |
| 2 | 4 | −6.27149 |
| 3 | 11 | 9.81089 |
| 4 | 16 | 23.24402 |

NUMERICAL EXAMPLE I-2

The zoom lens system of Numerical Example I-2 corresponds to Embodiment I-2 shown in FIG. 4. Table I-4 shows the surface data of the zoom lens system of Numerical Example I-2. Table I-5 shows the aspherical data. Table I-6 shows various data.

TABLE I-4

(Surface data)

| Surface number | r | d | nd | vd |
| --- | --- | --- | --- | --- |
| Object surface | ∞ | | | |
| 1 | 17.17720 | 0.50000 | 1.84666 | 23.8 |
| 2 | 12.82040 | 3.39800 | 1.58332 | 59.1 |
| 3* | −1040.03530 | Variable | | |
| 4 | 49.05790 | 0.30000 | 1.80470 | 41.0 |
| 5 | 4.70330 | 2.76380 | | |
| 6 | −12.77140 | 0.30000 | 1.74993 | 45.4 |
| 7 | 20.36460 | 0.14240 | | |
| 8 | 12.67710 | 1.13160 | 1.99537 | 20.7 |
| 9* | −161.40510 | Variable | | |

TABLE I-4-continued (Surface data)

| Surface number | r | d | nd | vd |
| --- | --- | --- | --- | --- |
| 10(Diaphragm) | ∞ | 0.40000 | | |
| 11 | 4.38810 | 1.95800 | 1.51742 | 52.1 |
| 12 | −21.71750 | 0.52920 | | |
| 13* | 6.67340 | 0.98750 | 1.68400 | 31.3 |
| 14 | 27.43090 | 0.40980 | 1.99537 | 20.7 |
| 15 | 4.93690 | Variable | | |
| 16* | 10.44690 | 1.66470 | 1.51610 | 63.4 |
| 17 | 41.12910 | Variable | | |
| 18 | ∞ | 0.78000 | 1.51680 | 64.2 |
| 19 | ∞ | (BF) | | |
| Image surface | ∞ | | | |

TABLE I-5

(Aspherical data)

Surface No. 3

K = 0.00000E+00, A4 = 7.60331E−06, A6 = −1.40064E−08,
A8 = 5.18064E−12
Surface No. 9

K = 0.00000E+00, A4 = −7.53498E−05, A6 = 5.33523E−06,
A8 = −1.30091E−07
Surface No. 13

K = 0.00000E+00, A4 = −2.27244E−03, A6 = −1.03594E−04,
A8 = −1.57293E−05
Surface No. 16

K = 0.00000E+00, A4 = −6.83863E−05, A6 = 1.60080E−06,
A8 = −1.50130E−08

TABLE I-6

(Various data)

Zooming ratio 9.33668

|  | Wide-angle limit | Middle position | Telephoto limit |
| --- | --- | --- | --- |
| Focal length | 4.6175 | 14.1211 | 43.1119 |
| F-number | 3.60832 | 5.11154 | 6.10735 |
| View angle | 40.2454 | 15.2624 | 4.9880 |
| Image height | 3.4000 | 3.8300 | 3.8300 |
| Overall length of lens system | 39.3423 | 43.6574 | 57.1167 |
| BF | 0.91458 | 0.94559 | 1.00687 |
| d3 | 0.3000 | 7.2677 | 17.0255 |
| d9 | 14.2762 | 4.5263 | 1.3000 |
| d15 | 6.0866 | 8.0162 | 17.9879 |
| d17 | 2.4999 | 7.6366 | 4.5314 |

Zoom lens unit data

| Lens unit | Initial surface | Focal length |
| --- | --- | --- |
| 1 | 1 | 33.85062 |
| 2 | 4 | −6.11220 |
| 3 | 10 | 9.64373 |
| 4 | 16 | 26.64214 |

NUMERICAL EXAMPLE I-3

The zoom lens system of Numerical Example I-3 corresponds to Embodiment I-3 shown in FIG. 7. Table I-7 shows the surface data of the zoom lens system of Numerical Example I-3. Table I-8 shows the aspherical data. Table I-9 shows various data.

TABLE I-7

(Surface data)

| Surface number | r | d | nd | vd |
|---|---|---|---|---|
| Object surface | ∞ | | | |
| 1 | 15.57450 | 0.50000 | 1.84666 | 23.8 |
| 2 | 11.61700 | 3.12000 | 1.58332 | 59.1 |
| 3* | −123.69100 | Variable | | |
| 4 | −130.31500 | 0.30000 | 1.80470 | 41.0 |
| 5* | 4.46700 | 2.52000 | | |
| 6 | −15.05300 | 0.30000 | 1.81600 | 46.6 |
| 7 | 80.65800 | 0.17000 | | |
| 8 | 13.14000 | 0.98000 | 1.94595 | 18.0 |
| 9 | ∞ | Variable | | |
| 10(Diaphragm) | ∞ | 0.30000 | | |
| 11* | 4.45200 | 2.41000 | 1.51845 | 70.0 |
| 12* | −12.78700 | 0.15000 | | |
| 13 | 5.78700 | 0.94000 | 1.65128 | 38.3 |
| 14 | 14.22600 | 0.40000 | 1.84666 | 23.8 |
| 15 | 3.65500 | Variable | | |
| 16* | 15.88120 | 1.48080 | 1.58332 | 59.1 |
| 17* | −41.56400 | Variable | | |
| 18 | ∞ | 0.78000 | 1.51680 | 64.2 |
| 19 | ∞ | (BF) | | |
| Image surface | ∞ | | | |

TABLE I-8

(Aspherical data)

Surface No. 3

K = 0.00000E+00, A4 = 7.11781E−06, A6 = 1.29957E−06,
A8 = −6.71076E−08 A10 = 1.83321E−09, A12 = −2.64889E−11,
A14 = 1.58897E−13

Surface No. 5

K = 0.00000E+00, A4 = −5.41893E−04, A6 = −2.74186E−05,
A8 = 6.68199E−06 A10 = −1.14304E−06, A12 = 7.39873E−08,
A14 = −2.04786E−09

Surface No. 11

K = 0.00000E+00, A4 = −7.23575E−04, A6 = 1.26368E−04,
A8 = −3.86130E−05 A10 = 7.68227E−06, A12 = 1.54012E−07,
A14 = −9.57976E−08

Surface No. 12

K = 0.00000E+00, A4 = 1.78219E−03, A6 = 2.08679E−04,
A8 = −6.97604E−05 A10 = 1.87950E−05, A12 = −1.02863E−06,
A14 = −5.57732E−08

Surface No. 16

K = 0.00000E+00, A4 = 1.30949E−03, A6 = −1.04056E−04,
A8 = 5.71297E−06 A10 = −1.30572E−07, A12 = 0.00000E+00,
A14 = 0.00000E+00

Surface No. 17

K = 0.00000E+00, A4 = 1.62164E−03, A6 = −1.33226E−04,
A8 = 6.62129E−06 A10 = −1.45371E−07, A12 = 0.00000E+00,
A14 = 0.00000E+00

TABLE I-9

(Various data)

Zooming ratio 7.49874

| | Wide-angle limit | Middle position | Telephoto limit |
|---|---|---|---|
| Focal length | 4.6532 | 12.7463 | 34.8928 |
| F-number | 3.39062 | 4.90571 | 6.12988 |
| View angle | 41.3389 | 16.7103 | 6.2911 |
| Image height | 3.6000 | 3.9020 | 3.9020 |

TABLE I-9-continued (Various data)

| | | | |
|---|---|---|---|
| Overall length of lens system | 34.2593 | 40.6906 | 48.2454 |
| BF | 0.84760 | 0.82135 | 0.85243 |
| d3 | 0.3300 | 6.2145 | 13.0000 |
| d9 | 11.0250 | 4.7950 | 0.8900 |
| d15 | 3.2861 | 9.9694 | 15.6596 |
| d17 | 4.4198 | 4.5396 | 3.4926 |

Zoom lens unit data

| Lens unit | Initial surface | Focal length |
|---|---|---|
| 1 | 1 | 27.49072 |
| 2 | 4 | −5.91501 |
| 3 | 10 | 9.25782 |
| 4 | 16 | 19.88768 |

NUMERICAL EXAMPLE I-4

The zoom lens system of Numerical Example I-4 corresponds to Embodiment I-4 shown in FIG. 10. Table I-10 shows the surface data of the zoom lens system of Numerical Example I-4. Table I-11 shows the aspherical data. Table I-12 shows various data.

TABLE I-10

(Surface data)

| Surface number | r | d | nd | vd |
|---|---|---|---|---|
| Object surface | ∞ | | | |
| 1 | 17.80690 | 0.65000 | 1.84666 | 23.8 |
| 2 | 12.02340 | 2.89720 | 1.68863 | 52.8 |
| 3* | −490.58770 | Variable | | |
| 4 | −568.88980 | 0.30000 | 1.80470 | 41.0 |
| 5* | 4.57670 | 2.72240 | | |
| 6 | −14.00980 | 0.30000 | 1.81600 | 46.6 |
| 7 | 57.28280 | 0.23580 | | |
| 8 | 14.16310 | 0.95940 | 1.94595 | 18.0 |
| 9 | −238.76930 | Variable | | |
| 10(Diaphragm) | ∞ | 0.30000 | | |
| 11* | 4.54050 | 2.50870 | 1.51845 | 70.0 |
| 12* | −12.42410 | 0.09640 | | |
| 13 | 5.25880 | 0.79150 | 1.61720 | 54.1 |
| 14 | 7.91350 | 0.40000 | 1.84666 | 23.8 |
| 15 | 3.45140 | Variable | | |
| 16* | 19.39100 | 1.44050 | 1.51845 | 70.0 |
| 17* | −25.14690 | Variable | | |
| 18 | ∞ | 0.78000 | 1.51680 | 64.2 |
| 19 | ∞ | (BF) | | |
| Image surface | ∞ | | | |

TABLE I-11

(Aspherical data)

Surface No. 3

K = 0.00000E+00, A4 = −1.66197E−06, A6 = 1.18447E−06,
A8 = −5.02553E−08 A10 = 1.07772E−09, A12 = −1.09341E−11,
A14 = 3.78052E−14

Surface No. 5

K = 0.00000E+00, A4 = −4.17600E−04, A6 = −2.66984E−05,
A8 = 6.86983E−06 A10 = −1.12718E−06, A12 = 7.40629E−08,
A14 = −2.01494E−09

Surface No. 11

K = 0.00000E+00, A4 = −8.97952E−04, A6 = 3.92079E−05,
A8 = −1.95984E−05 A10 = 5.00932E−06, A12 = −1.50902E−08,
A14 = −6.09931E−08

TABLE I-11-continued (Aspherical data)

Surface No. 12

K = 0.00000E+00, A4 = 1.25409E−03, A6 = 1.63953E−04,
A8 = −6.69710E−05 A10 = 1.81836E−05, A12 = −1.60412E−06,
A14 = 1.17236E−08

Surface No. 16

K = 0.00000E+00, A4 = 3.11792E−04, A6 = −3.13905E−05,
A8 = 3.12763E−06 A10 = −8.84964E−08, A12 = 0.00000E+00,
A14 = 0.00000E+00

Surface No. 17

K = 0.00000E+00, A4 = 4.61277E−04, A6 = −5.47272E−05,
A8 = 4.10270E−06 A10 = −1.06668E−07, A12 = 0.00000E+00,
A14 = 0.00000E+00

TABLE I-12

(Various data)

Zooming ratio 7.49976

|  | Wide-angle limit | Middle position | Telephoto limit |
|---|---|---|---|
| Focal length | 4.6580 | 12.7581 | 34.9342 |
| F-number | 3.39823 | 5.03777 | 6.09979 |
| View angle | 41.2990 | 16.7820 | 6.3118 |
| Image height | 3.6000 | 3.9020 | 3.9020 |
| Overall length of lens system | 35.4288 | 41.1847 | 49.0736 |
| BF | 0.51608 | 0.56196 | 0.60174 |
| d3 | 0.3300 | 5.6409 | 13.0000 |
| d9 | 11.4190 | 4.8450 | 0.8900 |
| d15 | 4.7279 | 11.9031 | 16.5706 |
| d17 | 4.0539 | 3.8518 | 3.6294 |

Zoom lens unit data

| Lens unit | Initial surface | Focal length |
|---|---|---|
| 1 | 1 | 27.83974 |
| 2 | 4 | −5.80424 |
| 3 | 10 | 9.20549 |
| 4 | 16 | 21.35358 |

NUMERICAL EXAMPLE I-5

The zoom lens system of Numerical Example I-5 corresponds to Embodiment I-5 shown in FIG. 13. Table I-13 shows the surface data of the zoom lens system of Numerical Example I-5. Table I-14 shows the aspherical data. Table I-15 shows various data.

TABLE I-13

(Surface data)

| Surface number | r | d | nd | vd |
|---|---|---|---|---|
| Object surface | ∞ | | | |
| 1 | 18.28560 | 0.65000 | 1.84666 | 23.8 |
| 2 | 12.35320 | 2.79510 | 1.68863 | 52.8 |
| 3* | −346.31670 | Variable | | |
| 4 | ∞ | 0.30000 | 1.80470 | 41.0 |
| 5* | 4.71060 | 2.68100 | | |
| 6 | −14.53430 | 0.30000 | 1.81600 | 46.6 |
| 7 | 40.33580 | 0.26550 | | |
| 8 | 13.63460 | 0.96250 | 1.94595 | 18.0 |
| 9 | −567.21210 | Variable | | |

TABLE I-13-continued (Surface data)

| Surface number | r | d | nd | vd |
|---|---|---|---|---|
| 10(Diaphragm) | ∞ | 0.30000 | | |
| 11* | 4.47680 | 2.66310 | 1.51845 | 70.0 |
| 12* | −14.96960 | 0.10000 | | |
| 13 | 5.10290 | 0.84100 | 1.61800 | 63.4 |
| 14 | 8.08690 | 0.40000 | 1.84666 | 23.8 |
| 15 | 3.47930 | Variable | | |
| 16* | 24.46220 | 1.34220 | 1.58332 | 59.1 |
| 17* | −23.73280 | Variable | | |
| 18 | ∞ | 0.78000 | 1.51680 | 64.2 |
| 19 | ∞ | (BF) | | |
| Image surface | ∞ | | | |

TABLE I-14

(Aspherical data)

Surface No. 3

K = 0.00000E+00, A4 = −8.34770E−07, A6 = 1.13255E−06,
A8 = −5.18382E−08 A10 = 1.27635E−09, A12 = −1.64233E−11,
A14 = 8.67465E−14

Surface No. 5

K = 0.00000E+00, A4 = −3.64588E−04, A6 = 4.20072E−07,
A8 = 1.56619E−06 A10 = −4.30252E−07, A12 = 3.19141E−08,
A14 = −9.41020E−10

Surface No. 11

K = 0.00000E+00, A4 = −6.77598E−04, A6 = 1.00616E−04,
A8 = −2.51330E−05 A10 = 4.59265E−06, A12 = 2.30563E−07,
A14 = −8.03443E−08

Surface No. 12

K = 0.00000E+00, A4 = 1.60943E−03, A6 = 2.60810E−04,
A8 = −8.00584E−05 A10 = 1.92232E−05, A12 = −1.16911E−06,
A14 = −4.40691E−08

Surface No. 16

K = 0.00000E+00, A4 = 1.71968E−04, A6 = −2.41290E−05,
A8 = 2.29268E−06 A10 = −5.46761E−08, A12 = 0.00000E+00,
A14 = 0.00000E+00

Surface No. 17

K = 0.00000E+00, A4 = 3.13341E−04, A6 = −4.75187E−05,
A8 = 3.25460E−06 A10 = −7.11414E−08, A12 = 0.00000E+00,
A14 = 0.00000E+00

TABLE I-15

(Various data)

Zooming ratio 7.49301

|  | Wide-angle limit | Middle position | Telephoto limit |
|---|---|---|---|
| Focal length | 4.6576 | 12.7517 | 34.8992 |
| F-number | 3.33260 | 4.94447 | 6.09992 |
| View angle | 41.3036 | 16.7408 | 6.3257 |
| Image height | 3.6000 | 3.9020 | 3.9020 |
| Overall length of lens system | 35.2473 | 40.9592 | 49.1121 |
| BF | 0.51439 | 0.55787 | 0.60099 |
| d3 | 0.3300 | 5.7469 | 12.9724 |
| d9 | 11.4090 | 4.9031 | 0.8900 |
| d15 | 4.6839 | 11.7645 | 16.7268 |
| d17 | 3.9296 | 3.6064 | 3.5415 |

TABLE I-15-continued (Various data)

Zoom lens unit data

| Lens unit | Initial surface | Focal length |
|---|---|---|
| 1 | 1 | 28.11926 |
| 2 | 4 | −5.84825 |
| 3 | 10 | 9.08755 |
| 4 | 16 | 20.86482 |

NUMERICAL EXAMPLE I-6

The zoom lens system of Numerical Example I-6 corresponds to Embodiment I-6 shown in FIG. 16. Table I-16 shows the surface data of the zoom lens system of Numerical Example I-6. Table I-17 shows the aspherical data. Table I-18 shows various data.

TABLE I-16

(Surface data)

| Surface number | r | d | nd | vd |
|---|---|---|---|---|
| Object surface | ∞ | | | |
| 1 | 17.59030 | 0.10000 | 1.84666 | 23.8 |
| 2 | 12.05100 | 2.90370 | 1.68863 | 52.8 |
| 3* | −330.72000 | Variable | | |
| 4 | 271.74070 | 0.10000 | 1.80470 | 41.0 |
| 5* | 4.47730 | 2.73660 | | |
| 6 | −13.34660 | 0.10000 | 1.81600 | 46.6 |
| 7 | 50.69290 | 0.24470 | | |
| 8 | 13.73350 | 0.78200 | 1.94595 | 18.0 |
| 9 | −155.68150 | Variable | | |
| 10(Diaphragm) | ∞ | 0.30000 | | |
| 11* | 4.51360 | 2.85320 | 1.51835 | 70.3 |
| 12* | −14.44820 | 0.11290 | | |
| 13 | 5.08620 | 0.80600 | 1.61720 | 54.1 |
| 14 | 8.18890 | 0.10000 | 1.84666 | 23.8 |
| 15 | 3.65980 | Variable | | |
| 16* | 12.82370 | 1.22100 | 1.51835 | 70.3 |
| 17* | −96.30810 | Variable | | |
| 18 | ∞ | 0.78000 | 1.51680 | 64.2 |
| 19 | ∞ | (BF) | | |
| Image surface | ∞ | | | |

TABLE I-17

(Aspherical data)

Surface No. 3

K = 0.00000E+00, A4 = 2.28372E−07, A6 = 1.08244E−06,
A8 = −4.68071E−08 A10 = 1.08013E−09, A12 = −1.30881E−11,
A14 = 6.55908E−14
Surface No. 5

K = 0.00000E+00, A4 = −4.71832E−04, A6 = −6.58602E−06,
A8 = 2.20339E−06 A10 = −5.35942E−07, A12 = 3.89081E−08,
A14 = −1.21974E−09
Surface No. 11

K = 0.00000E+00, A4 = −7.78498E−04, A6 = 1.25451E−04,
A8 = −3.94153E−05 A10 = 6.86397E−06, A12 = 1.88044E−07,
A14 = −1.05854E−07
Surface No. 12

K = 0.00000E+00, A4 = 1.54352E−03, A6 = 2.14554E−04,
A8 = −6.81651E−05 A10 = 1.82498E−05, A12 = −1.58009E−06,
A14 = 5.81997E−09

TABLE I-17-continued (Aspherical data)

Surface No. 16

K = 0.00000E+00, A4 = 2.30584E−04, A6 = −3.36495E−05,
A8 = 3.01234E−06 A10 = −6.81404E−08, A12 = 0.00000E+00,
A14 = 0.00000E+00
Surface No. 17

K = 0.00000E+00, A4 = 4.61443E−04, A6 = −7.27211E−05,
A8 = 4.89642E−06 A10 = −1.04313E−07, A12 = 0.00000E+00,
A14 = 0.00000E+00

TABLE I-18

(Various data)

Zooming ratio 7.50139

| | Wide-angle limit | Middle position | Telephoto limit |
|---|---|---|---|
| Focal length | 4.6572 | 12.7592 | 34.9357 |
| F-number | 3.48399 | 4.88905 | 6.10072 |
| View angle | 41.1832 | 16.7027 | 6.2968 |
| Image height | 3.6000 | 3.9020 | 3.9020 |
| Overall length of lens system | 34.8066 | 40.7640 | 48.3093 |
| BF | 0.51553 | 0.55177 | 0.59663 |
| d3 | 0.3300 | 6.4457 | 13.0000 |
| d9 | 11.4357 | 4.9402 | 0.8900 |
| d15 | 5.4425 | 11.4817 | 17.0872 |
| d17 | 3.9428 | 4.2045 | 3.5954 |

Zoom lens unit data

| Lens unit | Initial surface | Focal length |
|---|---|---|
| 1 | 1 | 27.02401 |
| 2 | 4 | −5.76501 |
| 3 | 10 | 9.33388 |
| 4 | 16 | 21.91612 |

NUMERICAL EXAMPLE I-7

The zoom lens system of Numerical Example I-7 corresponds to Embodiment I-7 shown in FIG. 19. Table I-19 shows the surface data of the zoom lens system of Numerical Example I-7. Table I-20 shows the aspherical data. Table I-21 shows various data.

TABLE I-19

(Surface data)

| Surface number | r | d | nd | vd |
|---|---|---|---|---|
| Object surface | ∞ | | | |
| 1 | 17.10190 | 0.10000 | 1.84666 | 23.8 |
| 2 | 13.09290 | 3.62540 | 1.58332 | 59.1 |
| 3* | −1065.78530 | Variable | | |
| 4 | 39.97580 | 0.10000 | 1.80470 | 41.0 |
| 5 | 4.65370 | 2.80340 | | |
| 6 | −12.23240 | 0.10000 | 1.74993 | 45.4 |
| 7 | 19.13300 | 0.13110 | | |
| 8 | 12.12160 | 0.92740 | 1.99537 | 20.7 |
| 9* | −138.86710 | Variable | | |
| 10(Diaphragm) | ∞ | 0.40000 | | |
| 11 | 4.45740 | 2.05640 | 1.51742 | 52.1 |
| 12 | −18.97810 | 0.43600 | | |
| 13* | 6.90660 | 0.97290 | 1.68400 | 31.3 |
| 14 | 36.26920 | 0.10000 | 1.99537 | 20.7 |
| 15 | 5.31850 | Variable | | |
| 16* | 8.99580 | 1.40660 | 1.51610 | 63.4 |

TABLE I-19-continued (Surface data)

| Surface number | r | d | nd | vd |
|---|---|---|---|---|
| 17 | 32.28760 | Variable | | |
| 18 | ∞ | 0.78000 | 1.51680 | 64.2 |
| 19 | ∞ | (BF) | | |
| Image surface | ∞ | | | |

TABLE I-20

(Aspherical data)

Surface No. 3

K = 0.00000E+00, A4 = 8.25308E−06, A6 = −1.22493E−08, A8 = 5.15824E−12

Surface No. 9

K = 0.00000E+00, A4 = −6.10967E−05, A6 = 3.19013E−06, A8 = 1.35922E−08

TABLE I-20-continued (Aspherical data)

Surface No. 13

K = 0.00000E+00, A4 = −2.14168E−03, A6 = −1.10355E−04, A8 = −1.28631E−05

Surface No. 16

K = 0.00000E+00, A4 = −9.54847E−05, A6 = 6.90485E−07, A8 = 1.09447E−08

TABLE I-21

(Various data)

Zooming ratio 9.33315

| | Wide-angle limit | Middle position | Telephoto limit |
|---|---|---|---|
| Focal length | 4.6153 | 14.1102 | 43.0756 |
| F-number | 3.60552 | 5.07671 | 6.10243 |
| View angle | 40.1883 | 15.4550 | 5.0077 |
| Image height | 3.4000 | 3.8300 | 3.8300 |
| Overall length of lens system | 38.9420 | 44.0812 | 56.8186 |

TABLE I-21-continued (Various data)

| | | | |
|---|---|---|---|
| BF | 0.91359 | 0.94299 | 0.99154 |
| d3 | 0.3093 | 7.1620 | 17.3053 |
| d9 | 14.1863 | 4.4186 | 1.1242 |
| d15 | 7.0504 | 10.3714 | 18.6596 |
| d17 | 2.5432 | 7.2470 | 4.7988 |

Zoom lens unit data

| Lens unit | Initial surface | Focal length |
|---|---|---|
| 1 | 1 | 33.38187 |
| 2 | 4 | −6.10281 |
| 3 | 10 | 9.87390 |
| 4 | 16 | 23.67565 |

The following Table I-22 shows the corresponding values to the individual conditions in the zoom lens systems of the numerical examples.

TABLE I-22

(Corresponding values to conditions)

| | Condition | I-1 | I-2 | I-3 | I-4 | I-5 | I-6 | I-7 |
|---|---|---|---|---|---|---|---|---|
| (1-1) | $M_2/f_{G2}$ | −0.12 | −0.16 | −0.22 | −0.15 | −0.19 | −0.13 | −0.13 |
| (a) | $\omega_W$ | 40.38 | 40.37 | 41.43 | 41.40 | 41.40 | 41.40 | 40.37 |
| (b) | $f_T/f_W$ | 7.51 | 9.35 | 7.51 | 7.52 | 7.51 | 7.52 | 9.35 |
| (2) | $M_3/f_{G3}$ | 1.18 | 1.45 | 1.24 | 1.24 | 1.29 | 1.21 | 1.41 |
| (3) | $(\beta_{4T}/\beta_{4W})/(f_T/f_W)$ | 0.15 | 0.10 | 0.14 | 0.14 | 0.14 | 0.14 | 0.09 |
| (4) | $\{f_{G3} \times (f_T/f_W)\}/\sqrt{(f_W \times f_T)}$ | 5.82 | 6.38 | 5.45 | 5.41 | 5.34 | 5.49 | 6.53 |
| (5) | $\{f_{G4} \times (f_T/f_W)\}/\sqrt{(f_W \times f_T)}$ | 13.81 | 17.67 | 11.73 | 12.59 | 12.30 | 12.92 | 15.70 |
| (6) | $f_{G4}/f_W$ | 5.04 | 5.78 | 4.28 | 4.59 | 4.49 | 4.71 | 5.14 |
| (7) | $M_1/f_{G1}$ | 0.49 | 0.52 | 0.51 | 0.49 | 0.49 | 0.50 | 0.53 |
| (8) | $t_{G3ce}/t_{G3}$ | 0.26 | 0.36 | 0.35 | 0.32 | 0.31 | 0.24 | 0.30 |
| (9) | $f_{G2}/f_{AIR}$ | −0.19 | −0.13 | −0.19 | −0.16 | −0.15 | −0.16 | −0.13 |
| (10) | $(f_T/f_W) \times f_{L11}/t_{L11}$ | −907.89 | −1178.24 | −860.83 | −533.04 | −547.09 | −3425.54 | −6238.73 |
| (11) | $(f_T/f_W) \times f_{G1}/t_{L12}$ | 89.98 | 93.13 | 66.17 | 72.23 | 75.56 | 69.95 | 86.08 |
| (12) | $f_{G2}/t_{L21}$ | −20.91 | −20.37 | −19.72 | −19.35 | −19.49 | −57.65 | −61.03 |
| (13) | $f_{G2}/t_{L22n}$ | −20.91 | −20.37 | −19.72 | −19.35 | −19.49 | −57.65 | −61.03 |

NUMERICAL EXAMPLE II-1

The zoom lens system of Numerical Example II-1 corresponds to Embodiment II-1 shown in FIG. 23. Table II-1 shows the surface data of the zoom lens system of Numerical Example II-1. Table II-2 shows the aspherical data. Table II-3 shows various data.

TABLE II-1

(Surface data)

| Surface number | r | d | nd | vd |
|---|---|---|---|---|
| Object surface | ∞ | | | |
| 1 | 17.47110 | 0.50000 | 1.84666 | 23.8 |
| 2 | 12.77780 | 2.78310 | 1.58332 | 59.1 |
| 3* | −121.25860 | Variable | | |
| 4 | 1074.67770 | 0.30000 | 1.80470 | 41.0 |
| 5* | 4.48390 | 2.28830 | | |
| 6 | −14.86000 | 0.30000 | 1.74993 | 45.4 |
| 7 | 22.02310 | 0.10110 | | |
| 8 | 11.09670 | 1.01730 | 1.99537 | 20.7 |
| 9 | −582.95810 | Variable | | |
| 10(Diaphragm) | ∞ | Variable | | |
| 11* | 5.09560 | 2.29220 | 1.51835 | 70.3 |
| 12* | −14.41540 | 0.10000 | | |
| 13 | 4.41120 | 0.99510 | 1.61293 | 37.0 |

TABLE II-1-continued (Surface data)

| Surface number | r | d | nd | vd |
|---|---|---|---|---|
| 14 | 6.48110 | 0.33550 | 1.99537 | 20.7 |
| 15 | 3.45250 | Variable | | |
| 16* | 12.08860 | 1.57190 | 1.51835 | 70.3 |
| 17* | −86.86680 | Variable | | |
| 18 | ∞ | 0.78000 | 1.51680 | 64.2 |
| 19 | ∞ | (BF) | | |
| Image surface | ∞ | | | |

TABLE II-2

(Aspherical data)

Surface No. 3

K = 0.00000E+00, A4 = 8.11150E−06, A6 = 2.84868E−07,
A8 = −7.06629E−09 A10 = −1.13294E−11, A12 = 2.98224E−12,
A14 = −3.38291E−14

Surface No. 5

K = 0.00000E+00, A4 = −3.87772E−04, A6 = 1.65802E−05,
A8 = −8.20777E−07 A10 = −5.66424E−08, A12 = 8.68245E−14,
A14 = −9.37322E−14

Surface No. 11

K = 0.00000E+00, A4 = −4.72136E−04, A6 = 1.05944E−04,
A8 = −1.77011E−05 A10 = 1.67716E−06, A12 = 2.85858E−11,
A14 = −5.33065E−16

Surface No. 12

K = 0.00000E+00, A4 = 1.14793E−03, A6 = 1.03858E−04,
A8 = −1.21012E−05 A10 = 1.63381E−06, A12 = 8.68837E−14,
A14 = −5.37360E−16

Surface No. 16

K = 0.00000E+00, A4 = 5.38048E−04, A6 = −1.94053E−05,
A8 = 7.05384E−07 A10 = −4.75530E−08, A12 = 0.00000E+00,
A14 = 0.00000E+00

Surface No. 17

K = 0.00000E+00, A4 = 7.12718E−04, A6 = −2.24898E−05,
A8 = −1.43207E−07 A10 = −2.28220E−08, A12 = 0.00000E+00,
A14 = 0.00000E+00

TABLE II-3

(Various data)

Zooming ratio 7.48644

| | Wide-angle limit | Middle position | Telephoto limit |
|---|---|---|---|
| Focal length | 4.6192 | 12.6485 | 34.5812 |
| F-number | 3.23511 | 4.16381 | 6.09975 |
| View angle | 40.2244 | 16.5154 | 6.2061 |
| Image height | 3.4000 | 3.8300 | 3.8300 |
| Overall length of lens system | 34.7276 | 41.1726 | 51.0292 |
| BF | 0.91665 | 0.94762 | 1.00596 |
| d3 | 0.3000 | 7.7109 | 15.0000 |
| d9 | 8.8683 | 2.0155 | 0.3026 |
| d10 | 3.1500 | 3.1500 | 1.4700 |
| d15 | 4.0014 | 8.3370 | 16.1836 |
| d17 | 4.1268 | 5.6471 | 3.7025 |

Zoom lens unit data

| Lens unit | Initial surface | Focal length |
|---|---|---|
| 1 | 1 | 30.64534 |
| 2 | 4 | −6.11163 |

TABLE II-3-continued (Various data)

| 3 | 11 | 9.44099 |
|---|---|---|
| 4 | 16 | 20.58395 |

NUMERICAL EXAMPLE II-2

The zoom lens system of Numerical Example II-2 corresponds to Embodiment II-2 shown in FIG. 26. Table II-4 shows the surface data of the zoom lens system of Numerical Example II-2. Table II-5 shows the aspherical data. Table II-6 shows various data.

TABLE II-4

(Surface data)

| Surface number | r | d | nd | vd |
|---|---|---|---|---|
| Object surface | ∞ | | | |
| 1 | 15.52800 | 0.50000 | 1.84666 | 23.8 |
| 2 | 11.73920 | 2.60870 | 1.58332 | 59.1 |
| 3* | 1209.60330 | Variable | | |
| 4 | 213.97190 | 0.30000 | 1.80470 | 41.0 |
| 5* | 4.31340 | 2.36830 | | |
| 6 | −12.02920 | 0.30000 | 1.74993 | 45.4 |
| 7 | 56.78030 | 0.22420 | | |
| 8 | 13.63820 | 0.99930 | 1.99537 | 20.7 |
| 9 | −84.04160 | Variable | | |
| 10(Diaphragm) | ∞ | Variable | | |
| 11* | 5.18320 | 3.42370 | 1.51835 | 70.3 |
| 12* | −14.46730 | 0.11140 | | |
| 13 | 6.41420 | 0.94740 | 1.60602 | 57.4 |
| 14 | 13.28000 | 0.30000 | 1.84666 | 23.8 |
| 15 | 4.71130 | Variable | | |
| 16* | 21.14270 | 1.34650 | 1.51835 | 70.3 |
| 17* | −27.40220 | Variable | | |
| 18 | ∞ | 0.78000 | 1.51680 | 64.2 |
| 19 | ∞ | (BF) | | |
| Image surface | ∞ | | | |

TABLE II-5

(Aspherical data)

Surface No. 3

K = 0.00000E+00, A4 = 9.73935E−06, A6 = 2.01529E−07,
A8 = −6.57286E−09 A10 = 4.68826E−11, A12 = 1.10311E−12,
A14 = −1.55602E−14

Surface No. 5

K = 0.00000E+00, A4 = −5.00762E−04, A6 = −6.90163E−05,
A8 = 2.16078E−05 A10 = −3.70181E−06, A12 = 2.74194E−07,
A14 = −7.99916E−09

Surface No. 11

K = 0.00000E+00, A4 = −2.89479E−04, A6 = 4.08999E−05,
A8 = 1.11002E−06 A10 = −6.50928E−08, A12 = −3.06626E−10,
A14 = −7.38863E−16

Surface No. 12

K = 0.00000E+00, A4 = 1.51249E−03, A6 = 1.03975E−04,
A8 = −2.90138E−06 A10 = 7.94844E−07, A12 = −1.32978E−08,
A14 = −1.27569E−15

Surface No. 16

K = 0.00000E+00, A4 = −6.52563E−04, A6 = 9.96884E−05,
A8 = −7.95833E−06 A10 = 1.69209E−07, A12 = 0.00000E+00,
A14 = 0.00000E+00

TABLE II-5-continued (Aspherical data)

Surface No. 17

K = 0.00000E+00, A4 = −6.32636E−04, A6 = 9.76080E−05,
A8 = −8.09954E−06 A10 = 1.75608E−07, A12 = 0.00000E+00,
A14 = 0.00000E+00

TABLE II-6

(Various data)

Zooming ratio 7.49310

|  | Wide-angle limit | Middle position | Telephoto limit |
|---|---|---|---|
| Focal length | 4.6144 | 12.6373 | 34.5762 |
| F-number | 3.60485 | 5.00754 | 6.10263 |
| View angle | 40.2420 | 16.8085 | 6.2694 |
| Image height | 3.4000 | 3.8300 | 3.8300 |
| Overall length of lens system | 36.4903 | 42.0945 | 51.9662 |
| BF | 0.90174 | 0.92299 | 0.96731 |
| d3 | 0.3000 | 7.1976 | 14.9737 |
| d9 | 9.4785 | 1.8338 | 0.3000 |
| d10 | 3.1500 | 3.1500 | 1.4700 |
| d15 | 3.8949 | 8.7628 | 17.2798 |
| d17 | 4.5557 | 6.0178 | 2.7659 |

Zoom lens unit data

| Lens unit | Initial surface | Focal length |
|---|---|---|
| 1 | 1 | 31.27548 |
| 2 | 4 | −6.27149 |
| 3 | 11 | 9.81089 |
| 4 | 16 | 23.24402 |

NUMERICAL EXAMPLE II-3

The zoom lens system of Numerical Example II-3 corresponds to Embodiment II-3 shown in FIG. 29. Table II-7 shows the surface data of the zoom lens system of Numerical Example II-3. Table II-8 shows the aspherical data. Table II-9 shows various data.

TABLE II-7

(Surface data)

| Surface number | r | d | nd | vd |
|---|---|---|---|---|
| Object surface | ∞ | | | |
| 1 | 18.17130 | 0.65000 | 1.84666 | 23.8 |
| 2 | 12.22770 | 2.98930 | 1.68863 | 52.8 |
| 3* | −212.50290 | Variable | | |
| 4 | −355.75610 | 0.30000 | 1.80470 | 41.0 |
| 5* | 4.54310 | 2.67490 | | |
| 6 | −12.83170 | 0.30000 | 1.81600 | 46.6 |
| 7 | 74.18050 | 0.24050 | | |
| 8 | 14.45400 | 1.01260 | 1.94595 | 18.0 |
| 9 | −110.09570 | Variable | | |
| 10(Diaphragm) | ∞ | 0.30000 | | |
| 11* | 4.54290 | 2.46430 | 1.51835 | 70.3 |
| 12* | −11.55780 | 0.10000 | | |
| 13 | 5.45990 | 0.76510 | 1.61800 | 63.4 |
| 14 | 7.75380 | 0.40000 | 1.84666 | 23.8 |
| 15 | 3.45990 | Variable | | |
| 16* | 15.19980 | 1.53730 | 1.58332 | 59.1 |
| 17* | −45.54100 | Variable | | |

TABLE II-7-continued (Surface data)

| Surface number | r | d | nd | vd |
|---|---|---|---|---|
| 18 | ∞ | 0.78000 | 1.51680 | 64.2 |
| 19 | ∞ | (BF) | | |
| Image surface | ∞ | | | |

TABLE II-8

(Aspherical data)

Surface No. 3

K = 0.00000E+00, A4 = 1.21907E−05, A6 = 3.74595E−07,
A8 = −3.21598E−08 A10 = 1.24830E−09, A12 = −2.30303E−11,
A14 = 1.61103E−13
Surface No. 5

K = 0.00000E+00, A4 = −3.95422E−04, A6 = −6.72308E−05,
A8 = 1.49718E−05 A10 = −1.83662E−06, A12 = 1.03246E−07,
A14 = −2.43887E−09
Surface No. 11

K = 0.00000E+00, A4 = −1.20975E−03, A6 = 6.77348E−05,
A8 = −3.25317E−05 A10 = 4.71109E−06, A12 = 2.09095E−07,
A14 = −6.47252E−08
Surface No. 12

K = 0.00000E+00, A4 = 8.41212E−04, A6 = 2.10864E−04,
A8 = −7.78307E−05 A10 = 1.33614E−05, A12 = −3.80272E−07,
A14 = −6.17202E−08
Surface No. 16

K = 0.00000E+00, A4 = 1.10298E−03, A6 = −8.78743E−05,
A8 = 3.90375E−06 A10 = −9.32794E−08, A12 = 0.00000E+00,
A14 = 0.00000E+00
Surface No. 17

K = 0.00000E+00, A4 = 1.40125E−03, A6 = −1.15319E−04,
A8 = 4.35142E−06 A10 = −9.14863E−08, A12 = 0.00000E+00,
A14 = 0.00000E+00

TABLE II-9

(Various data)

Zooming ratio 7.33790

|  | Wide-angle limit | Middle position | Telephoto limit |
|---|---|---|---|
| Focal length | 4.7328 | 12.8278 | 34.7285 |
| F-number | 3.21434 | 4.54698 | 6.09156 |
| View angle | 40.6860 | 16.5702 | 6.3041 |
| Image height | 3.6000 | 3.9020 | 3.9020 |
| Overall length of lens system | 34.6093 | 41.1994 | 49.1144 |
| BF | 0.51311 | 0.54895 | 0.60946 |
| d3 | 0.3300 | 6.4862 | 12.3667 |
| d9 | 10.5677 | 4.6157 | 0.8900 |
| d15 | 4.2303 | 10.6474 | 17.9842 |
| d17 | 4.4542 | 4.3871 | 2.7500 |

Zoom lens unit data

| Lens unit | Initial surface | Focal length |
|---|---|---|
| 1 | 1 | 27.11921 |
| 2 | 4 | −5.83344 |
| 3 | 10 | 9.30703 |
| 4 | 16 | 19.72067 |

NUMERICAL EXAMPLE II-4

The zoom lens system of Numerical Example II-4 corresponds to Embodiment II-4 shown in FIG. 32. Table II-10 shows the surface data of the zoom lens system of Numerical Example II-4. Table II-11 shows the aspherical data. Table II-12 shows various data.

TABLE II-10

(Surface data)

| Surface number | r | d | nd | vd |
|---|---|---|---|---|
| Object surface | ∞ | | | |
| 1 | 15.57450 | 0.50000 | 1.84666 | 23.8 |
| 2 | 11.61700 | 3.12000 | 1.58332 | 59.1 |
| 3* | −123.69100 | Variable | | |
| 4 | −130.31500 | 0.30000 | 1.80470 | 41.0 |
| 5* | 4.46700 | 2.52000 | | |
| 6 | −15.05300 | 0.30000 | 1.81600 | 46.6 |
| 7 | 80.65800 | 0.17000 | | |
| 8 | 13.14000 | 0.98000 | 1.94595 | 18.0 |
| 9 | ∞ | Variable | | |
| 10(Diaphragm) | ∞ | 0.30000 | | |
| 11* | 4.45200 | 2.41000 | 1.51845 | 70.0 |
| 12* | −12.78700 | 0.15000 | | |
| 13 | 5.78700 | 0.94000 | 1.65128 | 38.3 |
| 14 | 14.22600 | 0.40000 | 1.84666 | 23.8 |
| 15 | 3.65500 | Variable | | |
| 16* | 15.88120 | 1.48080 | 1.58332 | 59.1 |
| 17* | −41.56400 | Variable | | |
| 18 | ∞ | 0.78000 | 1.51680 | 64.2 |
| 19 | ∞ | (BF) | | |
| Image surface | ∞ | | | |

TABLE II-11

(Aspherical data)

Surface No. 3

K = 0.00000E+00, A4 = 7.11781E−06, A6 = 1.29957E−06,
A8 = −6.71076E−08 A10 = 1.83321E−09, A12 = −2.64889E−11,
A14 = 1.58897E−13

Surface No. 5

K = 0.00000E+00, A4 = −5.41893E−04, A6 = −2.74186E−05,
A8 = 6.68199E−06 A10 = −1.14304E−06, A12 = 7.39873E−08,
A14 = −2.04786E−09

Surface No. 11

K = 0.00000E+00, A4 = −7.23575E−04, A6 = 1.26368E−04,
A8 = −3.86130E−05 A10 = 7.68227E−06, A12 = 1.54012E−07,
A14 = −9.57976E−08

Surface No. 12

K = 0.00000E+00, A4 = 1.78219E−03, A6 = 2.08679E−04,
A8 = −6.97604E−05 A10 = 1.87950E−05, A12 = −1.02863E−06,
A14 = −5.57732E−08

Surface No. 16

K = 0.00000E+00, A4 = 1.30949E−03, A6 = −1.04056E−04,
A8 = 5.71297E−06 A10 = −1.30572E−07, A12 = 0.00000E+00,
A14 = 0.00000E+00

Surface No. 17

K = 0.00000E+00, A4 = 1.62164E−03, A6 = −1.33226E−04,
A8 = 6.62129E−06 A10 = −1.45371E−07, A12 = 0.00000E+00,
A14 = 0.00000E+00

TABLE II-12

(Various data)

Zooming ratio 7.49874

| | Wide-angle limit | Middle position | Telephoto limit |
|---|---|---|---|
| Focal length | 4.6532 | 12.7463 | 34.8928 |
| F-number | 3.39062 | 4.90571 | 6.12988 |
| View angle | 41.3389 | 16.7103 | 6.2911 |
| Image height | 3.6000 | 3.9020 | 3.9020 |
| Overall length of lens system | 34.2593 | 40.6906 | 48.2454 |
| BF | 0.84760 | 0.82135 | 0.85243 |
| d3 | 0.3300 | 6.2145 | 13.0000 |
| d9 | 11.0250 | 4.7950 | 0.8900 |
| d15 | 3.2861 | 9.9694 | 15.6596 |
| d17 | 4.4198 | 4.5396 | 3.4926 |

Zoom lens unit data

| Lens unit | Initial surface | Focal length |
|---|---|---|
| 1 | 1 | 27.49072 |
| 2 | 4 | −5.91501 |
| 3 | 10 | 9.25782 |
| 4 | 16 | 19.88768 |

NUMERICAL EXAMPLE II-5

The zoom lens system of Numerical Example II-5 corresponds to Embodiment II-5 shown in FIG. 35. Table II-13 shows the surface data of the zoom lens system of Numerical Example II-5. Table II-14 shows the aspherical data. Table II-15 shows various data.

TABLE II-13

(Surface data)

| Surface number | r | d | nd | vd |
|---|---|---|---|---|
| Object surface | ∞ | | | |
| 1 | 17.80690 | 0.65000 | 1.84666 | 23.8 |
| 2 | 12.02340 | 2.89720 | 1.68863 | 52.8 |
| 3* | −490.58770 | Variable | | |
| 4 | −568.88980 | 0.30000 | 1.80470 | 41.0 |
| 5* | 4.57670 | 2.72240 | | |
| 6 | −14.00980 | 0.30000 | 1.81600 | 46.6 |
| 7 | 57.28280 | 0.23580 | | |
| 8 | 14.16310 | 0.95940 | 1.94595 | 18.0 |
| 9 | −238.76930 | Variable | | |
| 10 (Diaphragm) | ∞ | 0.30000 | | |
| 11* | 4.54050 | 2.50870 | 1.51845 | 70.0 |
| 12* | −12.42410 | 0.09640 | | |
| 13 | 5.25880 | 0.79150 | 1.61720 | 54.1 |
| 14 | 7.91350 | 0.40000 | 1.84666 | 23.8 |
| 15 | 3.45140 | Variable | | |
| 16* | 19.39100 | 1.44050 | 1.51845 | 70.0 |
| 17* | −25.14690 | Variable | | |
| 18 | ∞ | 0.78000 | 1.51680 | 64.2 |
| 19 | ∞ | (BF) | | |
| Image surface | ∞ | | | |

TABLE II-14

(Aspherical data)

Surface No. 3

K = 0.00000E+00, A4 = −1.66197E−06, A6 = 1.18447E−06,
A8 = −5.02553E−08 A10 = 1.07772E−09, A12 = −1.09341E−11,
A14 = 3.78052E−14

TABLE II-14-continued (Aspherical data)

Surface No. 5

K = 0.00000E+00, A4 = −4.17600E−04, A6 = −2.66984E−05,
A8 = 6.86983E−06 A10 = −1.12718E−06, A12 = 7.40629E−08,
A14 = −2.01494E−09
Surface No. 11

K = 0.00000E+00, A4 = −8.97952E−04, A6 = 3.92079E−05,
A8 = −1.95984E−05 A10 = 5.00932E−06, A12 = −1.50902E−08,
A14 = −6.09931E−08
Surface No. 12

K = 0.00000E+00, A4 = 1.25409E−03, A6 = 1.63953E−04,
A8 = −6.69710E−05 A10 = 1.81836E−05, A12 = −1.60412E−06,
A14 = 1.17236E−08
Surface No. 16

K = 0.00000E+00, A4 = 3.11792E−04, A6 = −3.13905E−05,
A8 = 3.12763E−06 A10 = −8.84964E−08, A12 = 0.00000E+00,
A14 = 0.00000E+00
Surface No. 17

K = 0.00000E+00, A4 = 4.61277E−04, A6 = −5.47272E−05,
A8 = 4.10270E−06 A10 = −1.06668E−07, A12 = 0.00000E+00,
A14 = 0.00000E+00

TABLE II-15

(Various data)

Zooming ratio 7.49976

|  | Wide-angle limit | Middle position | Telephoto limit |
|---|---|---|---|
| Focal length | 4.6580 | 12.7581 | 34.9342 |
| F-number | 3.39823 | 5.03777 | 6.09979 |
| View angle | 41.2990 | 16.7820 | 6.3118 |
| Image height | 3.6000 | 3.9020 | 3.9020 |
| Overall length of lens system | 35.4288 | 41.1847 | 49.0736 |
| BF | 0.51608 | 0.56196 | 0.60174 |
| d3 | 0.3300 | 5.6409 | 13.0000 |
| d9 | 11.4190 | 4.8450 | 0.8900 |
| d15 | 4.7279 | 11.9031 | 16.5706 |
| d17 | 4.0539 | 3.8518 | 3.6294 |

Zoom lens unit data

| Lens unit | Initial surface | Focal length |
|---|---|---|
| 1 | 1 | 27.83974 |
| 2 | 4 | −5.80424 |
| 3 | 10 | 9.20549 |
| 4 | 16 | 21.35358 |

NUMERICAL EXAMPLE II-6

The zoom lens system of Numerical Example II-6 corresponds to Embodiment II-6 shown in FIG. 38. Table II-16 shows the surface data of the zoom lens system of Numerical Example II-6. Table II-17 shows the aspherical data. Table II-18 shows various data.

TABLE II-16

(Surface data)

| Surface number | r | d | nd | vd |
|---|---|---|---|---|
| Object surface | ∞ | | | |
| 1 | 17.59030 | 0.10000 | 1.84666 | 23.8 |
| 2 | 12.05100 | 2.90370 | 1.68863 | 52.8 |
| 3* | −330.72000 | Variable | | |
| 4 | 271.74070 | 0.10000 | 1.80470 | 41.0 |
| 5* | 4.47730 | 2.73660 | | |
| 6 | −13.34660 | 0.10000 | 1.81600 | 46.6 |
| 7 | 50.69290 | 0.24470 | | |
| 8 | 13.73350 | 0.78200 | 1.94595 | 18.0 |
| 9 | −155.68150 | Variable | | |
| 10 (Diaphragm) | ∞ | 0.30000 | | |
| 11* | 4.51360 | 2.85320 | 1.51835 | 70.3 |
| 12* | −14.44820 | 0.11290 | | |
| 13 | 5.08620 | 0.80600 | 1.61720 | 54.1 |
| 14 | 8.18890 | 0.10000 | 1.84666 | 23.8 |
| 15 | 3.65980 | Variable | | |
| 16* | 12.82370 | 1.22100 | 1.51835 | 70.3 |
| 17* | −96.30810 | Variable | | |
| 18 | ∞ | 0.78000 | 1.51680 | 64.2 |
| 19 | ∞ | (BF) | | |
| Image surface | ∞ | | | |

TABLE II-17

(Aspherical data)

Surface No. 3

K = 0.00000E+00, A4 = 2.28372E−07, A6 = 1.08244E−06,
A8 = −4.68071E−08 A10 = 1.08013E−09, A12 = −1.30881E−11,
A14 = 6.55908E−14
Surface No. 5

K = 0.00000E+00, A4 = −4.71832E−04, A6 = −6.58602E−06,
A8 = 2.20339E−06 A10 = −5.35942E−07, A12 = 3.89081E−08,
A14 = −1.21974E−09
Surface No. 11

K = 0.00000E+00, A4 = −7.78498E−04, A6 = 1.25451E−04,
A8 = −3.94153E−05 A10 = 6.86397E−06, A12 = 1.88044E−07,
A14 = −1.05854E−07
Surface No. 12

K = 0.00000E+00, A4 = 1.54352E−03, A6 = 2.14554E−04,
A8 = −6.81651E−05 A10 = 1.82498E−05, A12 = −1.58009E−06,
A14 = 5.81997E−09
Surface No. 16

K = 0.00000E+00, A4 = 2.30584E−04, A6 = −3.36495E−05,
A8 = 3.01234E−06 A10 = −6.81404E−08, A12 = 0.00000E+00,
A14 = 0.00000E+00
Surface No. 17

K = 0.00000E+00, A4 = 4.61443E−04, A6 = −7.27211E−05,
A8 = 4.89642E−06 A10 = −1.04313E−07, A12 = 0.00000E+00,
A14 = 0.00000E+00

TABLE II-18

(Various data)

Zooming ratio 7.50139

|  | Wide-angle limit | Middle position | Telephoto limit |
|---|---|---|---|
| Focal length | 4.6572 | 12.7592 | 34.9357 |
| F-number | 3.48399 | 4.88905 | 6.10072 |
| View angle | 41.1832 | 16.7027 | 6.2968 |
| Image height | 3.6000 | 3.9020 | 3.9020 |
| Overall length of lens system | 34.8066 | 40.7640 | 48.3093 |
| BF | 0.51553 | 0.55177 | 0.59663 |
| d3 | 0.3300 | 6.4457 | 13.0000 |
| d9 | 11.4357 | 4.9402 | 0.8900 |

TABLE II-18-continued (Various data)

| d15 | 5.4425 | 11.4817 | 17.0872 |
|---|---|---|---|
| d17 | 3.9428 | 4.2045 | 3.5954 |

Zoom lens unit data

| Lens unit | Initial surface | Focal length |
|---|---|---|
| 1 | 1 | 27.02401 |
| 2 | 4 | −5.76501 |
| 3 | 10 | 9.33388 |
| 4 | 16 | 21.91612 |

The following Table II-19 shows the corresponding values to the individual conditions in the zoom lens systems of the numerical examples.

TABLE II-19

(Corresponding values to conditions)

| | | Example | | | | | |
|---|---|---|---|---|---|---|---|
| | Condition | II-1 | II-2 | II-3 | II-4 | II-5 | II-6 |
| (1-2) | $f_W/t_{LG2}$ | 15.37 | 15.37 | 15.75 | 15.48 | 15.50 | 46.50 |
| (a) | $\omega_W$ | 40.37 | 40.38 | 40.95 | 41.43 | 41.40 | 41.40 |
| (b) | $f_T/f_W$ | 7.50 | 7.51 | 7.36 | 7.51 | 7.52 | 7.52 |
| (2) | $M_3/f_{G3}$ | 1.25 | 1.18 | 1.30 | 1.24 | 1.24 | 1.21 |
| (3) | $(\beta_{4T}/\beta_{4W})/(f_T/f_W)$ | 0.14 | 0.15 | 0.15 | 0.14 | 0.14 | 0.14 |
| (4) | $\{f_{G3} \times (f_T/f_W)\}/\sqrt{(f_W \times f_T)}$ | 5.59 | 5.82 | 5.33 | 5.45 | 5.41 | 5.49 |
| (5) | $\{f_{G4} \times (f_T/f_W)\}/\sqrt{(f_W \times f_T)}$ | 12.23 | 13.81 | 11.32 | 11.73 | 12.59 | 12.92 |
| (6) | $f_{G4}/f_W$ | 4.47 | 5.04 | 4.17 | 4.28 | 4.59 | 4.71 |
| (7) | $M_1/f_{G1}$ | 0.53 | 0.49 | 0.53 | 0.51 | 0.49 | 0.50 |
| (8) | $t_{G3ce}/t_{G3}$ | 0.36 | 0.26 | 0.31 | 0.35 | 0.32 | 0.24 |
| (9) | $f_{G2}/f_{AIR}$ | −0.17 | −0.19 | −0.16 | −0.19 | −0.16 | −0.16 |
| (10) | $(f_T/f_W) \times f_{L11}/t_{L11}$ | −886.55 | −907.89 | −526.34 | −860.83 | −533.04 | −3425.54 |
| (11) | $(f_T/f_W) \times f_{G1}/t_{L12}$ | 82.64 | 89.98 | 66.77 | 66.17 | 72.23 | 69.95 |
| (12) | $f_{G2}/t_{L21}$ | −20.37 | −20.91 | −19.44 | −19.72 | −19.35 | −57.65 |
| (13) | $f_{G2}/t_{L22n}$ | −20.37 | −20.91 | −19.44 | −19.72 | −19.35 | −57.65 |
| (14) | $\delta h_{L3R2}/\beta_{2T}$ | 0.16 | 0.45 | 0.35 | 0.43 | 0.36 | 0.34 |

NUMERICAL EXAMPLE III-1

The zoom lens system of Numerical Example III-1 corresponds to Embodiment III-1 shown in FIG. 42. Table III-1 shows the surface data of the zoom lens system of Numerical Example III-1. Table III-2 shows the aspherical data. Table III-3 shows various data.

TABLE III-1

(Surface data)

| Surface number | r | d | nd | vd |
|---|---|---|---|---|
| Object surface | ∞ | | | |
| 1 | 17.47110 | 0.50000 | 1.84666 | 23.8 |
| 2 | 12.77780 | 2.78310 | 1.58332 | 59.1 |
| 3* | −121.25860 | Variable | | |
| 4 | 1074.67770 | 0.30000 | 1.80470 | 41.0 |
| 5* | 4.48390 | 2.28830 | | |
| 6 | −14.86000 | 0.30000 | 1.74993 | 45.4 |
| 7 | 22.02310 | 0.10110 | | |
| 8 | 11.09670 | 1.01730 | 1.99537 | 20.7 |
| 9 | −582.95810 | Variable | | |
| 10 (Diaphragm) | ∞ | Variable | | |
| 11* | 5.09560 | 2.29220 | 1.51835 | 70.3 |
| 12* | −14.41540 | 0.10000 | | |
| 13 | 4.41120 | 0.99510 | 1.61293 | 37.0 |
| 14 | 6.48110 | 0.33550 | 1.99537 | 20.7 |
| 15 | 3.45250 | Variable | | |
| 16* | 12.08860 | 1.57190 | 1.51835 | 70.3 |
| 17* | −86.86680 | Variable | | |
| 18 | ∞ | 0.78000 | 1.51680 | 64.2 |
| 19 | ∞ | (BF) | | |
| Image surface | ∞ | | | |

TABLE III-2

(Aspherical data)

Surface No. 3

K = 0.00000E+00, A4 = 8.11150E−06, A6 = 2.84868E−07,
A8 = −7.06629E−09 A10 = −1.13294E−11, A12 = 2.98224E−12,
A14 = −3.38291E−14

Surface No. 5

K = 0.00000E+00, A4 = −3.87772E−04, A6 = 1.65802E−05,
A8 = −8.20777E−07 A10 = −5.66424E−08, A12 = 8.68245E−14,
A14 = −9.37322E−14

Surface No. 11

K = 0.00000E+00, A4 = −4.72136E−04, A6 = 1.05944E−04,
A8 = −1.77011E−05 A10 = 1.67716E−06, A12 = 2.85858E−11,
A14 = −5.33065E−16

Surface No. 12

K = 0.00000E+00, A4 = 1.14793E−03, A6 = 1.03858E−04,
A8 = −1.21012E−05 A10 = 1.63381E−06, A12 = 8.68245E−14,
A14 = −5.37360E−16

Surface No. 16

K = 0.00000E+00, A4 = 5.38048E−04, A6 = −1.94053E−05,
A8 = 7.05384E−07 A10 = −4.75530E−08, A12 = 0.00000E+00,
A14 = 0.00000E+00

TABLE III-2-continued (Aspherical data)

Surface No. 17

K = 0.00000E+00, A4 = 7.12718E−04, A6 = −2.24898E−05,
A8 = −1.43207E−07 A10 = −2.28220E−08, A12 = 0.00000E+00,
A14 = 0.00000E+00

TABLE III-3

(Various data)

Zooming ratio 7.48644

|  | Wide-angle limit | Middle position | Telephoto limit |
|---|---|---|---|
| Focal length | 4.6192 | 12.6485 | 34.5812 |
| F-number | 3.23511 | 4.16381 | 6.09975 |
| View angle | 40.2244 | 16.5154 | 6.2061 |
| Image height | 3.4000 | 3.8300 | 3.8300 |
| Overall length of lens system | 34.7276 | 41.1726 | 51.0292 |
| BF | 0.91665 | 0.94762 | 1.00596 |
| d3 | 0.3000 | 7.7109 | 15.0000 |
| d9 | 8.8683 | 2.0155 | 0.3026 |
| d10 | 3.1500 | 3.1500 | 1.4700 |
| d15 | 4.0014 | 8.3370 | 16.1836 |
| d17 | 4.1268 | 5.6471 | 3.7025 |

Zoom lens unit data

| Lens unit | Initial surface | Focal length |
|---|---|---|
| 1 | 1 | 30.64534 |
| 2 | 4 | −6.11163 |
| 3 | 11 | 9.44099 |
| 4 | 16 | 20.58395 |

NUMERICAL EXAMPLE III-2

The zoom lens system of Numerical Example III-2 corresponds to Embodiment III-2 shown in FIG. 45. Table III-4 shows the surface data of the zoom lens system of Numerical Example III-2. Table III-5 shows the aspherical data. Table III-6 shows various data.

TABLE III-4

(Surface data)

| Surface number | r | d | nd | vd |
|---|---|---|---|---|
| Object surface | ∞ | | | |
| 1 | 17.17720 | 0.50000 | 1.84666 | 23.8 |
| 2 | 12.82040 | 3.39800 | 1.58332 | 59.1 |
| 3* | −1040.03530 | Variable | | |
| 4 | 49.05790 | 0.30000 | 1.80470 | 41.0 |
| 5 | 4.70330 | 2.76380 | | |
| 6 | −12.77140 | 0.30000 | 1.74993 | 45.4 |
| 7 | 20.36460 | 0.14240 | | |
| 8 | 12.67710 | 1.13160 | 1.99537 | 20.7 |
| 9* | −161.40510 | Variable | | |
| 10 (Diaphragm) | ∞ | 0.40000 | | |
| 11 | 4.38810 | 1.95800 | 1.51742 | 52.1 |
| 12 | −21.71750 | 0.52920 | | |
| 13* | 6.67340 | 0.98750 | 1.68400 | 31.3 |
| 14 | 27.43090 | 0.40980 | 1.99537 | 20.7 |
| 15 | 4.93690 | Variable | | |
| 16* | 10.44690 | 1.66470 | 1.51610 | 63.4 |
| 17 | 41.12910 | Variable | | |

TABLE III-4-continued (Surface data)

| Surface number | r | d | nd | vd |
|---|---|---|---|---|
| 18 | ∞ | 0.78000 | 1.51680 | 64.2 |
| 19 | ∞ | (BF) | | |
| Image surface | ∞ | | | |

TABLE III-5

(Aspherical data)

Surface No. 3

K = 0.00000E+00, A4 = 7.60331E−06, A6 = −1.40064E−08,
A8 = 5.18064E−12
Surface No. 9

K = 0.00000E+00, A4 = −7.53498E−05, A6 = 5.33523E−06,
A8 = −1.30091E−07
Surface No. 13

K = 0.00000E+00, A4 = −2.27244E−03, A6 = −1.03594E−04,
A8 = −1.57293E−05
Surface No. 16

K = 0.00000E+00, A4 = −6.83863E−05, A6 = 1.60080E−06,
A8 = −1.50130E−08

TABLE III-6

(Various data)

Zooming ratio 9.33668

|  | Wide-angle limit | Middle position | Telephoto limit |
|---|---|---|---|
| Focal length | 4.6175 | 14.1211 | 43.1119 |
| F-number | 3.60832 | 5.11154 | 6.10735 |
| View angle | 40.2454 | 15.2624 | 4.9880 |
| Image height | 3.4000 | 3.8300 | 3.8300 |
| Overall length of lens system | 39.3423 | 43.6574 | 57.1167 |
| BF | 0.91458 | 0.94559 | 1.00687 |
| d3 | 0.3000 | 7.2677 | 17.0255 |
| d9 | 14.2762 | 4.5263 | 1.3000 |
| d15 | 6.0866 | 8.0162 | 17.9879 |
| d17 | 2.4999 | 7.6366 | 4.5314 |

Zoom lens unit data

| Lens unit | Initial surface | Focal length |
|---|---|---|
| 1 | 1 | 33.85062 |
| 2 | 4 | −6.11220 |
| 3 | 10 | 9.64373 |
| 4 | 16 | 26.64214 |

NUMERICAL EXAMPLE III-3

The zoom lens system of Numerical Example III-3 corresponds to Embodiment III-3 shown in FIG. 48. Table III-7 shows the surface data of the zoom lens system of Numerical Example III-3. Table III-8 shows the aspherical data. Table III-9 shows various data.

TABLE III-7

(Surface data)

| Surface number | r | d | nd | vd |
|---|---|---|---|---|
| Object surface | ∞ | | | |
| 1 | 15.57450 | 0.50000 | 1.84666 | 23.8 |
| 2 | 11.61700 | 3.12000 | 1.58332 | 59.1 |
| 3* | −123.69100 | Variable | | |
| 4 | −130.31500 | 0.30000 | 1.80470 | 41.0 |
| 5* | 4.46700 | 2.52000 | | |
| 6 | −15.05300 | 0.30000 | 1.81600 | 46.6 |
| 7 | 80.65800 | 0.17000 | | |
| 8 | 13.14000 | 0.98000 | 1.94595 | 18.0 |
| 9 | ∞ | Variable | | |
| 10 (Diaphragm) | ∞ | 0.30000 | | |
| 11* | 4.45200 | 2.41000 | 1.51845 | 70.0 |
| 12* | −12.78700 | 0.15000 | | |
| 13 | 5.78700 | 0.94000 | 1.65128 | 38.3 |
| 14 | 14.22600 | 0.40000 | 1.84666 | 23.8 |
| 15 | 3.65500 | Variable | | |
| 16* | 15.88120 | 1.48080 | 1.58332 | 59.1 |
| 17* | −41.56400 | Variable | | |
| 18 | ∞ | 0.78000 | 1.51680 | 64.2 |
| 19 | ∞ | (BF) | | |
| Image surface | ∞ | | | |

TABLE III-8

(Aspherical data)

Surface No. 3

K = 0.00000E+00, A4 = 7.11781E−06, A6 = 1.29957E−06,
A8 = −6.71076E−08 A10 = 1.83321E−09, A12 = −2.64889E−11,
A14 = 1.58897E−13
Surface No. 5

K = 0.00000E+00, A4 = −5.41893E−04, A6 = −2.74186E−05,
A8 = 6.68199E−06 A10 = −1.14304E−06, A12 = 7.39873E−08,
A14 = −2.04786E−09
Surface No. 11

K = 0.00000E+00, A4 = −7.23575E−04, A6 = 1.26368E−04,
A8 = −3.86130E−05 A10 = 7.68227E−06, A12 = 1.54012E−07,
A14 = −9.57976E−08
Surface No. 12

K = 0.00000E+00, A4 = 1.78219E−03, A6 = 2.08679E−04,
A8 = −6.97604E−05 A10 = 1.87950E−05, A12 = −1.02863E−06,
A14 = −5.57732E−08
Surface No. 16

K = 0.00000E+00, A4 = 1.30949E−03, A6 = −1.04056E−04,
A8 = 5.71297E−06 A10 = −1.30572E−07, A12 = 0.00000E+00,
A14 = 0.00000E+00
Surface No. 17

K = 0.00000E+00, A4 = 1.62164E−03, A6 = −1.33226E−04,
A8 = 6.62129E−06 A10 = −1.45371E−07, A12 = 0.00000E+00,
A14 = 0.00000E+00

TABLE III-9

(Various data)

Zooming ratio 7.49874

| | Wide-angle limit | Middle position | Telephoto limit |
|---|---|---|---|
| Focal length | 4.6532 | 12.7463 | 34.8928 |
| F-number | 3.39062 | 4.90571 | 6.12988 |
| View angle | 41.3389 | 16.7103 | 6.2911 |
| Image height | 3.6000 | 3.9020 | 3.9020 |

TABLE III-9-continued (Various data)

| | | | |
|---|---|---|---|
| Overall length of lens system | 34.2593 | 40.6906 | 48.2454 |
| BF | 0.84760 | 0.82135 | 0.85243 |
| d3 | 0.3300 | 6.2145 | 13.0000 |
| d9 | 11.0250 | 4.7950 | 0.8900 |
| d15 | 3.2861 | 9.9694 | 15.6596 |
| d17 | 4.4198 | 4.5396 | 3.4926 |

Zoom lens unit data

| Lens unit | Initial surface | Focal length |
|---|---|---|
| 1 | 1 | 27.49072 |
| 2 | 4 | −5.91501 |
| 3 | 10 | 9.25782 |
| 4 | 16 | 19.88768 |

NUMERICAL EXAMPLE III-4

The zoom lens system of Numerical Example III-4 corresponds to Embodiment III-4 shown in FIG. 51. Table III-10 shows the surface data of the zoom lens system of Numerical Example III-4. Table III-11 shows the aspherical data. Table III-12 shows various data.

TABLE III-10

(Surface data)

| Surface number | r | d | nd | vd |
|---|---|---|---|---|
| Object surface | ∞ | | | |
| 1 | 17.80690 | 0.65000 | 1.84666 | 23.8 |
| 2 | 12.02340 | 2.89720 | 1.68863 | 52.8 |
| 3* | −490.58770 | Variable | | |
| 4 | −568.88980 | 0.30000 | 1.80470 | 41.0 |
| 5* | 4.57670 | 2.72240 | | |
| 6 | −14.00980 | 0.30000 | 1.81600 | 46.6 |
| 7 | 57.28280 | 0.23580 | | |
| 8 | 14.16310 | 0.95940 | 1.94595 | 18.0 |
| 9 | −238.76930 | Variable | | |
| 10(Diaphragm) | ∞ | 0.30000 | | |
| 11* | 4.54050 | 2.50870 | 1.51845 | 70.0 |
| 12* | −12.42410 | 0.09640 | | |
| 13 | 5.25880 | 0.79150 | 1.61720 | 54.1 |
| 14 | 7.91350 | 0.40000 | 1.84666 | 23.8 |
| 15 | 3.45140 | Variable | | |
| 16* | 19.39100 | 1.44050 | 1.51845 | 70.0 |
| 17* | −25.14690 | Variable | | |
| 18 | ∞ | 0.78000 | 1.51680 | 64.2 |
| 19 | ∞ | (BF) | | |
| Image surface | ∞ | | | |

TABLE III-11

(Aspherical data)

Surface No. 3

K = 0.00000E+00, A4 = −1.66197E−06, A6 = 1.18447E−06,
A8 = −5.02553E−08 A10 = 1.07772E−09, A12 = −1.09341E−11,
A14 = 3.78052E−14
Surface No. 5

K = 0.00000E+00, A4 = −4.17600E−04, A6 = −2.66984E−05,
A8 = 6.86983E−06 A10 = −1.12718E−06, A12 = 7.40629E−08,
A14 = −2.01494E−09
Surface No. 11

K = 0.00000E+00, A4 = −8.97952E−04, A6 = 3.92079E−05,
A8 = −1.95984E−05 A10 = 5.00932E−06, A12 = −1.50902E−08,
A14 = −6.09931E−08

TABLE III-11-continued (Aspherical data)

Surface No. 12

K = 0.00000E+00, A4 = 1.25409E−03, A6 = 1.63953E−04,
A8 = −6.69710E−05 A10 = 1.81836E−05, A12 = −1.60412E−06,
A14 = 1.17236E−08
Surface No. 16

K = 0.00000E+00, A4 = 3.11792E−04, A6 = −3.13905E−05,
A8 = 3.12763E−06 A10 = −8.84964E−08, A12 = 0.00000E+00,
A14 = 0.00000E+00
Surface No. 17

K = 0.00000E+00, A4 = 4.61277E−04, A6 = −5.47272E−05,
A8 = 4.10270E−06 A10 = −1.06668E−07, A12 = 0.00000E+00,
A14 = 0.00000E+00

TABLE III-12

(Various data)

Zooming ratio 7.49976

|  | Wide-angle limit | Middle position | Telephoto limit |
|---|---|---|---|
| Focal length | 4.6580 | 12.7581 | 34.9342 |
| F-number | 3.39823 | 5.03777 | 6.09979 |
| View angle | 41.2990 | 16.7820 | 6.3118 |
| Image height | 3.6000 | 3.9020 | 3.9020 |
| Overall length of lens system | 35.4288 | 41.1847 | 49.0736 |
| BF | 0.51608 | 0.56196 | 0.60174 |
| d3 | 0.3300 | 5.6409 | 13.0000 |
| d9 | 11.4190 | 4.8450 | 0.8900 |
| d15 | 4.7279 | 11.9031 | 16.5706 |
| d17 | 4.0539 | 3.8518 | 3.6294 |

Zoom lens unit data

| Lens unit | Initial surface | Focal length |
|---|---|---|
| 1 | 1 | 27.83974 |
| 2 | 4 | −5.80424 |
| 3 | 10 | 9.20549 |
| 4 | 16 | 21.35358 |

NUMERICAL EXAMPLE III-5

The zoom lens system of Numerical Example III-5 corresponds to Embodiment III-5 shown in FIG. 54. Table III-13 shows the surface data of the zoom lens system of Numerical Example III-5. Table III-14 shows the aspherical data. Table III-15 shows various data.

TABLE III-13

(Surface data)

| Surface number | r | d | nd | vd |
|---|---|---|---|---|
| Object surface | ∞ | | | |
| 1 | 17.59030 | 0.10000 | 1.84666 | 23.8 |
| 2 | 12.05100 | 2.90370 | 1.68863 | 52.8 |
| 3* | −330.72000 | Variable | | |
| 4 | 271.74070 | 0.10000 | 1.80470 | 41.0 |
| 5* | 4.47730 | 2.73660 | | |
| 6 | −13.34660 | 0.10000 | 1.81600 | 46.6 |
| 7 | 50.69290 | 0.24470 | | |
| 8 | 13.73350 | 0.78200 | 1.94595 | 18.0 |
| 9 | −155.68150 | Variable | | |
| 10(Diaphragm) | ∞ | 0.30000 | | |
| 11* | 4.51360 | 2.85320 | 1.51835 | 70.3 |
| 12* | −14.44820 | 0.11290 | | |
| 13 | 5.08620 | 0.80600 | 1.61720 | 54.1 |
| 14 | 8.18890 | 0.10000 | 1.84666 | 23.8 |
| 15 | 3.65980 | Variable | | |
| 16* | 12.82370 | 1.22100 | 1.51835 | 70.3 |
| 17* | −96.30810 | Variable | | |
| 18 | ∞ | 0.78000 | 1.51680 | 64.2 |
| 19 | ∞ | (BF) | | |
| Image surface | ∞ | | | |

TABLE III-14

(Aspherical data)

Surface No. 3

K = 0.00000E+00, A4 = 2.28372E−07, A6 = 1.08244E−06,
A8 = −4.68071E−08 A10 = 1.08013E−09, A12 = −1.30881E−11,
A14 = 6.55908E−14
Surface No. 5

K = 0.00000E+00, A4 = −4.71832E−04, A6 = −6.58602E−06,
A8 = 2.20339E−06 A10 = −5.35942E−07, A12 = 3.89081E−08,
A14 = −1.21974E−09
Surface No. 11

K = 0.00000E+00, A4 = −7.78498E−04, A6 = 1.25451E−04,
A8 = −3.94153E−05 A10 = 6.86397E−06, A12 = 1.88044E−07,
A14 = −1.05854E−07
Surface No. 12

K = 0.00000E+00, A4 = 1.54352E−03, A6 = 2.14554E−04,
A8 = −6.81651E−05 A10 = 1.82498E−05, A12 = −1.58009E−06,
A14 = 5.81997E−09
Surface No. 16

K = 0.00000E+00, A4 = 2.30584E−04, A6 = −3.36495E−05,
A8 = 3.01234E−06 A10 = −6.81404E−08, A12 = 0.00000E+00,
A14 = 0.00000E+00
Surface No. 17

K = 0.00000E+00, A4 = 4.61443E−04, A6 = −7.27211E−05,
A8 = 4.89642E−06 A10 = −1.04313E−07, A12 = 0.00000E+00,
A14 = 0.00000E+00

TABLE III-15

(Various data)

Zooming ratio 7.50139

|  | Wide-angle limit | Middle position | Telephoto limit |
|---|---|---|---|
| Focal length | 4.6572 | 12.7592 | 34.9357 |
| F-number | 3.48399 | 4.88905 | 6.10072 |
| View angle | 41.1832 | 16.7027 | 6.2968 |
| Image height | 3.6000 | 3.9020 | 3.9020 |
| Overall length of lens system | 34.8066 | 40.7640 | 48.3093 |
| BF | 0.51553 | 0.55177 | 0.59663 |
| d3 | 0.3300 | 6.4457 | 13.0000 |
| d9 | 11.4357 | 4.9402 | 0.8900 |
| d15 | 5.4425 | 11.4817 | 17.0872 |
| d17 | 3.9428 | 4.2045 | 3.5954 |

Zoom lens unit data

| Lens unit | Initial surface | Focal length |
|---|---|---|
| 1 | 1 | 27.02401 |
| 2 | 4 | −5.76501 |

TABLE III-15-continued (Various data)

| 3 | 10 | 9.33388 |
|---|----|---------|
| 4 | 16 | 21.91612 |

NUMERICAL EXAMPLE III-6

The zoom lens system of Numerical Example III-6 corresponds to Embodiment III-6 shown in FIG. 57. Table III-16 shows the surface data of the zoom lens system of Numerical Example III-6. Table III-17 shows the aspherical data. Table III-18 shows various data.

TABLE III-16

(Surface data)

| Surface number | r | d | nd | vd |
|---|---|---|---|---|
| Object surface | ∞ | | | |
| 1 | 17.10190 | 0.10000 | 1.84666 | 23.8 |
| 2 | 13.09290 | 3.62540 | 1.58332 | 59.1 |
| 3* | −1065.78530 | Variable | | |
| 4 | 39.97580 | 0.10000 | 1.80470 | 41.0 |
| 5 | 4.65370 | 2.80340 | | |
| 6 | −12.23240 | 0.10000 | 1.74993 | 45.4 |
| 7 | 19.13300 | 0.13110 | | |
| 8 | 12.12160 | 0.92740 | 1.99537 | 20.7 |
| 9* | −138.86710 | Variable | | |
| 10(Diaphragm) | ∞ | 0.40000 | | |
| 11 | 4.45740 | 2.05640 | 1.51742 | 52.1 |
| 12 | −18.97810 | 0.43600 | | |
| 13* | 6.90660 | 0.97290 | 1.68400 | 31.3 |
| 14 | 36.26920 | 0.10000 | 1.99537 | 20.7 |
| 15 | 5.31850 | Variable | | |
| 16* | 8.99580 | 1.40660 | 1.51610 | 63.4 |
| 17 | 32.28760 | Variable | | |
| 18 | ∞ | 0.78000 | 1.51680 | 64.2 |
| 19 | ∞ | (BF) | | |
| Image surface | ∞ | | | |

TABLE III-17

(Aspherical data)

Surface No. 3

K = 0.00000E+00, A4 = 8.25308E−06, A6 = −1.22493E−08,
A8 = 5.15824E−12

TABLE III-17-continued (Aspherical data)

Surface No. 9

K = 0.00000E+00, A4 = −6.10967E−05, A6 = 3.19013E−06,
A8 = 1.35922E−08
Surface No. 13

K = 0.00000E+00, A4 = −2.14168E−03, A6 = −1.10355E−04,
A8 = −1.28631E−05
Surface No. 16

K = 0.00000E+00, A4 = −9.54847E−05, A6 = 6.90485E−07,
A8 = 1.09447E−08

TABLE III-18

(Various data)

Zooming ratio 9.33315

| | Wide-angle limit | Middle position | Telephoto limit |
|---|---|---|---|
| Focal length | 4.6153 | 14.1102 | 43.0756 |
| F-number | 3.60552 | 5.07671 | 6.10243 |
| View angle | 40.1883 | 15.4550 | 5.0077 |
| Image height | 3.4000 | 3.8300 | 3.8300 |
| Overall length of lens system | 38.9420 | 44.0812 | 56.8186 |
| BF | 0.91359 | 0.94299 | 0.99154 |
| d3 | 0.3093 | 7.1620 | 17.3053 |
| d9 | 14.1863 | 4.4186 | 1.1242 |
| d15 | 7.0504 | 10.3714 | 18.6596 |
| d17 | 2.5432 | 7.2470 | 4.7988 |

Zoom lens unit data

| Lens unit | Initial surface | Focal length |
|---|---|---|
| 1 | 1 | 33.38187 |
| 2 | 4 | −6.10281 |
| 3 | 10 | 9.87390 |
| 4 | 16 | 23.67565 |

The following Table III-19 shows the corresponding values to the individual conditions in the zoom lens systems of the numerical examples.

TABLE III-19

(Corresponding values to conditions)

| | | Example | | | | | |
|---|---|---|---|---|---|---|---|
| | Condition | III-1 | III-2 | III-3 | III-4 | III-5 | III-6 |
| (1-3) | $(f_T/f_W) \times f_{G1}/t_{G1}$ | 69.84 | 80.98 | 56.87 | 58.83 | 67.40 | 83.55 |
| (8) | $t_{G3ce}/t_{G3}$ | 0.36 | 0.36 | 0.35 | 0.32 | 0.24 | 0.30 |
| (a) | $\omega_W$ | 40.37 | 40.37 | 41.43 | 41.40 | 41.40 | 40.37 |
| (b) | $f_T/f_W$ | 7.50 | 9.35 | 7.51 | 7.52 | 7.52 | 9.35 |
| (2) | $M_3/f_{G3}$ | 1.25 | 1.45 | 1.24 | 1.24 | 1.21 | 1.41 |
| (3) | $(\beta_{4T}/\beta_{4W})/(f_T/f_W)$ | 0.14 | 0.10 | 0.14 | 0.14 | 0.14 | 0.09 |
| (4) | $\{f_{G3} \times (f_T/f_W)\}/\sqrt{(f_W \times f_T)}$ | 5.59 | 6.38 | 5.45 | 5.41 | 5.49 | 6.53 |
| (5) | $\{f_{G4} \times (f_T/f_W)\}/\sqrt{(f_W \times f_T)}$ | 12.23 | 17.67 | 11.73 | 12.59 | 12.92 | 15.70 |
| (6) | $f_{G4}/f_W$ | 4.47 | 5.78 | 4.28 | 4.59 | 4.71 | 5.14 |
| (7) | $M_1/f_{G1}$ | 0.53 | 0.52 | 0.51 | 0.49 | 0.50 | 0.53 |
| (9) | $f_{G2}/f_{AIR}$ | −0.17 | −0.13 | −0.19 | −0.16 | −0.16 | −0.13 |
| (10) | $(f_T/f_W) \times f_{L11}/t_{L11}$ | −886.55 | −1178.24 | −860.83 | −533.04 | −3425.54 | −6238.73 |
| (11) | $(f_T/f_W) \times f_{G1}/t_{L12}$ | 82.64 | 93.13 | 66.17 | 72.23 | 69.95 | 86.08 |
| (12) | $f_{G2}/t_{L21}$ | −20.37 | −20.37 | −19.72 | −19.35 | −57.65 | −61.03 |
| (13) | $f_{G2}/t_{L22n}$ | −20.37 | −20.37 | −19.72 | −19.35 | −57.65 | −61.03 |

NUMERICAL EXAMPLE IV-1

The zoom lens system of Numerical Example IV-1 corresponds to Embodiment IV-1 shown in FIG. 61. Table IV-1 shows the surface data of the zoom lens system of Numerical Example IV-1. Table IV-2 shows the aspherical data. Table IV-3 shows various data.

TABLE IV-1

(Surface data)

| Surface number | r | d | nd | vd |
|---|---|---|---|---|
| Object surface | ∞ | | | |
| 1 | 17.47110 | 0.50000 | 1.84666 | 23.8 |
| 2 | 12.77780 | 2.78310 | 1.58332 | 59.1 |
| 3* | −121.25860 | Variable | | |
| 4 | 1074.67770 | 0.30000 | 1.80470 | 41.0 |
| 5* | 4.48390 | 2.28830 | | |
| 6 | −14.86000 | 0.30000 | 1.74993 | 45.4 |
| 7 | 22.02310 | 0.10110 | | |
| 8 | 11.09670 | 1.01730 | 1.99537 | 20.7 |
| 9 | −582.95810 | Variable | | |
| 10(Diaphragm) | ∞ | Variable | | |
| 11* | 5.09560 | 2.29220 | 1.51835 | 70.3 |
| 12* | −14.41540 | 0.10000 | | |
| 13 | 4.41120 | 0.99510 | 1.61293 | 37.0 |
| 14 | 6.48110 | 0.33550 | 1.99537 | 20.7 |
| 15 | 3.45250 | Variable | | |
| 16* | 12.08860 | 1.57190 | 1.51835 | 70.3 |
| 17* | −86.86680 | Variable | | |
| 18 | ∞ | 0.78000 | 1.51680 | 64.2 |
| 19 | ∞ | (BF) | | |
| Image surface | ∞ | | | |

TABLE IV-2

(Aspherical data)

Surface No. 3

K = 0.00000E+00, A4 = 8.11150E−06, A6 = 2.84868E−07,
A8 = −7.06629E−09 A10 = −1.13294E−11, A12 = 2.98224E−12,
A14 = −3.38291E−14
Surface No. 5

K = 0.00000E+00, A4 = −3.87772E−04, A6 = 1.65802E−05,
A8 = −8.20777E−07 A10 = −5.66424E−08, A12 = 8.68245E−14,
A14 = −9.37322E−14
Surface No. 11

K = 0.00000E+00, A4 = −4.72136E−04, A6 = 1.05944E−04,
A8 = −1.77011E−05 A10 = 1.67716E−06, A12 = 2.85858E−11,
A14 = −5.33065E−16
Surface No. 12

K = 0.00000E+00, A4 = 1.14793E−03, A6 = 1.03858E−04,
A8 = −1.21012E−05 A10 = 1.63381E−06, A12 = 8.68837E−14,
A14 = −5.37360E−16
Surface No. 16

K = 0.00000E+00, A4 = 5.38048E−04, A6 = −1.94053E−05,
A8 = 7.05384E−07 A10 = −4.75530E−08, A12 = 0.00000E+00,
A14 = 0.00000E+00
Surface No. 17

K = 0.00000E+00, A4 = 7.12718E−04, A6 = −2.24898E−05,
A8 = −1.43207E−07 A10 = −2.28220E−08, A12 = 0.00000E+00,
A14 = 0.00000E+00

TABLE IV-3

(Various data)

Zooming ratio 7.48644

| | Wide-angle limit | Middle position | Telephoto limit |
|---|---|---|---|
| Focal length | 4.6192 | 12.6485 | 34.5812 |
| F-number | 3.23511 | 4.16381 | 6.09975 |
| View angle | 40.2244 | 16.5154 | 6.2061 |
| Image height | 3.4000 | 3.8300 | 3.8300 |
| Overall length of lens system | 34.7276 | 41.1726 | 51.0292 |
| BF | 0.91665 | 0.94762 | 1.00596 |
| d3 | 0.3000 | 7.7109 | 15.0000 |
| d9 | 8.8683 | 2.0155 | 0.3026 |
| d10 | 3.1500 | 3.1500 | 1.4700 |
| d15 | 4.0014 | 8.3370 | 16.1836 |
| d17 | 4.1268 | 5.6471 | 3.7025 |

Zoom lens unit data

| Lens unit | Initial surface | Focal length |
|---|---|---|
| 1 | 1 | 30.64534 |
| 2 | 4 | −6.11163 |
| 3 | 11 | 9.44099 |
| 4 | 16 | 20.58395 |

NUMERICAL EXAMPLE IV-2

The zoom lens system of Numerical Example IV-2 corresponds to Embodiment IV-2 shown in FIG. 64. Table IV-4 shows the surface data of the zoom lens system of Numerical Example IV-2. Table IV-5 shows the aspherical data. Table IV-6 shows various data.

TABLE IV-4

(Surface data)

| Surface number | r | d | nd | vd |
|---|---|---|---|---|
| Object surface | ∞ | | | |
| 1 | 15.52800 | 0.50000 | 1.84666 | 23.8 |
| 2 | 11.73920 | 2.60870 | 1.58332 | 59.1 |
| 3* | 1209.60330 | Variable | | |
| 4 | 213.97190 | 0.30000 | 1.80470 | 41.0 |
| 5* | 4.31340 | 2.36830 | | |
| 6 | −12.02920 | 0.30000 | 1.74993 | 45.4 |
| 7 | 56.78030 | 0.22420 | | |
| 8 | 13.63820 | 0.99930 | 1.99537 | 20.7 |
| 9 | −84.04160 | Variable | | |
| 10(Diaphragm) | ∞ | Variable | | |
| 11* | 5.18320 | 3.42370 | 1.51835 | 70.3 |
| 12* | −14.46730 | 0.11140 | | |
| 13 | 6.41420 | 0.94740 | 1.60602 | 57.4 |
| 14 | 13.28000 | 0.30000 | 1.84666 | 23.8 |
| 15 | 4.71130 | Variable | | |
| 16* | 21.14270 | 1.34650 | 1.51835 | 70.3 |
| 17* | −27.40220 | Variable | | |
| 18 | ∞ | 0.78000 | 1.51680 | 64.2 |
| 19 | ∞ | (BF) | | |
| Image surface | ∞ | | | |

TABLE IV-5

(Aspherical data)

Surface No. 3

K = 0.00000E+00, A4 = 9.73935E−06, A6 = 2.01529E−07,
A8 = −6.57286E−09 A10 = 4.68826E−11, A12 = 1.10311E−12,
A14 = −1.55602E−14

TABLE IV-5-continued (Aspherical data)

Surface No. 5

K = 0.00000E+00, A4 = -5.00762E-04, A6 = -6.90163E-05,
A8 = 2.16078E-05 A10 = -3.70181E-06, A12 = 2.74194E-07,
A14 = -7.99916E-09

Surface No. 11

K = 0.00000E+00, A4 = -2.89479E-04, A6 = 4.08999E-05,
A8 = 1.11002E-06 A10 = -6.50928E-08, A12 = -3.06626E-10,
A14 = -7.38863E-16

Surface No. 12

K = 0.00000E+00, A4 = 1.51249E-03, A6 = 1.03975E-04,
A8 = -2.90138E-06 A10 = 7.94844E-07, A12 = -1.32978E-08,
A14 = -1.27569E-15

Surface No. 16

K = 0.00000E+00, A4 = -6.52563E-04, A6 = 9.96884E-05,
A8 = -7.95833E-06 A10 = 1.69209E-07, A12 = 0.00000E+00,
A14 = 0.00000E+00

Surface No. 17

K = 0.00000E+00, A4 = -6.32636E-04, A6 = 9.76080E-05,
A8 = -8.09954E-06 A10 = 1.75608E-07, A12 = 0.00000E+00,
A14 = 0.00000E+00

TABLE IV-6

(Various data)

Zooming ratio 7.49310

| | Wide-angle limit | Middle position | Telephoto limit |
|---|---|---|---|
| Focal length | 4.6144 | 12.6373 | 34.5762 |
| F-number | 3.60485 | 5.00754 | 6.10263 |
| View angle | 40.2420 | 16.8085 | 6.2694 |
| Image height | 3.4000 | 3.8300 | 3.8300 |
| Overall length of lens system | 36.4903 | 42.0945 | 51.9662 |
| BF | 0.90174 | 0.92299 | 0.96731 |
| d3 | 0.3000 | 7.1976 | 14.9737 |
| d9 | 9.4785 | 1.8338 | 0.3000 |
| d10 | 3.1500 | 3.1500 | 1.4700 |
| d15 | 3.8949 | 8.7628 | 17.2798 |
| d17 | 4.5557 | 6.0178 | 2.7659 |

Zoom lens unit data

| Lens unit | Initial surface | Focal length |
|---|---|---|
| 1 | 1 | 31.27548 |
| 2 | 4 | -6.27149 |
| 3 | 11 | 9.81089 |
| 4 | 16 | 23.24402 |

NUMERICAL EXAMPLE IV-3

The zoom lens system of Numerical Example IV-3 corresponds to Embodiment IV-3 shown in FIG. 67. Table IV-7 shows the surface data of the zoom lens system of Numerical Example IV-3. Table IV-8 shows the aspherical data. Table IV-9 shows various data.

TABLE IV-7

(Surface data)

| Surface number | r | d | nd | vd |
|---|---|---|---|---|
| Object surface | ∞ | | | |
| 1 | 17.17720 | 0.50000 | 1.84666 | 23.8 |
| 2 | 12.82040 | 3.39800 | 1.58332 | 59.1 |
| 3* | -1040.03530 | Variable | | |
| 4 | 49.05790 | 0.30000 | 1.80470 | 41.0 |
| 5 | 4.70330 | 2.76380 | | |
| 6 | -12.77140 | 0.30000 | 1.74993 | 45.4 |
| 7 | 20.36460 | 0.14240 | | |
| 8 | 12.67710 | 1.13160 | 1.99537 | 20.7 |
| 9* | -161.40510 | Variable | | |
| 10(Diaphragm) | ∞ | 0.40000 | | |
| 11 | 4.38810 | 1.95800 | 1.51742 | 52.1 |
| 12 | -21.71750 | 0.52920 | | |
| 13* | 6.67340 | 0.98750 | 1.68400 | 31.3 |
| 14 | 27.43090 | 0.40980 | 1.99537 | 20.7 |
| 15 | 4.93690 | Variable | | |
| 16* | 10.44690 | 1.66470 | 1.51610 | 63.4 |
| 17 | 41.12910 | Variable | | |
| 18 | ∞ | 0.78000 | 1.51680 | 64.2 |
| 19 | ∞ | (BF) | | |
| Image surface | ∞ | | | |

TABLE IV-8

(Aspherical data)

Surface No. 3

K = 0.00000E+00, A4 = 7.60331E-06, A6 = -1.40064E-08,
A8 = 5.18064E-12

Surface No. 9

K = 0.00000E+00, A4 = -7.53498E-05, A6 = 5.33523E-06,
A8 = -1.30091E-07

Surface No. 13

K = 0.00000E+00, A4 = -2.27244E-03, A6 = -1.03594E-04,
A8 = -1.57293E-05

Surface No. 16

K = 0.00000E+00, A4 = -6.83863E-05, A6 = 1.60080E-06,
A8 = -1.50130E-08

TABLE IV-9

(Various data)

Zooming ratio 9.33668

| | Wide-angle limit | Middle position | Telephoto limit |
|---|---|---|---|
| Focal length | 4.6175 | 14.1211 | 43.1119 |
| F-number | 3.60832 | 5.11154 | 6.10735 |
| View angle | 40.2454 | 15.2624 | 4.9880 |
| Image height | 3.4000 | 3.8300 | 3.8300 |
| Overall length of lens system | 39.3423 | 43.6574 | 57.1167 |
| BF | 0.91458 | 0.94559 | 1.00687 |
| d3 | 0.3000 | 7.2677 | 17.0255 |
| d9 | 14.2762 | 4.5263 | 1.3000 |
| d15 | 6.0866 | 8.0162 | 17.9879 |
| d17 | 2.4999 | 7.6366 | 4.5314 |

Zoom lens unit data

| Lens unit | Initial surface | Focal length |
|---|---|---|
| 1 | 1 | 33.85062 |
| 2 | 4 | -6.11220 |
| 3 | 10 | 9.64373 |
| 4 | 16 | 26.64214 |

NUMERICAL EXAMPLE IV-4

The zoom lens system of Numerical Example IV-4 corresponds to Embodiment IV-4 shown in FIG. 70. Table IV-10 shows the surface data of the zoom lens system of Numerical Example IV-4. Table IV-11 shows the aspherical data. Table IV-12 shows various data.

TABLE IV-10

(Surface data)

| Surface number | r | d | nd | vd |
|---|---|---|---|---|
| Object surface | ∞ | | | |
| 1 | 15.57450 | 0.50000 | 1.84666 | 23.8 |
| 2 | 11.61700 | 3.12000 | 1.58332 | 59.1 |
| 3* | −123.69100 | Variable | | |
| 4 | −130.31500 | 0.30000 | 1.80470 | 41.0 |
| 5* | 4.46700 | 2.52000 | | |
| 6 | −15.05300 | 0.30000 | 1.81600 | 46.6 |
| 7 | 80.65800 | 0.17000 | | |
| 8 | 13.14000 | 0.98000 | 1.94595 | 18.0 |
| 9 | ∞ | Variable | | |
| 10(Diaphragm) | ∞ | 0.30000 | | |
| 11* | 4.45200 | 2.41000 | 1.51845 | 70.0 |
| 12* | −12.78700 | 0.15000 | | |
| 13 | 5.78700 | 0.94000 | 1.65128 | 38.3 |
| 14 | 14.22600 | 0.40000 | 1.84666 | 23.8 |
| 15 | 3.65500 | Variable | | |
| 16* | 15.88120 | 1.48080 | 1.58332 | 59.1 |
| 17* | −41.56400 | Variable | | |
| 18 | ∞ | 0.78000 | 1.51680 | 64.2 |
| 19 | ∞ | (BF) | | |
| Image surface | ∞ | | | |

TABLE IV-11

(Aspherical data)

Surface No. 3

$K = 0.00000E+00, A4 = 7.11781E-06, A6 = 1.29957E-06,$
$A8 = -6.71076E-08\ A10 = 1.83321E-09, A12 = -2.64889E-11,$
$A14 = 1.58897E-13$
Surface No. 5

$K = 0.00000E+00, A4 = -5.41893E-04, A6 = -2.74186E-05,$
$A8 = 6.68199E-06\ A10 = -1.14304E-06, A12 = 7.39873E-08,$
$A14 = -2.04786E-09$
Surface No. 11

$K = 0.00000E+00, A4 = -7.23575E-04, A6 = 1.26368E-04,$
$A8 = -3.86130E-05\ A10 = 7.68227E-06, A12 = 1.54012E-07,$
$A14 = -9.57976E-08$
Surface No. 12

$K = 0.00000E+00, A4 = 1.78219E-03, A6 = 2.08679E-04,$
$A8 = -6.97604E-05\ A10 = 1.87950E-05, A12 = -1.02863E-06,$
$A14 = -5.57732E-08$
Surface No. 16

$K = 0.00000E+00, A4 = 1.30949E-03, A6 = -1.04056E-04,$
$A8 = 5.71297E-06\ A10 = -1.30572E-07, A12 = 0.00000E+00,$
$A14 = 0.00000E+00$
Surface No. 17

$K = 0.00000E+00, A4 = 1.62164E-03, A6 = -1.33226E-04,$
$A8 = 6.62129E-06\ A10 = -1.45371E-07, A12 = 0.00000E+00,$
$A14 = 0.00000E+00$

TABLE IV-12

(Various data)

Zooming ratio 7.49874

| | Wide-angle limit | Middle position | Telephoto limit |
|---|---|---|---|
| Focal length | 4.6532 | 12.7463 | 34.8928 |
| F-number | 3.39062 | 4.90571 | 6.12988 |
| View angle | 41.3389 | 16.7103 | 6.2911 |
| Image height | 3.6000 | 3.9020 | 3.9020 |
| Overall length of lens system | 34.2593 | 40.6906 | 48.2454 |
| BF | 0.84760 | 0.82135 | 0.85243 |
| d3 | 0.3300 | 6.2145 | 13.0000 |
| d9 | 11.0250 | 4.7950 | 0.8900 |
| d15 | 3.2861 | 9.9694 | 15.6596 |
| d17 | 4.4198 | 4.5396 | 3.4926 |

Zoom lens unit data

| Lens unit | Initial surface | Focal length |
|---|---|---|
| 1 | 1 | 27.49072 |
| 2 | 4 | −5.91501 |
| 3 | 10 | 9.25782 |
| 4 | 16 | 19.88768 |

NUMERICAL EXAMPLE IV-5

The zoom lens system of Numerical Example IV-5 corresponds to Embodiment IV-5 shown in FIG. 73. Table IV-13 shows the surface data of the zoom lens system of Numerical Example IV-5. Table IV-14 shows the aspherical data. Table IV-15 shows various data.

TABLE IV-13

(Surface data)

| Surface number | r | d | nd | vd |
|---|---|---|---|---|
| Object surface | ∞ | | | |
| 1 | 17.80690 | 0.65000 | 1.84666 | 23.8 |
| 2 | 12.02340 | 2.89720 | 1.68863 | 52.8 |
| 3* | −490.58770 | Variable | | |
| 4 | −568.88980 | 0.30000 | 1.80470 | 41.0 |
| 5* | 4.57670 | 2.72240 | | |
| 6 | −14.00980 | 0.30000 | 1.81600 | 46.6 |
| 7 | 57.28280 | 0.23580 | | |
| 8 | 14.16310 | 0.95940 | 1.94595 | 18.0 |
| 9 | −238.76930 | Variable | | |
| 10(Diaphragm) | ∞ | 0.30000 | | |
| 11* | 4.54050 | 2.50870 | 1.51845 | 70.0 |
| 12* | −12.42410 | 0.09640 | | |
| 13 | 5.25880 | 0.79150 | 1.61720 | 54.1 |
| 14 | 7.91350 | 0.40000 | 1.84666 | 23.8 |
| 15 | 3.45140 | Variable | | |
| 16* | 19.39100 | 1.44050 | 1.51845 | 70.0 |
| 17* | −25.14690 | Variable | | |
| 18 | ∞ | 0.78000 | 1.51680 | 64.2 |
| 19 | ∞ | (BF) | | |
| Image surface | ∞ | | | |

TABLE IV-14

(Aspherical data)

Surface No. 3

$K = 0.00000E+00, A4 = -1.66197E-06, A6 = 1.18447E-06,$
$A8 = -5.02553E-08\ A10 = 1.07772E-09, A12 = -1.09341E-11,$
$A14 = 3.78052E-14$

TABLE IV-14-continued (Aspherical data)

Surface No. 5

K = 0.00000E+00, A4 = −4.17600E−04, A6 = −2.66984E−05,
A8 = 6.86983E−06 A10 = −1.12718E−06, A12 = 7.40629E−08,
A14 = −2.01494E−09
Surface No. 11

K = 0.00000E+00, A4 = −8.97952E−04, A6 = 3.92079E−05,
A8 = −1.95984E−05 A10 = 5.00932E−06, A12 = −1.50902E−08,
A14 = −6.09931E−08
Surface No. 12

K = 0.00000E+00, A4 = 1.25409E−03, A6 = 1.63953E−04,
A8 = −6.69710E−05 A10 = 1.81836E−05, A12 = −1.60412E−06,
A14 = 1.17236E−08
Surface No. 16

K = 0.00000E+00, A4 = 3.11792E−04, A6 = −3.13905E−05,
A8 = 3.12763E−06 A10 = −8.84964E−08, A12 = 0.00000E+00,
A14 = 0.00000E+00
Surface No. 17

K = 0.00000E+00, A4 = 4.61277E−04, A6 = −5.47272E−05,
A8 = 4.10270E−06 A10 = −1.06668E−07, A12 = 0.00000E+00,
A14 = 0.00000E+00

TABLE IV-15

(Various data)

Zooming ratio 7.49976

|  | Wide-angle limit | Middle position | Telephoto limit |
|---|---|---|---|
| Focal length | 4.6580 | 12.7581 | 34.9342 |
| F-number | 3.39823 | 5.03777 | 6.09979 |
| View angle | 41.2990 | 16.7820 | 6.3118 |
| Image height | 3.6000 | 3.9020 | 3.9020 |
| Overall length of lens system | 35.4288 | 41.1847 | 49.0736 |
| BF | 0.51608 | 0.56196 | 0.60174 |
| d3 | 0.3300 | 5.6409 | 13.0000 |
| d9 | 11.4190 | 4.8450 | 0.8900 |
| d15 | 4.7279 | 11.9031 | 16.5706 |
| d17 | 4.0539 | 3.8518 | 3.6294 |

Zoom lens unit data

| Lens unit | Initial surface | Focal length |
|---|---|---|
| 1 | 1 | 27.83974 |
| 2 | 4 | −5.80424 |
| 3 | 10 | 9.20549 |
| 4 | 16 | 21.35358 |

NUMERICAL EXAMPLE IV-6

The zoom lens system of Numerical Example IV-6 corresponds to Embodiment IV-6 shown in FIG. 76. Table IV-16 shows the surface data of the zoom lens system of Numerical Example IV-6. Table IV-17 shows the aspherical data. Table IV-18 shows various data.

TABLE IV-16

(Surface data)

| Surface number | r | d | nd | vd |
|---|---|---|---|---|
| Object surface | ∞ |  |  |  |
| 1 | 17.59030 | 0.10000 | 1.84666 | 23.8 |
| 2 | 12.05100 | 2.90370 | 1.68863 | 52.8 |
| 3* | −330.72000 | Variable |  |  |
| 4 | 271.74070 | 0.10000 | 1.80470 | 41.0 |
| 5* | 4.47730 | 2.73660 |  |  |
| 6 | −13.34660 | 0.10000 | 1.81600 | 46.6 |
| 7 | 50.69290 | 0.24470 |  |  |
| 8 | 13.73350 | 0.78200 | 1.94595 | 18.0 |
| 9 | −155.68150 | Variable |  |  |
| 10(Diaphragm) | ∞ | 0.30000 |  |  |
| 11* | 4.51360 | 2.85320 | 1.51835 | 70.3 |
| 12* | −14.44820 | 0.11290 |  |  |
| 13 | 5.08620 | 0.80600 | 1.61720 | 54.1 |
| 14 | 8.18890 | 0.10000 | 1.84666 | 23.8 |
| 15 | 3.65980 | Variable |  |  |
| 16* | 12.82370 | 1.22100 | 1.51835 | 70.3 |
| 17* | −96.30810 | Variable |  |  |
| 18 | ∞ | 0.78000 | 1.51680 | 64.2 |
| 19 | ∞ | (BF) |  |  |
| Image surface | ∞ |  |  |  |

TABLE IV-17

(Aspherical data)

Surface No. 3

K = 0.00000E+00, A4 = 2.28372E−07, A6 = 1.08244E−06,
A8 = −4.68071E−08 A10 = 1.08013E−09, A12 = −1.30881E−11,
A14 = 6.55908E−14
Surface No. 5

K = 0.00000E+00, A4 = −4.71832E−04, A6 = −6.58602E−06,
A8 = 2.20339E−06 A10 = −5.35942E−07, A12 = 3.89081E−08,
A14 = −1.21974E−09
Surface No. 11

K = 0.00000E+00, A4 = −7.78498E−04, A6 = 1.25451E−04,
A8 = −3.94153E−05 A10 = 6.86397E−06, A12 = 1.88044E−07,
A14 = −1.05854E−07
Surface No. 12

K = 0.00000E+00, A4 = 1.54352E−03, A6 = 2.14554E−04,
A8 = −6.81651E−05 A10 = 1.82498E−05, A12 = −1.58009E−06,
A14 = 5.81997E−09
Surface No. 16

K = 0.00000E+00, A4 = 2.30584E−04, A6 = −3.36495E−05,
A8 = 3.01234E−06 A10 = −6.81404E−08, A12 = 0.00000E+00,
A14 = 0.00000E+00
Surface No. 17

K = 0.00000E+00, A4 = 4.61443E−04, A6 = −7.27211E−05,
A8 = 4.89642E−06 A10 = −1.04313E−07, A12 = 0.00000E+00,
A14 = 0.00000E+00

TABLE IV-18

(Various data)

Zooming ratio 7.50139

|  | Wide-angle limit | Middle position | Telephoto limit |
|---|---|---|---|
| Focal length | 4.6572 | 12.7592 | 34.9357 |
| F-number | 3.48399 | 4.88905 | 6.10072 |
| View angle | 41.1832 | 16.7027 | 6.2968 |
| Image height | 3.6000 | 3.9020 | 3.9020 |

TABLE IV-18-continued (Various data)

| Overall length of lens system | 34.8066 | 40.7640 | 48.3093 |
|---|---|---|---|
| BF | 0.51553 | 0.55177 | 0.59663 |
| d3 | 0.3300 | 6.4457 | 13.0000 |
| d9 | 11.4357 | 4.9402 | 0.8900 |
| d15 | 5.4425 | 11.4817 | 17.0872 |
| d17 | 3.9428 | 4.2045 | 3.5954 |

Zoom lens unit data

| Lens unit | Initial surface | Focal length |
|---|---|---|
| 1 | 1 | 27.02401 |
| 2 | 4 | −5.76501 |
| 3 | 10 | 9.33388 |
| 4 | 16 | 21.91612 |

NUMERICAL EXAMPLE IV-7

The zoom lens system of Numerical Example IV-7 corresponds to Embodiment IV-7 shown in FIG. 79. Table IV-19 shows the surface data of the zoom lens system of Numerical Example IV-7. Table IV-20 shows the aspherical data. Table IV-21 shows various data.

TABLE IV-19

(Surface data)

| Surface number | r | d | nd | vd |
|---|---|---|---|---|
| Object surface | ∞ | | | |
| 1 | 17.10190 | 0.10000 | 1.84666 | 23.8 |
| 2 | 13.09290 | 3.62540 | 1.58332 | 59.1 |
| 3* | −1065.78530 | Variable | | |
| 4 | 39.97580 | 0.10000 | 1.80470 | 41.0 |
| 5 | 4.65370 | 2.80340 | | |
| 6 | −12.23240 | 0.10000 | 1.74993 | 45.4 |
| 7 | 19.13300 | 0.13110 | | |
| 8 | 12.12160 | 0.92740 | 1.99537 | 20.7 |
| 9* | −138.86710 | Variable | | |
| 10(Diaphragm) | ∞ | 0.40000 | | |
| 11 | 4.45740 | 2.05640 | 1.51742 | 52.1 |
| 12 | −18.97810 | 0.43600 | | |
| 13* | 6.90660 | 0.97290 | 1.68400 | 31.3 |
| 14 | 36.26920 | 0.10000 | 1.99537 | 20.7 |
| 15 | 5.31850 | Variable | | |
| 16* | 8.99580 | 1.40660 | 1.51610 | 63.4 |
| 17 | 32.28760 | Variable | | |
| 18 | ∞ | 0.78000 | 1.51680 | 64.2 |
| 19 | ∞ | (BF) | | |
| Image surface | ∞ | | | |

TABLE IV-20

(Aspherical data)

Surface No. 3

K = 0.00000E+00, A4 = 8.25308E−06, A6 = −1.22493E−08, A8 = 5.15824E−12

Surface No. 9

K = 0.00000E+00, A4 = −6.10967E−05, A6 = 3.19013E−06, A8 = 1.35922E−08

Surface No. 13

K = 0.00000E+00, A4 = −2.14168E−03, A6 = −1.10355E−04, A8 = −1.28631E−05

Surface No. 16

K = 0.00000E+00, A4 = −9.54847E−05, A6 = 6.90485E−07, A8 = 1.09447E−08

TABLE IV-21

(Various data)

Zooming ratio 9.33315

| | Wide-angle limit | Middle position | Telephoto limit |
|---|---|---|---|
| Focal length | 4.6153 | 14.1102 | 43.0756 |
| F-number | 3.60552 | 5.07671 | 6.10243 |
| View angle | 40.1883 | 15.4550 | 5.0077 |
| Image height | 3.4000 | 3.8300 | 3.8300 |
| Overall length of lens system | 38.9420 | 44.0812 | 56.8186 |
| BF | 0.91359 | 0.94299 | 0.99154 |
| d3 | 0.3093 | 7.1620 | 17.3053 |
| d9 | 14.1863 | 4.4186 | 1.1242 |
| d15 | 7.0504 | 10.3714 | 18.6596 |
| d17 | 2.5432 | 7.2470 | 4.7988 |

Zoom lens unit data

| Lens unit | Initial surface | Focal length |
|---|---|---|
| 1 | 1 | 33.38187 |
| 2 | 4 | −6.10281 |
| 3 | 10 | 9.87390 |
| 4 | 16 | 23.67565 |

The following Table IV-22 shows the corresponding values to the individual conditions in the zoom lens systems of the numerical examples.

TABLE IV-22

(Corresponding values to conditions)

| | Condition | IV-1 | IV-2 | IV-3 | IV-4 | IV-5 | IV-6 | IV-7 |
|---|---|---|---|---|---|---|---|---|
| (1-4) | $(f_T/f_W) \times f_{G4}/t_{G4}$ | 98.27 | 129.56 | 149.62 | 100.85 | 111.03 | 134.91 | 157.36 |
| (6) | $f_{G4}/f_W$ | 4.47 | 5.04 | 5.78 | 4.28 | 4.59 | 4.71 | 5.14 |
| (a) | $\omega_W$ | 40.37 | 40.38 | 40.37 | 41.43 | 41.40 | 41.40 | 40.37 |
| (b) | $f_T/f_W$ | 7.50 | 7.51 | 9.35 | 7.51 | 7.52 | 7.52 | 9.35 |
| (2) | $M_3/f_{G3}$ | 1.25 | 1.18 | 1.45 | 1.24 | 1.24 | 1.21 | 1.41 |
| (3) | $(\beta_{4T}/\beta_{4W})/(f_T/f_W)$ | 0.14 | 0.15 | 0.10 | 0.14 | 0.14 | 0.14 | 0.09 |
| (4) | $\{f_{G3} \times (f_T/f_W)\}/\sqrt{(f_W \times f_T)}$ | 5.59 | 5.82 | 6.38 | 5.45 | 5.41 | 5.49 | 6.53 |
| (5) | $\{f_{G4} \times (f_T/f_W)\}/\sqrt{(f_W \times f_T)}$ | 12.23 | 13.81 | 17.67 | 11.73 | 12.59 | 12.92 | 15.70 |
| (7) | $M_1/f_{G1}$ | 0.53 | 0.49 | 0.52 | 0.51 | 0.49 | 0.50 | 0.53 |
| (8) | $t_{G3ce}/t_{G3}$ | 0.36 | 0.26 | 0.36 | 0.35 | 0.32 | 0.24 | 0.30 |
| (9) | $f_{G2}/f_{AIR}$ | −0.17 | −0.19 | −0.13 | −0.19 | −0.16 | −0.16 | −0.13 |

TABLE IV-22-continued (Corresponding values to conditions)

| Condition | | Example | | | | | | |
|---|---|---|---|---|---|---|---|---|
| | | IV-1 | IV-2 | IV-3 | IV-4 | IV-5 | IV-6 | IV-7 |
| (10) | $(f_T/f_W) \times f_{L11}/t_{L11}$ | −886.55 | −907.89 | −1178.24 | −860.83 | −533.04 | −3425.54 | −6238.73 |
| (11) | $(f_T/f_W) \times f_{G1}/t_{L12}$ | 82.64 | 89.98 | 93.13 | 66.17 | 72.23 | 69.95 | 86.08 |
| (12) | $f_{G2}/t_{L21}$ | −20.37 | −20.91 | −20.37 | −19.72 | −19.35 | −57.65 | −61.03 |
| (13) | $f_{G2}/t_{L22n}$ | −20.37 | −20.91 | −20.37 | −19.72 | −19.35 | −57.65 | −61.03 |

The zoom lens system according to the present invention is applicable to a digital input device such as a digital camera, a mobile telephone, a PDA (Personal Digital Assistance), a surveillance camera in a surveillance system, a Web camera or a vehicle-mounted camera. In particular, the zoom lens system according to the present invention is suitable for a photographing optical system where high image quality is required like in a digital camera.

Although the present invention has been fully described by way of example with reference to the accompanying drawings, it is to be understood that various changes and modifications will be apparent to those skilled in the art. Therefore, unless otherwise such changes and modification depart from the scope of the present invention, they should be construed as being included therein.

What is claimed is:

1. A zoom lens system, in order from an object side to an image side, comprising a first lens unit having positive optical power, a second lens unit having negative optical power, a third lens unit having positive optical power, and a fourth lens unit having positive optical power, wherein in zooming from a wide-angle limit to a telephoto limit at the time of image taking, the first lens unit, the second lens unit, the third lens unit and the fourth lens unit are moved individually along an optical axis such that air spaces between the individual lens units should vary, so that variable magnification is achieved, and wherein the following conditions (1-1), (a) and (b) are satisfied:

$$-0.60 < M_2/f_{G2} < -0.07 \quad (1-1)$$

$$\omega_W \geq 30 \quad (a)$$

$$f_T/f_W \geq 4.5 \quad (b)$$

where, $M_2$ is an amount of axial movement of the second lens unit in zooming from a wide-angle limit to a telephoto limit, wherein the wide-angle limit is adopted as a reference position, and movement from the image side to the object side is defined as positive, $f_{G2}$ is a composite focal length of the second lens unit, $\omega_W$ is a half view angle (°) at a wide-angle limit, $f_T$ is a focal length of the entire system at a telephoto limit, and $f_W$ is a focal length of the entire system at a wide-angle limit.

2. The zoom lens system as claimed in claim 1, satisfying the following condition (2):

$$1.15 < M_3/f_{G3} < 1.80 \quad (2)$$

where, $M_3$ is an amount of axial movement of the third lens unit in zooming from a wide-angle limit to a telephoto limit, wherein the wide-angle limit is adopted as a reference position, and movement from the image side to the object side is defined as positive, and $f_{G3}$ is a composite focal length of the third lens unit.

3. The zoom lens system as claimed in claim 1, satisfying the following condition (12):

$$-250 < f_{G2}/t_{L21} < -15 \quad (12)$$

where, $f_{G2}$ is a composite focal length of the second lens unit, and $t_{L21}$ is a center thickness of the most object side lens element of the second lens unit.

4. An imaging device capable of outputting an optical image of an object as an electric image signal, comprising:

a zoom lens system that forms the optical image of the object; and an image sensor that converts the optical image formed by the zoom lens system into the electric image signal, wherein the zoom lens system is the zoom lens system as claimed in claim 1.

5. A camera for converting an optical image of an object into an electric image signal and then performing at least one of displaying and storing of the converted image signal, comprising an imaging device including a zoom lens system that forms the optical image of the object and an image sensor that converts the optical image formed by the zoom lens system into the electric image signal, wherein the zoom lens system is the zoom lens system as claimed in claim 1.

6. A zoom lens system, in order from an object side to an image side, comprising a first lens unit having positive optical power, a second lens unit having negative optical power, a third lens unit having positive optical power, and a fourth lens unit having positive optical power, wherein in zooming from a wide-angle limit to a telephoto limit at the time of image taking, the first lens unit, the second lens unit, the third lens unit and the fourth lens unit are moved individually along an optical axis such that air spaces between the individual lens units should vary, so that variable magnification is achieved, wherein at least one of the lens elements constituting the second lens unit satisfies the following condition (I-2), and wherein the following conditions (a) and (b) are satisfied:

$$11.8 < f_W/t_{LG2} < 500.0 \quad (1-2)$$

$$\omega_W \geq 30 \quad (a)$$

$$f_T/f_W 4.5 \quad (b)$$

where, $t_{LG2}$ is a center thickness of the lens elements constituting the second lens unit, $\omega_W$ is a half view angle (°) at a wide-angle limit, $f_T$ is a focal length of the entire system at a telephoto limit, and $f_W$ is a focal length of the entire system at a wide-angle limit.

7. The zoom lens system as claimed in claim 6, satisfying the following condition (2):

$$1.15 < M_3/f_{G3} < 1.80 \qquad (2)$$

where, $M_3$ is an amount of axial movement of the third lens unit in zooming from a wide-angle limit to a telephoto limit, wherein the wide-angle limit is adopted as a reference position, and movement from the image side to the object side is defined as positive, and $f_{G3}$ is a composite focal length of the third lens unit.

8. The zoom lens system as claimed in claim 6, satisfying the following condition (12):

$$-250 < f_{G2}/t_{L21} < -15 \qquad (12)$$

where, $f_{G2}$ is a composite focal length of the second lens unit, and $t_{L21}$ is a center thickness of the most object side lens element of the second lens unit.

9. An imaging device capable of outputting an optical image of an object as an electric image signal, comprising:
a zoom lens system that forms the optical image of the object; and
an image sensor that converts the optical image formed by the zoom lens system into the electric image signal, wherein
the zoom lens system is the zoom lens system as claimed in claim 6.

10. A camera for converting an optical image of an object into an electric image signal and then performing at least one of displaying and storing of the converted image signal, comprising
an imaging device including a zoom lens system that forms the optical image of the object and an image sensor that converts the optical image formed by the zoom lens system into the electric image signal, wherein
the zoom lens system is the zoom lens system as claimed in claim 6.

11. A zoom lens system, in order from an object side to an image side, comprising a first lens unit having positive optical power, a second lens unit having negative optical power, a third lens unit having positive optical power, and a fourth lens unit having positive optical power, wherein
the third lens unit includes at least one set of cemented lens element, wherein
in zooming from a wide-angle limit to a telephoto limit at the time of image taking, the first lens unit, the second lens unit, the third lens unit and the fourth lens unit are moved individually along an optical axis such that air spaces between the individual lens units should vary, so that variable magnification is achieved, and wherein
the following conditions (1-3), (8), (a) and (b) are satisfied:

$$53 < (f_T/f_W) \times f_{G1}/t_{G1} < 900 \qquad (1\text{-}3)$$

$$0.15 < t_{G3ce}/t_{G3} < 0.39 \qquad (8)$$

$$\omega_W \geq 30 \qquad (a)$$

$$f_T/f_W \geq 4.5 \qquad (b)$$

where, $f_{G1}$ is a composite focal length of the first lens unit, $t_{G1}$ is a thickness of the first lens unit, wherein an optical axial distance measured from the object side surface of the most object side lens element to the image side surface of the most image side lens element, $t_{G3ce}$ is a center thickness of the cemented lens element of the third lens unit, $t_{G3}$ is a thickness of the third lens unit, wherein an optical axial distance measured from the object side surface of the most object side lens element to the image side surface of the most image side lens element, $\omega_W$ is a half view angle (°) at a wide-angle limit, $f_T$ is a focal length of the entire system at a telephoto limit, and $f_W$ is a focal length of the entire system at a wide-angle limit.

12. The zoom lens system as claimed in claim 11, satisfying the following condition (2):

$$1.15 < M_3/f_{G3} < 1.80 \qquad (2)$$

where, $M_3$ is an amount of axial movement of the third lens unit in zooming from a wide-angle limit to a telephoto limit, wherein the wide-angle limit is adopted as a reference position, and movement from the image side to the object side is defined as positive, and $f_{G3}$ is a composite focal length of the third lens unit.

13. The zoom lens system as claimed in claim 11, satisfying the following condition (12):

$$-250 < f_{G2}/t_{L21} < -15 \qquad (12)$$

where, $f_{G2}$ is a composite focal length of the second lens unit, and $t_{L21}$ is a center thickness of the most object side lens element of the second lens unit.

14. An imaging device capable of outputting an optical image of an object as an electric image signal, comprising:
a zoom lens system that forms the optical image of the object; and
an image sensor that converts the optical image formed by the zoom lens system into the electric image signal, wherein
the zoom lens system is the zoom lens system as claimed in claim 11.

15. A camera for converting an optical image of an object into an electric image signal and then performing at least one of displaying and storing of the converted image signal, comprising
an imaging device including a zoom lens system that forms the optical image of the object and an image sensor that converts the optical image formed by the zoom lens system into the electric image signal, wherein
the zoom lens system is the zoom lens system as claimed in claim 11.

16. A zoom lens system, in order from an object side to an image side, comprising a first lens unit having positive optical power, a second lens unit having negative optical power, a third lens unit having positive optical power, and a fourth lens unit having positive optical power, wherein
in zooming from a wide-angle limit to a telephoto limit at the time of image taking, the first lens unit, the second lens unit, the third lens unit and the fourth lens unit are moved individually along an optical axis such that air spaces between the individual lens units should vary, so that variable magnification is achieved, and wherein
the following conditions (1-4), (6), (a) and (b) are satisfied:

$$83 < (f_T/f_W) \times f_{G4}/t_{G4} < 900 \qquad (1\text{-}4)$$

$$4.0 < f_{G4}/f_W < 8.0 \qquad (6)$$

$$\omega_W \geq 30 \quad (a)$$

$$f_T/f_W \geq 4.5 \quad (b)$$

where,
$f_{G4}$ is a composite focal length of the fourth lens unit,
$t_{G4}$ is a thickness of the fourth lens unit, wherein an optical axial distance measured from the object side surface of the most object side lens element to the image side surface of the most image side lens element,
$\omega_W$ is a half view angle (°) at a wide-angle limit,
$f_T$ is a focal length of the entire system at a telephoto limit, and
$f_W$ is a focal length of the entire system at a wide-angle limit.

17. The zoom lens system as claimed in claim 16, satisfying the following condition (2):

$$1.15 < M_3/f_{G3} < 1.80 \quad (2)$$

where,
$M_3$ is an amount of axial movement of the third lens unit in zooming from a wide-angle limit to a telephoto limit, wherein the wide-angle limit is adopted as a reference position, and movement from the image side to the object side is defined as positive, and
$f_{G3}$ is a composite focal length of the third lens unit.

18. The zoom lens system as claimed in claim 16, satisfying the following condition (12):

$$-250 < f_{G2}/t_{L21} < -15 \quad (12)$$

where,
$f_{G2}$ is a composite focal length of the second lens unit, and
$t_{L21}$ is a center thickness of the most object side lens element of the second lens unit.

19. An imaging device capable of outputting an optical image of an object as an electric image signal, comprising:
a zoom lens system that forms the optical image of the object; and
an image sensor that converts the optical image formed by the zoom lens system into the electric image signal, wherein
the zoom lens system is the zoom lens system as claimed in claim 16.

20. A camera for converting an optical image of an object into an electric image signal and then performing at least one of displaying and storing of the converted image signal, comprising
an imaging device including a zoom lens system that forms the optical image of the object and an image sensor that converts the optical image formed by the zoom lens system into the electric image signal, wherein
the zoom lens system is the zoom lens system as claimed in claim 16.

* * * * *